(12) United States Patent
Takizawa

(10) Patent No.: US 7,990,459 B2
(45) Date of Patent: Aug. 2, 2011

(54) DUST-PROOF FILTER UNIT, IMAGE PICKUP APPARATUS, AND PROJECTION-TYPE IMAGE DISPLAY APPARATUS

(75) Inventor: Hiroyuki Takizawa, Chofu (JP)

(73) Assignee: Olympus Imaging Corp., Tokyo (JP)

( * ) Notice: Subject to any disclaimer, the term of this patent is extended or adjusted under 35 U.S.C. 154(b) by 589 days.

(21) Appl. No.: 12/074,902

(22) Filed: Mar. 6, 2008

(65) Prior Publication Data
US 2009/0225214 A1    Sep. 10, 2009

(51) Int. Cl.
*H04N 5/217*   (2006.01)
*H04N 5/225*   (2006.01)

(52) U.S. Cl. .......................... 348/342; 348/241
(58) Field of Classification Search .................. 348/241, 348/335, 342
See application file for complete search history.

(56) References Cited

U.S. PATENT DOCUMENTS

| | | | | |
|---|---|---|---|---|
| 5,760,528 A | * | 6/1998 | Tomikawa | 310/323.02 |
| 2005/0280712 A1 | * | 12/2005 | Kawai | 348/207.99 |
| 2008/0037980 A1 | * | 2/2008 | Okumura et al. | 396/535 |

FOREIGN PATENT DOCUMENTS

| | | |
|---|---|---|
| JP | 03-244281 | 10/1991 |
| JP | 04-035125 | 3/1992 |
| JP | 08-079633 | 3/1996 |
| JP | 09-130654 | 5/1997 |
| JP | 2002-204379 | 7/2002 |
| JP | 2003-110930 | 4/2003 |
| JP | 2003-348401 | 12/2003 |
| JP | 2004-056368 | 2/2004 |
| JP | 2004-219945 | 8/2004 |
| JP | 2004-264691 | 9/2004 |
| JP | 2005-159711 | 6/2005 |
| JP | 2007017700 A | * 1/2007 |

OTHER PUBLICATIONS

Japanese Office Action, dated Apr. 19, 2011, issued in corresponding Japanese Patent Application No. 2005-250009.
Japanese Office Action, dated Apr. 19, 2011, issued in corresponding Japanese Patent Application No. 2005-250010.

* cited by examiner

*Primary Examiner* — Timothy J Henn
(74) *Attorney, Agent, or Firm* — Kenyon & Kenyon LLP

(57) ABSTRACT

The dust-proof filter unit includes: a dust-proof member including a transmission portion which can transmit a light flux for image, the dust-proof member being oppositely disposed to a solid image pickup device at a predetermined spacing therebetween; a first excitation unit for providing a vibration to the dust-proof member, the vibration being in a first direction in parallel with a predetermined plane; a second excitation unit for providing a vibration to the dust-proof member, the vibration being in a second direction substantially perpendicular to the first direction; a dust-proof filter driving portion for driving the first excitation unit and the second excitation unit; and a control circuit for controlling the dust-proof filter driving portion.

14 Claims, 59 Drawing Sheets

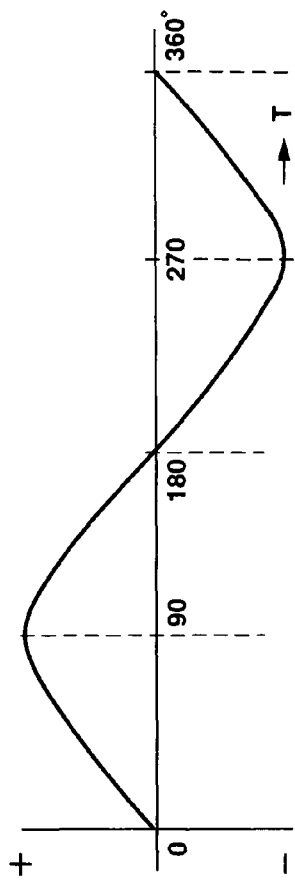
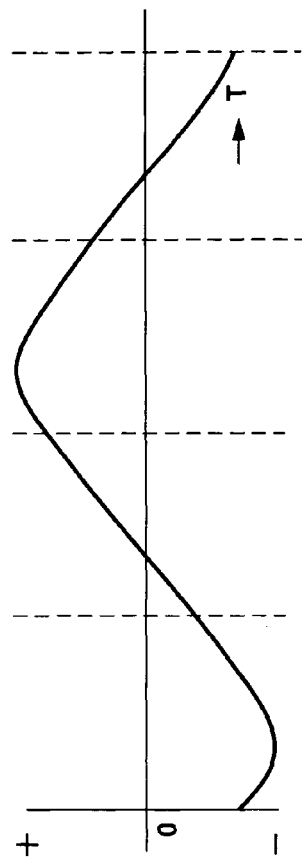
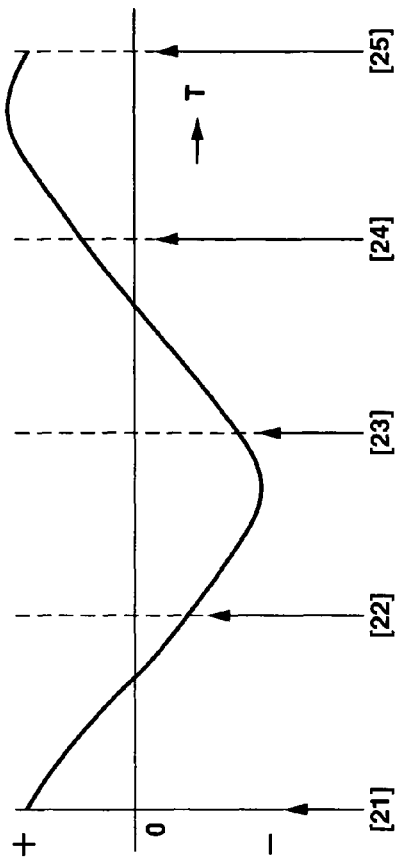
FIG.20A APPLICATION TO PIEZOELECTRIC ELEMENT 18A
FIG.20B APPLICATION TO PIEZOELECTRIC ELEMENT 18B
FIG.20C APPLICATION TO PIEZOELECTRIC ELEMENT 18C (A)    (B)

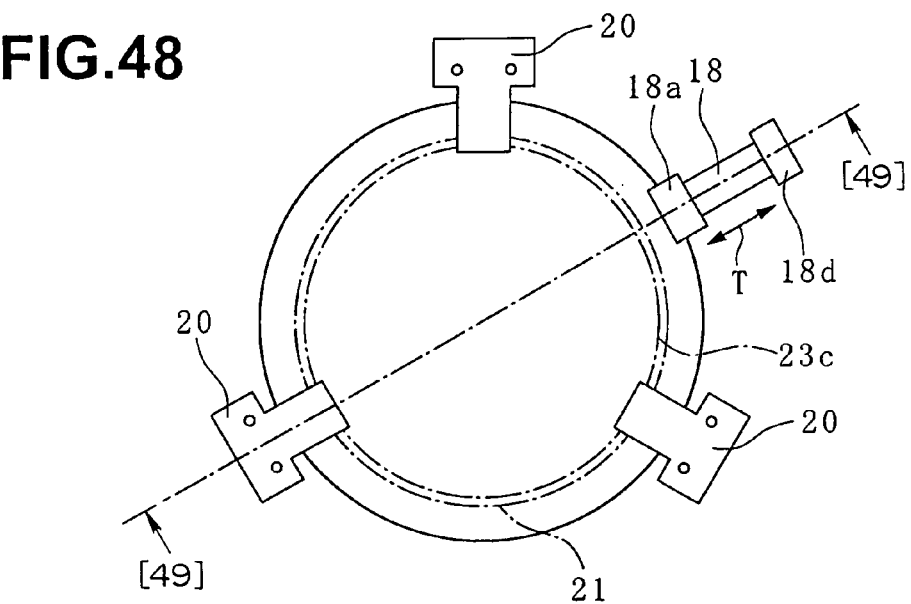
FIG.48
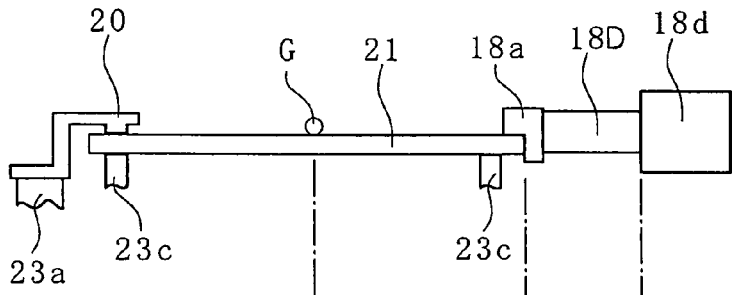
FIG.49A
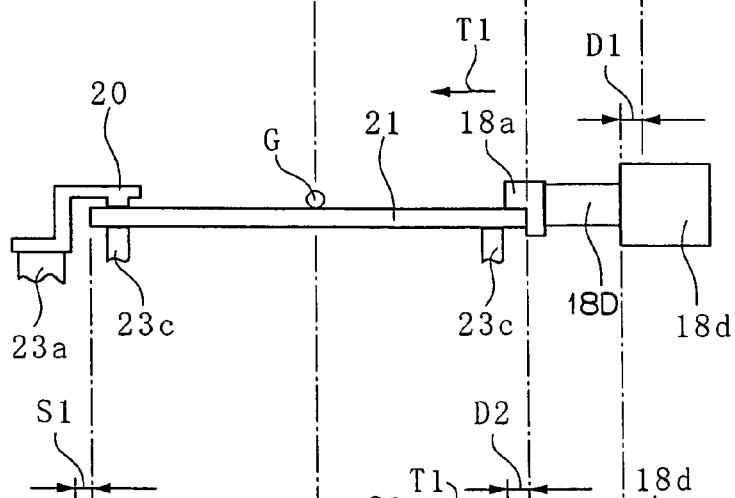
FIG.49B
FIG.49C

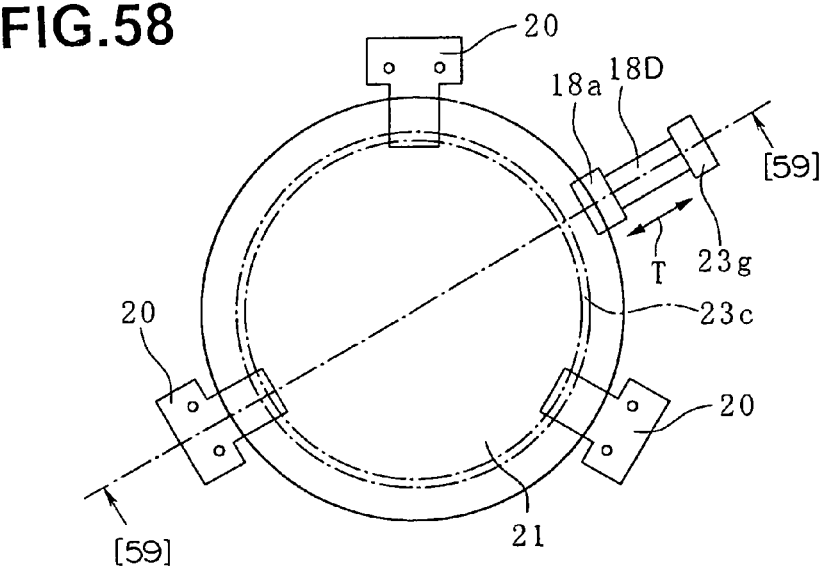
FIG.58
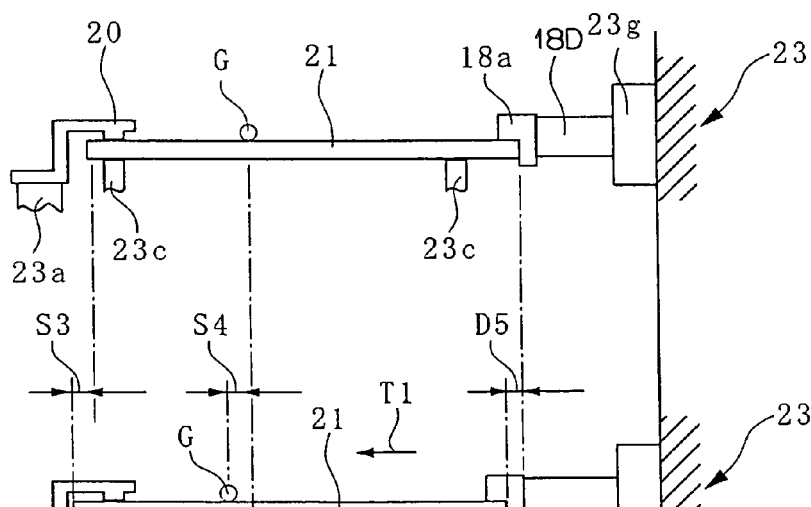
FIG.59A
FIG.59B
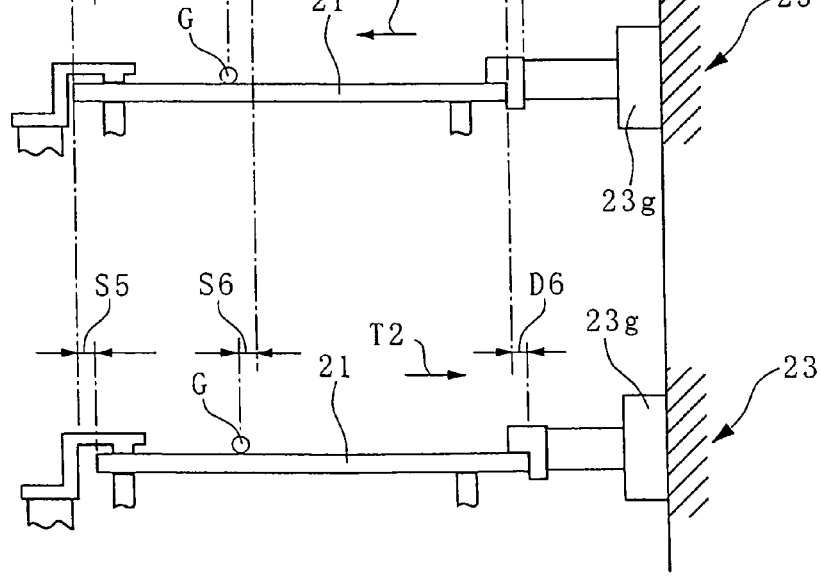
FIG.59C

FIG.76
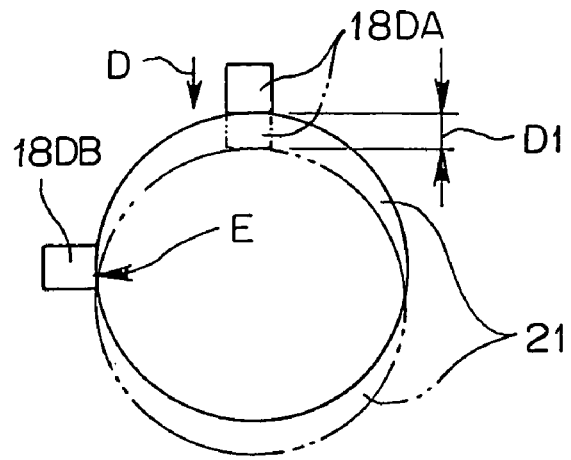
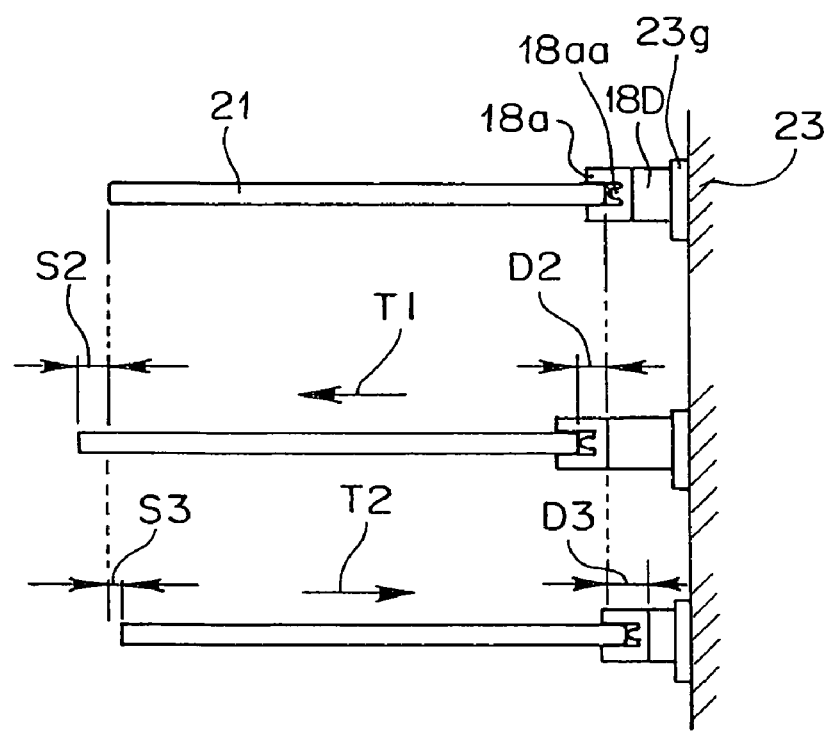
FIG.77A
FIG.77B
FIG.77C

DUST-PROOF FILTER UNIT, IMAGE PICKUP APPARATUS, AND PROJECTION-TYPE IMAGE DISPLAY APPARATUS

BACKGROUND OF THE INVENTION

1. Field of the Invention

The present invention relates to a dust-proof filter unit, an image pickup apparatus, and a projection image display apparatus, and particularly to an image pickup apparatus equipped with an image pickup device unit including an image pickup device which generates an image signal corresponding to a light irradiated onto a photoelectric conversion surface, and optical apparatuses such as a projection image display apparatus which forms an optical image in response to image information by modulating a light flux emitted from a light source by means of an image forming element, and enlarges and projects the optical image.

2. Description of the Related Art

Heretofore, image pickup apparatuses such as a digital camera have been generally commercialized and in wide spread use, which is an optical apparatus equipped with an image pickup device unit including a solid image pickup device (for example, a charge coupled device (CCD); hereinafter, simply referred to as an image pickup device) which receives an object image formed based on a light flux from an object (hereinafter, referred to as an object light flux) that has passed through a photographing optical system, and generates an image signal corresponding thereto.

Some of such digital cameras are equipped with a finder apparatus for observing an object to be photographed prior to a photographing operation. An example of such finder apparatuses is an optical finder apparatus of a single lens reflex type, which is configured to allow the observation of an optical image (object image) formed by for example a photographing optical system, and which can lead the object light flux that has passed through the photographing optical system to a photoelectric conversion surface of an image pickup device upon a photographing operation.

In recent years, digital cameras of single lens reflex type featuring interchangeable lenses are becoming in common use, in which by providing an optical finder apparatus of a single lens reflex type and arranging the photographing optical system to be detachable with respect to the camera body, it is made possible for a user to freely detach and replace the photographing optical system as desired thereby selectively using multiple types of photographing optical systems for a single camera body.

Such digital cameras featuring interchangeable lenses have a risk in that dusts etc. floating in the air enter into the camera body while the photographing optical system concerned is detached from the camera body. Further, since various mechanisms which operate mechanically, such as a shutter mechanism and an aperture mechanism are disposed in the camera body, minute debris etc. may be produced from such various mechanisms during the operation thereof.

During a photographing operation in which the shutter mechanism is kept open, the photoelectric conversion surface of the image pickup device, which is disposed in the rear of the photographing optical system, is exposed to the air inside the camera. This may cause the dusts and minute debris etc. produced as described above to adhere to the photoelectric conversion surface of the image pickup device.

Thus, the dusts and minute debris etc. that have adhered to the photoelectric conversion surface may have adverse effects such as causing an undesired shadow on the image represented by an image signal generated by the image pickup device.

Accordingly, in Japanese Patent Laid-Open No. 2003-348401, the present applicants proposed and put into practical use a technique which allows to remove the dusts adhering to the photographing lens side surface of an optical device, by disposing an optical element (a dust-proof member) on the front face side of a photoelectric conversion element (an image pickup device) so that the space between the optical element and the photoelectric conversion element is sealed, and causing the optical element to vibrate by means of excitation means.

Further, in Japanese Patent Laid-Open No. 2002-204379, the present applicants proposed a technique which allows to remove the dusts adhering to the surface of an optical element, by proving a dust-proof member (the optical element) on the front face side of a photoelectric conversion element (an image pickup device), and a stacked piezoelectric body which provides vibration in a predetermined direction to the dust-proof member, one end of which is fixedly disposed to a predetermined portion of the dust-proof member, and to the other end of which a weight member is fixedly attached, and by applying a periodic voltage to the stacked piezoelectric body to cause the dust-proof member to vibrate along the optical axis of a photographing lens.

On the other hand, although image pickup devices sealed in a package (for example, called as a packaged CCD) are in wide spread use as the image pickup device for conventional digital cameras, recently, other than such form of image pickup devices, marketing of CCD chips in a bare state so called a bare-chip CCD has been proposed.

In such a bare-chip CCD, since dusts or the like are more likely to adhere to the photoelectric conversion surface thereof, for example, Japanese Patent Laid-Open No. 09-130654 discloses proposals on a configuration which enables to shake off the dusts or the like adhering to the photoelectric conversion surface of the CCD by providing a piezoelectric element between a bare-chip CCD and a substrate for mounting the bare-chip CCD, and vibrating the bare-chip CCD itself by applying a predetermined voltage to the piezoelectric element; or a configuration which allows to remove the dusts or the like adhering to the photoelectric conversion surface of the CCD concerned by providing an optical member in front of the photoelectric conversion surface of a bare-chip CCD, arranging the optical member and the bare-chip CCD to be sealed inside a hollow cylindrical member, and causing the bare-chip CCD to vibrate by means of a piezoelectric element provided in the back of the bare-chip CCD.

On the other hand, in recent years, various kinds of optical apparatus are proposed and put into practical use, including a projection image display apparatus, so called a projector, which is configured such that a light flux emitted from a light source is modulated to form an optical image in response to image information by means of an image forming element such as a liquid crystal display element, and thus formed optical image is enlarged and projected onto a screen etc.

SUMMARY OF THE INVENTION

A dust-proof filer unit of the present invention comprises: a dust-proof member including a transmission portion which can transmit a light flux for image, the dust-proof member being oppositely disposed to a solid image pickup device at a predetermined spacing therebetween; first excitation means for providing a vibration to the dust-proof member, the vibration being in a first direction in parallel with a predetermined plane; second excitation means for providing a vibration to the dust-proof member, the vibration being in a second direction substantially perpendicular to the first direction; a dust-proof filter driving portion for driving the first excitation means and the second excitation means; and a control circuit for controlling the dust-proof filter driving portion.

An image pickup apparatus of the present invention comprises: a solid image pickup device for acquiring an image signal corresponding to a light irradiated onto a photoelectric conversion surface; an image pickup optical system for directing an object image incident onto a photoelectric conversion surface of the solid image pickup device; a display apparatus for displaying an image based on an image pickup signal from the solid image pickup device; a dust-proof member which is disposed between the image pickup optical system and the solid image pickup device; first excitation means for proving a vibration to the dust-proof member, the vibration being in a substantially perpendicular direction to the optical axis direction of the image pickup optical system; second excitation means for providing a second vibration to the dust-proof member, the second vibration being substantially in an optical axis direction; a dust-proof filter driving portion for driving the first excitation means and the second excitation means; and a control circuit for controlling the dust-proof filter driving portion.

A projection image display apparatus of the present invention includes a light source, an image forming element for modulating a light flux emitted from the light source and forming an optical image according to image information, and a projection optical system for enlarging and projecting an optical image formed by the image forming element, the apparatus comprising: a dust-proof member having a transmission portion which is oppositely disposed to the image forming element and which can transmit a light flux for an image; first excitation means for providing a vibration to the dust-proof member, the vibration being in a substantially perpendicular direction to an optical axis along which a light flux is incident from the light source; second excitation means for providing a vibration to the dust-proof member, the vibration being substantially in an optical axis direction along which a light flux is incident from the light source; a dust-proof filter driving portion for driving the first excitation means and the second excitation means; and a control circuit for controlling the dust-proof filter driving portion.

The benefits of these embodiments of the present invention will become apparent from the following detailed description.

BRIEF DESCRIPTION OF THE DRAWINGS

FIG. 20A shows a variation of the applied voltage to be applied to drive one of the plurality of first excitation members to be extended/contracted in the camera of FIG. 1;

FIG. 20B shows a variation of the applied voltage to be applied to drive another of the plurality of first excitation members to be extended/contracted in the camera of FIG. 1;

FIG. 20C shows a variation of the applied voltage to be applied to drive still another of the plurality of first excitation members to be extended/contracted in the camera of FIG. 1;

FIG. 48 is a layout drawing as viewed from the front of a dust-proof member (a dust-proof filter) and an excitation member (a piezoelectric element) in the camera of FIG. 43;

FIG. 49A is a conceptual side view to illustrate the action of the dust-proof member (dust-proof filter) and the excitation member (piezoelectric element) of FIG. 48 showing the state in which the excitation member is extended to the furthest position;

FIG. 49B is a conceptual side view to illustrate the action of the dust-proof member (dust-proof filter) and the excitation member (piezoelectric element) of FIG. 48 showing the state in which the excitation member is contracted from the state of FIG. 49A;

FIG. 49C is a conceptual side view to illustrate the action of the dust-proof member (dust-proof filter) and the excitation member (piezoelectric element) of FIG. 48 showing the state in which the excitation member is extended from the state of FIG. 49B;

FIG. 58 is a layout drawing as viewed from the front of a dust-proof member (a dust-proof filter) and an excitation member (a piezoelectric element) in the camera of FIG. 56;

FIG. 59A is a conceptual side view to illustrate the action of the dust-proof member (dust-proof filter) and the excitation member (piezoelectric element) of FIG. 58 showing the state in which the excitation member is at no load;

FIG. 59B is a conceptual side view to illustrate the action of the dust-proof member (dust-proof filter) and the excitation member (piezoelectric element) of FIG. 58 showing the state in which the excitation member is extended from the state of FIG. 59A;

FIG. 59C is a conceptual side view to illustrate the action of the dust-proof member (dust-proof filter) and the excitation member (piezoelectric element) of FIG. 58 showing the state in which the excitation member is contracted from the state of FIG. 59B;

FIG. 76 conceptually illustrates the manner in which the plurality of excitation members act to the dust-proof member in the image pickup apparatus of FIG. 67;

FIG. 77A is a side view of the dust-proof member and the excitation member to conceptually show the manner in which the dust-proof member vibrates when the excitation member in the image pickup apparatus of FIG. 67 is extended/contracted, in which the excitation member is at no load;

FIG. 77B is a side view of the dust-proof member and the excitation member to conceptually show the manner in which the dust-proof member vibrates when the excitation member in the image pickup apparatus of FIG. 67 is extended/contracted, in which the excitation member has been extended from the state of FIG. 77A;

FIG. 77C is a side view of the dust-proof member and the excitation member to conceptually show the manner in which the dust-proof member vibrates when the excitation member in the image pickup apparatus of FIG. 67 is extended/contracted, in which the excitation member has been contracted from the state of FIG. 77B;

DETAILED DESCRIPTION OF THE PREFERRED EMBODIMENTS

First, a first embodiment of the present invention will be described below. In the present embodiment, an image pickup apparatus to which the present invention is applied, specifically a single lens reflex digital camera (hereinafter, simply referred to as a camera) with interchangeable lenses will be demonstrated.

Figure 1:
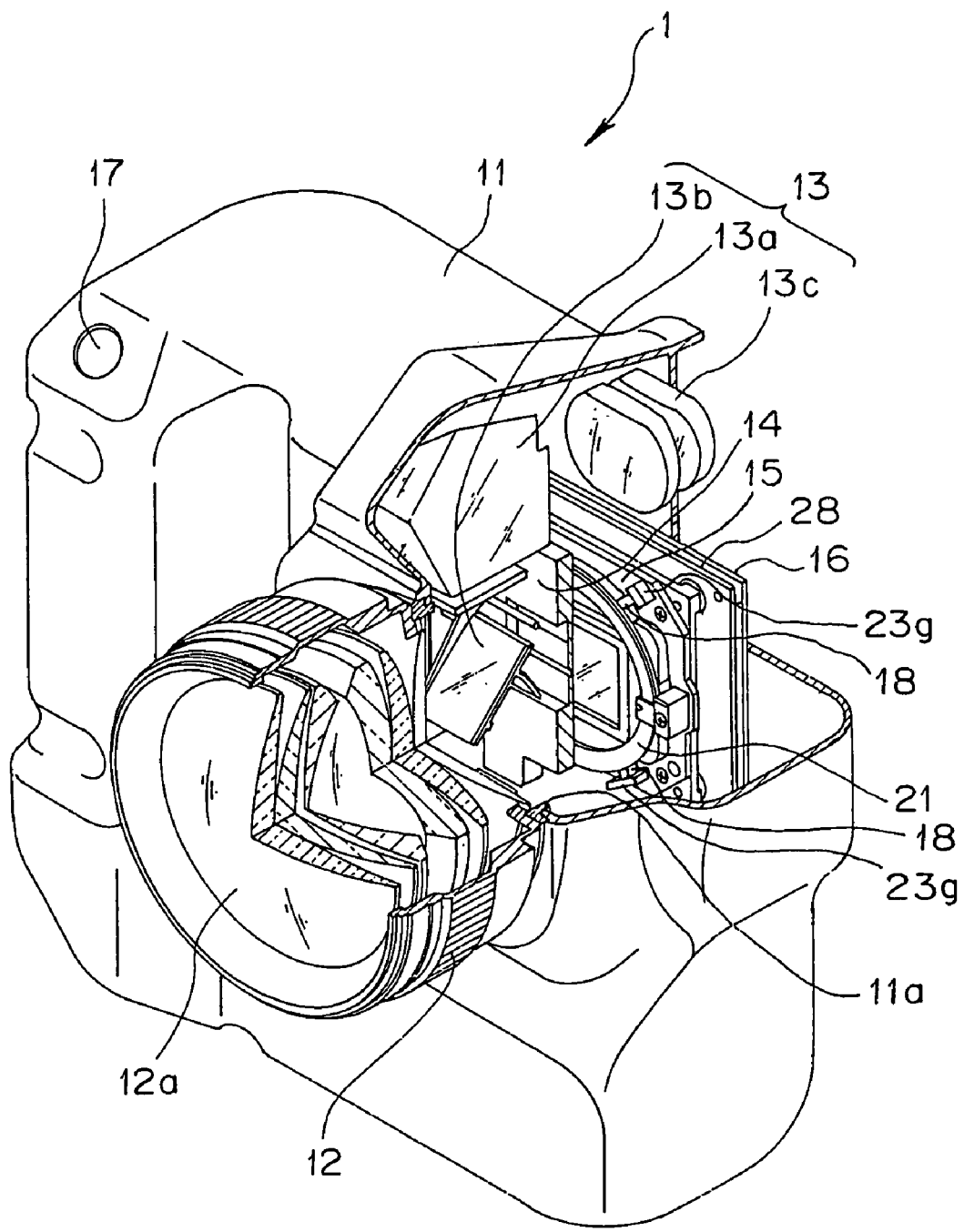
FIG. 1 is a partially cutaway perspective view to schematically show the internal configuration of an image pickup apparatus (a camera) of a first embodiment of the present invention.
Figure 2:
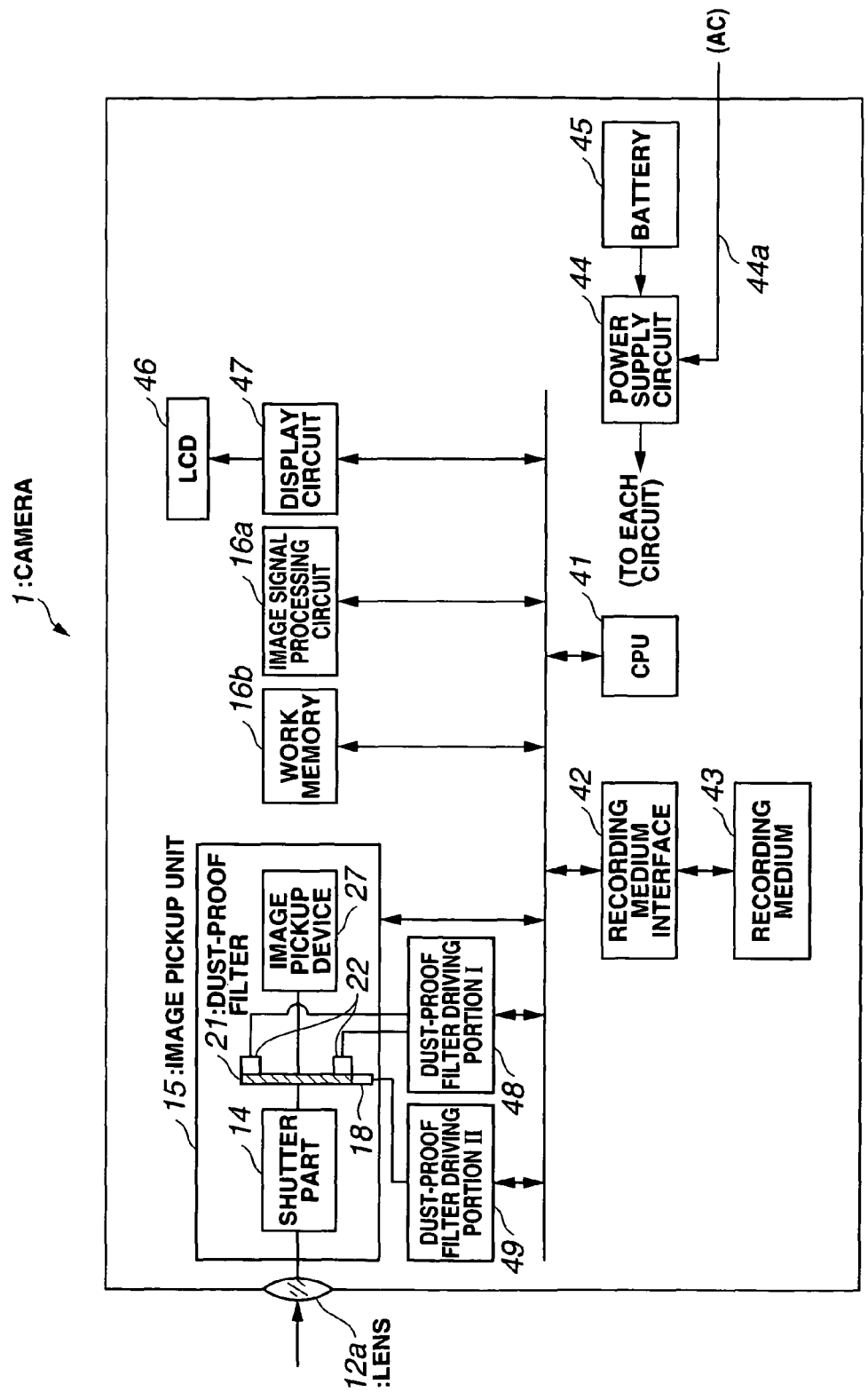
FIG. 2 is a schematic block diagram to primarily show the electric configuration of the camera of FIG. 1.

FIGS. 1 and 2 schematically show the configuration of an image pickup apparatus (a camera) according to a first embodiment of the present invention; in which FIG. 1 is a partially cutaway perspective view to schematically show the internal configuration of the image pickup apparatus (the camera), and FIG. 2 is a schematic block diagram to primarily show the electric configuration of the image pickup apparatus (the camera) of FIG. 1.

The camera 1 of the present invention is made up of a camera body 11 and a lens barrel 12, both of which (11, 12)

are separately constructed and configured to be attachable to and detachable from each other.

The lens barrel 12 is configured to contain an optical system made up of a plurality of optical lenses (optical elements), that is, a photographing optical system 12a and mechanism members such as a drive mechanism thereof and an aperture blade. The photographing optical system 12a is made up of, for example, a plurality of optical lenses through which a light flux from an object passes through such that an object image to be formed from the object light flux can be formed at a predetermined position (on a photoelectric conversion surface of an image pickup device 27 to be described later). The lens barrel 12 is disposed so as to project forward from the front face of the camera body 11.

Further, as the lens barrel 12, one similar to those which are commonly used in conventional cameras is applied. Therefore, description on the detailed configuration thereof will be omitted.

The camera body 11 is configured to include various components thereinside, and also include in the front face thereof a photographing optical system mounting part 11a which is a connection member for arranging the lens barrel 12, which retains the photographing optical system 12a, to be detachable. Thus, a camera 1 of a so called single lens reflex type with interchangeable lenses is configured.

An exposure opening having a predetermined diameter for directing an object light flux into the camera body 11 is formed at approximately central portion of the front face side of the camera body 11, and the photographing optical system mounting part 11a is formed at the peripheral edge part of the exposure opening.

On the outer face side of the camera body 11, the above described photographing optical system mounting part 11a is disposed on the front face thereof, and moreover various operation members for operating the camera body 11, for example, a release button 17 for generating an indicator signal for starting the photographing operation and the like are disposed at predetermined positions on the top face and the rear face thereof. Since these operation members are not directly relevant with the present invention, description on the operation members except the release button 17 will be omitted for avoiding the complexity of the drawing.

Inside the camera body 11, as shown in FIG. 1, there are disposed respectively at predetermined positions various components such as: for example, a finder apparatus 13 which is provided to form a desired object image formed by a photographing optical system 12a at a predetermined position different from the photoelectric conversion surface of an image pickup device 27 (an image forming body; see FIG. 2) and which makes up a so-called observation optical system; an image pickup unit 15 (to be described in more detail below) which is an assembly made up of a shutter part 14 including a shutter mechanism for controlling an illumination time of an object light flux onto the photoelectric conversion surface of the image pickup device 27, an image pickup device 27 for obtaining an image signal corresponding to the object image to be formed based on the object light flux which has passed through a photographing optical system 12a, and a dust-proof filter 21 (to be described in more detail below) which is a dust-proof member disposed at a predetermined position on the front face side of a photoelectric conversion surface of the image pickup device 27 and for preventing dusts etc. from adhering to the photoelectric conversion surface; and a plurality of circuit boards including a main circuit board 16 (only a main circuit board 16 is shown in FIG. 1) on which various electric members making up an electric circuit such as an image signal processing circuit 16a (see FIG. 2) for performing various signal processing on an image signal obtained by the image pickup device 27.

The finder apparatus 13 is made up of: a reflex mirror 13b configured to be able to bend the optical axis of the object light flux which has passed through the photographing optical system 12a and lead it toward the observation optical system; a pentaprism 13a which receives the light flux emitted from the reflex mirror 13b and forms an erect image; an eyepiece 13c for enlarging the image formed by the pentaprism 13a to provide an optimum image for observation; and the like.

The reflex mirror 13b is configured to be movable between the position to be retracted from the optical axis of the photographing optical system 12a and a predetermined position on the optical axis, and disposed on the optical axis of the photographing optical system 12a so as to have a predetermined angle, for example 45 degrees with respect to the optical axis in a normal condition. This will cause the optical axis of the object light flux which has passed through the photographing optical system 12a to be bent by the reflex mirror 13b and reflected to the side of the pentaprism 13a which is disposed above the reflex mirror 13b.

On the other hand, while the camera 1 is executing a photographing operation, the reflex mirror 13b is adapted to move to a predetermined position (not expressly shown) to be retracted from the optical axis of the photographing optical system 12a during an actual light exposure operation. This will allow the object light flux to be directed to the image pickup device 27 to illuminate the photoelectric conversion surface thereof.

The shutter part 14 adopts those similar to what are commonly used in conventional cameras etc., such as for example a shutter mechanism of a focal plane type, a drive circuit for controlling the operation of the shutter mechanism, and the like. Therefore, description on details thereof will be omitted.

Further, inside the camera body 1, a plurality of circuit boards are disposed making up various electric circuits as described above. As shown in FIG. 2, the electric configuration of the camera body 1 is primarily made up of: a CPU 41 which is a control circuit for integrally controlling the entire camera body 1; an image signal processing circuit 16a for performing various signal processing such as a signal processing to convert an image signal obtained by the image pickup device 27 into a form of signal adapted for recording; a work memory 16b for temporarily recording image signals and image data processed by the image signal processing circuit 16a and various information associated therewith; a recording medium 43 for recording the image data for recording of a predetermined format generated by the image signal processing circuit 16a in a predetermined region; a recording medium interface 42 configured to electrically connect the recording medium 43 and the electric circuits of the camera 1; a display part 46 made up of a liquid crystal display device (LCD) for displaying the image and the like; a display circuit 47 which electrically connects the display part 46 and the camera body 1 to receive image signals processed by the image signal processing circuit 16a and generates an image signal for display suitable for displaying using the display part 46; a battery 45 made up of a secondary battery such as a dry cell, or the like; a power supply circuit 44 which receives power from an external power source (AC) supplied by the battery 45 or a predetermined connection cable 44a etc. and controls it to be suitable for operating the camera 1 thereby delivering it to each electric circuit; a dust-proof filter driving portion I 48 made up of an oscillator or the like so as to control the driving of a piezoelectric element 22 which is an electric circuit for generating vibration in a predetermined direction of the dust-proof filter 21 contained in the image pickup unit 15, and which is a second excitation member integrally disposed on one face of the peripheral edge part of the dust-proof filter 21, and made up of for example an electromechanical transducer element; a dust-proof filter driving portion II 49 which controls the driving of piezoelectric element 18 of a stack-type (to be described in more detail below, and hereinafter referred to as a stacked piezoelectric element) made up of for example an electromechanical transducer element etc. and which is an electric circuit for generating vibration in a predetermined direction of the dust-proof filter 21 contained in the image pickup unit 15, and which is a first excitation member to be disposed in the vicinity of the dust-proof filter 21; and the like.

Next, detailed configuration of the image pickup unit 15 in the camera 1 of the present embodiment will be described.

Figure 3:
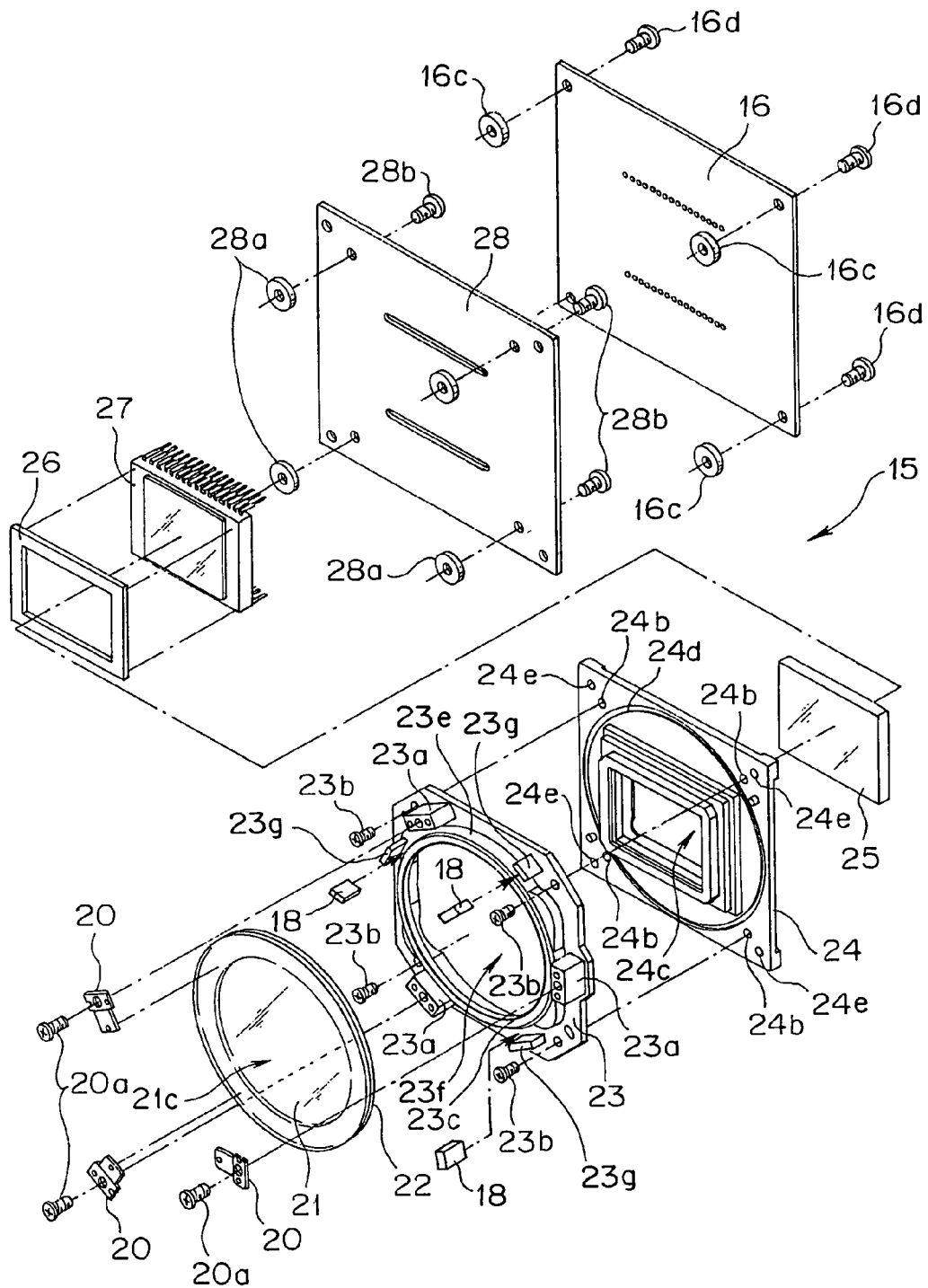
FIG. 3 is a principal part exploded perspective view to exclusively show part of the image pickup unit of the camera of FIG. 1.
Figure 4:
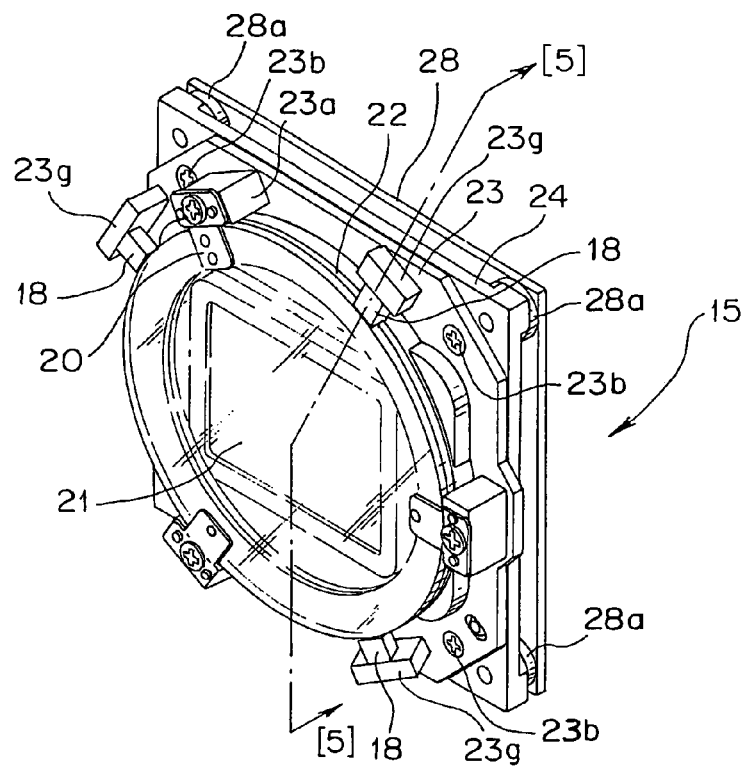
FIG. 4 is a perspective view to show the image pickup unit in the camera of FIG. 1 in an assembled state.
Figure 5:
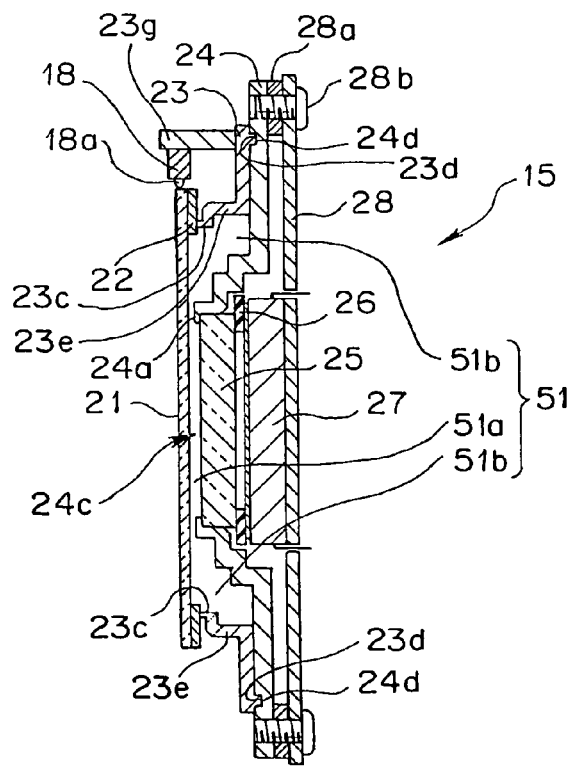
FIG. 5 is a sectional view taken along the line [5]-[5] in FIG. 4.

FIGS. 3, 4, and 5 show a part taken from the image pickup unit in the camera of the present embodiment; in which FIG. 3 is a principal part exploded perspective view of part of the image pickup unit, FIG. 4 is a perspective view to show the image pickup unit in an assembled state, and FIG. 5 is a sectional view taken along the line [5]-[5] in FIG. 4.

It is to be noted that although the image pickup unit 15 of the camera 1 according to this embodiment is a unit made up of a plurality of members including the shutter part 14 as described above (see FIGS. 1 and 2), FIGS. 3 to 5 illustrate only principal parts thereof omitting the illustration of the shutter part 14 itself. Further, in order to illustrate a positional relationship between respective components, FIG. 3 also shows a main circuit board 16 which is provided in the vicinity of the image pickup unit 15 and on which an electric circuit of am image pickup system such as the image pickup device 27 is mounted. Moreover, although the main circuit board 16 is mounted with an image signal processing circuit 16a, a work memory 16b (see FIG. 2) and the like, description on the detail of the main circuit board 16 itself is omitted as those commonly used in conventional cameras etc. are adopted.

The image pickup unit 15 is primarily made up of: an image pickup device 27 which obtains an image signal corresponding to the light which has passed through the photographing optical system 12a (see FIGS. 1 and 2) to illuminate the photoelectric conversion surface of the image pickup device 27 itself; an image pickup unit fixing plate 28 made up of a thin plate member which fixedly supports the image pickup device 27; an optical low pass filter (hereinafter, referred to as an optical LPF) 25 which is an optical element disposed on the photoelectric conversion surface side of the image pickup device 27 and adapted to remove high frequency components from an object light flux that has passed through the photographing optical system 12a and is to be radiated therefrom; a low pass filter receiving member 26 disposed on the peripheral edge part between the optical LPF 25 and the image pickup device 27 and formed of an elastic member having a substantially frame-shape or the like; an image pickup device container case member 24 (hereinafter, referred to as a CCD case 24) which contains and fixedly holds the image pickup device 27, which is arranged to be appressed against the peripheral edge portion or its vicinity portion of the optical LPF 25 to support the same, and a predetermined portion of which is in intimate contact with a dust-proof filter receiving member 23, which will be described later; a dust-proof filter receiving member 23 disposed on the front face side of the CCD case 24 and adapted to be appressed against the peripheral edge portion or its vicinity portion of the dust-proof filter 21 (a dust-proof member) to support the same; a dust-proof filter 21 which is a dust-proof member supported by the dust-proof filter receiving member 23, which is positioned on the photoelectric conversion surface side of the image pickup device 27 and oppositely disposed to the optical LPF 25 at a predetermined position with a predetermined spacing therebetween on the front face side of the optical LPF 25, and which has a transmission portion 21c which is a transparent part capable of transmitting an incoming light flux (light flux for an image) from an object passing through the photographing optical system 12a; a piezoelectric element 22 which is made of for example an electromechanical transducer element etc. and is a second excitation member integrally disposed on one side of the peripheral edge part of the dust-proof filter 21 and for providing a vibration in a second direction (the optical axis direction of the photographing optical system 12a) to the dust-proof filter 21; a stack-type piezoelectric element (stacked piezoelectric element) 18 which is made of for example an electromechanical transducer element etc. and is a first excitation member disposed in contact with the peripheral edge part of the dust-proof filter 21 and for providing a vibration in a first direction (a direction approximately perpendicular to the optical axis direction of the photographing optical system 12a) to the dust-proof filter 21; a pressing member 20 made of an elastic body which holds the dust-proof filter 21 to be airtightly joined with the dust-proof filter receiving member 23; and the like.

Further, in the present embodiment, a first excitation means is made up of the stacked piezoelectric element 18 which is the first excitation member described above, a dust-proof filter driving portion II 49 which is an electric circuit for generating vibration in a predetermined direction (a first direction) of the dust-proof filter 21 by controlling the driving of the stacked piezoelectric element 18 while being controlled by a CPU 41.

Further, in a similar fashion, a second excitation means is made up of the piezoelectric element 22 which is the second excitation member described above, a dust-proof filter driving portion I 48 which is an electric circuit for generating vibration of the dust-proof filter 21 in a predetermined direction (a second direction) by controlling the driving of the stacked piezoelectric element 22 while being controlled by a CPU 41.

The image pickup device 27 is adapted to obtain an image signal corresponding to an object image formed on the photoelectric conversion surface of itself by receiving an object light flux which passed through the photographing optical system 12a on the photoelectric conversion surface to perform photoelectric conversion processing, and to which for example a charge coupled device (CCD) is applied.

The image pickup device 27 is mounted at a predetermined position on the main circuit board 16 via an image pickup device fixing plate 28. The main circuit board 16 is mounted with an image signal processing circuit 16a and a work memory 16b etc. (not expressly shown in FIG. 3; see FIG. 2) so that an output signal from the image pick-up device 27, that is, an image signal obtained by photoelectric conversion processing is transmitted to the image signal processing circuit 16a.

Signal processing to be performed in the image signal processing circuit 16a includes various signal processing such as for example a processing to convert the image signal obtained from the image pickup device 27 into a form of signal adapted for recording, as a signal corresponding to an image formed on the photoelectric conversion surface of the image pickup device 27 by the photographing optical system 12a held within the lens barrel 12 mounted on the photographing optical system mounting part 11a. Such signal processing is approximately similar to processing commonly performed in typical digital cameras etc. which are configured to deal with electronic image signals. Therefore, detailed description on various signal processing to be performed in the camera 1 will be omitted.

On the front face side of the image pickup device 27, the optical LPF 25 is disposed sandwiching the low pass filter receiving member 26 therebetween. The CCD case 24 is disposed so as to cover the optical LPF 25.

The CCD case 24 is provided in its substantially central portion with an opening 24c of a rectangular shape, and the low pass filter receiving member 26, the optical LPF 25, and the image pickup device 27 are disposed in the opening 24c from rearward. On the rearward side inner peripheral edge part of the opening 24c, a step 24a having a substantially L-shape section is formed as shown in FIG. 5.

As described above, the low pass filter receiving member 26 made up of an elastic member etc. is disposed between the optical LPF 25 and the image pickup device 27. The low pass filter receiving member 26 is disposed at a position of the front face side peripheral edge part of the image pickup device 27 where superposition with the effective area of the photoelectric conversion surface can be avoided, and is in abutment with the vicinity of the rear face side peripheral edge part of the optical LPF 25. The low pass filter receiving member 26 also serves to keep an airtight condition between the optical LPF 25 and the image pickup device 27. Concurrently, the optical LPF 25 is subjected to an elastic force along the optical axis of the photographing optical system 12a caused by the low pass filter receiving member 26.

Further, the optical LPF 25 is disposed such that the front face side peripheral edge part comes into contact with the step 24a of the CCD case 24 in a substantially airtight manner. Thus, the step 24a of the CCD case 24 is subjected to an elastic force caused by the low pass filter receiving member 26, which tends to cause the optical LPF 25 to be displaced along the optical axis of the photographing optical system 12a, thereby serving to restrict the position of the optical LPF 25 in the direction along the optical axis of the photographing optical system 12a.

In other words, the optical LPF 25, which is inserted into the opening 24c of the CCD case 24 from rear face side, is restricted in its position in the direction along the optical axis of the photographing optical system 12a by the step 24a. This prevents the optical LPF 25 from being drawn out forwardly to outside from inside the CCD case 24.

Thus, after the optical LPF 25 is inserted into the opening 24c of the CCD case 24 from the rear face side, the image pickup device 27 is disposed on the rear face side of the optical LPF 25 via the low pass filter receiving member 26 which is held between the peripheral edge part and the image pickup device 27.

Additionally, the image pickup device 27 is mounted on the main circuit board 16 with the image pickup device fixing plate 28 being sandwiched therebetween as described above. Further, the image pickup device fixing plate 28 is fixed to a screw hole 24e from the rear face side of the CCD case 24 via a spacer 28a with a screw 28b. Furthermore, the main circuit board 16 is fixed to the image pickup device fixing plate 28 via the spacer 16c with the screw 16d.

On the front face side of the CCD case 24, the dust-proof filter receiving member 23 is fixed to the screw hole 24b of the CCD case 24 with the screw 23b. In this case, as shown in FIGS. 3 and 5, a circumferential groove 24d is formed in a substantially annular form at a predetermined position in the vicinity of the front face side peripheral edge part of the CCD case 24. On the other hand, an annular convex portion 23d (not shown in FIG. 3, and see FIG. 5) corresponding to the circumferential groove 24d of the CCD case 24 is formed in a substantially annular shape along the entire circumference at a predetermined position in the vicinity of the peripheral edge part on the rear face side of the dust-proof filter receiving member 23. Therefore, since the annular convex portion 23d and the circumferential groove 24d are fitted to each other, the CCD case 24 and the dust-proof filter receiving member 23 are adapted to fit to each other in a substantially air tight manner in the annular region, i.e., a region where the circumferential groove 24d and the annular convex portion 23d are formed.

The dust-proof filter 21 is an optical member which has a circular or polygonal plate shape as a whole, and at least a region of which forms a transparent part (transmission portion 21C, see FIG. 3) having a predetermined spread in the radial direction from its own center, serving as a dust-proof member for preventing dusts etc. from adhering to the outer surfaces of the optical LPF 25 and the image pickup device 27 of the photoelectric conversion surface. The transmission portion 21c of the dust-proof filter 21 is oppositely disposed to the front face of the optical LPF 25 (photoelectric conversion surface of the image pickup device 27) with a predetermined spacing.

Furthermore, at the peripheral edge part of one side (rear face side in the present embodiment) of the dust-proof filter 21, the piezoelectric element 22, which is a second excitation member to provide vibration to the dust-proof filter 21, and which is formed of an electro mechanical conversion element, is integrally disposed by use of attachment means, for example, an adhesive.

The piezoelectric element 22 is configured to be able to generate a vibration in a second direction (the optical axis direction of the photographing optical system 12a) with respect to the dust-proof filter 21 by being applied with a predetermined drive voltage from outside.

The dust-proof filter 21 is disposed as shown in FIGS. 4 and 5 so as to be airtightly joined with respect to the dust-proof filter receiving member 23 via the piezoelectric element 22. In this case, the elastic force of the pressing member 20 made of an elastic body such as a leaf spring presses the dust-proof filter 21 at its outer peripheral edge part of front face side in a predetermined direction, that is, a direction along the optical axis of the photographing optical system 12a, and from the front face side to the rear face side, so as to be held at a predetermined position on the front face side of the dust-proof filter receiving member 23.

Next, the mechanism of the portion at which the dust-proof filter 21 is held against the dust-proof filter receiving member 23 will be described in more detail.

That is, as shown in FIG. 3, an opening 23f having a circular or polygonal shape is provided in substantially central part of the dust-proof filter receiving member 23. The opening 23f is specified to have an enough size to allow an object light flux, which has passed through the photographing optical system 12a, to pass therethrough and illuminate the photoelectric conversion surface of the image pickup device 27 disposed in the rearward thereof.

A wall part 23e which protrudes forwardly (see FIGS. 3 and 5) is formed into a substantially annular shape at the peripheral edge part of the opening 23f and, on the distal end side of the wall part 23e, a receiving part 23c is formed so as to protrude further forwardly.

Meanwhile, on the front face side of the dust-proof filter receiving member 23, a plurality of protruding parts 23a, 23g (three for each in the present embodiment) are formed so as to protrude forwardly at predetermined positions in the vicinity of the outer peripheral edge part of the wall part 23e. In this case, the three protruding parts 23a are respectively disposed at an angular spacing of about 120 degrees with respect to the circumference of the dust-proof filter 21. Similarly, three protruding parts 23g are disposed at an angular spacing of about 120 degrees to each other at positions different form those of the above-mentioned protruding parts 23a.

The protruding part 23a is a portion to be formed to fixedly mount the pressing member 20 which holds the dust-proof filter 21. The pressing member 20 is fixedly mounted to the distal end of the protruding part 23a by fastening means i.e., a screw 20a.

The pressing member 20 is a member formed of an elastic body such as a leaf spring as described above, and the proximal end portion thereof is fixedly mounted to the distal end portion of the protruding part 23a and a free end part thereof comes into abutment with the outer peripheral edge part of the dust-proof filter 21 resulting in pressing the dust-proof filter 21 toward the dust-proof filter receiving member 23 side, that is, in the direction along the optical axis of the photographing optical system 12a to hold the dust-proof filter 21.

In this case, the abutment of the predetermined part of the piezoelectric element 22, which is disposed at the outer peripheral edge part on the rear face side of the dust-proof filter 21, against the receiving part 23c results in that the positions of the dust-proof filter 21 and the piezoelectric element 22 are restricted in the optical axis direction of the photographing optical system 12a. Therefore, the dust-proof filter 21 is held to be airtightly joined with respect to the dust-proof filter receiving member 23 via the piezoelectric element 22.

In other words, the dust-proof filter receiving member 23 is configured to join the dust-proof filter 21 with the piezoelectric element 22 in an airtight manner with the elastic force caused by the pressing member 20.

In this case, the pressing force by the pressing member 20 is set to a level of force that allows to secure a satisfactory airtightness between the dust-proof filter 21 and the receiving part 23c of the dust-proof filter receiving member 23, and will not inhibit the vibration of the dust-proof filter 21 in a first direction (a direction along the face of the transmission portion 21c of the dust-proof filter 21) caused by the stacked piezoelectric element 18.

Moreover, the protruding part 23g is a portion to be formed to hold the stacked piezoelectric element 18 which is the first excitation member for providing the dust-proof filter 21 with a vibration in a first direction (a direction approximately perpendicular to the optical axis of the photographing optical system 12a) with respect to the dust-proof filter 21.

Figure 6:
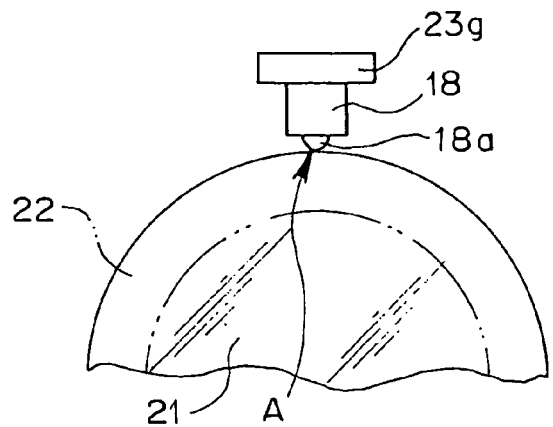
FIG. 6 is a principal part enlarged view to conceptually show part of the image pickup unit (the vicinity of the contacting portion of a first excitation part with a dust-proof member) in the camera of FIG. 1.

FIG. 6 is a principal part enlarged view to conceptually show an enlarged part of the image pickup unit (FIG. 3) of the camera 1 of the present embodiment. More specifically, it is a principal part enlarged view to conceptually show the contacting portion and its vicinity of the first excitation member (stacked piezoelectric element) against the dust-proof member (the dust-proof filter 21) in the image pickup unit 15.

As shown in FIGS. 5 and 6, the stacked piezoelectric element 18 is fixedly bonded with, for example, an adhesive etc. at its proximal end portion to a predetermined position on the inner face side of the protruding part 23g. Moreover, for example, a spherical protrusion 18a is integrally disposed at the distal end of the stacked piezoelectric element 18 by adhesive means or the like. The stacked piezoelectric element 18 is disposed on the protruding part 23g such that the spherical protrusion 18a is in constant abutment with the outer peripheral end face of the dust-proof filter 21. In this arrangement, the contact between spherical protrusion 18a and the dust-proof filter 21 becomes a point contact at point A as shown in FIG. 6.

The reason of such configuration that the distal end of the stacked piezoelectric element 18 is in point contact with the outer peripheral end face of the dust-proof filter 21 is as follows.

That is, as will be described later, the dust-proof filter 21 is subjected to a vibration in a first direction (a direction approximately perpendicular to the optical axis direction of the photographing optical system 12a) caused by the stacked piezoelectric element 18, and to a vibration in a second direction (the optical axis direction of the photographing optical system 12a) caused by the piezoelectric element 22.

Moreover, as described above, it is arranged such that the spherical protrusion 18a at the distal end of the stacked piezoelectric element 18 is in constant contact with the outer peripheral end face of the dust-proof filter 21. Therefore, when the dust-proof filter 21 is subjected to a vibration in the second direction (the optical axis direction of the photographing optical system 12a) caused by the piezoelectric element 22, there is a risk that the contact between the outer peripheral end face of the dust-proof filter 21 and the distal end of the stacked piezoelectric element 18 inhibits the vibration of the piezoelectric element 22.

On the other hand, when providing a vibration in the first direction to the dust-proof filter 21 caused by the stacked piezoelectric element 18, the both need to be in constant contact with each other.

Therefore, the spherical protrusion 18a is arranged at the distal end of the stacked piezoelectric element 18, configuring that a vibration in the first direction is securely transferred to the dust-proof filter 21 while the contact between the outer peripheral end face of the dust-proof filter 21 and the distal end of the stacked piezoelectric element 18 is constantly secured, and at the same time adopting a configuration that allows to reduce the contact resistance at the contact point A between the both to a minimum.

That is, the point contact achieved by the spherical protrusion 18a between the outer peripheral end face of the dust-proof filter 21 and itself results in that the dust-proof filter 21 can freely vibrate in the optical axis direction of the photographing optical system 12a.

Thus, a vibration in the second direction caused by the piezoelectric element 22 will be provided to the dust-proof filter 21 without being inhibited, and a vibration in the first direction caused by the stacked piezoelectric element 18 is securely transferred to the dust-proof filter 21.

Further, in addition to that, forming the spherical protrusion 18a of a material which has virtually no vibration damping effect will be more effective.

It is noted that the configuration of the contacting portion between the dust-proof filter 21 and the stacked piezoelectric element 18 is not limited to the above described example, and different configurations may be employed provided that similar effect can be achieved.

For example, two variants for the contacting portion concerned will be shown below.

Figure 7:
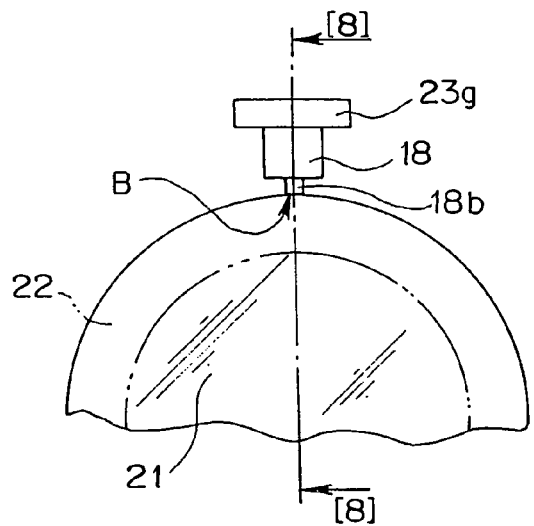
FIG. 7 is a principal part enlarged conceptual diagram to show a first variant of the contacting state of the first excitation member with respect to the dust-proof member in the image pickup unit of the camera of FIG. 1.
Figure 8:
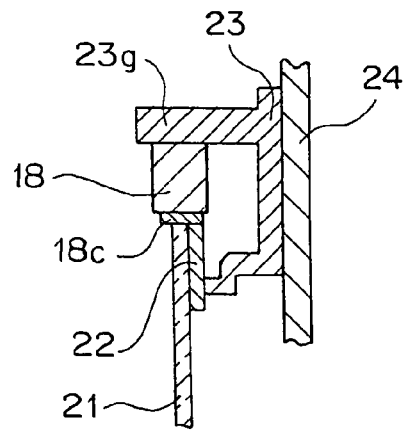
FIG. 8 is a sectional view taken along the line [8]-[8] in FIG. 7.

FIGS. 7 and 8 show a first variant for the contacting state of the first excitation member (stacked piezoelectric element) with respect to the dust-proof member (dust-proof filter) of the image pickup unit of the camera according to the present embodiment; in which FIG. 7 is a principal part enlarged conceptual diagram, and FIG. 8 is a sectional view taken along the line [8]-[8] in FIG. 7.

The first variant differs only in the point that a protrusion part 18b which has a rectangular section and a generally prismatic shape is disposed at the distal end of the stack piezoelectric element 18. The protrusion part 18b is made of a material which has virtually no vibration damping effect. Other configuration is the same as that of the above described embodiment.

In the above described case, the contacting portion B between the protrusion part 18b and the outer peripheral end face of the dust-proof filter 21 (see FIG. 7) forms a plane contact, and the contacting portion extends across the whole thickness of the dust-proof filter 21 on the outer peripheral end face of the dust-proof filter 21. That is, since the contact between the outer peripheral end face of the dust-proof filter 21 and the contacting surface B of the protrusion part 18b takes place in a larger area compared with the point contact described above (FIG. 6), it is considered that this configuration can secure the contacting state of the both parts when the dust-proof filter 21 is subjected to a vibration in the second direction caused by the piezoelectric element 22.

Figure 9:
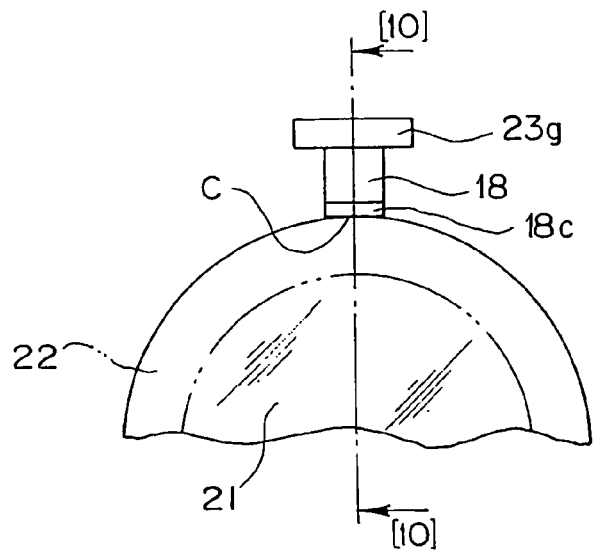
FIG. 9 is a principal part enlarged view to conceptually show a second variant of the contacting state of the first excitation member with respect to the dust-proof member in the image pickup unit of the camera in FIG. 1.
Figure 10:
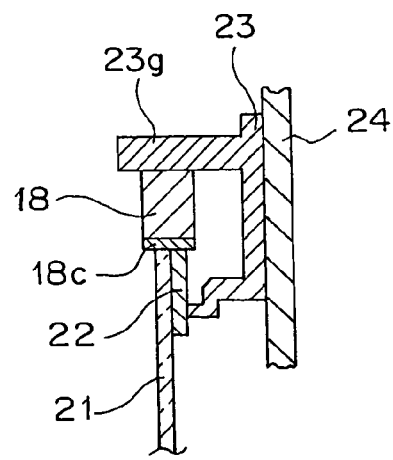
FIG. 10 is a sectional view taken along the line [10]-[10] in FIG. 9.

On the other hand, FIGS. 9 and 10 show a second variant for the contacting state of the first excitation member (stacked piezoelectric element) with respect to the dust-proof member (dust-proof filter) of the image pickup unit of the camera according to the present embodiment; in which FIG. 9 is a principal part enlarged conceptual diagram, and FIG. 10 is a sectional view taken along the line [10]-[10] in FIG. 9.

The second variant differs only in the point that a lubricating sheet 18c is stuck to the distal end of the stack piezoelectric element 18. This lubricating sheet 18c is made of a material which has virtually no vibration damping effect. Other configuration is the same as that of the above described embodiment.

In the above described case, the contacting portion C between the surface of the lubricating sheet 18c and the outer peripheral end face of the dust-proof filter 21 (see FIG. 7) becomes of a plane contact as with the first variant described above. Therefore, it is possible to achieve similar effect to that of the first variant described above. In addition to that, since in the second variant, only the lubricating sheet 18c needs to be stuck to the distal end of the stacked piezoelectric element 18, the configuration is simplified and the production becomes easier compared with the case in which a member such as the spherical protrusion 18a and the protrusion part 18b is bonded.

Figure 11:
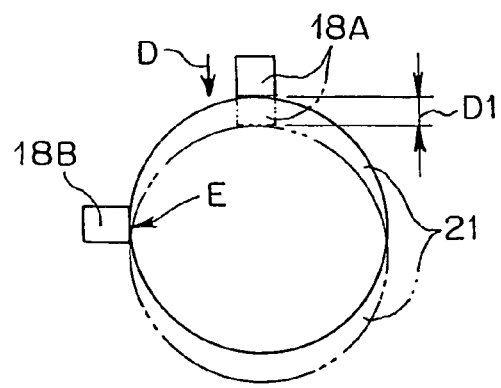
FIG. 11 conceptually shows the actions of the dust-proof member and the first excitation member in the second variant of FIG. 9.

Further, consider a case in which the arrangement of the plurality of the stacked piezoelectric elements 18 is, for example, in the form as shown in FIG. 11. FIG. 11 conceptually shows the actions of the dust-proof member (dust-proof filter) and the first excitation members (stacked piezoelectric elements) in the second variant described above. Specifically, it conceptually shows the state in which the first excitation member (stacked piezoelectric element) is extended, to illustrate the action of the distal end portion of the first excitation member (stacked piezoelectric element) in the aforementioned state. Moreover, FIG. 11 illustrates, by way of simplicity, two stacked piezoelectric elements.

In the above described case, it is supposed that the first stacked piezoelectric element 18A and the second stacked piezoelectric element 18B of the plurality of stacked piezoelectric elements (18) are disposed respectively at a position rotated by about 90 degrees with respect to the dust-proof filter 21 in the vicinity of the outer peripheral edge part of the dust-proof filter 21.

Next, suppose that, one of the two stacked piezoelectric elements 18A and 18B, that is, the first stacked piezoelectric element 18A is driven and thereby the same first stacked piezoelectric element 18A is extended by the amount shown by symbol D1 in the direction shown by the arrow D in FIG. 11. Then, the dust-proof filter 21 vibrates between the positions respectively indicated by the solid line position and the two-dot chain line in FIG. 11. At this time, the amount of vibration of the dust-proof filter 21 is the same as the amount of extension, symbol D1, of the first stacked piezoelectric element 18A.

On the other hand, if it is assumed that when the first piezoelectric element 18A is driven to extend in the direction of arrow D as described above, the second stacked piezoelectric element 18B is not driven and stays at the same position, the contact (see symbol E) between the second stacked piezoelectric element 18B and the outer peripheral end face of the dust-proof filter 21 is consistently maintained. Therefore, the lubricating sheet 18c is disposed such that the contact between the second stacked piezoelectric element 18B and the outer peripheral end face of the dust-proof filter 21 will not hinder the extension driving of the first stacked piezoelectric element 18A, and therefore the vibration of the dust-proof filter 21.

In this way, the present embodiment and each variant thereof are configured such that one stacked piezoelectric element can securely transfer the vibration caused by itself to the dust-proof filter 21 without hindering vibration caused by any of the plurality of stacked piezoelectric elements 18 except itself, by bonding a member such as the spherical protrusion 18a and the protrusion part 18b, or by sticking the lubricating sheet 18c to the distal end portion of the stacked piezoelectric element 18 as described above.

Meanwhile, as described above, the dust-proof filter receiving member 23 and the CCD case 24 are arranged such that the circumferential groove 24d and the annular convex portion 23d (see FIGS. 3 and 5) fit to each other in a substantially airtight manner. At the same time, the dust-proof filter receiving member 23 and the dust-proof filter 21 are arranged to contact with each other in an airtight manner via the piezoelectric element 22 by a bias of the pressing member 20. Moreover, the optical LPF 25 disposed in the CCD case 24 is arranged such that the peripheral edge part of the front face of the optical LPF 25 comes into substantially airtight contact with the step 24a of the CCD case 24. Further, the image pickup device 27 is disposed in the rear face side of the optical LPF 25 via the low pass filter receiving member 26 so that a substantially airtight condition is maintained between the optical LPF 25 and the image pickup device 27.

Therefore, an air gap part 51a is formed in a space in which the optical LPF 25 and the dust-proof filter 21 faces with each other as shown in FIG. 5. Further, a space part 51b is formed by the peripheral edge side of the optical LPF 25, i.e., the CCD case 24, the dust-proof filter receiving member 23, and the dust-proof filter 21. The space part 51b is a sealed space formed so as to protrude toward outside the optical LPF 25 (see FIG. 5). Furthermore, the space part 51b is configured to be a larger space than the air gap part 51a. Moreover, the space made up of the air gap part 51a and the space part 51b is a sealed space 51 which is substantially air tightly sealed by the CCD case 24, the dust-proof filter receiving member 23, the dust-proof filter 21, and the optical LPF 25 as described above.

Thus, the image pickup unit 15 in the camera according to the present embodiment is configured to include a sealing structure part which forms a substantially air tightly sealed space 51 which is made up of the air gap part 51a formed at the peripheral edges of the optical LPF 25 and the dust-proof filter 21, and the space part 51b. Moreover, the sealing structure part is provided at a position outside the peripheral edge or its vicinity of the optical LPF 25.

That is, the sealing structure of the present embodiment is made up of the dust-proof filter receiving member 23 which supports the dust-proof filter 21 by being appressed against its peripheral edge portion or its vicinity portion, the CCD case 24 which supports the optical LPF 25 by being appressed against its peripheral edge portion or its vicinity portion and is arranged to be in intimate contact with the dust-proof filter receiving member 23 at a predetermined portion of its own, and the like.

In thus configured camera of the present embodiment, the dust-proof filter 21 is arranged oppositely to the image pickup device 27 at a predetermined position on the front face side thereof, and the sealed space 51 formed at the peripheral edges of the photoelectric conversion surface of the image pickup device 27 and the dust-proof filter 21; this configuration allows to prevent dusts etc. from adhering to the photoelectric conversion surface of the image pickup device 27 and the outer surface of the optical LPF 25.

Moreover, the dusts or the like adhering to the exposed surface on the front face side of the dust-proof filter 21 can be removed by applying a cyclic voltage to at least one of the piezoelectric element 22, which is arranged integrally with the peripheral edge part of the dust-proof filter 21, and the stacked piezoelectric element 18, which is disposed in contact with the outer peripheral end face of the dust-proof filter 21 in the vicinity of the outer peripheral edge part of the dust-proof filter 21, thereby providing a predetermined vibration to the dust-proof filter 21.

Furthermore, in the above described case, various controls are envisaged for the driving control of the piezoelectric element 22 and the stacked piezoelectric element 18 when providing vibration to the dust-proof filter 21. Details of such controls will be described later.

In the thus-configured camera 1 according to the present embodiment, the actions of the dust-proof filter 21 and the stacked piezoelectric element 18 of the image pickup unit 15 will be described below.

FIGS. 12A, 12B, and 12C and FIGS. 13 to 38 illustrate the actions of the camera according to the present embodiment; in which FIGS. 12A, 12B, and 12C and FIGS. 13 to 25 primarily illustrate the action of the first excitation member (stacked piezoelectric element).

Figures 12A, 12B, 12C:
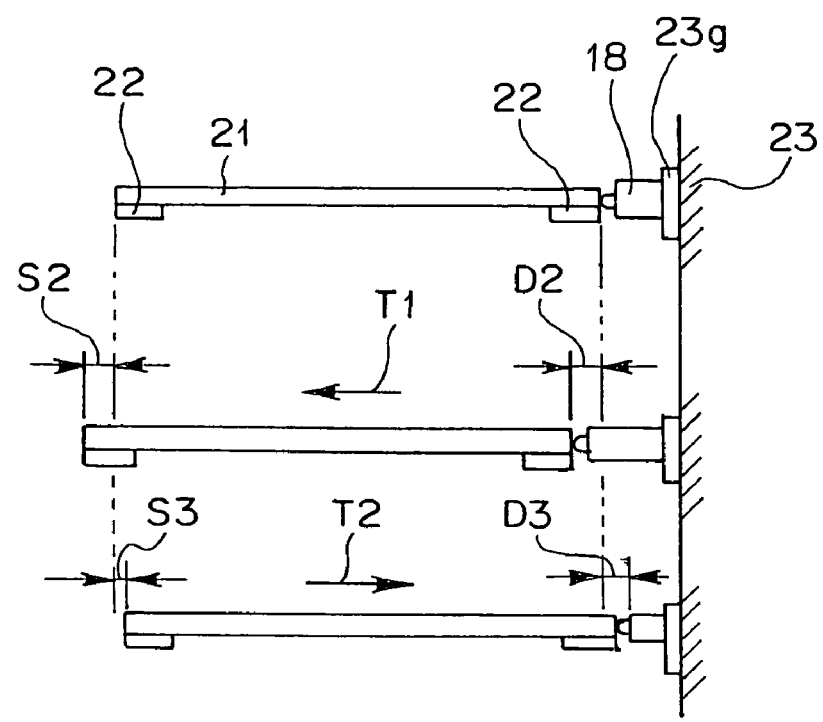
FIG. 12A is a conceptual side view of the dust-proof member and the first excitation member, illustrating the action of the first excitation member in the camera of FIG. 1, in which the first excitation member is at no load.
FIG. 12B is a conceptual side view of the dust-proof member and the first excitation member, illustrating the action of the first excitation member in the camera of FIG. 1, in which the first excitation member is extended in the direction of arrow T1.
FIG. 12C is a conceptual side view of the dust-proof member and the first excitation member, illustrating the action of the first excitation member in the camera of FIG. 1, in which the first excitation member is contracted in the direction of arrow T2.
Figure 13:
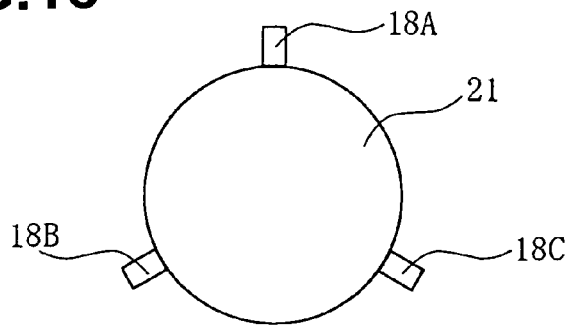
FIG. 13 is a conceptual front view of the dust-proof member and the first excitation member, illustrating the action of the first excitation member in the camera of FIG. 1, in which the positional relationship between the dust-proof member and the first excitation member in a normal (no load) condition is shown.
Figure 14:
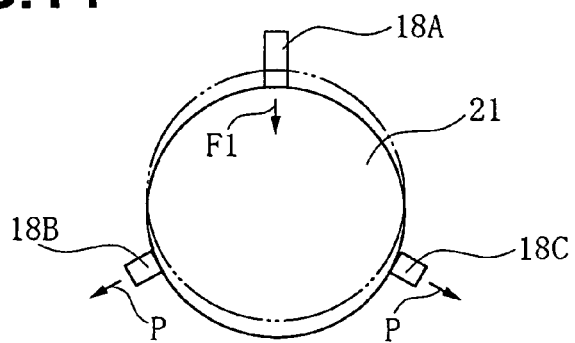
FIG. 14 conceptually illustrates a state change from the state of FIG. 13, in which a first stacked piezoelectric element out of a plurality of first excitation members has become extended and simultaneously a second and third stacked piezoelectric elements have become contracted.
Figure 15:
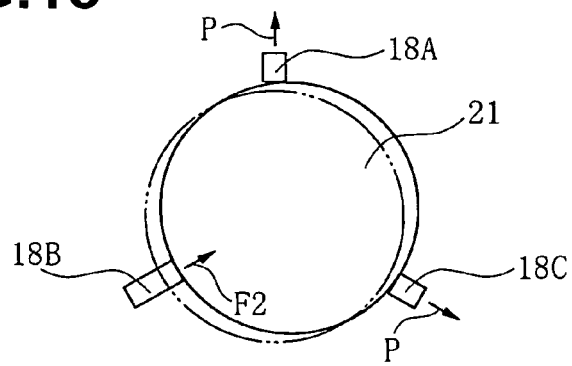
FIG. 15 conceptually illustrates a state change from the state of FIG. 14, in which the second stacked piezoelectric element out of a plurality of first excitation members has become extended and simultaneously a first and third stacked piezoelectric elements have become contracted.
Figure 16:
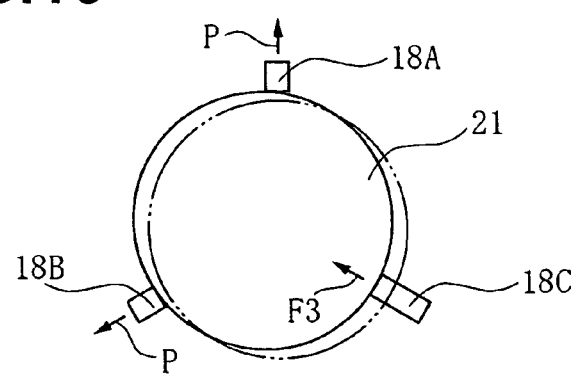
FIG. 16 conceptually illustrates a state change from the state of FIG. 15, in which the third stacked piezoelectric element out of a plurality of first excitation members has become extended and simultaneously a first and third stacked piezoelectric elements have become contracted.

That is, FIGS. 12A, 12B, and 12C and FIGS. 13 to 16 conceptually show the manner in which the dust-proof member (dust-proof filter) vibrates while the first excitation member (stacked piezoelectric element) extends/contracts. Out of these figures, FIGS. 12A, 12B, and 12C are conceptual side views of the dust-proof member (dust-proof filter) and the first excitation member (stacked piezoelectric element), showing the manner in which the dust-proof member (dust-proof filter) vibrates as the first excitation member (stacked piezoelectric element) extends/contracts. Further, FIGS. 13 to 16 are conceptual front views of the dust-proof member (dust-proof filter) and the first excitation member (stacked piezoelectric element), in which FIG. 13 shows the positional relationship between the dust-proof member (dust-proof filter) and the first excitation member (stacked piezoelectric element) in a normal (no load) condition; FIG. 14 shows a state in which a first stacked piezoelectric element of a plurality of first excitation members (stacked piezoelectric elements) has become extended and simultaneously a second and third stacked piezoelectric elements have become contracted; FIG. 15 shows a state in which a second stacked piezoelectric element out of a plurality of first excitation members (stacked piezoelectric elements) has become extended and simultaneously a first and third stacked piezoelectric elements have become contracted; and FIG. 16 shows a state in which a third stacked piezoelectric element out of a plurality of first excitation members (stacked piezoelectric elements) has become extended and simultaneously a first and the third stacked piezoelectric elements have become contracted.

Figure 17:
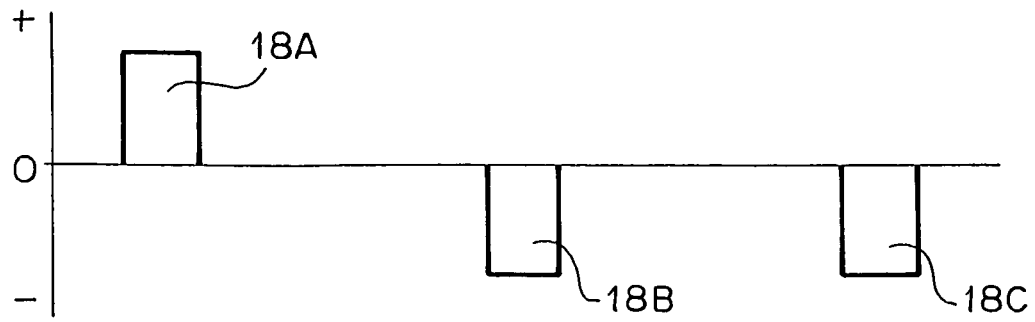
FIG. 17 shows the state of the applied voltage to be applied to drive the plurality of first excitation members (stacked piezoelectric elements) to be extended/contracted in the state of FIG. 14.
Figure 18:
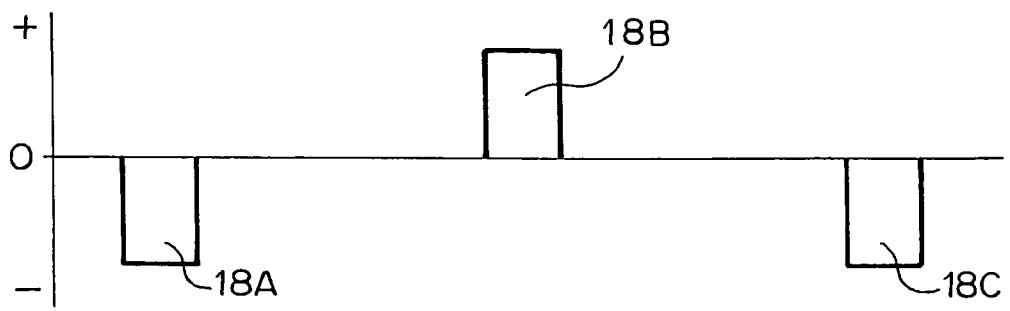
FIG. 18 shows the state of the applied voltage to be applied to drive the plurality of first excitation members (stacked piezoelectric elements) to be extended/contracted in the state of FIG. 15.
Figure 19:
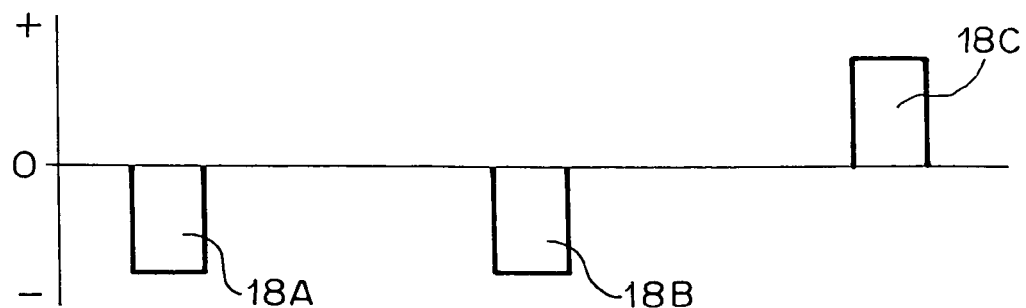
FIG. 19 shows the state of the applied voltage to be applied to drive the plurality of first excitation members (stacked piezoelectric elements) to be extended/contracted in the state of FIG. 16.

FIGS. 17 to 19 show the state of the applied voltages to be applied to drive the plurality of first excitation members (stacked piezoelectric elements) to be extended/contracted in each state of FIGS. 14 to 16 described above; in which FIG. 17 shows each applied voltage corresponding to the state of FIG. 14; FIG. 18 each applied voltage corresponding to the state of FIG. 15; and FIG. 19 each applied voltage corresponding to the state of FIG. 16, respectively.

Further, FIGS. 20A, 20B, and 20C respectively show variants of each applied voltage to be applied to drive each of the plurality of first excitation members (stacked piezoelectric elements) to be extended/contracted in the camera of the present embodiment.

Figure 21:
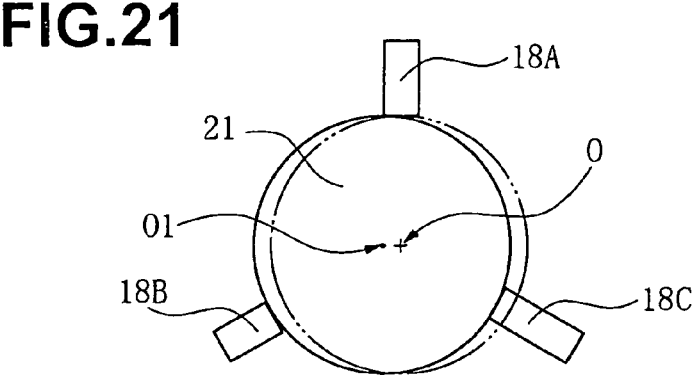
FIG. 21 conceptually shows the state shifts of the plurality of first excitation members and the dust-proof member caused by the application of the voltage at the timing of symbols [21] and [25] in FIG. 20C.
Figure 22:
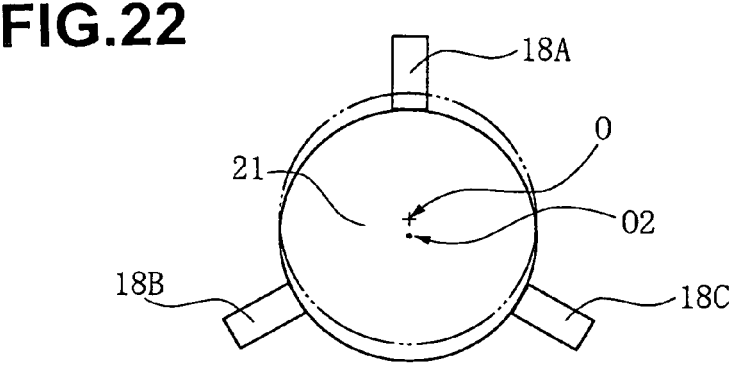
FIG. 22 conceptually shows the state shifts of the plurality of first excitation members and the dust-proof member caused by the application of the voltage at the timing of symbol [22] in FIG. 20C.
Figure 23:
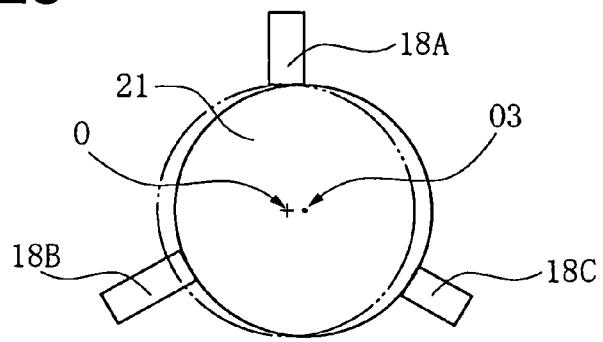
FIG. 23 conceptually shows the state shifts of the plurality of first excitation members and the dust-proof member caused by the application of the voltage at the timing of symbol [23] in FIG. 20C.
Figure 24:
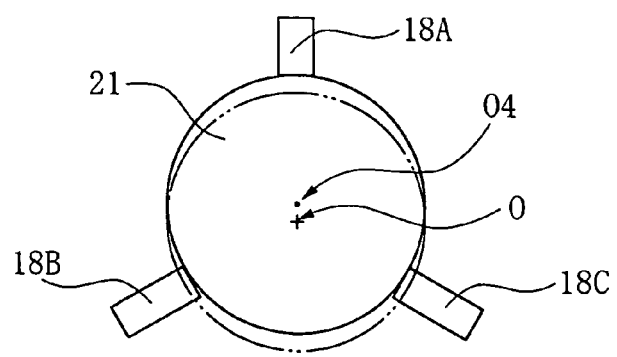
FIG. 24 conceptually shows the state shifts of the plurality of first excitation members and the dust-proof member caused by the application of the voltage at the timing of symbol [24] in FIG. 20C.

Further, FIGS. 21 to 24 show the state shifts of the plurality of first excitation members (stacked piezoelectric elements) and the dust-proof member (dust-proof filter) caused by the application of the voltages corresponding to each time point of symbols [21], [22], [23], [24], and [25] shown in FIG. 20C. FIG. 21 shows the state when the voltage at the time point of symbols [21] and [25] in FIG. 20C is applied; FIG. 22 the state when the voltage at the time point of symbol [22] in FIG. 20C is applied; FIG. 23 the state when the voltage at the time point of symbol [23] in FIG. 20C is applied; and FIG. 24 shows the state when the voltage at the time point of symbol [24] in FIG. 20C is applied.

Figure 25:
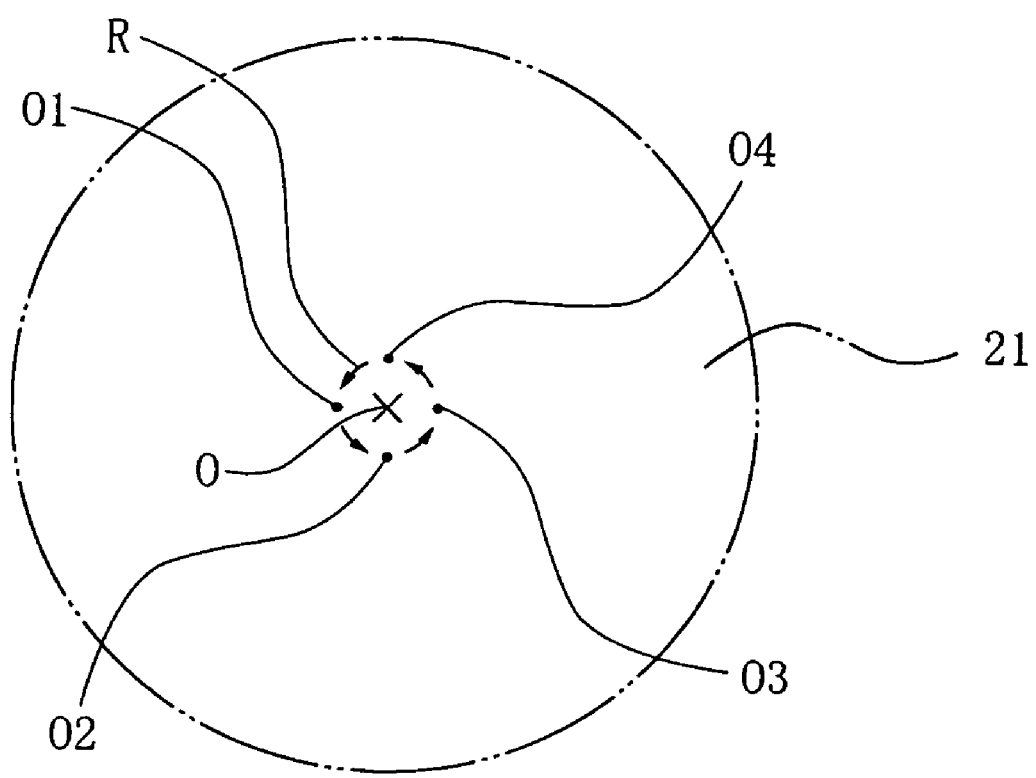
FIG. 25 conceptually shows the locus of the center point of the dust-proof member when the voltages shown in FIG. 20A, FIG. 20B, and FIG. 20C are consecutively applied to the plurality of first excitation members.

FIG. 25 conceptually shows the locus of the center point of the dust-proof member (dust-proof filter) when the voltages shown in FIG. 20A, FIG. 20B, and FIG. 20C are consecutively applied to the plurality of first excitation members (stacked piezoelectric elements).

Figure 26:
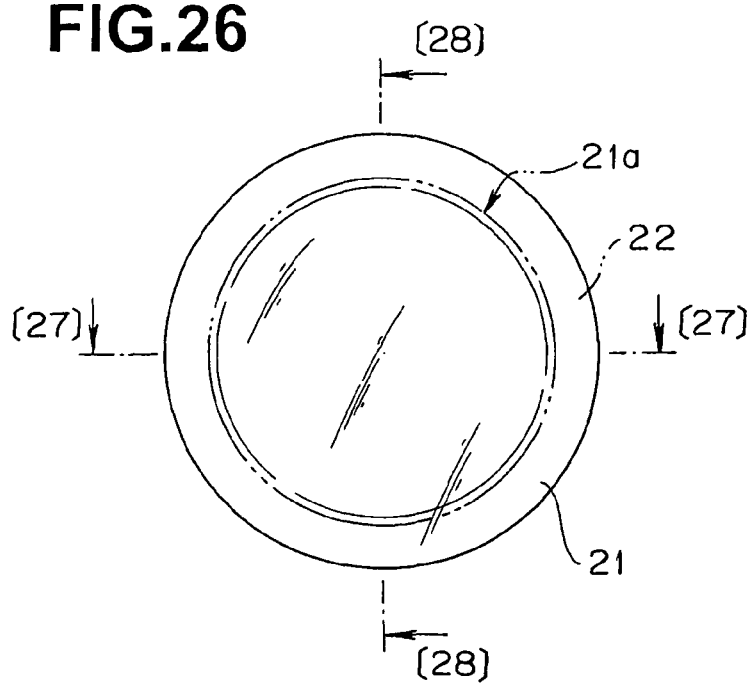
FIG. 26 is a front view to illustrate an example of the action of the second excitation member in the image pickup unit of the camera in FIG. 1.
Figure 27:
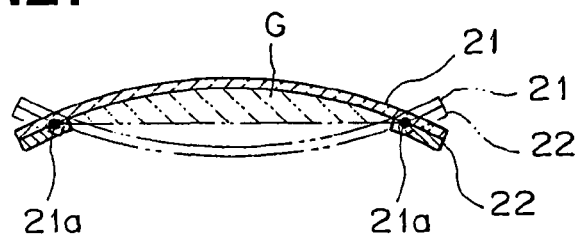
FIG. 27 is a sectional view taken along the line [27]-[27] in FIG. 26 to show the state change of the dust-proof member and the second excitation member when a drive voltage is applied to the second excitation member of FIG. 26.
Figure 28:
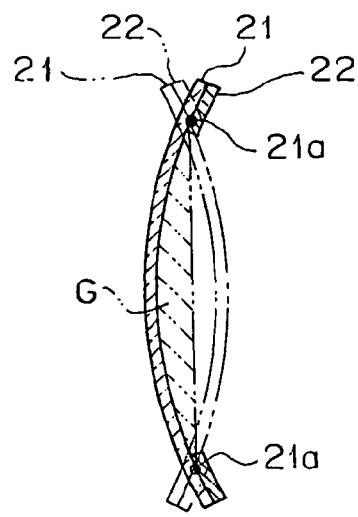
FIG. 28 is a sectional view taken along the line [28]-[28] in FIG. 26 to show the state change of the dust-proof member and the second excitation member when a drive voltage is applied to the second excitation member of FIG. 26.

On the other hand, FIGS. 26 to 31 primarily illustrate the action of the second excitation member (piezoelectric element) in the image pickup unit of the camera according to the present embodiment; in which FIGS. 26 to 28 illustrate an example of the action of the second excitation member (piezoelectric element) in the present embodiment.

That is, FIG. 26 is a front view to exclusively show the dust-proof member (dust-proof filter) and the second excitation member (piezoelectric element) which is integrally provided in the dust-proof member, out of the image pickup unit. Further, FIGS. 27 and 28 illustrate the state change of the dust-proof member (dust-proof filter) and the second excitation member (piezoelectric element) when a drive voltage is applied to the second excitation member (piezoelectric element) of FIG. 26, in which FIG. 27 is a sectional view taken along the line [27]-[27] in FIG. 26; and FIG. 28 is a sectional view taken along the line [28]-[28] in FIG. 26.

Figure 29:
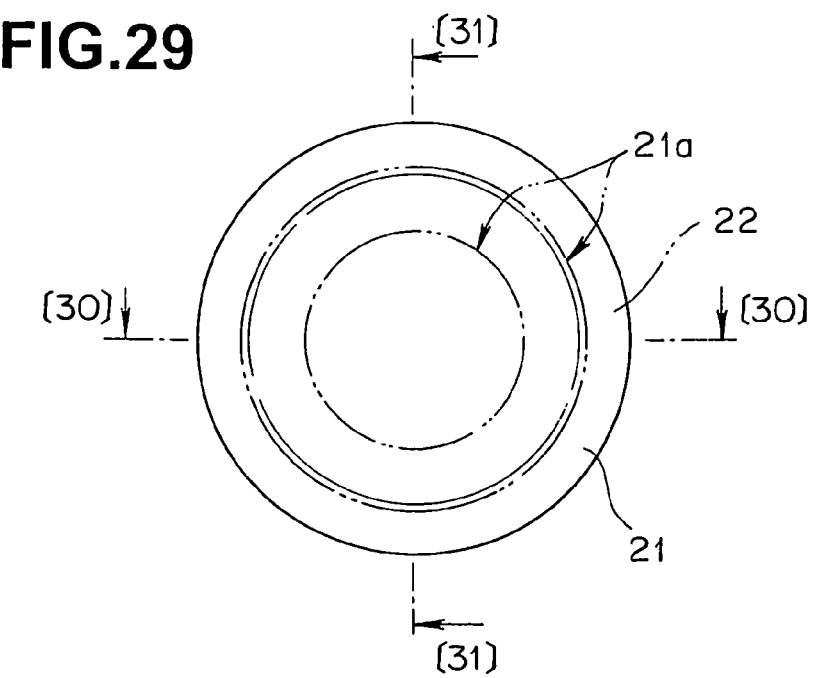
FIG. 29 is a front view to illustrate another example of the action of the second excitation member (when a secondary vibration is generated) in the image pickup unit of the camera of FIG. 1.
Figure 30:
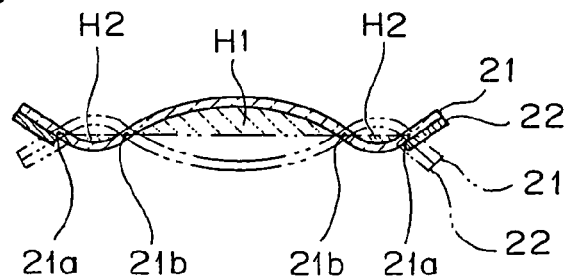
FIG. 30 is a sectional view taken along the line [30]-[30] in FIG. 29 to show the state change of the dust-proof member and the second excitation member when a drive voltage is applied to the second excitation member of FIG. 29.
Figure 31:
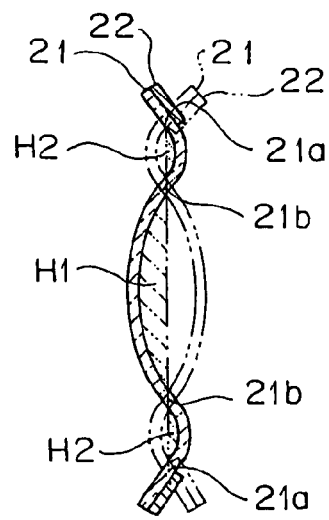
FIG. 31 is a sectional view taken along the line [31]-[31] in FIG. 29 to show the state change of the dust-proof member and the second excitation member when a drive voltage is applied to the second excitation member of FIG. 29.

FIGS. 29 to 31 show another example of the action of the second excitation member (piezoelectric element) in the present embodiment. That is, FIGS. 29 to 31 illustrate the situation when a secondary mode vibration is provided to the dust-proof member (dust-proof filter) in an image pickup unit having the same configuration as that of shown in FIGS. 26 to 28 described above, in which FIG. 29 is a front view to exclusively show the dust-proof member (dust-proof filter) and the second excitation member (piezoelectric element) out of the image pickup unit in the same fashion as in FIG. 26. Moreover, FIGS. 30 and 31 show the state change of the dust-proof member (dust-proof filter) and the second excitation member (piezoelectric element) when a drive voltage is applied to the second excitation member (piezoelectric element) of FIG. 29, in which FIG. 30 is a sectional view taken along the line [30]-[30] in FIG. 29, and FIG. 31 is a sectional view taken along the line [31]-[31] in FIG. 29.

Figure 32:
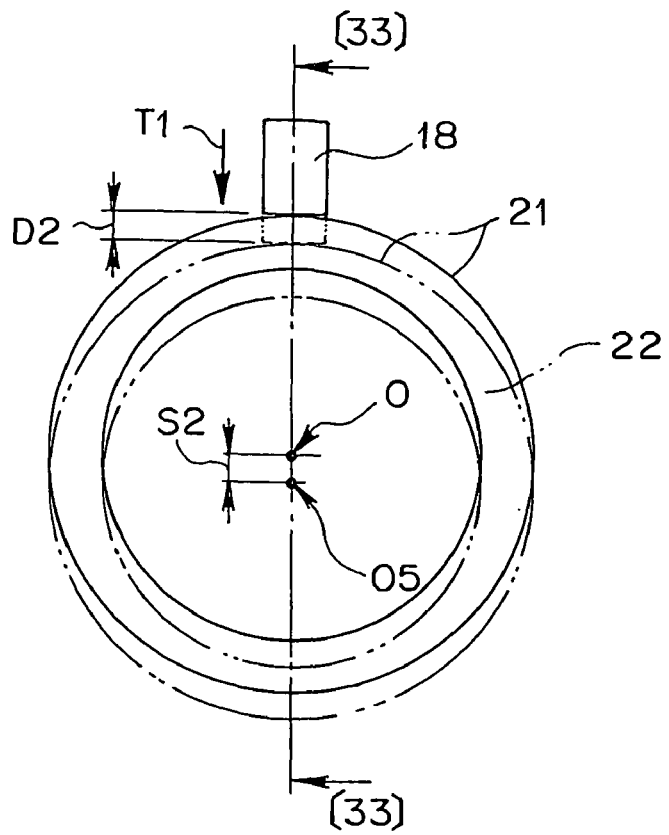
FIG. 32 is a front view showing exclusively the dust-proof member, the first and the second excitation members to illustrate the actions thereof when the first excitation member and the second excitation member are simultaneously driven in the image pickup unit of the camera of FIG. 1.
Figure 33:
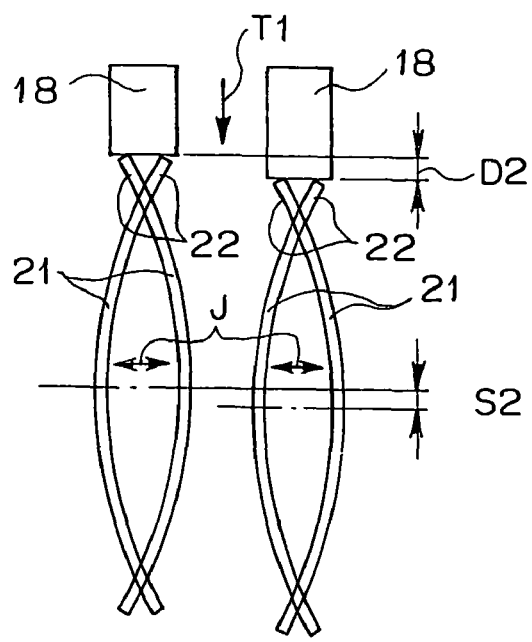
FIG. 33 is a sectional view taken along the line [33]-[33] in FIG. 32 to show the state change of the dust-proof member and the first and second excitation members when a drive voltage is applied to both the first and second excitation members of FIG. 32.

FIGS. 32 and 33 illustrate the action when the first excitation member (stacked piezoelectric element) and the second excitation member (piezoelectric element) are simultaneously driven in the image pickup unit of the camera according to the present embodiment, in which FIG. 32 is a front view to exclusively show the dust-proof member (dust-proof filter), the second excitation member (piezoelectric element), which is integrally provided with the dust-proof member, and the first excitation member (stacked piezoelectric element), which is provided in contact with the vicinity of the outer peripheral edge part of the dust-proof member (dust-proof filter), out of the image pickup unit. Further, FIG. 33 shows the state change of the dust-proof member (dust-proof filter) and the first and second excitation members when a drive voltage is applied to both the first excitation member (stacked piezoelectric element) and the second excitation member (piezoelectric element) of FIG. 32; and which is a sectional view taken along the line [33]-[33] in FIG. 32.

Figure 34:
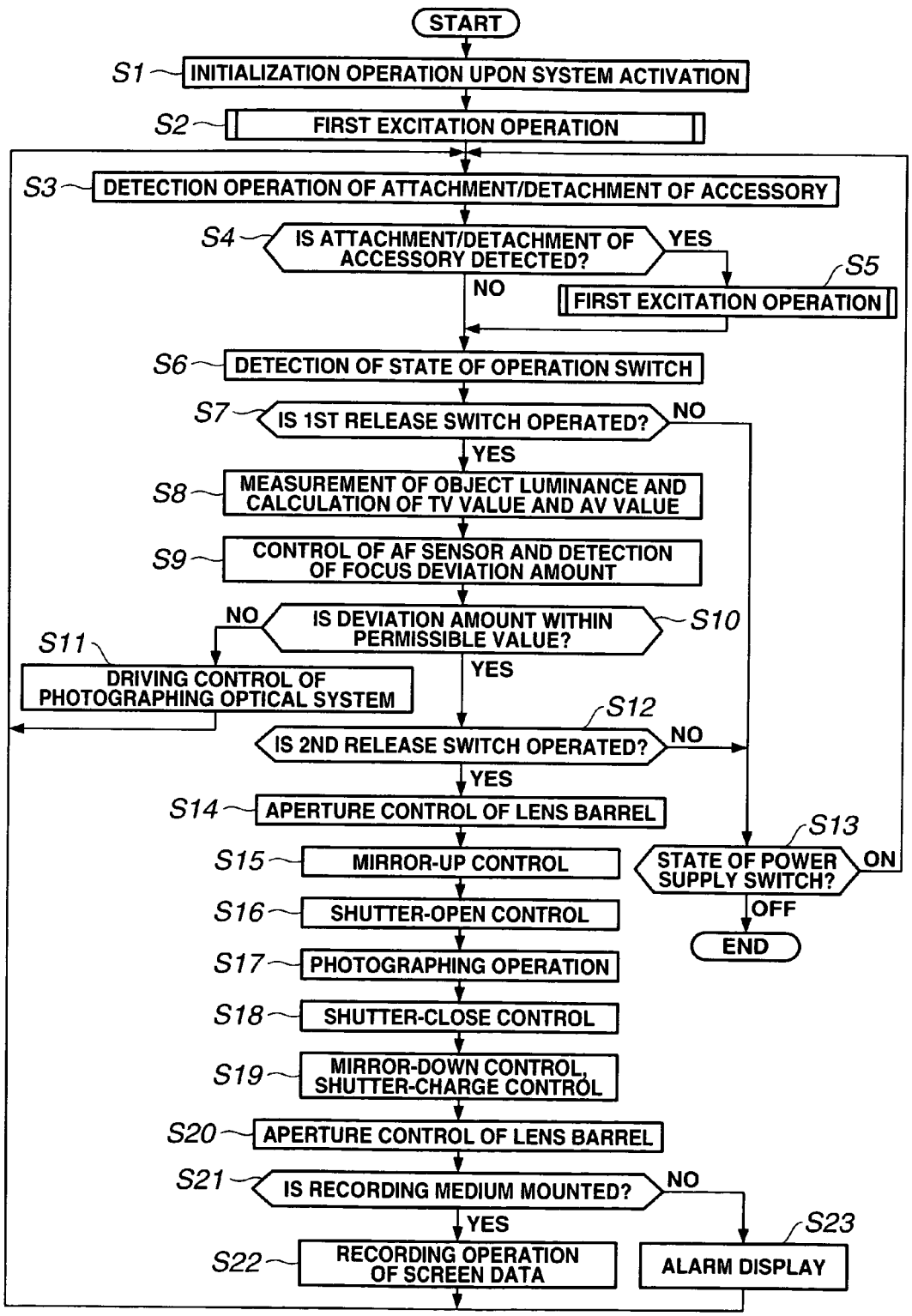
FIG. 34 is a flowchart to show the outline of the photographing operation processing in the camera of FIG. 1.
Figure 35:
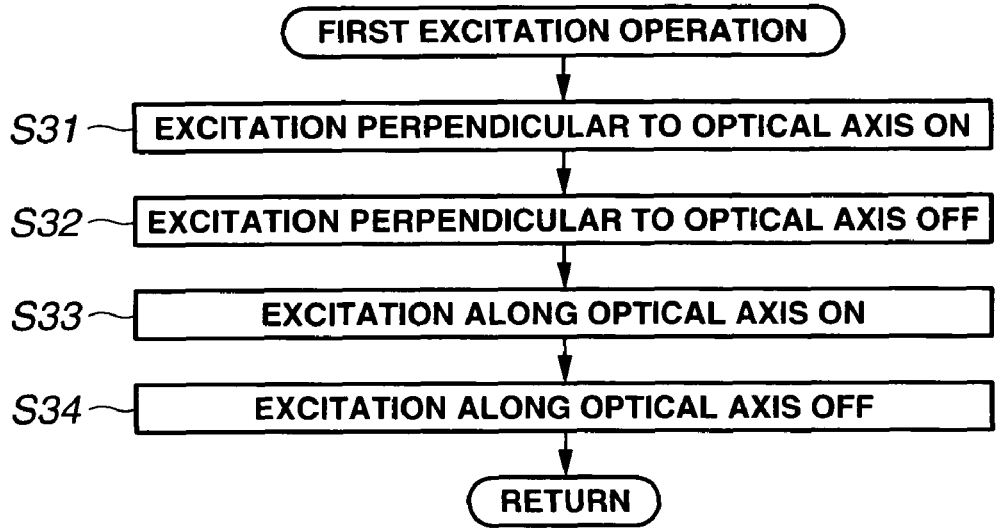
FIG. 35 is a flowchart to show a "first excitation operation" processing out of the photographing operation processing of FIG. 34.

FIGS. 34 and 35 show the flow of action (control processing) in the camera of the present embodiment, in which FIG. 34 is a flowchart to show the outline of the photographing operation processing in the camera concerned; and FIG. 35 is a flowchart to show a "first excitation operation" processing out of the photographing operation processing shown in FIG. 34.

Figure 37:
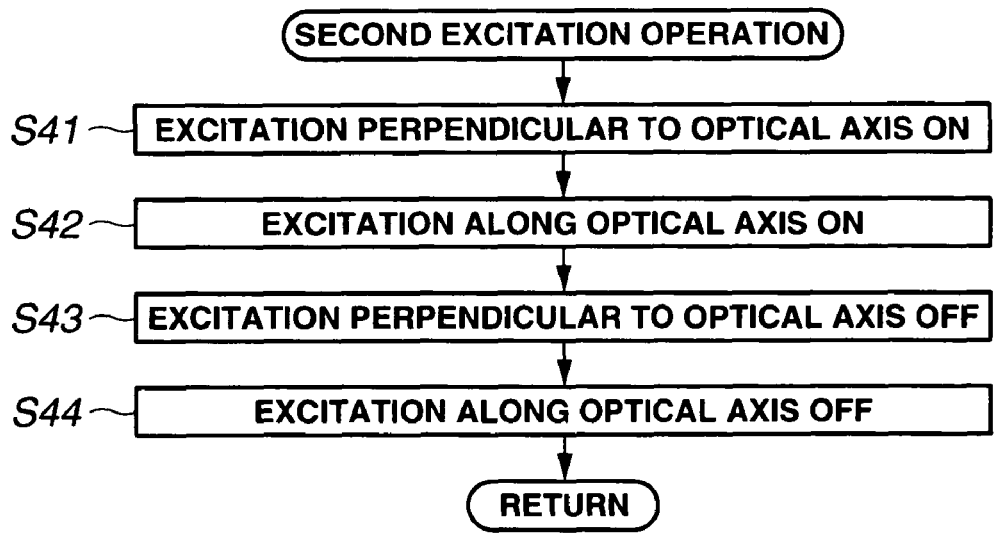
FIG. 37 is a flowchart to show a "second excitation operation" processing out of the photographing operation processing of FIG. 36.
Figure 36:
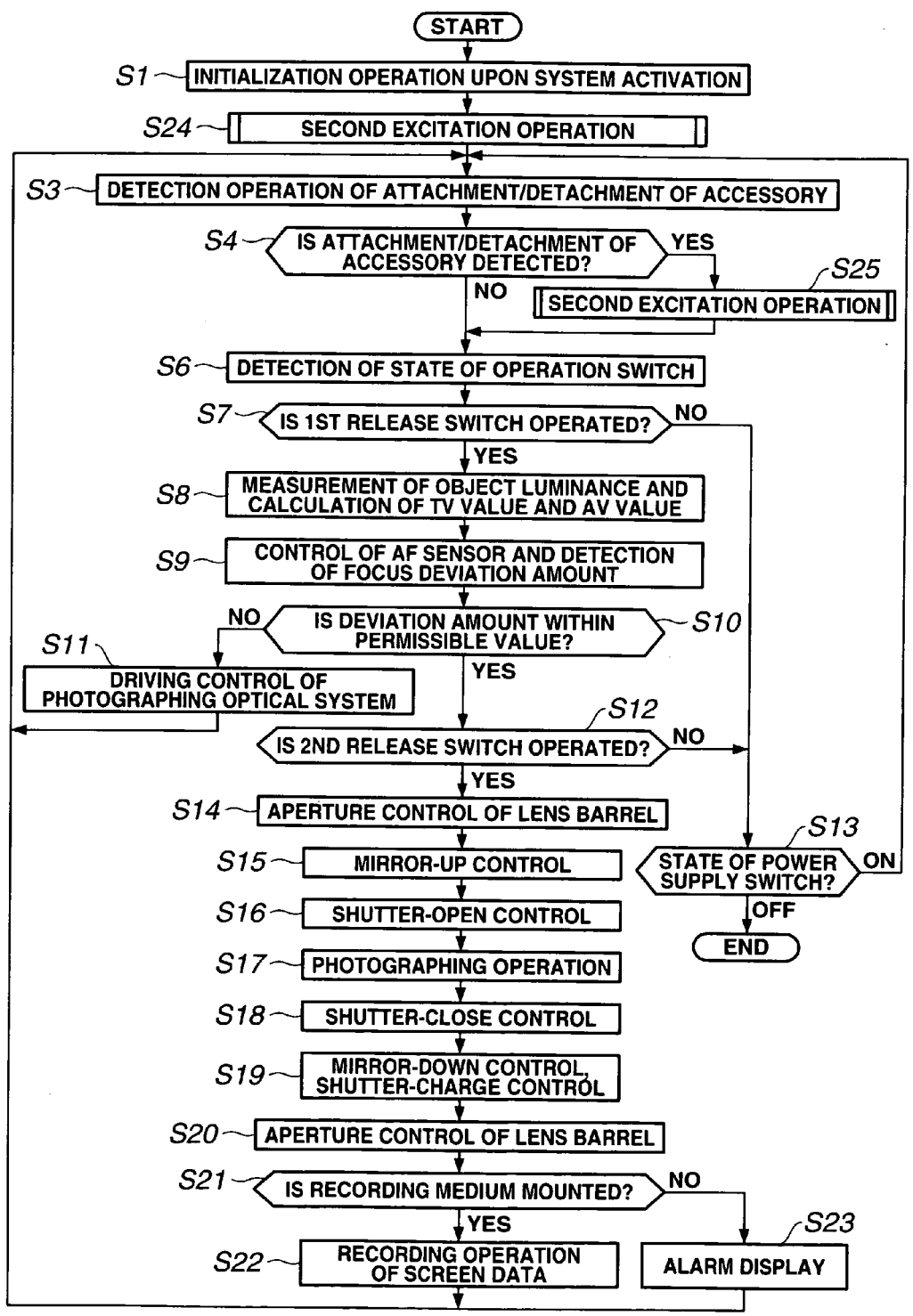
FIG. 36 is a flowchart to show a variant of the photographing operation processing in the camera of FIG. 1.

FIGS. 36 and 37 show a variant of the action (control processing) in the camera of the present embodiment, in which FIG. 36 is a flowchart to show a variant of the photographing operation processing in the camera concerned; and FIG. 37 is a flowchart to show a "second excitation operation" processing out of the photographing operation processing shown in FIG. 36.

Figure 38:
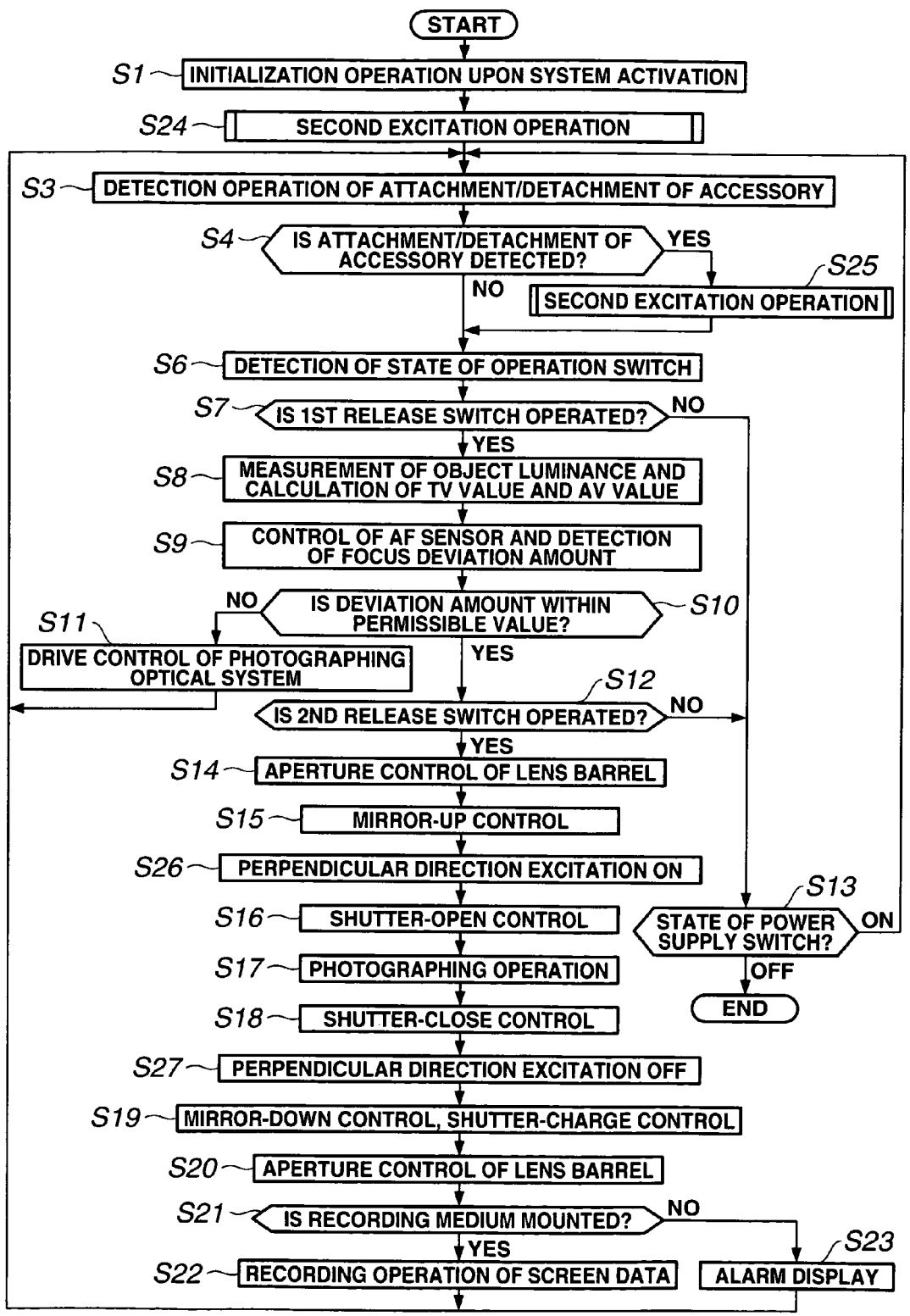
FIG. 38 is a flowchart to show another variant of the photographing operation processing of the camera of FIG. 1.

FIG. 38 is a flowchart to show another variant of the photographing operation processing of the camera of the present embodiment.

It is noted that the operation of each member shown in each figure after FIG. 11 is exaggerated for the convenience of illustrating the actions.

First, the actions when the dust-proof filter 21, which is the dust-proof member, is caused to vibrate by the extension/contraction of the stacked piezoelectric element 18, which is the first excitation member, will be described with reference to FIGS. 12A, 12B, and 12C.

The stacked piezoelectric element 18 is, as well known, an element which extends/contracts by a minute amount upon being applied a voltage. First, when in a no-load state shown in FIG. 12A, a plus (+) voltage is applied to the stacked piezoelectric element 18 through the control by CPU 41 via a dust-proof filter driving portion II 49 (see FIG. 2). Then the stacked piezoelectric element 18 extends in the direction of arrow T1 shown in FIG. 12B. The extension amount of the stacked piezoelectric element 18 at the moment is indicated by symbol D2 in the same figure.

The distal end of the stacked piezoelectric element 18 is contacted with the outer peripheral end face of the dust-proof filter 21. Therefore, when the stacked piezoelectric element 18 extends by the amount indicated by symbol D2 as described above, the dust-proof filter 21 will move by the amount indicated by symbol S2 in FIG. 12B in the direction of arrow T1.

Next, when in a state shown in FIG. 12B, a minus (−) voltage is applied to the stacked piezoelectric element 18 through the control by CPU 41 via the dust-proof filter driving portion II 49 (see FIG. 2). Then, the stacked piezoelectric element 18 contracts in the direction of arrow T2 shown in FIG. 12C. The contraction amount of the stacked piezoelectric element 18 at the moment is indicated by symbol D3 in the same figure. It is noted that the contraction amount D3 is a contraction amount corresponding to the no-load state shown in FIG. 12A. Therefore, when a shift from the state of FIG. 12B to the state of FIG. 12C occurs, the stacked piezoelectric element 18 will contract by the amount indicated by D2+D3. This will cause the dust-proof filter 21 to move in the direction of arrow T2 by the amount indicated by S2+S3.

Thus, the configuration is such that an alternate application of a plus (+) and minus (−) voltages to the stacked piezoelectric element 18 will cause the dust-proof filter 21 to vibrate in the direction indicated by arrows T1 and T2, that is, the direction substantially perpendicular to the optical axis of the light flux (first direction) that passes through the dust-proof filter 21.

It is noted that an application of a voltage to the stacked piezoelectric element 18 can achieve for example a response rate of not more than about 10 micro seconds (μsec). Therefore, this can cause minute dusts etc. to float up from the surface of the dust-proof filter 21, to which the minute dusts etc. adhere and which is to be subjected to a vibration.

The actions when the dust-proof filter 21 vibrates due to the extension/contraction of the stacked piezoelectric element 18 will be described in more detail with reference to FIGS. 13 to 18.

In the present embodiment, as described above, three stacked piezoelectric elements 18 are disposed to be substantially evenly spaced apart to each other, that is, at an angular spacing of about 120 degrees, in the vicinity of the peripheral edge part of the dust-proof filter 21.

Now, let the three stacked piezoelectric elements 18 be a first stacked piezoelectric element 18A, a second stacked piezoelectric element 18B, and a third stacked piezoelectric element 18C as shown in FIGS. 13 to 16.

First, when in a no-load state shown in FIG. 13, voltages shown in FIG. 17 are applied to each of the stacked piezoelectric elements 18A, 18B, and 18C, respectively. That is, a plus (+) voltage is applied to the first stacked piezoelectric element 18A, and a minus (−) voltage is applied to the second stacked piezoelectric element 18B and the third stacked piezoelectric element 18C.

This will cause a shift in the state of the stacked piezoelectric elements 18A, 18B, and 18C and the dust-proof filter 21 from the state shown in FIG. 13 to the state shown in FIG. 14. At this moment, the first stacked piezoelectric element 18A extends by a predetermined amount in the direction of arrow F1 in FIG. 14, and the second stacked piezoelectric element 18B and the third stacked piezoelectric element 18C contract by a predetermined amount in the direction of arrow P in FIG. 14. This will cause the dust-proof filter 21 to move from the position indicated by the two-dot chain line in FIG. 14 (an equal position to the state of FIG. 13) to the position indicated by the solid line in FIG. 14.

Next, when in a state of FIG. 14, voltages shown in FIG. 18 are applied to each of the stacked piezoelectric elements 18A, 18B, and 18C, respectively. That is, a plus (+) voltage is applied to the second stacked piezoelectric element 18B, and a minus (−) voltage is applied to the first stacked piezoelectric element 18A and the third stacked piezoelectric element 18C.

This will cause the states of the stacked piezoelectric elements 18A, 18B, and 18C, and the dust-proof filter 21 to be shifted from the state shown in FIG. 14 to the state shown in FIG. 15. At this moment, the second stacked piezoelectric element 18B extends by a predetermined amount in the direction of arrow F2 in FIG. 15, and the first stacked piezoelectric element 18A and the third stacked piezoelectric element 18C contract by a predetermined amount in the direction of arrow P in FIG. 15. This will cause the dust-proof filter 21 to move from the position indicated by the two-dot chain line in FIG. 15 (an equal position to the state indicated by the solid line of FIG. 14) to the position indicated by the solid line in FIG. 15.

Further following that, when in a state of FIG. 15, voltages shown in FIG. 19 are applied to each of the stacked piezoelectric elements 18A, 18B, and 18C, respectively. That is, a plus (+) voltage is applied to the third stacked piezoelectric element 18C, and a minus (−) voltage is applied to the first stacked piezoelectric element 18A and the second stacked piezoelectric element 18B.

This will cause the states of the stacked piezoelectric elements 18A, 18B, and 18C, and the dust-proof filter 21 to be shifted from the state shown in FIG. 15 to the state shown in FIG. 16. At this moment, the third stacked piezoelectric element 18C extends by a predetermined amount in the direction of arrow F3 in FIG. 16, and the first stacked piezoelectric element 18A and the second stacked piezoelectric element 18B contract by a predetermined amount in the direction of arrow P in FIG. 16. This will cause the dust-proof filter 21 to move from the position indicated by the two-dot chain line in FIG. 16 (an equal position to the state indicated by the solid line of FIG. 15) to the position indicated by the solid line in FIG. 16.

Thus, the configuration is such that repeated execution of the control to apply voltages in the forms as shown in FIGS. 17 to 19 to each of the stacked piezoelectric elements 18A, 18B, and 18C can cause the dust-proof filter 21 to intermittently vibrate in the direction to rotate it around the optical axis thereof, that is, in the direction substantially perpendicular to the light flux which passes through the dust-proof filter 21.

In this case, as described above, an application of a voltage to the stacked piezoelectric element 18 can achieve for example a response rate of not more than about 10 micro seconds (μsec). Therefore, the execution of the vibration control as described above will cause minute dusts etc. to float up from the surface of the dust-proof filter 21, to which the minute dusts etc. adhere. Thus, execution of the control to successively change the vibration direction of the dust-proof filter 21 in the order of arrows F1, F2, and F3 will vibrate the dust-proof filter 21 to rotate around the optical axis. This will cause the minute dusts etc. adhering to the surface of the dust-proof filter 21 to gradually move toward the outer periphery side on the dust-proof filter 21 due to centrifugal force.

It is noted that the control to apply voltage to respective stacked piezoelectric elements 18A, 18B, and 18C is not limited to the above described example, and for example, the control shown in FIGS. 20A, 20B, and 20C may be performed.

That is, in a variant shown in FIGS. 20A, 20B, and 20C, the voltage to be applied to respective stacked piezoelectric elements 18A, 18B, and 18C is controlled so as to have a sinusoidal waveform.

FIG. 20A shows the control of the voltage application to the first stacked piezoelectric element 18A, FIG. 20B the control of the voltage application to the second stacked piezoelectric element 18B, and FIG. 20C the control of the voltage application to the third stacked piezoelectric element 18C.

In this case, the states of respective stacked piezoelectric elements 18A, 18B, and 18C and the dust-proof filter 21 caused by, for example, the applied voltages to respective stacked piezoelectric elements 18A, 18B, and 18C at the time point of symbol [21] and symbol [25] shown in FIG. 20C.

That is, at this moment, the first stacked piezoelectric element 18A is in a no-load state, and therefore it has no extension/contraction. The second stacked piezoelectric element 18B is applied with a voltage of a minus (−) predetermined amount. This will result in that the second stacked piezoelectric element 18B is contracted by a predetermined amount. And the third stacked piezoelectric element 18C is applied with a voltage of a plus (+) predetermined amount. This will result in that the third stacked piezoelectric element 18C is extended by a predetermined amount. Therefore, in the state shown in FIG. 21, the dust-proof filter 21 is located at the position indicated by the solid line with respect to the position of a no-load state indicated by the two-dot chain line in the same figure.

It is noted that the circle indicated by the two-dot chain line of FIG. 21 indicates the position of the dust-proof filter 21 when all the three stacked piezoelectric elements 18A, 18B, and 18C are in a no-load state (called as a reference position, and as the same hereinafter in FIGS. 22 to 24).

When a shift takes place from the time point of symbol [21] in FIG. 20C to the time point of symbol [22] in the same figure, the state of respective stacked piezoelectric elements 18A, 18B, and 18C and the dust-proof filter 21 caused by the applied voltages to respective stacked piezoelectric elements 18A, 18B, and 18C at this time point of symbol [22] becomes the state shown in FIG. 22.

That is, at this moment, a voltage of a plus (+) predetermined amount is applied to the first stacked piezoelectric element 18A. This will result in that the first stacked piezoelectric element 18A is extended by a predetermined amount. The second stacked piezoelectric element 18B and the third stacked piezoelectric element 18C are applied with a voltage of a minus (−) predetermined amount. This will result in that the second stacked piezoelectric element 18B and the third stacked piezoelectric element 18C are contracted by a predetermine amount, respectively. Thus, in the state shown in FIG. 22, the dust-proof filter 21 is located at the position indicated by the solid line in the same figure.

Further, when a shift takes place from the time point of symbol [22] in FIG. 20C to the time point of symbol [23] in the same figure, the state of respective stacked piezoelectric elements 18A, 18B, and 18C and the dust-proof filter 21 caused by the applied voltages to respective stacked piezoelectric elements 18A, 18B, and 18C at this time point of symbol [23] become the state shown in FIG. 23.

That is, at this moment, the first stacked piezoelectric element 18A is in a no-load state, and therefore it has no extension/contraction. The second stacked piezoelectric element 18B is applied with a voltage of a plus (+) predetermined amount. This will result in that the second stacked piezoelectric element 18B is extended by a predetermined amount. And the third stacked piezoelectric element 18C is applied with a voltage of a minus (−) predetermined amount. This will result in that the third stacked piezoelectric element 18C is contracted by a predetermined amount. Thus, in the state shown in FIG. 23, the dust-proof filter 21 is located at the position indicated by the solid line in the same figure.

Further, when a shift takes place from the time point of symbol [23] in FIG. 20C to the time point of symbol [24] in the same figure, the state of respective stacked piezoelectric elements 18A, 18B, and 18C and the dust-proof filter 21 caused by the applied voltages to respective stacked piezoelectric elements 18A, 18B, and 18C at this time point of symbol [24] becomes the state shown in FIG. 24.

That is, at this moment, the first stacked piezoelectric element 18A is applied with a voltage of a minus (−) predetermined amount. This will result in that the first stacked piezoelectric element 18A is contracted by a predetermined amount. The second stacked piezoelectric element 18B and the third stacked piezoelectric element 18C are applied with a voltage of a plus (+) predetermined amount, respectively. This will result in that the second stacked piezoelectric element 18B and the third stacked piezoelectric element 18C are extended by a predetermined amount. Therefore, in the state shown in FIG. 24, the dust-proof filter 21 is located at the position indicated by the solid line in the same figure.

Then, when a shift takes place from the time point of symbol [24] in FIG. 20C to the time point of symbol [25] in the same figure, the state of respective stacked piezoelectric elements 18A, 18B, and 18C and the dust-proof filter 21 caused by the applied voltages to respective stacked piezoelectric elements 18A, 18B, and 18C at this time point of symbol [25] returns to the state shown in FIG. 21.

When the control (sinusoidal waveform control) of applied voltage to respective stacked piezoelectric elements 18A, 18B, and 18C is performed as described above, the dust-proof filter 21 will vibrate in the direction to rotate around the center point "O" thereof with respect to the reference position of the dust-proof filter 21. That is, the center points O1, O2, O3, and O4 of the dust-proof filter 21 at respective time points will vibrate so as to move along a predetermined locus R around the center point "O" at the reference position as shown in FIG. 25. This enables to remove minute dusts etc. adhering to the surface of the dust-proof filter 21.

And as the application frequency of applied voltage is raised, the vibration speed of the dust-proof filter 21 in the rotational direction increases. Therefore, the control of voltage application frequency will allow to more effectively remove minute dusts etc. on the surface of the dust-proof filter 21.

On the other hand, the actions when the dust-proof filter 21, which is a dust-proof member, is caused to vibrate by the application of a voltage to the piezoelectric element 22, which is a second excitation member, will be described with reference to FIGS. 26 to 28.

For example, when a minus (−) voltage is applied to the piezoelectric element 22, the dust-proof filter 21 will deform as shown by the solid line in FIGS. 27 and 28. And when a plus (+) voltage is applied to the piezoelectric element 22, the dust-proof filter 21 will deform as shown by the two-dot chain line in the same FIGS. 27 and 28.

In this case, since the amplitude becomes substantially zero at the position of a node of vibration as indicated by symbol 21a in FIGS. 26 to 28, it is arranged such that the portion corresponding to the node 21a is abutted by the receiving part 23c of a dust-proof filter receiving member 23. This allows to effectively support the dust-proof filter 21 without inhibiting the vibration thereof.

Then, in this state, a dust-proof filter driving portion I 48 is controlled at a predetermined time point through the control of the CPU 41 so that a periodic voltage is applied to the piezoelectric element 22. This will cause the dust-proof filter 21 to vibrate. Thus, dusts etc. adhering to the surface of the dust-proof filter 21 will be removed.

It is noted that the resonance frequency of this arrangement will depend on the shape, thickness, material etc. of the dust-proof filter 21. The above example shown in FIGS. 26 to 28 shows the case in which the primary mode vibration is generated. However, not being limited thereto, and it may be arranged such that a higher order mode vibration is generated.

For example, another example shown in FIGS. 29 to 31 shows a situation when a secondary mode vibration is generated in a dust-proof filter 21 having the same configuration as that of the embodiment shown in FIGS. 26 to 28.

In the above described example, when a minus (−) voltage is applied to piezoelectric element 22, the dust-proof filter 21 will deform as indicated by the solid line in FIGS. 30 and 31. Further, when a plus (+) voltage is applied to piezoelectric element 22, the dust-proof filter 21 will deform as indicated by the two-dot chain line in the same figure.

In this case, two pairs of nodes exist in the vibration of the another example as indicated by symbols 21a and 21b in FIGS. 29 to 31. Thus, the arrangement that the portion corresponding to the node 21a out of those nodes is abutted by the receiving part 23c of the dust-proof filter receiving member 23, will allow to effectively support the dust-proof filter 21 without inhibiting the vibration thereof in the same manner with the above described example shown in FIGS. 26 to 28.

Then, in this state, a dust-proof filter driving portion I 48 is controlled at a predetermined time point through the control of the CPU 41 so that a periodic voltage is applied to the piezoelectric element 22. This will cause the dust-proof filter 21 to vibrate. Thus, dusts etc. adhering to the surface of the dust-proof filter 21 will be removed.

When the primary mode vibration is generated as shown in the above described FIGS. 26 to 28, a sealed space 51 undergoes a volume change by the amount indicated by symbol G (FIGS. 27 and 28) caused by the amplitude of the dust-proof filter 21. On the other hand, when a secondary mode vibration is generated as shown in FIGS. 29 to 31, the volume change of the sealed space 51 caused by the amplitude of the dust-proof filter 21 will be equal to the amount obtained by subtracting two times the area indicated by symbol H2 from the area indicated by symbol H1 i.e., (H1−(H2×2)).

It is well known that as the volume change to the sealed space 51 decreases, the change of the internal pressure inside the sealed space 51 decreases. This will result in that a smaller volume change of the sealed space 51 will allow to provide a vibration more efficiently. Therefore, in view of the efficiency of electromechanical conversion, it will be more desirable to arrange that vibration is generated in a high order mode.

Moreover, in the present embodiment, it is configured such that the stacked piezoelectric element 18, which is the first excitation member, and the piezoelectric element 22, which is the second excitation member, can be controlled by a separate driving part (48, 49) respectively. Therefore, for example, it is possible to drive the two simultaneously. The actions in this case will be generally described with reference to FIGS. 32 and 33.

As described above, when a voltage is applied to a stacked piezoelectric element 18, the stacked piezoelectric element 18 will extend/contract. In the state indicated by the solid line in FIG. 32, if a plus (+) voltage is applied to the stacked piezoelectric element 18, the stacked piezoelectric element 18 will extend in the direction of arrow T1 of FIG. 32 by a predetermined amount (symbol D2). This will result in that the dust-proof filter 21 comes into the state indicated by the two-dot chain line in FIG. 32. At this moment, the center point of the dust-proof filter 21 moves from the position indicated by symbol "O" in the same figure to the position indicated by symbol O5 in the same figure.

Then, from that state, when a minus (−) voltage is applied to the stacked piezoelectric element 18, the stacked piezoelectric element 18 will be contracted by a predetermined amount in the opposite direction to that of arrow T1 of FIG. 32 (not expressly shown).

Thus, controlling the dust-proof filter driving portion II 49 through the control of the CPU 41 to apply a periodic voltage to the stacked piezoelectric element 18 and thereby driving the stacked piezoelectric element 18 will result in that the dust-proof filter 21 vibrates in a first direction, that is, a direction substantially perpendicular to the optical axis of a light flux that passes through the dust-proof filter 21.

At the same time, controlling the dust-proof filter driving portion I 48 through the control of the CPU 41 to apply a periodic voltage to the piezoelectric element 22 and thereby driving the piezoelectric element 22 will also result in that the dust-proof filter 21 moves in a second direction (direction of arrow J in the same figure) as shown in FIG. 33, that is, a traveling direction of a light flux passing through the dust-proof filter 21, which is a direction along the optical axis of the photographing optical system 12*a*, while continuing to vibrate in the first direction by the above described stacked piezoelectric element 18.

In an image pickup apparatus (camera) thus configured according to the present embodiment, the flow of control processing while a photographing operation is performed will be described below with reference to the flowcharts of FIGS. 34 and 35.

First, user's operation of a predetermined operation member (a power supply switch etc., not expressly shown) in the camera 1 of the present embodiment will cause the present camera 1 to be activated. This causes the CPU 41 to start the execution of the photographing operation processing shown in FIG. 34 (START).

In the step S1 of FIG. 34, the CPU 41 executes the processing of the initialization operation during system activation. Thereafter, the process advances to the processing of the step S2.

In the step S2, the CPU 41 executes a first excitation operation processing (see FIG. 35). The first excitation operation processing to be executed here is a series of sequence processing shown in FIG. 35. That is, the first excitation operation processing is a processing to control the alternate driving of the first excitation means (the stacked piezoelectric element 18, and the dust-proof filter driving portion II 49) and the second excitation means (the piezoelectric element 22, and the dust-proof filter driving portion I 48).

That is, in the step S31 of FIG. 35, the CPU 41 turns the excitation operation in the direction perpendicular to the optical axis into On state. That is, the CPU 41 applies a periodic voltage to the stacked piezoelectric element 18 via the dust-proof filter driving portion II 49. This will result in that the stacked piezoelectric element 18 will cause the dust-proof filter 21 to vibrate in a first direction, that is, a direction substantially perpendicular to the optical axis of a light flux that passes through the dust-proof filter 21. Thereafter, the process advances to the next step S32.

In the step S32, after a predetermined time period has passed from the start of the processing of the above described step S31, the CPU 41 turns the excitation operation in a direction perpendicular to the optical axis into Off state. That is, the CPU 41 stops applying voltage to the stacked piezoelectric element 18 via the dust-proof filter driving portion II 49. This will result in that the vibration of the dust-proof filter 21 in the first direction caused by the stacked piezoelectric element 18 is stopped. Thereafter, the process advances to the next step S33.

Next, in the step S33, the CPU 41 turns the excitation operation in the direction of the optical axis of the photographing optical system 12*a* into On state. That is, the CPU 41 applies voltage to the piezoelectric element 22 via the dust-proof filter driving portion I 48. This will result in that the piezoelectric element 22 causes the dust-proof filter 21 to vibrate in a second direction, that is, the traveling direction of a light flux that passes through the dust-proof filter 21, which is the direction along the optical axis of the photographing optical system 12*a*. Thereafter, the process advances to the processing of next step S34.

In the step S34, after a predetermined time period has passed from the start of the processing of the above described step S33, the CPU 41 turns the excitation operation in the optical axis direction of the photographing optical system 12*a* into Off state. That is, the CPU 41 stops applying voltage to the piezoelectric element 22 via the dust-proof filter driving portion I 48. This will result in that the vibration of the dust-proof filter 21 in the second direction caused by the piezoelectric element 22 will be stopped. Thereafter, the process returns to the sequence of FIG. 34 and advances to the processing of the step S3 in the same figure (RETURN).

Referring back to FIG. 34, in the step S3, the CPU 41 executes the detection operation of the attachment/detachment of accessory. The detection operation of the attachment/detachment of accessory is an operation to detect if an accessory such as the lens barrel 12 etc. is attached/detached to or from the camera body 11.

First, in the step S4, if the attachment/detachment of an accessory is not detected, the process advances to the processing of the step S6. On the other hand, if the attachment/detachment of an accessory is detected, the process advances to the processing of the step S5.

In the step S5, the CPU 41 executes a first excitation operation processing. The first excitation operation processing to be executed here is a similar operation to the above described operation of the step S2, which is a series of sequence processing shown in FIG. 35. Thereafter, the process advances to the operation of the step S6.

In the step S6, the CPU 41 executes the detection operation of the state of various operation switches (SW, not expressly shown). The operation switches of which state is detected here include, for example, a release switch which is interlocked with the operation of a release button 17, a power supply switch, and the like. This release switch is made up of a two-step switch which is used in ordinary cameras etc. That is an ordinary release switch which is configured such that a half-press operation of the release button 17 turns the first (1st) release switch into On state and the following full-press state of the release button 17 will turn the second (2nd) switch into On state.

In the step S7, the CPU 41 confirms whether or not the first release switch has been operated. Here, if it is confirmed that the aforementioned switch has not been operated, the process advances to the step S13. Then, in the step S13, the CPU 41 confirms the state of the power supply switch. Here, if it is confirmed that the state of the power supply switch is Off state, a series of processing is terminated (END). Further, if it is confirmed that the state of the power supply switch is On state, the process returns to the processing of the above described step S3, and repeats the processing that follows.

On the other hand, in the above described step S7, if it is confirmed by the CPU 41 that the first release switch has been operated, the process advances to the next step S8.

In the step S8, the CPU 41 executes a so-called photometric processing which performs the measurement of object luminance and the calculation of TV values and AV values.

Next, in the step S9, the CPU 41 executes a so-called autofocus (AF) processing which controls an AF sensor to detect a focus deviation amount.

Next, in the step S10, the CPU 41 makes judgment whether or not the focus deviation amount detected as the result of the AF processing by the above described step S9 is within a permissible value. Here, if it is judged that the deviation amount is not within the permissible value, the process advances to the processing of the step S11. Then, in the step S11, after executing the driving control of the photographing optical system 12*a*, the CPU 41 returns to the processing of the above described step S3, and repeats the processing that follows.

On the other hand, in the above described step S10, if it is judged that the deviation amount is within the permissible value, the process advances to the next step S12.

In the step S12, the CPU 41 confirms whether or not the second release switch has been operated. Here, if it is confirmed that the aforementioned switch has not been operated, the process advances to the processing of the step S13. Then, in the step S13, the CPU 41 confirms the state of the power supply switch. Here, if it is confirmed that the state of the power supply switch is Off state, a series of processing are terminated (END). Further, if it is confirmed that the state of the power supply switch is On state, the process returns to the processing of the above described step S3 and repeats the processing that follows.

On the other hand, in the above described step S12, if the CPU 41 confirms that the second release switch has been operated, the process advances to the next step S14.

In the step S14, the CPU 41 executes an aperture control processing of the lens barrel 12. The aperture control processing is a processing to perform the open-close operation of the aperture blade provided inside the lens barrel 12 based on the calculation result in the above described step S8 thereby controlling the setting of a predetermined aperture value.

Next, in the step S15, the CPU 41 executes a mirror-up control processing. The mirror-up control processing is a control of the operation to move the reflex mirror 13*b*, which is located in the position at which the reflex mirror 13*b* can bend the optical axis of the object light flux that has passed the photographing optical system 12*a* and direct the object light flux toward the observation optical system, to a position at which the reflex mirror 13*b* retreats from the optical axis of the photographing optical system 12*a*. This mirror-up operation allows the object light flux that has passed the photographing optical system 12*a* to travel toward the photoelectric conversion surface of the image pickup device 27.

Next, in the step S16, the CPU 41 executes a shutter-open control processing. The shutter-open control processing is a processing to control the opening operation of the shutter mechanism provided inside the camera body 11 based on the calculation result in the above described step S8.

Then, in the step S17, the CPU 41 executes an image pickup operation processing by controlling the driving of the image pickup device 27, the image signal processing circuit 16*a*, the work memory 16*b*, the display circuit 47, the LCD 46, and the like. The image pickup operation processing includes: a processing to drive the image pickup device 27 to perform photoelectric conversion processing and to acquire image signal; a processing to perform a predetermined signal processing on the acquired image signal, at the image signal processing circuit 16*a* etc. and convert it into a predetermined form of image data; and a series of control processing such as transferring the generated image data to the work memory 16*b* to temporally record it, transferring the image data to the display circuit 47 to generate an image signal in a predetermined display format with the display circuit 47, and performing an image display processing by the LCD 46.

In parallel with that, in the step S18, the CPU 41 executes a shutter-close control processing. The shutter-close control processing is a processing to control the closing operation of the shutter mechanism provided inside the camera body 11 based on the calculation result in the above described step S8.

Next, in the step S19, the CPU 41 executes a mirror-down control processing and a shutter-charge control operation. Out of these, the mirror-down control processing is a control to perform the operation to move the reflex mirror 13*b*, which is located in the position at which the reflex mirror 13*b* can retreat from the optical axis of the photographing optical system 12*a*, to a position at which the reflex mirror 13*b* can bend the optical axis of the object light flux that has passed the photographing optical system 12*a* and direct the object light flux toward the observation optical system. This mirror-down operation allows the optical axis of the object light flux, which has passed the photographing optical system 12*a*, to be bent by the reflex mirror 13*b* and reflected toward the pentaprism which is disposed above the reflex mirror 13*b*.

Further, the shutter-charge control operation is a preparation operation for the next photographing operation, and is a control to turn the shutter mechanism into a charge state.

Then, in the step S20, the CPU 41 executes an aperture control processing of the lens barrel 12. The aperture control processing to be executed here is a processing to operate the aperture blade, which is set to be a specific aperture value based on the calculation result in the above described step S8, to be set in a full-open state, that is, an open state.

Next, in the step S21, the CPU 41 confirms whether or not a recording medium 43 is installed at a predetermined portion of the camera body 11 of the present camera 1 via a recording medium interface 42. In this case, if the CPU 41 confirms that the recording medium 43 is installed in the camera body 11, the process advances to the processing of the next step S22.

In the step S22, the CPU 41 executes a recording operation processing of image data. The recording operation of image data is a control operation to record the image data, which is acquired and generated by the image pickup operation processing in the above described step S17, and is temporally recorded inside the work memory 16*b* etc., in the recording medium 43 through the recording medium interface 42.

On the other hand, in the step S21, if the CPU 41 confirms that the recording medium 43 is not installed in the camera body 11, the process advances to the processing of the step S23. Then, in the step S23, an alarm display processing indicating that the recording medium 43 is not installed is executed on the display screen of the LCD 46 connected, for example, via the display circuit 47. Thereafter, the process returns to the above described step S3 and repeats the processing that follows.

In the action of the present embodiment according to the flowchart shown in the above described FIG. 34, a first excitation operation processing is to be performed, in the operations of the steps S2 and S5 as the control of the vibration of the dust-proof filter 21 by the first excitation means and the second excitation means.

In the first excitation operation processing, it is arranged that the vibration in the first direction by means of the first excitation means and the vibration in the second direction by means of the second excitation means are alternately produced as shown in FIG. 35.

On the other hand, the action (flowcharts of FIGS. 36 and 37) according to a variant to be described next differs in that a second excitation operation processing (processing of the steps S24 and S25 in FIG. 36; see the sequence operation of FIG. 37 for detail) is to be performed as the control of the vibration of the dust-proof filer 21 by the first excitation means and the second excitation means.

In the second excitation operation processing, as shown in FIG. 37, it is arranged that the vibration in the first direction by means of the first excitation means and the vibration in the second direction by means of the second excitation means are produced simultaneously.

That is, in the steps S24 and S25 in FIG. 36, the CPU 41 executes a second excitation operation processing. The second excitation operation processing to be executed here is a series of sequence processing shown in FIG. 37. The second excitation operation processing is a processing to control the driving of the first excitation means (the stacked piezoelectric element 18, and the dust-proof filter driving portion II 49) and the second excitation means (the piezoelectric element 22, and the dust-proof filter driving portion I 48) during the same time period.

That is, in the step S41 in FIG. 37, the CPU 41 turns the excitation operation in the perpendicular direction to the optical axis into On state. That is, the CPU 41 applies a periodic voltage to the stacked piezoelectric element 18 through the dust-proof filter driving portion II 49. This will result in that the stacked piezoelectric element 18 causes the dust-proof filter 21 to vibrate in the first direction, that is, the direction substantially perpendicular to the optical axis of the light flux that passes the dust-proof filter 21. Thereafter, the process advances to the operation of the next step S42.

Next, in the step S42, the CPU 41 turns the excitation operation in the optical axis direction of the photographing optical system 12a into On state. That is, the CPU 41 applies a voltage to the piezoelectric element 22 through the dust-proof filter driving portion I 48. This will result in that the piezoelectric element 22 causes the dust-proof filter 21 to vibrate in the second direction, that is, the moving direction of the light flux that passes through the dust-proof filter 21, which is the direction along the optical axis of the photographing optical system 12a. Thereafter, the process advances to the processing of the next step S43.

At this moment, the dust-proof filter 21 is caused to vibrate in the first direction caused by the stacked piezoelectric element 18, and at the same time is caused to vibrate in the second direction by the piezoelectric element 22 as well.

Then, in the step S43, after a predetermined time period has passed from the start of the processing of the above described step S42, the CPU 41 turns the excitation operation in the perpendicular direction to the optical axis into Off state. That is, the CPU 41 stops applying voltage to the stacked piezoelectric element 18 via the dust-proof filter driving portion II 49. This will result in that the vibration of the dust-proof filter 21 in the first direction caused by the stacked piezoelectric element 18 will be stopped. Thereafter, the process advances to the next step S44.

Next, in the step S44, the CPU 41 turns the excitation operation in the optical axis direction of the photographing optical system 12a into Off state. That is, the CPU 41 stops applying voltage to the piezoelectric element 22 via the dust-proof filter driving portion I 48. This will result in that the vibration of the dust-proof filter 21 in the second direction caused by the piezoelectric element 22 will be stopped. Thereafter, the process returns to the sequence of FIG. 36, and advances to the processing of the step S3 (RETURN).

In the flowchart of FIG. 36, other processing steps are identical to those in the flowchart of the above described FIG. 34.

In the action of the embodiment shown in each flowchart shown in FIGS. 34 and 36, the timing to operate the first excitation means or the second excitation means, that is, the timing to execute the first excitation operation processing (see FIG. 35) or the second excitation operation processing (see FIG. 37) are arranged at the time point immediately after the system activation of the camera 1 (the step S2 in FIG. 34 or the step S24 in FIG. 35) and at the time point when an accessory such as the lens barrel 12 and the like is attached/detached to or from the camera body 11 (the step S5 in FIG. 34 or the step S25 in FIG. 35).

The timing to operate the first excitation means or the second excitation means is not limited to the above case, but for example it can be arranged in the same manner with another variant to be described next (see the flowchart shown in FIG. 38). In the another variant, in addition to the operation timing shown by the above described FIGS. 34 and 36, the first excitation means or the second excitation means is operated in a predetermined time period before or after the photographing operation processing (see the steps S26, and S27 in FIG. 38).

That is, after the mirror-up control processing of the step S15 of FIG. 38, in the step S26, the CPU 41 turns the excitation operation in the direction perpendicular to the optical axis into On state. That is, the CPU 41 applies a periodic voltage to the stacked piezoelectric element 18 via the dust-proof filter driving portion II 49. This will result in that the stacked piezoelectric element 18 causes the dust-proof filter 21 to vibrate in the first direction, that is, the direction substantially perpendicular to the optical axis of the light flux that passes through the dust-proof filter 21. Thereafter, the process advances to the processing of the next step S16.

Further, after the shutter-close control processing of the step S18 of FIG. 38, in the step S27, the CPU 41 turns the excitation operation in the perpendicular direction to the optical axis into Off state. That is, the CPU 41 stops applying voltage to the stacked piezoelectric element 18 via the dust-proof filter driving portion II 49. This will result in that the vibration of the dust-proof filter 21 in the first direction caused by the stacked piezoelectric element 18 is stopped. Thereafter, the process advances to the next step S19.

In the flowchart of FIG. 38, other processing steps are identical to those of the above described flowchart of FIG. 36.

Thus, in this example, it is arranged that the dust-proof filter 21 is caused to vibrate by the first excitation means during the time period from the time point before the execution of the shutter-open control processing (step S16) to the time point after the execution of the shutter-close control processing (step S18). When the present camera 1 is in such state, the shutter is turned into open state and the outer surface of the dust-proof filter 21 is most extensively exposed to the outside. Therefore, the outer surface of the dust-proof filter 21 is most likely to be adhered to by dusts etc.

Then, performing the control processing as shown in the flowchart of FIG. 38 can result in that the dust-proof filter 21 is caused to vibrate by the first excitation means at a timing when the shutter mechanism is in an open state during image pickup operation, thereby allowing to remove dusts etc.

In addition, since the dust-proof filter 21 is kept on vibrating during an image pickup operation, even when there exist dusts etc. which are adhering to the surface of the dust-proof filter 21 and which cannot be removed, since it is arranged that microvibration is provided to the dust-proof filter 21 in the vicinity of the front face side of the photoelectric conversion surface of the image pickup device 27, a shadow caused by the adhering dusts etc. will not form a clear image on the photoelectric conversion surface. Therefore, even in a state in which dusts etc. on the surface of the dust-proof filter 21 have not been completely removed, it is ensured that a high quality image will be obtained without adversely affecting the image to be obtained.

As so far described, according to the above described first embodiment, first excitation means (the stacked piezoelectric element 18, and the dust-proof filter driving portion II 49) which provide vibration in a direction in parallel with the dust-proof member (the dust-proof filter 21) and second excitation means (the piezoelectric element 22, and the dust-proof filter driving portion I 48) which provide vibration in a second direction, that is, in a direction along the optical axis of an optical element (the photographing optical system 12a) are provided as a separate body respectively, and thus it is possible to more effectively remove dusts etc. adhering to the surface of the dust-proof filter 21 by devising the control of the driving of the both excitation means.

It is noted that in the image pickup unit 15 of the above described first embodiment, although there is shown a configuration that an optical LPF 25 is disposed on the front face side of the image pickup device 27 so as to sandwich the low pass filter receiving member 26, the disposition of the optical LPF 25 is not limited to such an example.

For example, the dust-proof filter 21 itself, which is disposed on the front face side of the CCD case 24 and is caused to vibrate by the excitation member (the piezoelectric element 18), can be made up of the optical LPF 25.

Next, a second embodiment of the present invention will be described. In the present embodiment, as the optical apparatus to which the present invention is applied, a projection image display apparatus, specifically a three-panel projector apparatus having three transmission liquid crystal display panels (image display elements) as an image forming body including an image forming element will be illustrated. Therefore, in the second embodiment described below, the optical apparatus is referred to as a projection image display apparatus (hereinafter, simply referred to as a "projector apparatus").

Figure 39:
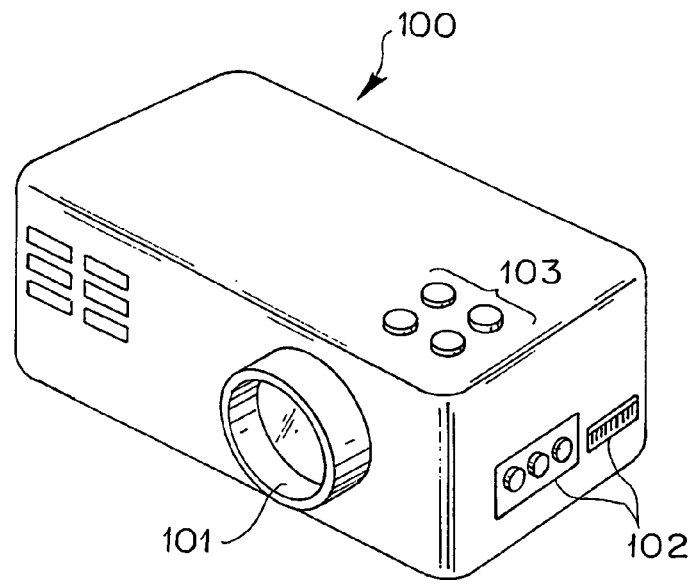
FIG. 39 is an outside perspective view to show the exterior of a projection image display apparatus according to a second embodiment of the present invention.
Figure 40:
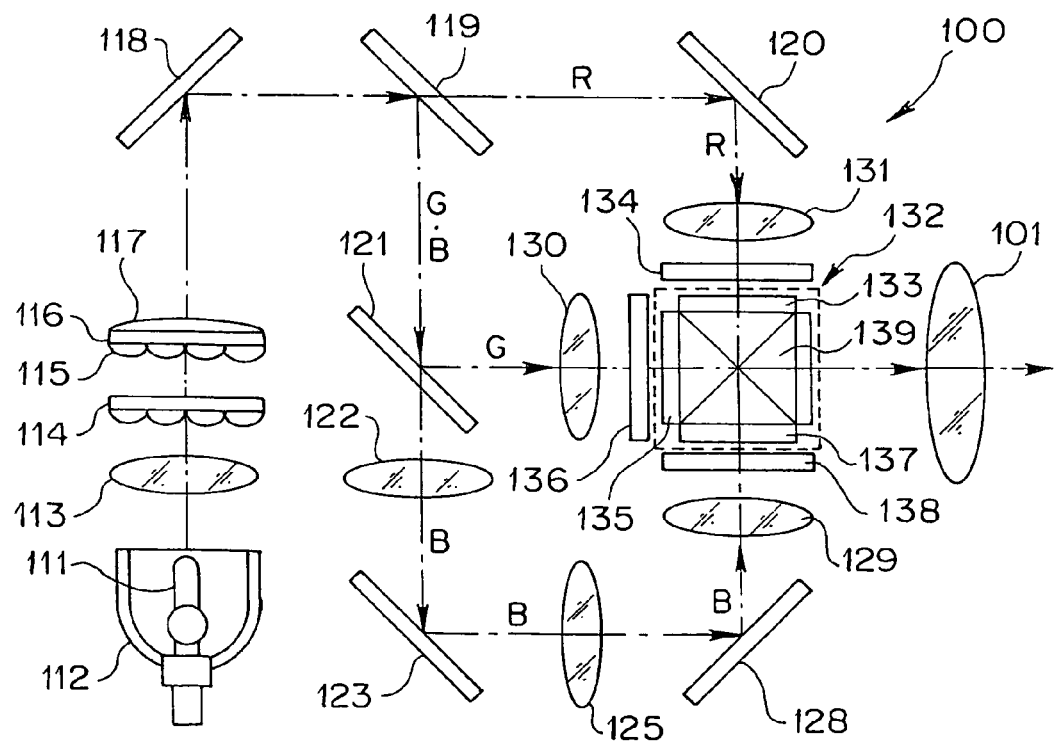
FIG. 40 is a block diagram to schematically show the system configuration of the projection image display apparatus of FIG. 39.
Figure 41:
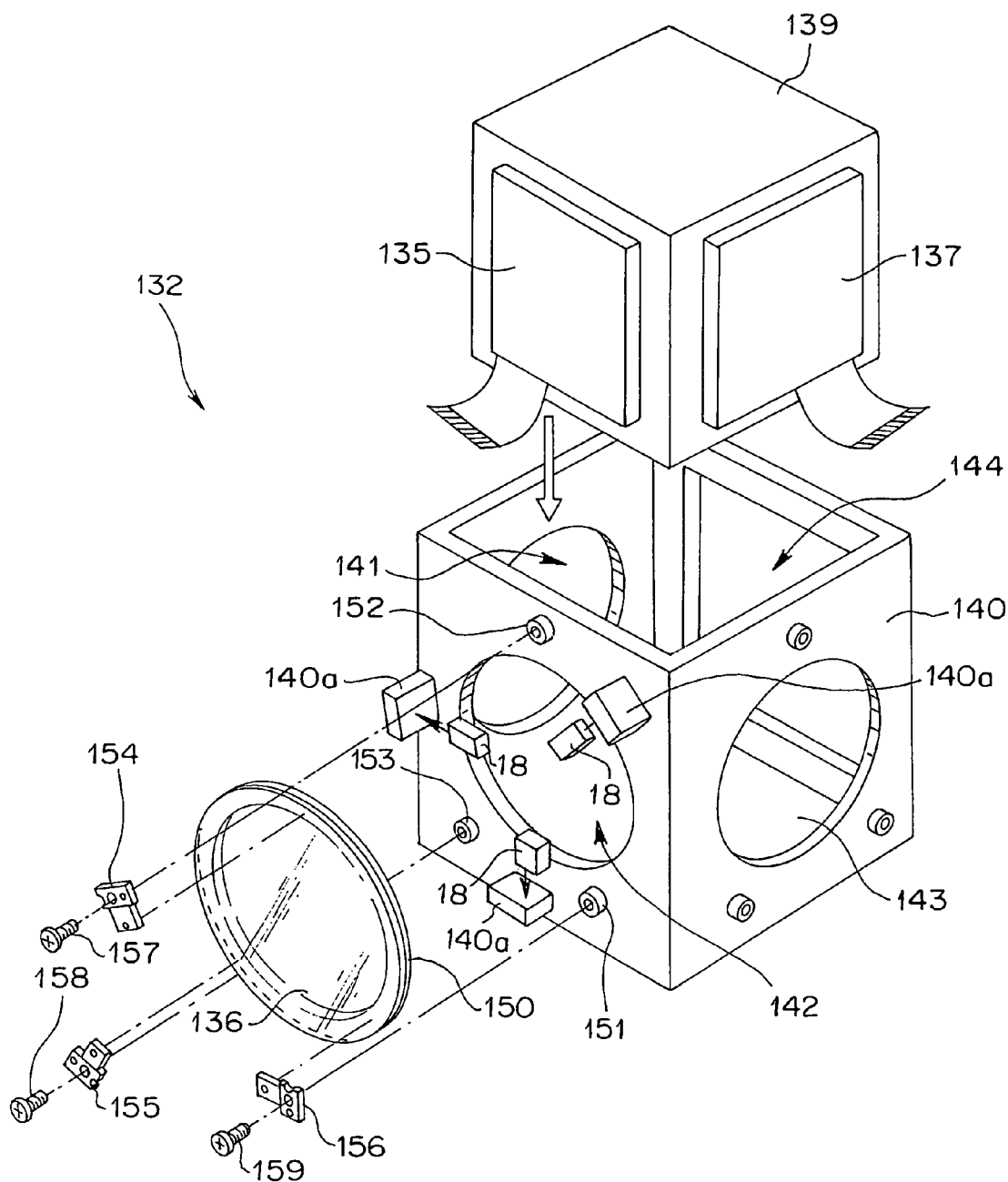
FIG. 41 is an exploded perspective view of a prism unit of the projection image display apparatus of FIG. 39.
Figure 42:
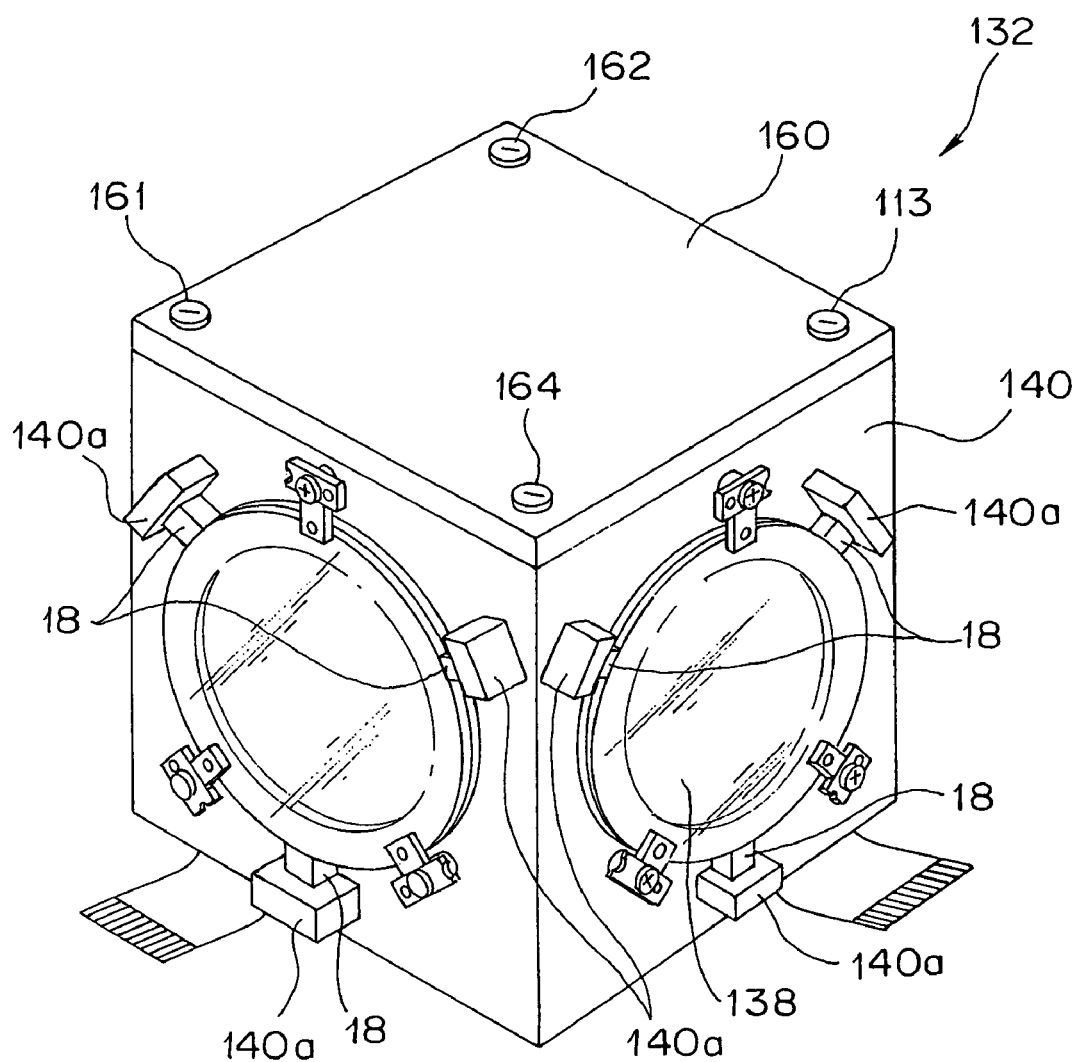
FIG. 42 is an outside perspective view to show the prism-unit of FIG. 41 in an assembled state.

FIGS. 39 to 42 show a projection image display apparatus (a projector apparatus) according to the second embodiment of the present invention, in which FIG. 39 is an outside perspective view to show the exterior of the projection image display apparatus (projector apparatus) of the present embodiment; FIG. 40 is a block diagram to schematically show the system configuration of the projection image display apparatus (projector apparatus) of the present embodiment; FIG. 41 is an exploded perspective view of a prism unit of the projection image display apparatus (projector apparatus) of the present embodiment; FIG. 42 is an outside perspective view to show the prism unit in an assembled state in the projection image display apparatus (projector apparatus) of the present embodiment.

The projector apparatus 100 of the present embodiment is an optical apparatus. The projector apparatus 100 is a type of a projector apparatus in which an image which is displayed on a transmission liquid crystal display panel which is an image forming body and an image forming element including an image display element, is illuminated by a predetermined light source from the rear face side of the liquid crystal display panel, and the illumination light flux is projected onto a screen surface via a projection lens.

To be more specific, the projector apparatus is a so-called three-panel projector apparatus which is configured such that an image is displayed on each of the three liquid crystal display panels of red, blue, and green corresponding to the primary colors of light, and images of respective color are optically combined to generate a color image.

The projector apparatus 100 is provided on the side face part thereof with a signal input terminal 102 for inputting projection image signals from external equipment such as a small computer.

Moreover, a projection image signal inputted from the signal input terminal 102 is subjected to a predetermined signal processing in an internal electric circuit (not expressly shown) and thereafter is displayed on the liquid crystal display panel as an image, and this image is projected to a screen (not shown) via a projection lens 101.

The projector apparatus 100 is provided on the top face thereof with a plurality of operation buttons 103. Arrangement is made such that any operation of the operation buttons 103 by a user can start or stop projection, and also can perform image adjustment of a focus state, color, brightness etc. of an image during image projection.

Next, the outline of the internal system configuration of the present projector apparatus will be described with reference to the block diagram of FIG. 40.

As shown in FIG. 40, the projector apparatus 100 of the present embodiment is primarily made up of: an extra-high pressure mercury lamp 111 which is a radiation light source; a reflector 112 which reflects a radial light beam emitted from the extra-high pressure mercury lamp 111 to emit it as a parallel light beam; a relay lens 113 which directs the parallel light beam emitted from the reflector 112, to a first lens array 114 later described; a first lens array 114 receives the light flux emitted from the mercury lamp 111 via the relay lens 113 to divide it into a plurality of partial light fluxes; a second lens array 115 irradiates the plurality of partial light fluxes divided at the first lens array 114 onto liquid crystal display panels (133, 135, 137) later described, in conjunction with a superposed lens 117; a polarization conversion element 116 which is disposed between the second lens array 115 and the superposed lens 117 and converts a light flux into a specific polarized light; a total reflection mirror 118 which bends a plurality of partial light fluxes that has passed the superposed lens 117 by an angle of about 90 degrees with respect to the optical axis; a dichroic mirrors 119, 121 which is a color separation optical system for separating the light flux bent by the total reflection mirror 119 into three colors of red (R), green (G), and blue (B); a total reflection mirror 120 which totally reflects the red light flux R that has passed through the dichroic mirror 119 and bends it by an angle of about 90 degrees; a relay lens 131 which transmits the red light flux R reflected by the total reflection mirror 120 to direct it to the side of a liquid crystal display panel 133 via a dust-proof filter 134; a relay lens 130 which transmits the green light flux G reflected by the dichroic mirror 121 out of the light beam excepting red light reflected by the dichroic mirror 119 and directs it to the side of a liquid crystal display panel 135 via a dust-proof filter 136; a relay lens 122 which transmits the blue light flux B that passes through the dichroic mirror 121 out of the light beam excepting the red light reflected by the dichroic mirror 119; a total reflection mirror 123 which totally reflects the light flux that has passed the relay lens 122 and bends it by an angle of about 90 degrees; a relay lens 125 which transmits the light flux reflected by the total reflection mirror 123, and directs it to a total reflection mirror 128; the total reflection mirror 128 which totally reflects the light flux that has passed the relay lens 125 and bends it by an angle of about 90 degrees; a relay lens 129 which transmits the light flux that is reflected by the total reflection mirror 128, and directs it to the side of a liquid crystal display panel 137 via a dust-proof filter 138; transmission liquid crystal display panels (hereinafter, simply referred to as a liquid crystal display panel) 133, 135, 137 which are an image forming element including an image display element and an image forming body, and displays an image based on a projection image signal inputted from a signal input terminal 102 (see FIG. 39); a dust-proof filters 134, 136, 138 which are disposed with a predetermined spacing with respect to each image display surface (light flux incident surface) of the liquid crystal display panels 133, 135, and 137; a dichroic prism 139 which respectively combines the red light flux R that has passed through the liquid crystal display panel 133, the green light flux G that has passed through the liquid crystal display panel 135, and the blue light flux B that has passed through the liquid crystal display panel 137; a projection lens 101 which transmits the light flux emitted from the dichroic prism 139 and projects it onto a screen (not shown) thereby causing an image to be formed; and the like.

The first lens array 114 is configured by arranging small lenses, which have a substantially rectangular profile seen from the optical axis, in a matrix form in order to divide the light flux from the mercury lamp 111 into a plurality of partial light fluxes as described above.

The second lens array 115 is configured by arranging small lenses into a matrix form substantially in the same manner with the first lens array 114.

The dichroic mirror 119 transmits the red light flux R and reflects the other light fluxes. The dichroic mirror 121 transmits the blue light flux B out of the light beam other than red light reflected by the dichroic mirror 119, and reflects the green light flux G.

The dichroic prism 139 is provided in order to form a color image by combining optical images modulated for each color of R, G, and B as described above. The dichroic prism 139 is provided with a dielectric multi-layer film which reflects a red light flux R and a dielectric multi-layer film which reflects a blue light flux B in a substantially X shape along the boundaries of four right-angle prisms, and is configured that three color light fluxes are combined by these dielectric multi-layer films.

The dichroic prism 139, the three liquid crystal display panels 133, 135, and 137, and the dust-proof filters 134, 136, and 138 are integrally formed into one body as a single prism unit 132 as shown in FIG. 40.

Next, the configuration of the prism unit 132 in the projector apparatus 100 of the present embodiment will be described in detail with reference to FIGS. 40 to 42.

Each face of the dichroic prism 139 is fixedly attached with three liquid crystal display panels 133, 135, and 137 as shown in FIG. 41 (the liquid crystal display panel 133 is not shown in FIG. 41).

The dichroic prism 139 with the liquid crystal display panels 133, 135, and 137 being fixedly attached thereto is arranged to be installed into a prism frame 140, which is a frame member, from an upper opening thereof.

The prism frame 140 is formed with circular openings 141, 142, and 143 at positions so as to be respectively faced with the three liquid crystal display panels 133, 135, and 137 fixedly attached to the dichroic prism 139. Moreover, the prism frame 140 is formed with a rectangular opening 144 at a position so as to be faced with the emitting face of the dichroic prism 139.

Further, the prism frame 140 is attached on the outer surface with the dust-proof filters 134, 136, and 138 so as to cover the circular openings 141, 142, and 143. That is, the arrangement is such that the dust-proof filters 134, 136, and 138 are disposed respectively in the vicinity of each liquid crystal display panel 133, 135, 137 with a predetermined spacing with respect to the display surface thereof.

It is noted that in FIG. 41, for purposes of simplifying the drawing, only the structure for attaching the dust-proof filter 136 to the circular opening 142 will be illustrated, and description will be made only on the configuration of this portion. Therefore, other portions, that is, the structures for attaching the dust-proof filter 134 to the circular opening 141 and for attaching the dust-proof filter 138 to the circular opening 143 will neither be illustrated nor described since they are identical.

Receiving parts 151, 152, and 153 protruding to the outer face side are formed in the peripheral edge part of the circular opening 142 of the prism frame 140. The receiving parts 151, 152, and 153 are portions which are formed to fixedly dispose pressing members 154, 155, and 156 for holding the dust-proof filter 136. Each pressing member 154, 155, 156 is fixedly disposed by fastening means such as screws 157, 158, and 159.

The dust-proof filter 136 is held by the pressing members 154, 155, and 156 so as to be airtightly and vibratably joined with the prism frame 140 via the piezoelectric element 150.

A piezoelectric element 150, which is a second excitation member for providing a predetermined vibration to the dust-proof filter 136, is disposed at the outer peripheral edge part of the dust-proof filter 136.

Further, three supporting parts 140*a* protruding to the outer face side are formed at the peripheral edge part of the circular opening 142 of the prism frame 140. There are fixedly disposed on to the three supporting parts 140*a*, stacked piezoelectric elements 18, which are first excitation members that come into contact with the outer peripheral end face of the dust-proof filter 136 and provides thereto a predetermined vibration in a first direction (a direction substantially perpendicular to the optical axis of the relay lens 130).

Here, the structures of the above described first and second excitation members, and the dust-proof member are identical to those in the camera 1 shown in the first embodiment. Therefore, detailed description thereof will be omitted.

As shown in FIG. 42, it arranged such that the interior of the prism frame 140 can be kept in a sealed state by containing the dichroic prism 139 inside the prism frame 140, arranging the dust-proof filters 134, 136, and 138 to be attached to the three circular openings 141, 142, and 143 respectively, and fixing a lid member 160 to the upper opening of the prism frame 140 with screws 161, 162, 163 and 164.

There are formed in the bottom face part of the prism frame 140 with an opening (not expressly shown) for passing a flexible electric substrate therethrough, which is drawn out from the liquid crystal display panels 133, 135, and 137. This can result in that control signals from the outside can be provided to each liquid crystal display panel 133, 135, 137 via the flexible electric substrate. It is noted that the opening for the above described flexible electric substrate is also arranged to be a sealing structure for securing a sealed state of the interior of the prism frame 140.

The outline of the action of the thus configured projector apparatus 100 of the present embodiment will be described below.

As shown in FIG. 40, a radial light beam emitted from the extra-high pressure mercury lamp 111 is reflected by the reflector 112 and emitted therefrom as a parallel light beam. The parallel light beam is directed to the first lens array 114 by the relay lens 113. The first lens array 114 divides the light flux emitted from the mercury lamp 111 into a plurality of partial light fluxes.

Then, the light flux that has passed through the first lens array 114 passes through the second lens array 115 to be converted into a specific polarized light by the polarization conversion element 116, and passes through the superposed lens 117, thereafter being directed to the total reflection mirror 118.

The plurality of partial light fluxes that has passed through the superposed lens 117 are bent by an angle of about 90 degrees with respect to the optical axis by the total reflection mirror 118 to be totally reflected toward the dichroic mirror 119.

The light flux other than the red light flux R, out of the light flux which is bent by the total reflection mirror 119, is reflected by the dichroic mirror 119 to be directed toward the dichroic mirror 121. Further, the red light flux R passes through the dichroic mirror 119.

After being bent by an angle of about 90 degrees by the total reflection mirror 120, the red light flux R that has passed the dichroic mirror 119 passes through the relay lens 121 to be directed toward the dust-proof filter 134, and enters into the liquid crystal display panel 133 therethrough.

On the other hand, out of the light flux other than the red light flux R reflected by the dichroic mirror 119, the blue light flux B passes through the dichroic mirror 121 and the green light flux G is reflected thereby.

The green light flux G reflected by the dichroic mirror 121 is directed toward the dust-proof filter 136 via the relay lens 130 and enters into the liquid crystal display panel 135 therethrough.

Further, the blue light flux B that has passed through dichroic mirror 121 is totally reflected by the total reflection mirror 123 via the relay lens 122, is totally reflected by the total reflection mirror 128 via the relay lens 125, thereafter being directed toward the dust-proof filter 138 via the relay lens 129, and enters into the liquid crystal display panel 137 therethrough.

Then, each of the red light flux R that has passed through the liquid crystal display panel 133, the green light flux G that has passed through the liquid crystal display panel 135, and the blue light flux B that has passed through the liquid crystal display panel 137 is combined by the dichroic prism 139 and thereafter is emitted toward the projection lens 101.

Then, the light flux projected by the projection lens 101 forms a predetermined image on the screen.

As so far described, in the projector apparatus 100 of the present embodiment, the dichroic prism 139 is contained in the prism frame 140 with the three incidence surfaces thereof being attached with the three liquid crystal display panels 133, 135, and 137 corresponding to the three colors of red, blue, and green.

Further, there are provided circular openings 141, 142, and 143 on the side wall of the prism frame 140 at positions so as to face with each of the liquid crystal display panels 133, 135, and 137, and the dust-proof filters 134, 136, and 138 are attached thereto so as to cover the each of the three circular openings 141, 142, and 143. Then, the prism frame 140 is kept in a substantially sealed state by the dust-proof filters 134, 136, and 138 and the lid member 160.

Such structure provides a structure for preventing dusts etc. from entering into the prism frame 140 and from adhering to each surface of the three liquid crystal display panels 133, 135, and 137.

Further, dusts etc. which have adhered to each outer surface of the dust-proof filters 134, 136, and 138 will be shaken off by the first excitation means and the second excitation means, and therefore there is no risk that dusts etc. are enlarged and displayed in the image which is projected on the screen by the projector apparatus 100.

It is noted that the excitation control of the dust-proof filters 134, 136, and 138 can employ the same means described on the camera 1 in the above described first embodiment just as they are. Therefore, detailed description on the action thereof will be omitted, however what differs from the camera 1 of the above described first embodiment is the timing to perform the excitation operation.

Within a typical projector apparatus, a cooling fan is generally provided to cool the light source lamp. Therefore, dusts etc. are always suspended in the air inside the projector apparatus.

Therefore, it is possible to effectively shake off dusts etc. adhering to the dust-proof filter by causing the dust-proof filter to vibrate periodically during image display or at a predetermined timing such as the time point of switching image display.

Next, a third embodiment of the present invention will be described below. In the present embodiment, as an optical apparatus to which the present invention is applied, an image pickup apparatus, specifically a single lens reflex digital camera (hereinafter, simply referred to as a camera) with interchangeable lenses similar to the above described first embodiment will be illustrated.

Figure 43:
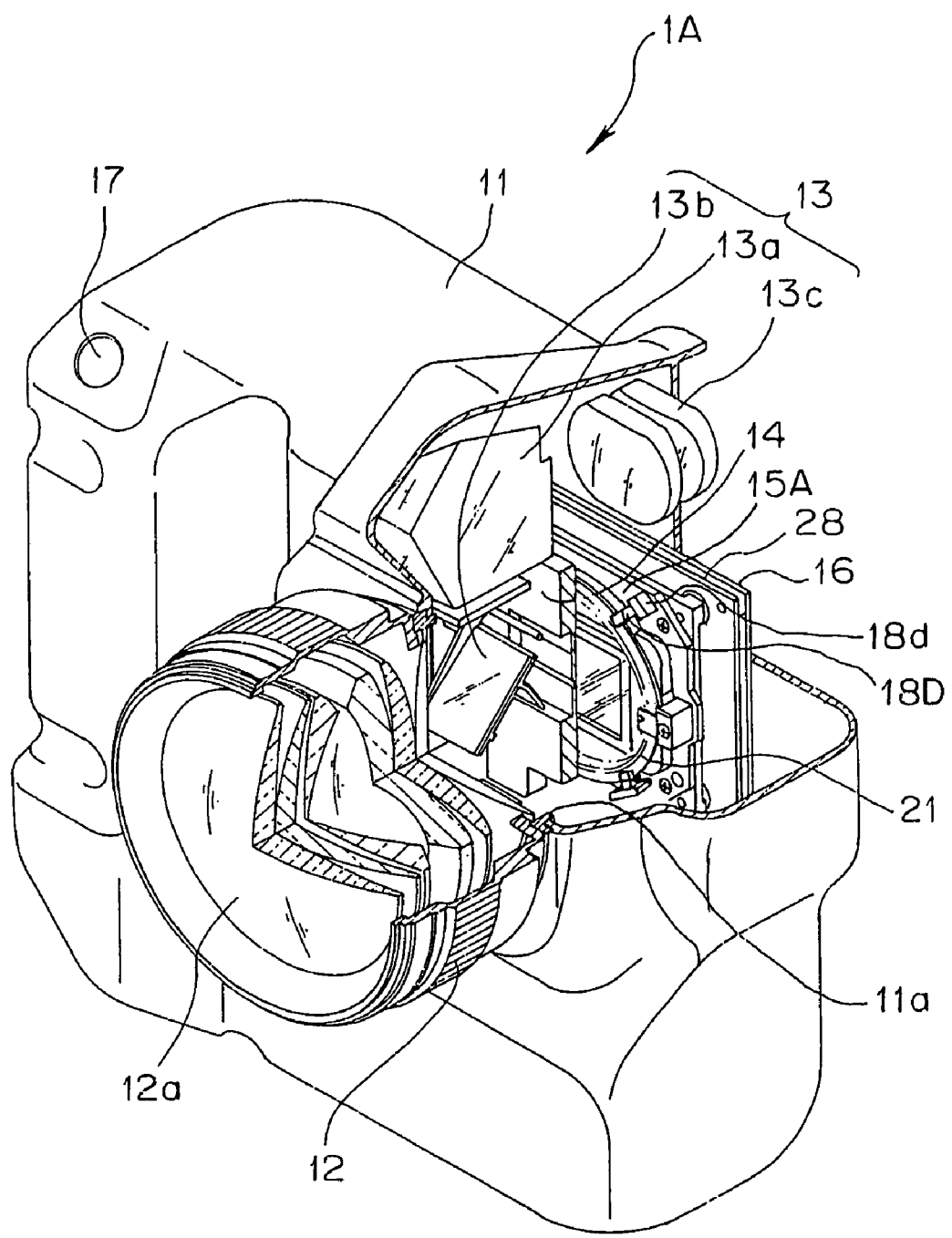
FIG. 43 is a partially cutaway perspective view to schematically show the internal configuration of an image pickup apparatus (a camera) of a third embodiment of the present invention.
Figure 44:
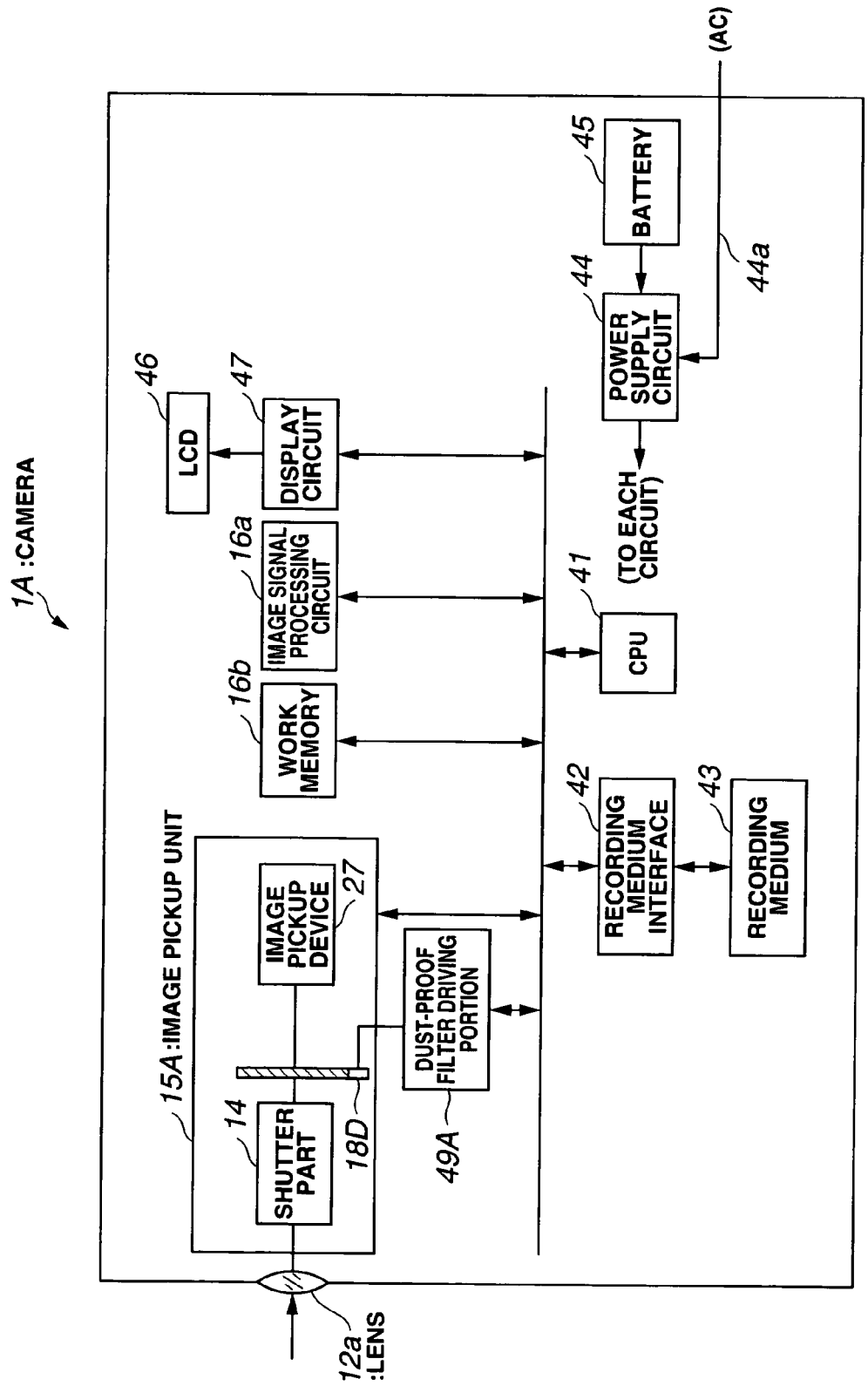
FIG. 44 is a schematic block diagram to primarily show the electric configuration of the camera of FIG. 43.

FIGS. 43 and 44 schematically show the configuration of the image pickup apparatus (camera) of the third embodiment of the present invention, in which FIG. 43 is a partially cutaway perspective view to schematically show the internal configuration of the image pickup apparatus (camera); and FIG. 44 is a schematic block diagram to primarily show the electric configuration of the image pickup apparatus (camera) of FIG. 43.

Figure 45:
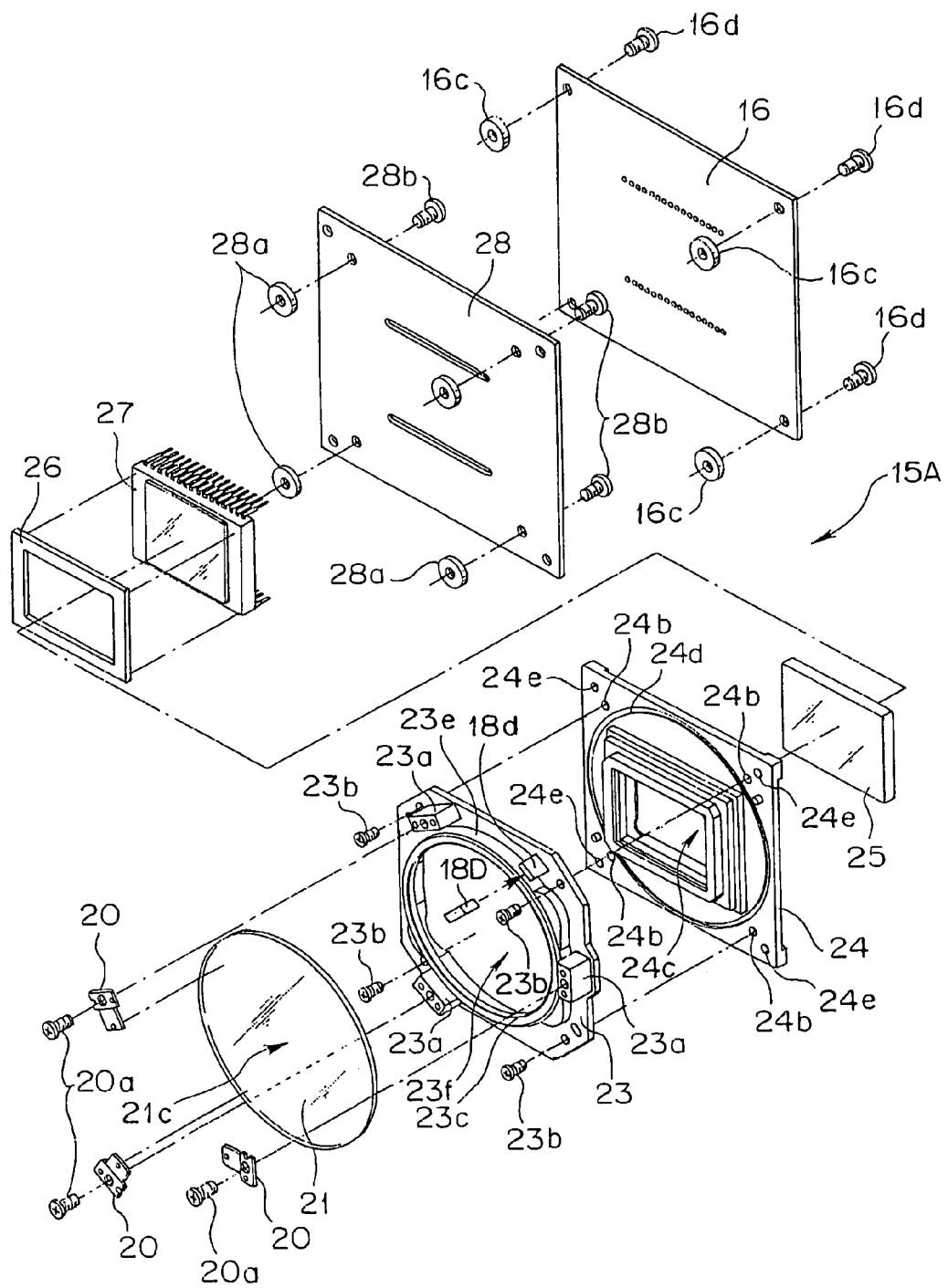
FIG. 45 is a principal part exploded perspective view to exclusively show part of the image pickup unit of the camera in FIG. 43.
Figure 46:
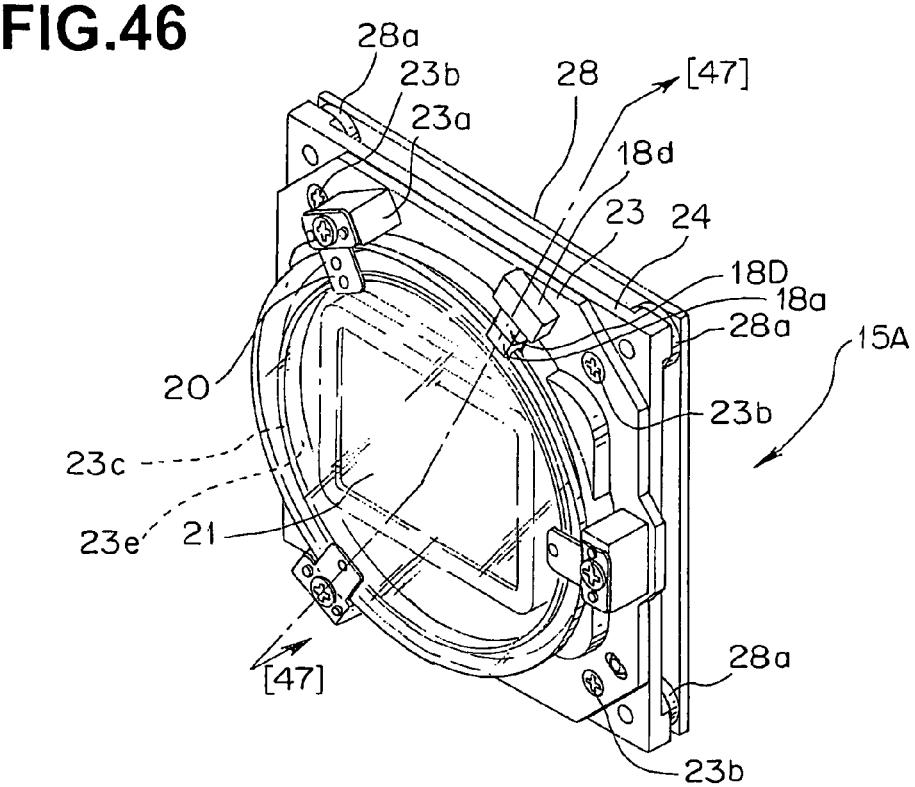
FIG. 46 is a perspective view to show the image pickup unit of the camera in FIG. 45 in an assembled state.
Figure 47:
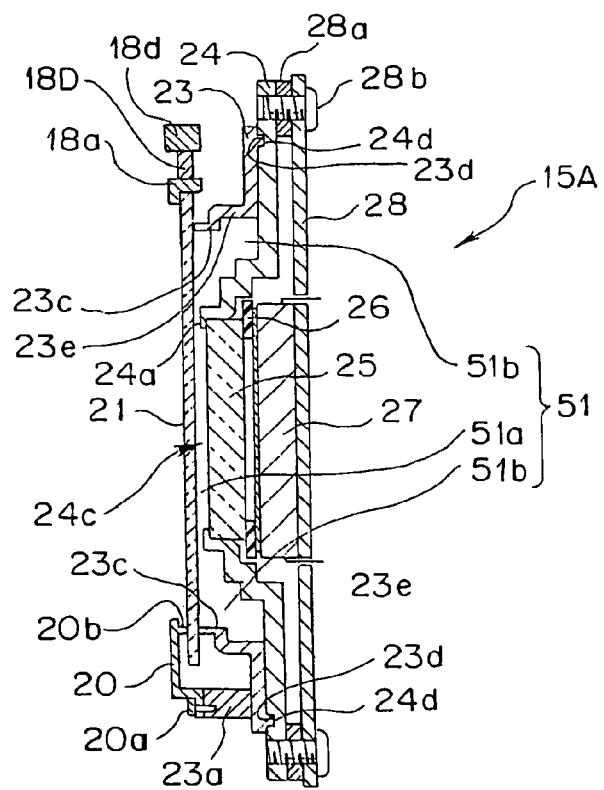
FIG. 47 is a sectional view taken along the line [47]-[47] in FIG. 46.

FIGS. 45, 46, and 47 are partially cutaway views of the image pickup unit of the camera according to the present embodiment; in which FIG. 45 is a principal part exploded perspective view to exclusively show part of the image pickup unit; FIG. 46 is a perspective view to show the image pickup unit in an assembled state; and FIG. 47 is a sectional view taken along the line [47]-[47] in FIG. 46.

It is noted that the configuration of the present embodiment is basically similar to that of the above described first embodiment, and only slightly differs in the configuration of the image pickup unit. Therefore, description on the similar configuration to that of the above described first embodiment will be omitted and only different configuration will be described in detail below.

The electric configuration of the camera 1A of the present embodiment is principally configured as shown in FIG. 44 to include as an alternative excitation means to replace the above described first and second excitation means, a stacked piezoelectric element 18D (to be specifically described later) which is disposed in the vicinity of the dust-proof filter 21 and which is an electric circuit for generating a vibration in a predetermined direction of the dust-proof filter 21 included in the image pickup unit 15A, a dust-proof filter driving portion 49A for performing the driving control of the piezoelectric element 18D, and the like, in addition to components similar to those of the camera 1 of the above described first embodiment, such as a CPU 41, an image signal processing circuit 16a, a work memory 16b, a recording medium 43, a recording medium interface 42, a display part 46, a display circuit 47, a battery 45, a connection cable 44a, a power supply circuit 44 etc.

Next, detailed configuration of the image pickup unit 15A in the camera 1A of the present embodiment will be described below.

The image pickup unit 15A in the camera 1A of the present embodiment is principally configured, as shown in FIGS. 43 to 47, to include similar components to those of the image pickup unit 15 of the camera 1 of the above described first embodiment, such as an image pickup device 27, an image pickup device fixing plate 28, an optical low pass filter (optical LPF) 25, a low pas filter receiving member 26, an image pickup device container case member 24 (CCD case 24), a dust-proof filter receiving member 23, a dust-proof filter 21, a pressing member 20, a stacked piezoelectric element 18D which is an excitation member, and the like.

It is noted that in the present embodiment, the excitation means is made up of a piezoelectric element 18D, dust-proof filter driving portion 49A (see FIG. 44) and the like.

Out of the excitation means in the present embodiment, the piezoelectric element 18D is an excitation member for providing a vibration in a predetermined direction, that is, a direction perpendicular to the direction along the optical axis of the photographing optical system 12a. direction along the face of the transmission portion 21c of the dust-poof filter 21), and is made up of for example an electromechanical conversion element etc. That is, it is arranged that a predetermined voltage is applied to the piezoelectric element 18D by the driving control of the dust-proof filter driving portion 49A, resulting in an extensional vibration of the piezoelectric element 18D in a predetermined direction.

At one end of the piezoelectric element 18D in the direction of the extensional vibration thereof, a holder member 18a is adhesively fixed thereto for example with an adhesive to transfer the extensional vibration of the piezoelectric element 18D to the dust-proof filter 21. For that reason, the holder member 18a is adhesively fixed for example with an adhesive in contact with the outer peripheral edge part of the dust-proof filter 21. Also, at the other end of the piezoelectric element 18D, an inertial body 18d which is an inertial mass member is for example adhesively fixed with an adhesive.

On the other hand, the dust-proof filter driving portion 49A is an electric circuit for performing the driving control of the piezoelectric element 18D by receiving a control command of the CPU 41. The dust-proof filter driving portion 49A controls the applied voltage to the piezoelectric element 18D through the control command of the CPU 41, which can result in that the dust-proof filter 21 is caused to vibrate in a predetermined direction (direction substantially perpendicular to the direction along the optical axis of the photographing optical system 12a, that is, the direction along the face of the transmission portion 21c of the dust-proof filter 21).

In the present embodiment, as shown in FIGS. 46 and 47, the dust-proof filter 21 is disposed so as to be directly joined in an airtight manner with the dust-proof filter receiving member 23. In this case, the elastic force of the pressing member 20 made of an elastic body such as a leaf spring presses the dust-proof filter 21 at its outer peripheral edge part of the front face side in a predetermined direction, that is, a direction along the optical axis of the photographing optical system 12a, and from the front face side to the rear face side, so as to be held at a predetermined position on the front face side of the dust-proof filter receiving member 23. That is, in the present embodiment, the piezoelectric element 22 in the above described first embodiment is omitted.

Meanwhile, on the front face side of the dust-proof filter receiving member 23, a plurality of (three in the present embodiment) protruding parts 23a are formed so as to protrude forwardly at predetermined positions in the vicinity of the outer peripheral edge part of the wall part 23e. The three protruding parts 23a are respectively disposed at an angular spacing of about 120 degrees with respect to the circumference of the dust-proof filter 21. That is, the protruding part 23g for holding the piezoelectric element 18 in the above described first embodiment will not be provided in the present embodiment.

It is substantially same with the first embodiment that the protruding part 23a is a portion which is formed to fixedly mount the pressing member 20 for holding the dust-proof filter 21. It is also substantially same with the first embodiment that the pressing member 20 is fixedly mounted to the distal end of the protruding part 23a by a screw 20a, which is fastening means.

It is also substantially same with the first embodiment that the pressing member 20 is a member formed of an elastic body such as a leaf spring, and the proximal end portion thereof is fixedly mounted to the distal end portion of the protruding part 23a and a free end part thereof comes into abutment with the outer peripheral edge part of the dust-proof filter 21, thereby pressing the dust-proof filter 21 in the direction to the dust-proof filter receiving member 23 side, that is, the direction along the optical axis of the photographing optical system 12a to hold the dust-proof filter 21.

In this case, in the present embodiment, a convex shape part 20b (see FIG. 47) which protrudes toward the dust-proof filter 21 side is formed in the vicinity of the distal end part on the free end part side of the pressing member 20, and in the face opposed to the dust-proof filter 21 when the pressing member 20 is fixedly disposed to the protruding part 23a. And the pressing member 20 is disposed such that the convex shape part 20b abuts against a predetermined portion in the vicinity of the front face side of the outer peripheral edge part of the dust-proof filter 21.

On the other hand, it is arranged such that a receiving part 23c abuts against a predetermined portion in the vicinity of the rear face side of the outer peripheral edge part of the dust-proof filter 21. This will result in that the dust-proof filter 21 is sandwiched between the convex shape part 20b of the pressing member 20 and the receiving part 23c. And, in this state, an elastic pressing force of the pressing member 20 is applied to the dust-proof filter 21 from the front face side thereof, resulting in that the dust-proof filter 21 is pressed toward the receiving part 23c in the direction along the optical axis of the photographing optical system 12a. This will result in that the position of the dust-proof filter 21 in the same direction is restricted. Concurrently with this, an airtight joint will be maintained between the dust-proof filter 21 and the dust-proof filter receiving member 23.

In other words, it is configured such that the dust-proof filter receiving member 23 airtightly joins the dust-proof filter 21 with the elastic force caused by the pressing member 20.

It is noted that, in this case, the pressing force by the pressing member 20 is set to be a level of force that allows to secure a satisfactory airtightness between the dust-proof filter 21 and the receiving part 23c of the dust-proof filter receiving member 23, and will not inhibit the vibration of the dust-proof filter 21 in a predetermined direction (a direction substantially perpendicular to the direction along the optical axis of the photographing optical system 12a, and a direction along the face of the transmission portion 21C of the dust-proof filter 21) caused by the piezoelectric element 18D.

Further, in addition to that, each of the portions of the convex shape part 20b of the pressing member 20 and the receiving part 23c, which comes in contact with the dust-proof filter 21, is configured to have a lubricity by means of sticking a lubricating sheet or the like.

As the result of such configuration, the dust-proof filter 21 is held to be slidable in the horizontal direction, that is, the direction along the face of the transmission portion 21c, and to be immobile in the direction along the optical axis of the photographing optical system 12a.

Meanwhile, as described above, the dust-proof filter receiving member 23 and the CCD case 24 are arranged such that the circumferential groove 24d and the annular convex portion 23d (see FIGS. 45 and 47) fit to each other in a substantially airtight manner. Concurrently, the dust-proof filter receiving member 23 and the dust-proof filter 21 are arranged to be directly and airtightly joined by a biasing force of the pressing member 20. Moreover, the optical LPF 25 disposed in the CCD case 24 is arranged such that a substantially airtight contact is achieved between the peripheral edge part of the front face side of the optical LPF 25 and the step 24a of the CCD case 24. Further, the image pickup device 27 is disposed in the rear face side of the optical LPF 25 via the low pass filter receiving member 26 so that a substantially airtight condition is maintained between the optical LPF 25 and the image pickup device 27 as well. Other configurations are substantially same as those of the first embodiment.

As the result of such configuration, in the camera of the present embodiment, the dust-proof filter 21 is oppositely disposed at a predetermined position of the front face side of the image pickup device 27 such that a sealed space 51 formed at the peripheral edges of the photoelectric conversion surface and of the dust-proof filter 21 is sealed, thereby preventing dusts etc. from adhering to the photoelectric conversion surface of the image pickup device 27 and the outer surface of the optical LPF 25.

Meanwhile, as to dusts etc. adhering to the exposure surface on the front face side of the dust-proof filter 21, it is arranged such that a periodic voltage is applied to the piezoelectric element 18D disposed in contact with the outer peripheral end face of the dust-proof filter 21 in the vicinity of the outer peripheral edge part of the dust-proof filter 21 so that the dusts etc. can be removed.

It is noted in this case that various control can be envisaged for the driving control of the piezoelectric element 18D when providing a vibration to the dust-proof filter 21. Details of such control will be described later.

In thus configured camera 1A of the present embodiment, the actions of the dust-proof filter 21 and the piezoelectric element 18D out of the image pickup unit 15A will be described below with reference to FIGS. 48 to 53.

FIG. 48 is a layout drawing as viewed from the front of a dust-proof member (a dust-proof filter) and an excitation member (a piezoelectric element) in the camera of the present embodiment. FIGS. 49A, 49B, and 49C and FIGS. 51A, 51B, and 51C are conceptual side views of the dust-proof member (dust-proof filter) and the excitation member (the piezoelectric element) of FIG. 48, each figure (A) to (C) illustrating the manner the dust-proof member (dust-proof filter) moves in a predetermined direction as the excitation member (piezoelectric element) extends/contracts. It is noted that FIGS. 49A, 49B, and 49C and FIGS. 51A, 51B, and 51C are side views as viewed from direction of the arrow [49] of FIG. 48.

Figure 50:
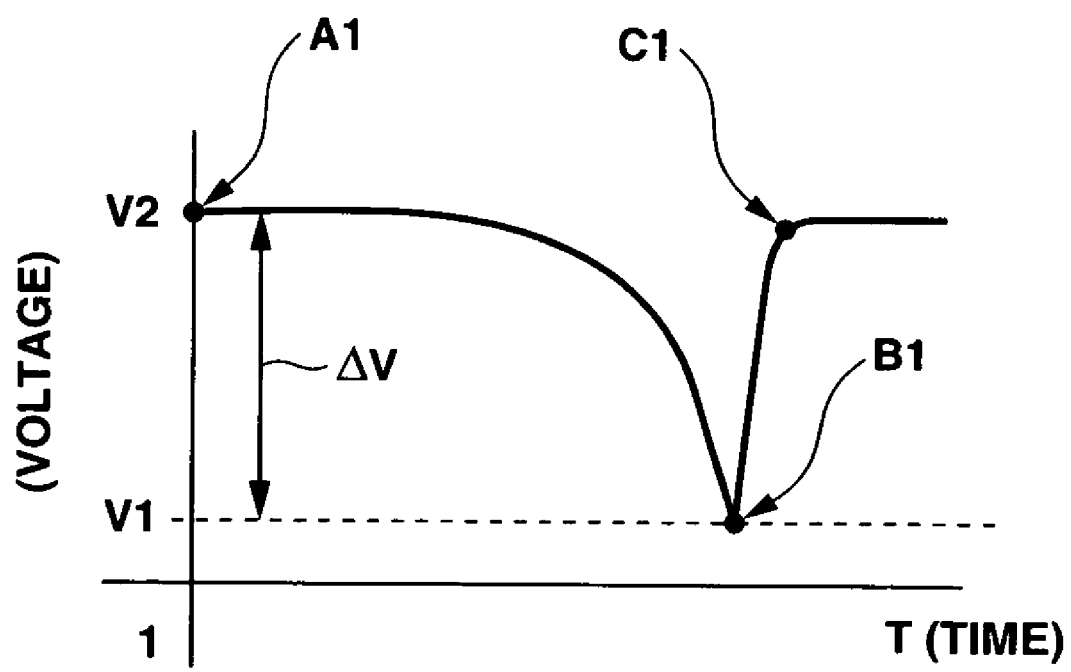
FIG. 50 illustrates the pulse waveform when performing the driving control in FIG. 49A, FIG. 49B, and FIG. 49C, in which the pulse waveform is generated due to the state change of applied voltage to be applied to drive the excitation member (piezoelectric element) of FIG. 48 to be extended/contracted.

Further, FIGS. 49A, 49B, and 49C and FIGS. 51A, 51B, and 51C respectively show the differences in the action caused by applying different forms of applied voltages. That is, the state change of each applied voltage for realizing each action shown in FIGS. 49A, 49B, and 49C and FIGS. 51A, 51B, and 51C is shown in FIG. 50 and 52, respectively. Out of those, FIG. 50 corresponds to each state shown in FIGS. 49A, 49B, and 49C. FIG. 52 shows the state change of the applied voltage of a different form from those of FIGS. 49A, 49B, and 49C, corresponding to each state of FIGS. 51A, 51B, and 51C.

Figure 53:
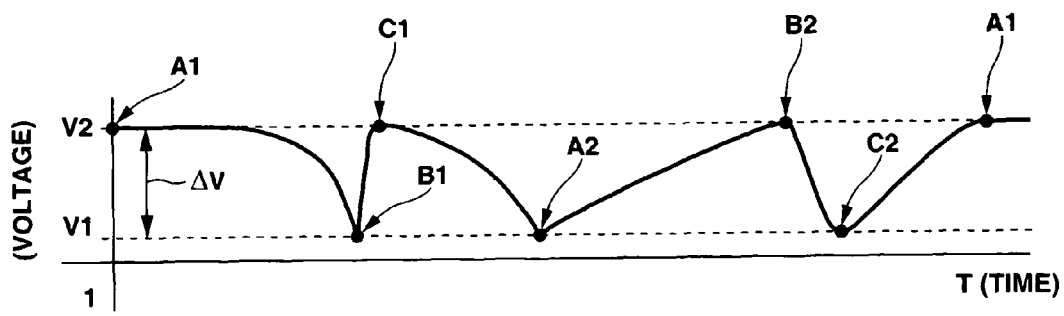
FIG. 53 illustrates the pulse waveform when alternately performing the driving control in FIG. 49A, FIG. 49B, and FIG. 49C, and FIG. 51A, FIG. 51B, and FIG. 51C, the pulse waveform being generated due to the state change of applied voltage to be applied to drive the excitation member (piezoelectric element) of FIG. 48 to be extended/contracted.

FIG. 53 illustrates the pulse waveform when alternately performing the driving control of FIGS. 49A, 49B, and 49C and FIGS. 51A, 51B, and 51C, the pulse waveform being generated due to the state change of the applied voltage to be applied to the excitation member (piezoelectric element) to drive it extended/contracted.

Figure 54:
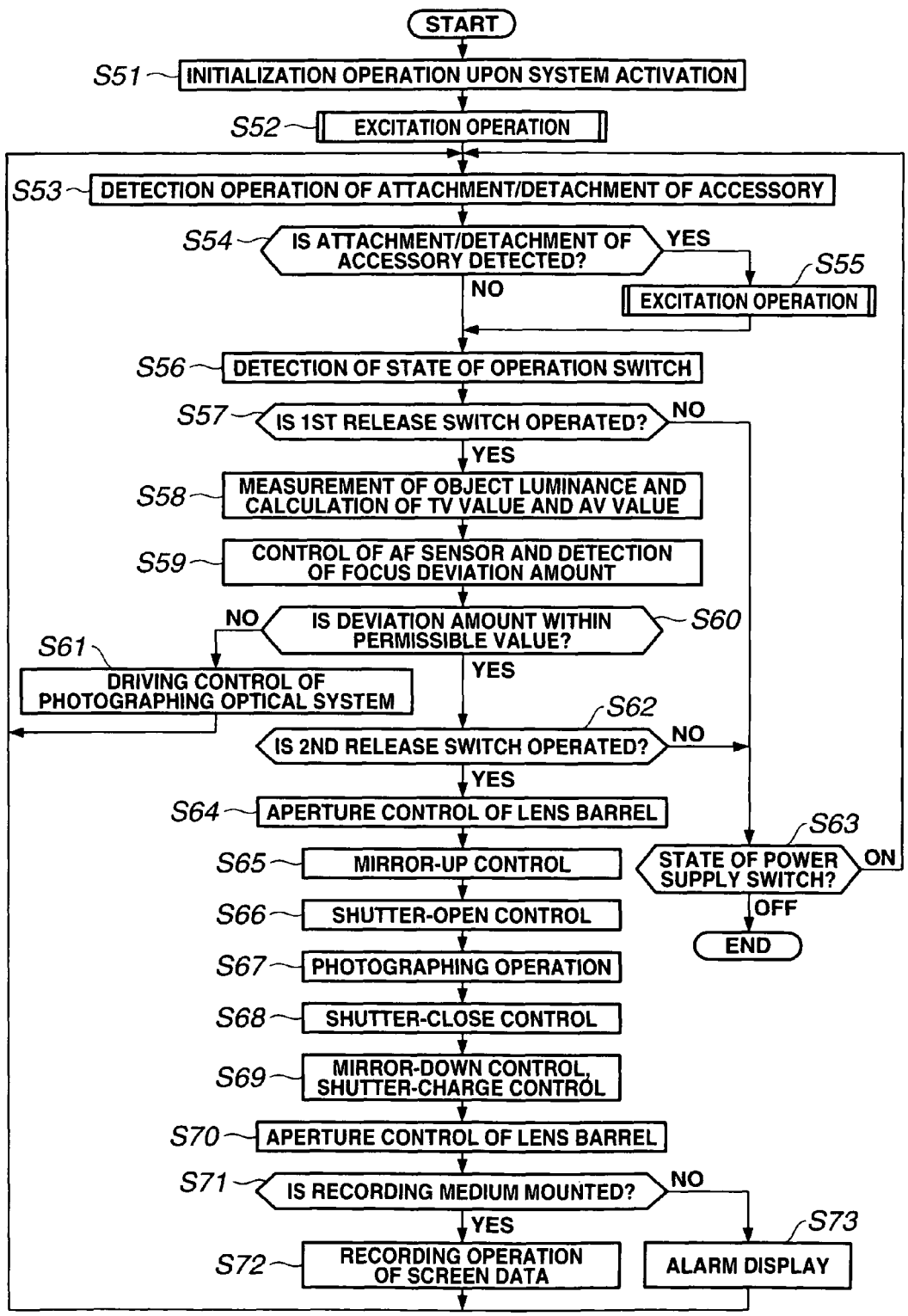
FIG. 54 is a flowchart to show the outline of the photographing operation processing in the camera of FIG. 43.
Figure 55:
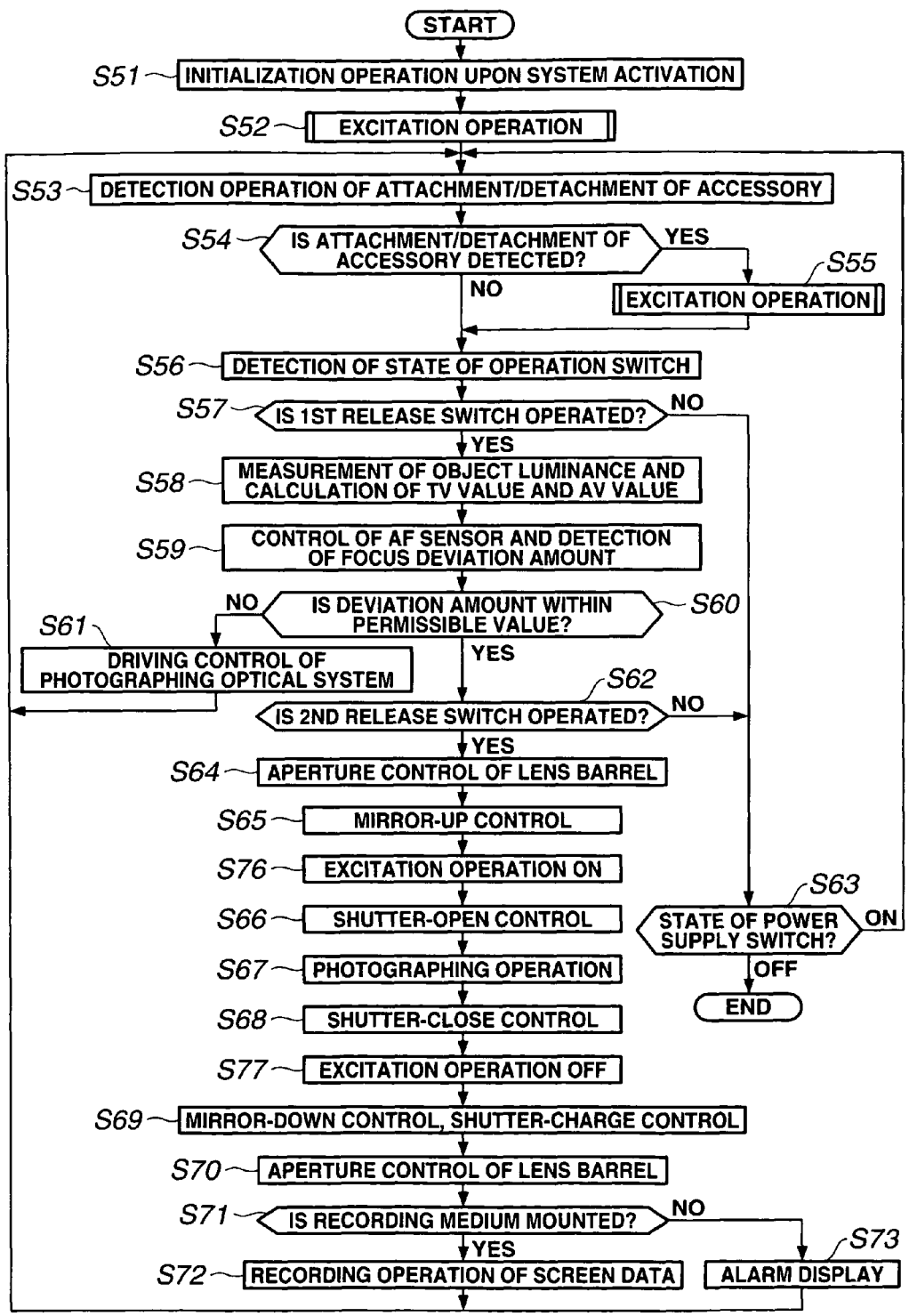
FIG. 55 is a flowchart to show a variant of the photographing operation processing in the camera of FIG. 43.

FIG. 54 is a flowchart to show the outline of the photographing operation processing in the image pickup apparatus (camera) of the present embodiment. FIG. 55 is a flowchart to show a variant of the photographing operation processing in the image pickup apparatus (camera) of the present embodiment.

It is noted that the action of each member shown in each figure after FIG. 48 is exaggerated for convenience of illustrating actions.

The action when removing minute dusts etc. adhering to the exposure surface of the front face side of the dust-proof filter 21 by transferring extension/contraction vibration of the piezoelectric element 18D to the dust-proof filter 21 so that the dust-proof filter 21 is caused to vibrate in a predetermined direction will be described below with reference to FIGS. 48 to 52.

The piezoelectric element 18D is, as well known, an element which extends/contracts by a minute amount upon being applied a voltage. Therefore, now suppose that when in a no-load state shown in FIG. 48, a plus (+) or minus (−) voltage is applied to the piezoelectric element 18D through the control by the CPU 41 via the dust-proof filter driving portion 49A (see FIG. 44). Then the piezoelectric element 18D will extend/contract in the direction of arrow T shown in FIG. 48.

In this case, the extension/contraction direction of the piezoelectric element 18D is set to be a direction along the face of the transmission portion 21c of the dust-proof filter 21, and a direction substantially perpendicular to the direction along the optical axis of the photographing optical system 12a.

First, the state shown in FIG. 49A shows the state in which the piezoelectric element 18D is extended to the fullest extent. The state of the applied voltage at this moment is a state in which a plus (+) voltage V2 is applied as indicated by symbol A1 in FIG. 50.

Then, the piezoelectric element 18D is caused to contract from this state to the state shown in FIG. 49B. In order to achieve this, the applied voltage is controlled such that the applied voltage is gradually reduced in a gentle curve from the applied voltage V2 at the time point of symbol A1 in FIG. 50 to the applied voltage V1 at the time point of symbol B1 in the same figure.

As a result, the piezoelectric element 18D gradually contracts in the direction of arrow T1 in FIG. 49. Along with this, the inertial body 18d moves in the same direction by the amount indicated by symbol D1 in FIG. 49B. At this moment, the applied voltage is reduced so that the contraction rate of the piezoelectric element 18D and moving velocity of the inertial body 18d are lowered. Therefore, the dust-proof filter 21 is kept in an immobile state by the pressing force caused by the pressing member 20.

That is, in this state, the dust-proof filter 21 is being sandwiched by the pressing member 20 and the receiving part 23c, and the static friction force between the two is being larger than the inertial force generated by the motion of the piezoelectric element 18D. The static friction force of the dust-proof filter 21 caused by the pressing member 20 and the receiving part 23c is set as such.

Next, in the state of FIG. 49B, the applied voltage to the piezoelectric element 18D becomes a predetermined voltage V1 at the time point indicated by symbol B1 in FIG. 50. Upon coming into such state, the CPU 41 rapidly applies an applied voltage to the piezoelectric element 18D via the dust-proof filter driving portion 49A. That is, at this moment, the applied voltage is boosted in a steep curve from the applied voltage V1 at the time point of symbol B1 in FIG. 50 to the applied voltage V2 at the time point of symbol C1 in the same figure.

This will result in that the piezoelectric element 18D extends with a large acceleration in the direction of arrow T1 shown in FIG. 49C by the amount indicated by symbol D2 shown in FIG. 49C. At this moment, the inertial body 18d stays at its position due to its own weight, while the dust-proof filter 21 moves by the amount indicated by symbol S1 of FIG. 49C in the direction of the arrow T1 shown in FIG. 49C.

Now, suppose that minute dust adheres onto the surface (on the front face side exposure surface) of the dust-proof filter 21 as indicated by symbol G in FIGS. 49A, 49B, and 49C. In this case, when a shift from the state of FIG. 49A to the state of FIG. 49B takes place, the dust-proof filter 21 is immobile and therefore the dust G is also immobile.

Next, when a shift from the state of FIG. 49B to the state of FIG. 49C takes place, the dust-proof filter 21 rapidly moves to the direction of arrow T1, and therefore the dust G located on the surface departs from the surface of the dust-proof filter 21 and floats up as indicated by arrow U of FIG. 49C. Thereafter, for example, the dusts again will fall onto the surface of the dust-proof filter 21. At this time, since the dust-proof filter 21 itself has moved by the amount indicated by symbol S1 of FIG. 49C in the direction of arrow T1 in the same figure, the falling down position of the dust G will be a point which is a same distance as symbol S1 in the arrow T2 direction in the same figure C.

In this way, if the dust-proof filter 21 is caused to rapidly vibrate in a predetermined direction (arrow T1 direction) by controlling the applied voltage to be applied to the piezoelectric element 18D such that a voltage of a pulse waveform having a predetermined frequency component is applied as in the form shown in FIG. 50, minute dust G on the dust-proof filter 21 floats up from the surface of the dust-proof filter 21. Then, since the dust-proof filter 21 moves in the direction of arrow T1 by the distance S1 while minute dusts are floating up, the dust G which has floated up from the surface of the dust-proof filter 21 will result in moving by distance S1 in the direction of arrow T2 relatively opposite to the moving direction of the dust-proof filter 21 (T1 direction).

Further, inside the actual camera 1A, the dust-proof filter 21 is ordinarily disposed such that the surface thereof is oriented along the direction substantially perpendicular to the optical axis of the photographing optical system 12a. That is, when the camera 1A is in an ordinary posture, the surface of the dust-proof filter 21 is disposed to be oriented along the vertical direction. Therefore, when the camera 1A is in an ordinary posture, the dust G will result in departing from the surface of the dust-proof filter 21, and at the same time falling down to the bottom face side of the camera 1A. Thus, the dust G will be easily removed from the dust-proof filter 21.

Next, the actions when the dust-proof filter 21 is moved in the direction opposite to that in the case of the above described FIG. 50, by applying a form of applied voltage as shown in FIG. 52.

Figure 51A:
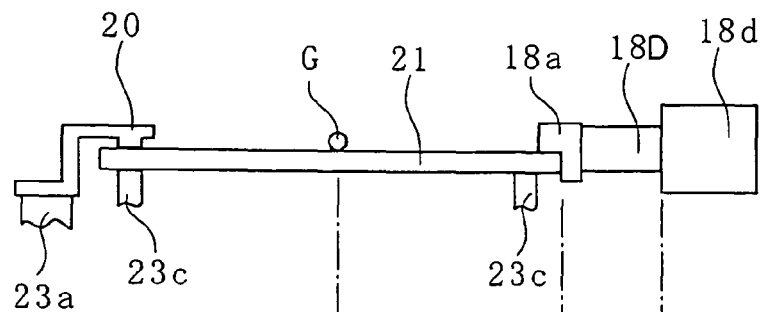
FIG. 51A is conceptual side view to illustrate the action of the dust-proof member (dust-proof filter) and the excitation member (piezoelectric element) of FIG. 48 showing the state in which the excitation member is contracted to a predetermined state.
Figure 52:
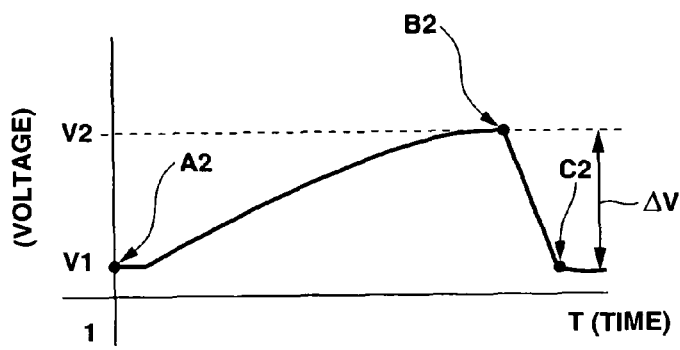
FIG. 52 illustrates the pulse waveform when performing the driving control in FIG. 51A, FIG. 51B, and FIG. 51C, the pulse waveform being generated due to the state change of applied voltage to be applied to drive the excitation member (piezoelectric element) of FIG. 48 to be extended/contracted.

First, the state shown in FIG. 51A is a state in which the piezoelectric element 18D is contracted to a predetermined state. That is, an applied voltage V1 is applied to the piezoelectric element 18D via the dust-proof filter driving portion 49A (see FIG. 44) through the control by the CPU 41 so that the piezoelectric element 18D maintains a predetermined amount of contraction. The state of the applied voltage at this moment is a state in which an applied voltage V1 is applied as indicated by symbol A2 in FIG. 52.

Figure 51B:
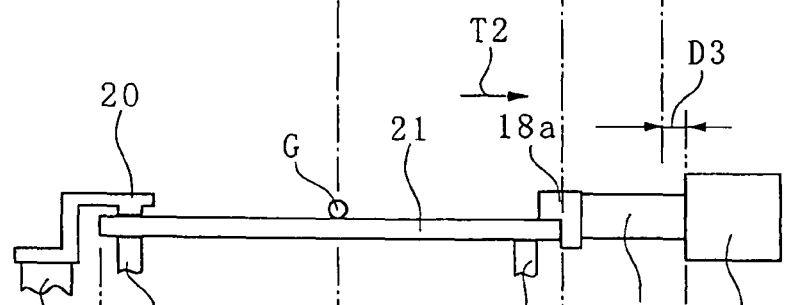
FIG. 51B is conceptual side view to illustrate the action of the dust-proof member (dust-proof filter) and the excitation member (piezoelectric element) of FIG. 48 showing the state in which the excitation member is extended from the state of FIG. 51A.

From this state, the piezoelectric element 18D is caused to extend to a state shown in FIG. 51B. In order to achieve this, the applied voltage to be applied to the piezoelectric element 18D is gradually boosted from the applied voltage V1 at the time point of symbol A2 shown in FIG. 52 to the applied voltage V2 at the time point of symbol B2 in the same figure.

Then, the piezoelectric element 18D gradually extends toward the direction of arrow T2 in FIG. 51B. As this occurs, the inertial body 18d moves in the same direction by the amount indicated by symbol D3 of FIG. 51B as well. At this moment, the boosting of applied voltage is performed such that the extension rate of the piezoelectric element 18D and the moving velocity of the inertial body 18d are lowered. Therefore, the dust-proof filter 21 is kept in an immobile state by the pressing force of the pressing member 20. That is, in this state, the dust-proof filter 21 is being sandwiched by the pressing member 20 and the receiving part 23c so that the static friction force by the two is greater than the inertial force of the inertial body 18d produced by the movement of the piezoelectric element 18D.

Then, in the state of FIG. 51B, the applied voltage to the piezoelectric element 18D becomes a predetermined voltage value V2 at the time point of symbol B2 shown in FIG. 52. Upon coming into this state, the CPU 41 rapidly reduces the applied voltage to the piezoelectric element 18D via the dust-proof filter driving portion 49A. That is, the applied voltage is rapidly reduced in a steep curve from the applied voltage V2 at the time point of symbol B2 shown in FIG. 52 to the applied voltage V1 at the time point of symbol C2 in the same figure.

Figure 51C:
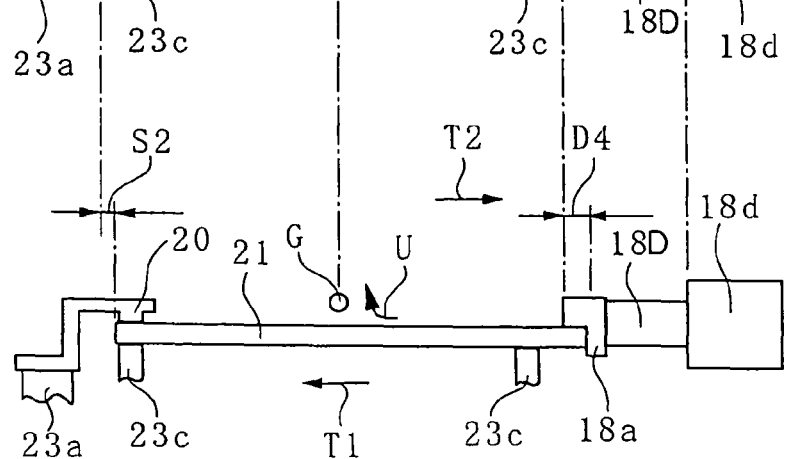
FIG. 51C is conceptual side view to illustrate the action of the dust-proof member (dust-proof filter) and the excitation member (piezoelectric element) of FIG. 48 showing the state in which the excitation member is contracted from the state of FIG. 51B.

This will cause the piezoelectric element 18D to contract with a large acceleration toward the direction of arrow T2 shown in FIG. 51C by the amount indicated by symbol D4 in FIG. 51C. At this moment, the inertial body 18d stays at its position due to its own weight while the dust-proof filter 21 moves in the direction of arrow T2 shown in FIG. 51C by the amount indicated by symbol S2 in FIG. 51C.

Now, suppose that minute dusts as indicated by symbol G in FIGS. 51A, 51B, and 51C adheres onto the surface of the dust-proof filter 21. In this case, when a shift from the state of FIG. 51A to the state of FIG. 51B takes place, the dust-proof filter 21 is immobile, and therefore the dust G is also immobile.

Next, when a shift from the state of FIG. 51B to the state of FIG. 51C takes place, the dust-proof filter 21 will move rapidly in the direction of arrow T2, and therefore the dust G on the surface thereof will depart and float up from the surface of the dust-proof filter 21 as shown by arrow U in FIG. 51C. Thereafter, the dust G will result in falling down again, for example, onto the surface of the dust-proof filter 21. At this moment, since the dust-proof filter 21 itself has moved by the amount indicated by symbol S2 in FIG. 51C in the direction of arrow T2 in the same figure, the falling down point of the dust G will be the position which is relatively moved away by the substantially same distance as that of symbol S2 in the direction of arrow T1 in the same figure C.

Thus, if the dust-proof filter 21 is caused to vibrate rapidly in a predetermined direction (direction of arrow T2) by performing the control of the applied voltage to be applied to the piezoelectric element 18D such that a voltage of a pulse waveform having a predetermined frequency component is applied in a form as shown in FIG. 52, minute dust G on the dust-proof filter 21 floats up from the surface of the dust-proof filter 21. Then, since the dust-proof filter 21 will move in the direction of arrow T2 by the distance S2 while the minute dust G is floating in the air, the minute dust G, which has floated up from the surface of the dust-proof filter 21, will result in moving in the direction of arrow T1 relatively opposite to the moving direction of the dust-proof filter 21 (T2 direction) by the same distance S2.

Further, when the camera 1A is in an ordinary posture, the dust G will depart from the surface of the dust-proof filter 21 to float up in the air, and at the same time will fall down to the bottom face side of the camera 1A to be removed, which is substantially the same with the case of the above described FIGS. 49A, 49B, and 49C and FIG. 50.

Furthermore, conveniently combining the control of applied voltage shown in FIG. 50 and the control of applied voltage shown in FIG. 52 will cause the dust-proof filter 21 to alternately move in the directions of arrow T1 and arrow T2 as shown in FIG. 49C and FIG. 51C thereby generating continuous vibration, which allows to more securely separate and remove the dust G adhering onto the surface of the dust-proof filter 21.

As an example of this case, a control by a pulse waveform of applied voltage of the form as shown in FIG. 53 is envisaged. In the example shown in FIG. 53, the control action of the applied voltage described by the above described FIGS. 49A, 49B, and 49C and FIG. 50 and the control action of the applied voltage described by the above described FIGS. 51A, 51B, and 51C and FIG. 52 are alternately performed.

The outline of the action in this case is as follows. That is, the state change of applied voltage from the time point of symbol A1 shown in FIG. 53 to the time point of symbol C1 shown in the same figure is substantially the same as that of the driving control and the action thereof of the piezoelectric element 18D in the state changes between FIGS. 49A, 49B, and 40C.

Next, the state change of applied voltage from the time point of symbol C1 in FIG. 53 to the time point of symbol A2 in the same figure is the reduction of the applied voltage to cause a shift from the state of FIG. 49C to the state of FIG. 51A. That is, at the time point of symbol C1 in FIG. 53, the piezoelectric element 18D is in an extended state as in the state of FIG. 49C, and at this time the piezoelectric element 18D is applied with applied voltage V2. To shift this state to a state same as that of FIG. 51A, the applied voltage V2 to the piezoelectric element 18D is gradually reduced to applied voltage V1 from the time point of symbol C1 of FIG. 53 to the time point of symbol A2 of the same figure. This will cause the piezoelectric element 18D to be contracted by a predetermined amount. Since the reduction of the applied voltage is performed in a gentle curve, the piezoelectric element 18D will be gradually contracted. Therefore, the dust-proof filter 21 will be kept at the position in FIG. 49C.

This will result in that at the time point of symbol A2 in FIG. 53, while the relative positional relationship of the dust-proof filter 21 with respect to the pressing member 20 and the receiving part 23c stay in a state of FIG. 49C, the states of the piezoelectric element 18D and the inertial body 18d become substantially same as that of FIG. 51A.

In this state, the state of applied voltage is changed from the time point of symbol A2 of FIG. 53 to the time point of symbol C2 of the same figure. This driving control is substantially same as the driving control of the piezoelectric element 18D and the action thereof in the state changes between the above described FIGS. 51A, 51B, and 51C. This will cause the dust-proof filter 21 to vibrate from the position shown in FIG. 49c to the direction of arrow T2 of FIG. 51B.

It is noted that to cause a shift from the state of FIG. 51C further to the state of FIG. 49A, the boosting of the applied voltage from applied voltage V1 to applied voltage V2 is performed in a gentle curve from the time point of symbol C2 of FIG. 53 to the time point of symbol A1 of the same figure.

Since successive execution of this series of driving control will result in providing vibration of different directions alternately and successive to the dust-proof filter 21, it is possible to more effectively separate and remove minute dusts etc. from the surface of the dust-proof filter 21.

In thus configured image pickup apparatus (camera 1A) of the present embodiment, the flow of control processing while a photographing operation is performed will be described below with reference to the flowchart of FIG. 54.

First, upon user's operation of the predetermined operation member (a power supply switch etc., not expressly shown), the present camera 1A is activated. This causes the CPU 41 to start the execution of the photographing operation processing shown in FIG. 54 (START).

In the step S51 of FIG. 54, the CPU 41 executes the processing of an initialization operation during system activation. Thereafter, the process advances to the processing of the step S52.

In the step S52, the CPU 41 executes an excitation operation processing. The excitation operation processing executed here is a control processing to execute a series of actions described in FIGS. 48 to 52. That is, the excitation operation processing is an operation processing to control the driving of the excitation means (the piezoelectric element 18D, and the dust-proof filter driving portion 49A) to provide a vibration of a predetermined direction to the dust-proof filter 21.

Next, in the step S53, the CPU 41 executes a detection operation of the attachment/detachment of accessory. The detection operation of the attachment/detachment of accessory is an operation to detect if an accessory such as the lens barrel 12 is attached/detached to or from the camera body 11.

First, in the step S54, if the attachment/detachment of an accessory is not detected, the process advances to the processing of the step S56. Meanwhile, in the step S54, if the attachment/detachment of an accessory is detected, the process advances to the processing of the step S55.

In the step S55, the CPU 41 executes an excitation operation processing. The excitation operation processing to be executed here is a similar operation to the above described operation of the step S52. Thereafter, the process advances to the operation of the step S56.

In the step S56, the CPU 41 executes a detection operation of the state of various operation switches (SW, not expressly shown). The operation switches of which state is detected here include, for example, a release switch which is interlocked with the operation of a release button 17 and power supply switches. This release switch is made up of a two-step switch which is used in ordinary cameras etc. That is a typical release switch which is configured such that a half-press operation of the first release button 17 turns the first (1st) release switch into On state and the following full press state of the release button 17 will turn the second (2nd) switch into On state.

In the step S57, the CPU 41 confirms whether or not the first release switch has been operated. Here, if it is confirmed that the aforementioned switch has not been operated, the process advances to the step S63. Then, in the step S63, the CPU 41 confirms the state of the power supply switch. Here, if it is confirmed that the state of the power supply switch is Off state, a series of processing is terminated (END). Further, if it is confirmed that the state of the power supply switch is On state, the process returns to the processing of the above described step S53, and repeats the processing that follows.

Meanwhile, in the above described step S57, if the CPU 41 confirms that the first release switch has been operated, the process advances to the next step S58.

In the step S58, the CPU 41 executes a so-called photometric processing in which the measurements of object luminance and the calculation of TV values and AV values are performed.

Following that, in the step S59, the CPU 41 executes a so-called autofocus (AF) processing which controls an AF sensor to detect a focus deviation amount.

Next, in the step S60, the CPU 41 makes judgment whether or not the focus deviation amount detected as the result of the AF processing by the above described step S59 is within a permissible value. Here, if it is judged that the deviation amount is not within the permissible value, the process advances to the processing of the step S61. Then, in the step S61, after executing the driving control of the photographing optical system 12a, the CPU 41 returns to the above described processing of the step S63, and repeats the processing that follows.

Meanwhile, in the above described step S60, if it is judged that the deviation amount is within the permissible value, the process advances to the next step S62.

In the step S62, the CPU 41 confirms whether or not the second release switch has been operated. Here, if it is confirmed that the aforementioned switch has not been operated, the process advances to the processing of the step S63. Then, in the step S63, the CPU 41 confirms the state of the power supply switch. Here, if it is confirmed that the state of the power supply switch is Off state, a series of processing are terminated (END). Further, if it is confirmed that the state of the power supply switch is On state, the process returns to the processing of the above described step S53 and repeats the processing that follows.

On the other hand, in the above described step S62 described above, if the CPU 41 confirms that the second release switch has been operated, the process advances to the next step S64.

In the step S64, the CPU 41 executes an aperture control processing of the lens barrel 12. The aperture control processing is a processing to perform the open-close operation of the aperture blade provided inside the lens barrel 12 based on the calculation result in the above described step S58 thereby controlling the setting of a predetermined aperture value.

Next, in the step S65, the CPU 41 executes a mirror-up control processing. The mirror-up control processing is a processing to perform the operation to move the reflex mirror 13b, which is located in the position to allow to bend the optical axis of the object light flux that has passed the photographing optical system 12a and to direct it toward the observation optical system, to the position to allow to retreat from the optical axis of the photographing optical system 12a. This mirror-up operation will allow the object light flux that has passed the photographing optical system 12a to advance toward the photoelectric conversion surface of the image pickup device 27.

Following that, in the step S66, the CPU 41 executes a shutter-open control processing. The shutter-open control processing is a processing to control the opening operation of the shutter mechanism provided inside the camera body 11 based on the calculation result in the above described step S58.

Then, in the step S67, the CPU 41 executes an image pickup operation processing by controlling the driving of the image pickup device 27, the image signal processing circuit 16a, the work memory 16b, the display circuit 47, the LCD 46, and the like. The image pickup operation processing is: a processing to drive the image pickup device 27 to perform a photoelectric conversion processing thereby acquiring an image signal; a processing to perform a predetermined signal processing on the acquired image signal at the image signal processing circuit 16a etc. and to convert it into a predetermined form of image data; and a series of control processing such as transferring the generated image data to the work memory 16b to temporally record it, and transferring the image data to the display circuit 47 to generate an image signal in a predetermined display format at the display circuit 47, and to perform an image display processing by the LCD 46.

In parallel with that, in the step S68, the CPU 41 executes a shutter-close control processing. The shutter-close control processing is a processing to control the closing operation of the shutter mechanism provided inside the camera body 11 based on the calculation result in the above described step S58.

Next, in the step S69, the CPU 41 executes a mirror-down control processing and a shutter-charge control operation. Out of these, the mirror-down control processing is a control to perform the operation to move the reflex mirror 13b, which is located in the position to allow to retreat from the optical axis of the photographing optical system 12a, to the position to allow to bend the optical axis of the object light flux that has passed the photographing optical system 12a to direct it toward the observation optical system. This mirror-down operation allows the optical axis of the object light flux that has passed the photographing optical system 12a, to be bent by the reflex mirror 13b and reflected toward a pentaprism 13a which is disposed above the reflex mirror 13b.

Further, the shutter-charge control operation is a preparation operation for the next photographing operation, and is a control to control the shutter mechanism to turn it into a charge state.

Then, in the step S70, the CPU 41 executes an aperture control processing of the lens barrel 12. The aperture control processing to be executed here is a processing to operate the aperture blade, which is set to be a predetermined aperture value based on the calculation result in the step S58 described above, to set it in a full-open state, that is, an open state.

Next, in the step S71, the CPU 41 confirms whether or not the recording medium 43 is installed at a predetermined portion of the camera body 11 of the camera 1A via the recording medium interface 42. At this moment, if the CPU 41 confirms that the recording medium 43 is installed in the camera body 11, the process advances to the processing of the next step S72.

In the step S72, the CPU 41 executes a recording operation processing of image data. The recording operation processing of image data is a control operation to record the image data, which is acquired and generated by the image pickup operation processing in the above described step S67, and which is temporally recorded inside the work memory 16b, in the recording medium 43 through the recording medium interface 42.

On the other hand, in the step S71, if the CPU 41 confirms that the recording medium 43 is not installed in the camera body 11, the process advances to the processing of the step S73. Then, in the step S73, an alarm display processing indicating that the recording medium 43 is not installed is executed on the display screen of the LCD 46 connected, for example, via the display circuit 47. Thereafter, the process returns to the above described step S53 and repeats the processing that follows.

In the above described embodiment, as shown by the flowchart of FIG. 54, the timing for operating the excitation means (the execution timing of the excitation operation processing) is the time point (step S52 of FIG. 54) immediately after the system activation of the camera 1A and the time point (step S55 of FIG. 54) at which an accessory such as the lens barrel 12 is attached/detached to or from the camera body 11.

The operation timing of the excitation means will not be limited to the above described one, but may be as with a variant to be described next (the flowchart of FIG. 55). In the variant, in addition to at the operation timing of the above described step S52 and the step S55 of FIG. 54, at a predetermined time point (step S76 and step S77 of FIG. 55) before or after the image pickup operation processing, the excitation means is caused to operate.

That is, after the mirror-up control processing of the step S65 of FIG. 55, in the step S76, the CPU 41 turns the excitation operation in the direction perpendicular to the optical axis into On state. That is, the CPU 41 applies a predetermined voltage to the piezoelectric element 18D via the dust-proof filter driving portion 49A. This will result in that the piezoelectric element 18D causes the dust-proof filter 21 to vibrate in a predetermined direction, that is, the direction substantially perpendicular to the optical axis of the photographing optical system 12a. Thereafter, the process advances to the processing of the next step S66.

Further, after the shutter-close control processing of the step S68 of FIG. 55, in the step S77, the CPU 41 turns the excitation operation into Off state. That is, the CPU 41 stops applying a voltage to the piezoelectric element 18D via the dust-proof filter driving portion 49A. This will result in that the vibration of the dust-proof filter 21 in a predetermined direction caused by the piezoelectric element 18D is stopped. Thereafter, the process advances to the next step S69.

In the flowchart of FIG. 55, other processing steps are identical to those of the above described flowchart of FIG. 54.

Thus, in this example, it is arranged that the dust-proof filter 21 is caused to vibrate by the excitation means during the time period from the time point before the shutter-open control processing (step S66) to the time point after the shutter-close control processing (step S68). When the present camera 1A is in such condition, the shutter is turned into an open state and the outer surface of the dust-proof filter 21 is most extensively exposed to the outside. Therefore, the outer surface of the dust-proof filter 21 is most likely to be adhered by dusts etc.

Then, performing the control processing as shown in the flowchart of FIG. 55 can result in that the dust-proof filter 21 is caused to vibrate by the excitation means at a timing when the shutter mechanism is in an open state during an image pickup operation, thereby allowing to remove dusts etc.

In addition, since the dust-proof filter 21 is kept on vibrating during an image pickup operation, even when there exist dusts etc. which remain adhering to the surface of the dust-proof filter 21 without being removed, a microvibration is provided to the dust-proof filter 21 in the vicinity of the front face side of the photoelectric conversion surface of the image pickup device 27, and thereby a shadow caused by the adhering dusts etc. will not form a clear image on the photoelectric conversion surface. Therefore, even in a state in which dusts etc. on the surface of the dust-proof filter 21 have not been completely removed, it is ensured that a high quality image will be obtained without adversely affecting the image to be obtained.

As so far described, according to the above described third embodiment, the image pickup unit 15A is configured such that one end of the piezoelectric element 18D is fixedly disposed to the outer periphery edge part of the dust-proof filter 21 via the holder member 18a, and the inertial body 18d which is an inertial mass member is attached to the other end of the piezoelectric element 18D. And arrangement is made such that the CPU 41 controls the applied voltage to the piezoelectric element 18D to drive the piezoelectric element 18D utilizing the inertia of the inertial body 18d such that the velocity of the vibration to be provided to the dust-proof filter 21 will vary between during extension and during contraction of the piezoelectric element 18D, allowing that the dust-proof filter 21 is caused to vibrate in a predetermined direction, that is, a direction along the face of the transmission portion 21c of the dust-proof member (dust-proof filter 21) by providing only one piezoelectric element 18D.

This makes it possible to effectively remove minute dusts etc. adhering onto the surface of the dust-proof filter 21 by use of a fewer components and a simpler mechanism, and also to realize a reduction of the number of parts thereby contributing to the reduction of production cost of the image pickup unit 15A and the image pickup apparatus (camera 1A) to which the image pickup unit 15A is applied.

Next, an image pickup apparatus (a camera) will be described below as a fourth embodiment of the present invention.

The fourth embodiment of the present invention is made up of substantially same configurations as those of the above described third embodiment of the present invention, and only slightly differs in the attachment means of the piezoelectric element 18D, which is an excitation member. Therefore, the configurations similar to those of the above described third embodiment will be omitted from illustration and detailed description, and only the different parts will be described below.

Figure 56:
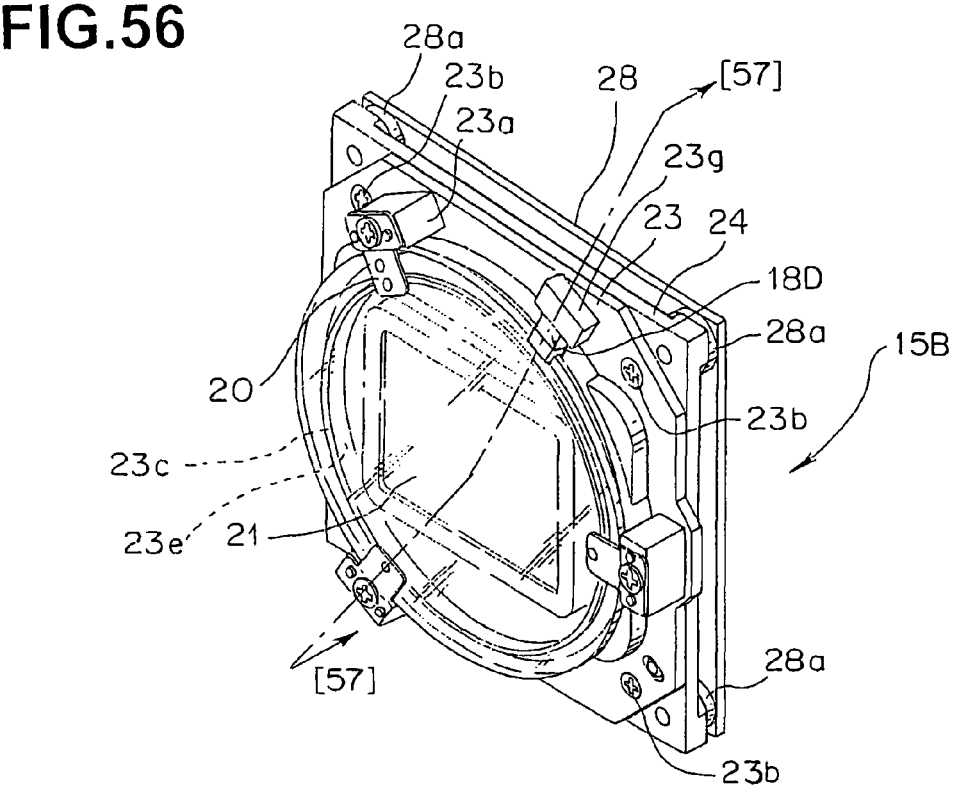
FIG. 56 is a perspective view to show a part taken from the image pickup unit of the image pickup apparatus (the camera) according to a fourth embodiment of the present invention.
Figure 57:
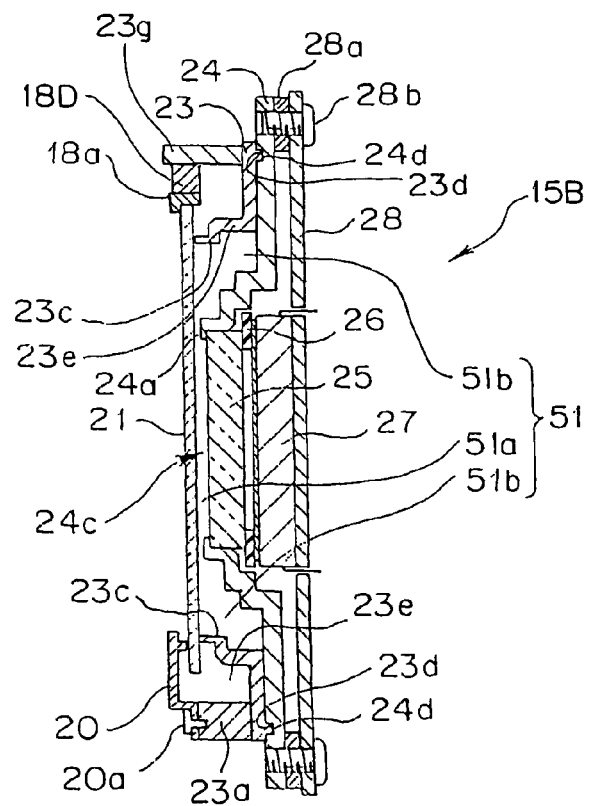
FIG. 57 is a sectional view taken along the line [57]-[57] in FIG. 56.

FIGS. 56 and 57 show a part taken from the image pickup unit of the image pickup apparatus according to the fourth embodiment, in which FIG. 56 is a perspective view to show the image pickup unit in an assembled state; and FIG. 57 is a sectional view taken along the line [57]-[57] in FIG. 56. FIGS. 56 and 57 correspond to FIGS. 46 and 47 in the above described third embodiment. Therefore, like symbols are used to designate like configurations as those of the above described third embodiment and detailed description thereof is omitted.

It is substantially same as in the above described third embodiment that there are formed, as shown in FIGS. 56 and 57, in the vicinity of the outer peripheral edge part of a wall part 23e on the front face side of a dust-proof filter receiving member 23 of an image pickup unit 15B in the image pickup apparatus of the present embodiment, a plurality of protruding parts 23a so as to protrude to the front face side for holding a pressing member 20. In the present embodiment, in addition to those, a further protruding part 23a having substantially the same shape is disposed at a predetermined position in the same arrangement.

The protruding part 23g is a portion to be formed to securely hold the piezoelectric element 18D which is an excitation member for providing a vibration in a predetermined direction to the dust-proof filter 21.

As shown in FIGS. 56 and 57, one end of the piezoelectric element 18D is fixedly disposed at the outer peripheral edge part of the dust-proof filter 21 via a holder member 18a as in the above described third embodiment. The holder member 18a and the outer peripheral end face of the dust-proof filter 21 are adhesively fixed together by means of for example an adhesive etc. Further, the other end of the piezoelectric element 18D is adhesively fixed to a predetermined position in the inner face of a protruding part 23g of the above described dust-proof filter receiving member 23 by means of for example an adhesive etc. The other configurations are identical to those of the above described third embodiment.

The actions, in the thus-configured image pickup apparatus of the present embodiment, of the dust-proof filter 21 and the piezoelectric element 18D out of the image pickup unit 15B will be described below with reference to FIGS. 58 to 64.

FIG. 58 is a layout drawing as viewed from the front of the dust-proof member (dust-proof filter) and the excitation member (piezoelectric element) in the image pickup apparatus of the present embodiment. FIGS. 59A, 59B, and 59C and FIGS. 60A, 60B, and 60C are conceptual diagrams as viewed from the side of the dust-proof member (dust-proof filter) and the excitation member (piezoelectric element) of FIG. 58, respectively showing the detailed course of action when the dust-proof member (dust-proof filter) moves in a predetermined direction as the excitation member (piezoelectric element) extends/contracts. FIGS. 59A, 59B, and 59C and FIGS. 60A, 60B, and 60C are side views as viewed from the direction indicated by arrow [59] in FIG. 58.

Figure 61:
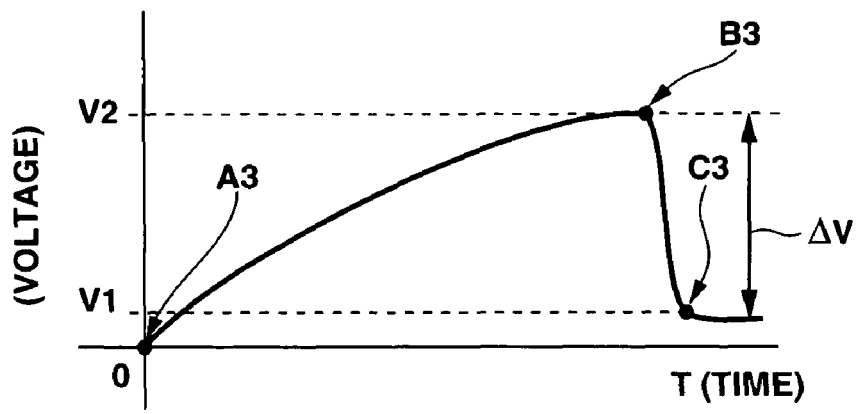
FIG. 61 illustrates the pulse waveform when performing the driving control in FIG. 59A, FIG. 59B, and FIG. 59C showing the state change of the applied voltage to be applied to drive the excitation member (piezoelectric element) of FIG. 58 to be extended/contracted.
Figure 62:
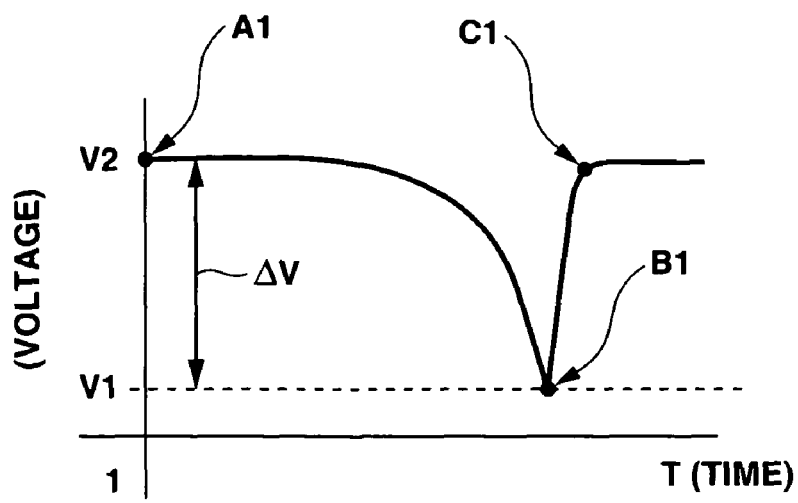
FIG. 62 illustrates the pulse waveform when performing the driving control in FIG. 60A, FIG. 60B, and FIG. 60C showing the pulse waveform due to the state change of the applied voltage to be applied to drive the excitation member (piezoelectric element) of FIG. 58 to be extended/contracted.

Further, FIGS. 59A, 59B, and 59C and FIGS. 60A, 60B, and 60C respectively show the difference in the operation caused by the application of a different form of applied voltage. The state changes of respective applied voltages for realizing the operations shown in FIGS. 59A, 59B, and 59C and FIGS. 60A, 60B, and 60C are shown in FIGS. 61 and 62 respectively. Out of these, FIG. 61 corresponds to respective states shown in FIGS. 59A, 59B, and 59C. FIG. 62 shows the state change of a different form of applied voltage from that of FIG. 61 and corresponds to respective states in FIGS. 60A, 60B, and 60C.

First, the action when the applied voltage shown in FIG. 61 is applied to the dust-proof filter 21 and the piezoelectric element 18 of the image pickup unit 15B in the image pickup apparatus of the present embodiment shown in FIG. 58; that is, the action when an extensional vibration of the piezoelectric element 18D is transferred to the dust-proof filter 21 causing the dust-proof filter 21 to vibrate in a predetermined direction, and thereby minute dusts etc. adhering to the exposure surface on the front face side of the dust-proof filter 21 are removed, will be described primarily based on FIGS. 59A, 59B, and 59C.

First, suppose that a plus (+) or minus (−) voltage is applied to the piezoelectric element 18D via a dust-proof filter driving portion 49A by the control of the CPU 41 when the dust-proof filter 21 and the piezoelectric element 18D are in a no-load state shown in FIG. 58 and FIGS. 59A, 59B, and 59C. Then, the piezoelectric element 18D extends/contracts in the direction of arrow T shown in FIG. 58.

In this occasion, the extension/contraction direction of the piezoelectric element 18D is set to be a direction along the face of a transmission portion 21c of the dust-proof filter 21, and is a direction substantially perpendicular to the optical axis of a photographing optical system 12a.

First, in the no-load state shown in FIG. 59A, the piezoelectric element 18D is not applied with an applied voltage (see symbol A3 in FIG. 61). From this state to the state shown in FIG. 59B, the dust-proof filter driving portion 49A gradually applies a plus (+) applied voltage to the piezoelectric element 18D through the control by the CPU 41.

This will result in that the applied voltage applied to the piezoelectric element 18D changes in a gentle curve into the state shown in FIG. 59B. The applied voltage at this moment is in a state in which a plus (+) voltage V2 is applied as indicated by symbol B3 in FIG. 61.

Now suppose that an extension operation of the piezoelectric element 18D in the direction of arrow T1 in FIG. 59B will cause the piezoelectric element 18D to extend by the distance indicated by symbol D5 in FIG. 59B. This will involve that the dust-proof filter 21 gradually moves in the same direction by the distance indicated by symbol S3 in FIG. 59B. Concurrently, dust G adhering to the surface of the dust-proof filter 21 also moves in the same direction by substantially the same distance (the distance indicated by symbol S4 in the same figure).

Then, when coming into the state of FIG. 59B, that is, when the applied voltage to the piezoelectric element 18D reached a predetermined voltage value V2 coming into the state of symbol B3 shown in FIG. 61, the CPU 41 performs the control to rapidly reduce the applied voltage to the piezoelectric element 18D via the dust-proof filter driving portion 49A.

That is, at this moment, the applied voltage is reduced in a steep curve from an applied voltage V2 at the time point of symbol B3 shown in FIG. 61 until reaching an applied voltage V1 at the time point of symbol C3 in the same figure.

This will cause the piezoelectric element 18D to contract with a large acceleration to the direction of arrow T2 shown in FIG. 59C by the amount indicated by symbol D6 in the same figure. This will cause the dust-proof filter 21 to move in the direction of symbol T2 shown in FIG. 59C by the amount indicated by symbol S5 in the same figure.

Now suppose that at this time, minute dust as indicated by symbol G in FIGS. 59A, 59B, and 59C adheres onto the surface (exposure surface on the front face side) of the dust-proof filter 21. In this case, since the dust-proof filter 21 moves slowly when a shift occurs from the state of FIG. 59A to the state of FIG. 59B, the dust G moves in the same direction by the same distance while remaining to adhere to the dust-proof filter 21.

Next, since the dust-proof filter 21 rapidly moves in the direction of arrow T2 when a shift occurs from the state of FIG. 59B to the state of FIG. 59C, the dust G located on the surface of the dust-proof filter 21 will be separated therefrom, and thereafter will fall down, for example, again onto the surface of the dust-proof filter 21. At this moment, since the dust-proof filter 21 itself has moved by the amount indicated by symbol S5 of FIG. 59C in the direction of arrow T2 in the same figure as described above, the dust G will move relatively by substantially the same distance (the distance indicated by symbol S6) in the direction closer to the outer peripheral edge part.

Thus, if the dust-proof filter 21 is caused to continuously vibrate in a predetermined direction (direction along the face of the transmission portion 21c of the dust-proof filter 21) by performing a control of the applied voltage to the piezoelectric element 18D by a pulse waveform of applied voltage in a form as shown in FIG. 61, the minute dust G on the dust-proof filter 21 will gradually move toward the outer peripheral edge part.

Next, description will be made on the action when dust is caused to move in the opposite direction to that in the case of performing the control shown in the above described FIG. 61, by performing a control by a pulse waveform of applied voltage in a form as shown in FIG. 62.

Figure 60A:
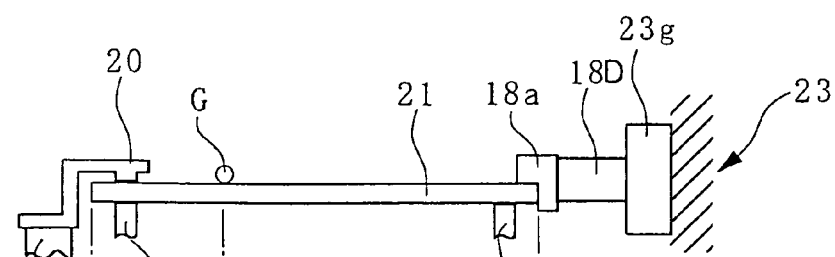
FIG. 60A is a conceptual side view to illustrate the action of the dust-proof member (dust-proof filter) and the excitation member (piezoelectric element) of FIG. 58 showing the state in which the excitation member is extended to a predetermined state.

First, the state shown in FIG. 60A shows a state in which the piezoelectric element 18D has extended into a predetermined state. That is, an applied voltage V2 has been applied to the piezoelectric element 18D via the dust-proof filter driving portion 49A (see FIG. 44) through the control by the CPU 41, and thereby the piezoelectric element 18D has been extended by a predetermined amount. The applied voltage at this moment is a state in which an applied voltage V2 is applied as indicated by symbol A1 in FIG. 64.

Figure 60B:
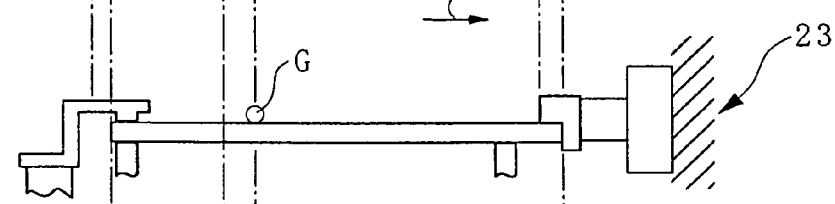
FIG. 60B is a conceptual side view to illustrate the action of the dust-proof member (dust-proof filter) and the excitation member (piezoelectric element) of FIG. 58 showing the state in which the excitation member is contracted from the state of FIG. 60A.

The piezoelectric element 18D is gradually contracted from this state toward the state shown in FIG. 60B. For purposes of achieving this, the applied voltage to be applied to the piezoelectric element 18D is reduced in a gentle curve from the applied voltage V2 at the time point of symbol A1 shown in FIG. 64 until reaching the applied voltage V1 at the time point of symbol B1 in the same figure.

Then the piezoelectric element 18D gradually contracts in the direction of arrow T2 of FIG. 60B by the amount indicated by symbol D7 of the same figure. This will cause the dust-proof filter 21 to move in the same direction by the distance indicated by symbol S7 of the same figure.

Figure 64:
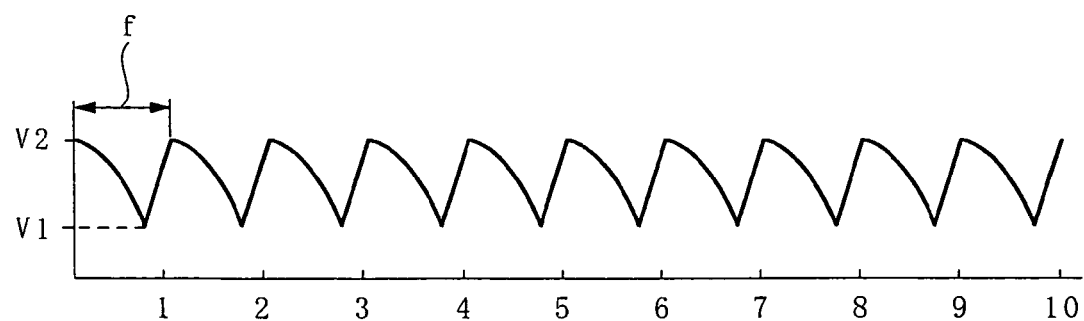
FIG. 64 shows another example of the waveform of the applied voltage to be applied when consecutively driving the excitation member (piezoelectric element) of FIG. 58.

Next, when coming into the state of FIG. 60B, that is, when the applied voltage to the piezoelectric element 18D becomes a predetermined voltage V1 coming into the state indicated by symbol B13 shown in FIG. 64, the CPU 41 rapidly applies an applied voltage to the piezoelectric element 18D via the dust-proof filter driving portion 49A. That is, at this moment, the applied voltage is boosted in a steep curve from the applied voltage V1 at the time point of symbol B1 shown in FIG. 64 until reaching the applied voltage V2 at the time point of symbol C1 in the same figure.

Figure 60C:
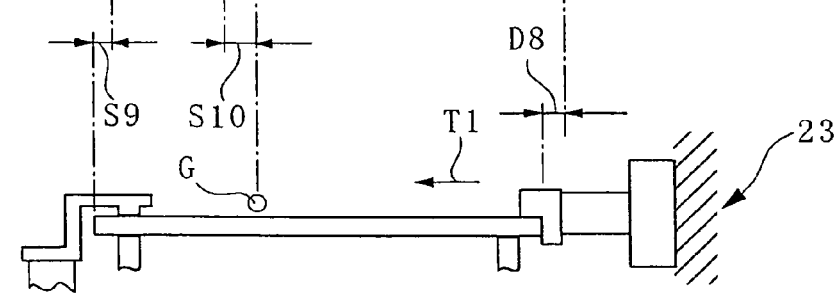
FIG. 60C is a conceptual side view to illustrate the action of the dust-proof member (dust-proof filter) and the excitation member (piezoelectric element) of FIG. 58 showing the state in which the excitation member is extended from the state of FIG. 60B.

This will cause the piezoelectric element 18D to extend with a large acceleration toward the direction of arrow T1 shown in FIG. 60C by the amount indicated by symbol D8 in the same figure. This will cause the dust-proof filter 21 to move toward the direction of arrow T1 shown in FIG. 60C by the amount indicated by symbol S9 in the same figure.

Now suppose that at this moment, minute dust adheres onto the surface of the dust-proof filter 21 as indicated by symbol G in FIGS. 60A, 60B, and 60C. In this case, when a shift from the state of FIG. 60A to the state of FIG. 60B takes place, the dust-proof filter 21 moves by the distance indicated by symbol S7 of FIG. 60B in the direction of arrow T2 of the same figure and concurrently the dust G moves in the same direction by the distance indicated by symbol S8 of the same figure.

Next, when a shift from the state of FIG. 60B to the state of FIG. 60C takes place, the dust-proof filter 21 rapidly moves to the direction of arrow T1, and therefore the dust G located on the surface thereof departs from the surface of the dust-proof filter 21 and thereafter will fall down again for example onto the surface of the dust-proof filter 21. At this time, since the dust-proof filter 21 itself has moved by the amount indicated by symbol S9 of FIG. 60C in the direction of arrow T1 in the same figure, the dust G will result in moving relatively by substantially the same distance (distance indicated by symbol S10) in the direction of arrow T2 in the same figure.

In this way, if the dust-proof filter 21 is caused to continuously vibrate in a predetermined direction (direction along the face of the transmission portion 21c of the dust-proof filter 21) by performing a control of the applied voltage to the piezoelectric element 18D by a pulse waveform of applied voltage in a form as shown in FIG. 62, the minute dust G on the dust-proof filter 21 will gradually move toward the outer peripheral edge part.

Figure 63:
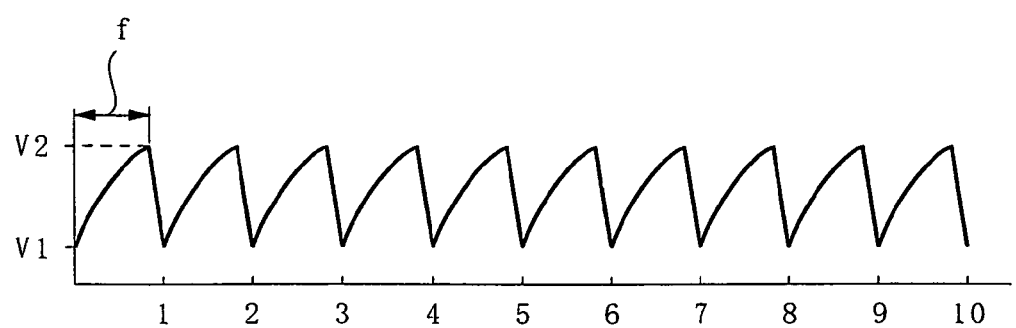
FIG. 63 shows an example of the waveform of the applied voltage to be applied when consecutively driving the excitation member (piezoelectric element) of FIG. 58.

Thus, FIGS. 63 and 64 show examples of the pulse waveform of the applied voltage to be applied when successively driving the excitation member (piezoelectric element). Out of these, FIG. 63 shows the pulse waveform of the applied voltage in the case of a successive driving in which the control of the applied voltage shown in FIG. 61 is successively performed. FIG. 64 shows the pulse waveform of the applied voltage in the case of a successive driving in which the control of the applied voltage shown in FIG. 62 is successively performed. Further, the examples shown in FIGS. 63 and 64 respectively show a pulse waveform when 10 successive driving is performed. The number of successive driving in such occasion, that is the number of waveforms, may be arbitrarily set taking into consideration the moving distance of dusts etc. on the dust-proof filter 21, and the like.

The symbol 'f' shown in FIGS. 63 and 64 represent frequency. The change of the frequency component (frequency f) can result in the change of the period of vibration. Therefore, the moving speed of the dust-proof filter 21 can be arbitrarily changed.

Further, setting the frequency component (frequency f) to be substantially the same as the resonance frequency of the vibration system including the dust-proof filter 21, allows to more effectively drive the dust-proof filter 21 to move.

Further by performing in combination the control of the applied voltage shown in FIG. 63 and the control of the applied voltage shown in FIG. 64 can result in that the dust-proof filter 21 is moved alternately in the directions of symbol T1 and symbol T2 shown in FIGS. 61 and 62 thereby generating continuous vibration, and therefore it is possible to more securely separate and remove the dust G adhering onto the outer surface of the dust-proof filter 21.

As so far described, according to the fourth embodiment, it is possible to achieve similar effects to those of the third embodiment.

Next, a fifth embodiment of the present invention will be described below. In the present embodiment, as the optical apparatus to which the present invention is applied, a projection image display apparatus, specifically a three-panel projector apparatus having three transmission liquid crystal display panels (image display elements) as an image forming body including an image forming element will be illustrated. Therefore, in the fifth embodiment described below, the optical apparatus is referred to as a projection image display apparatus (hereinafter, simply referred to as a "projector apparatus").

Figure 65:
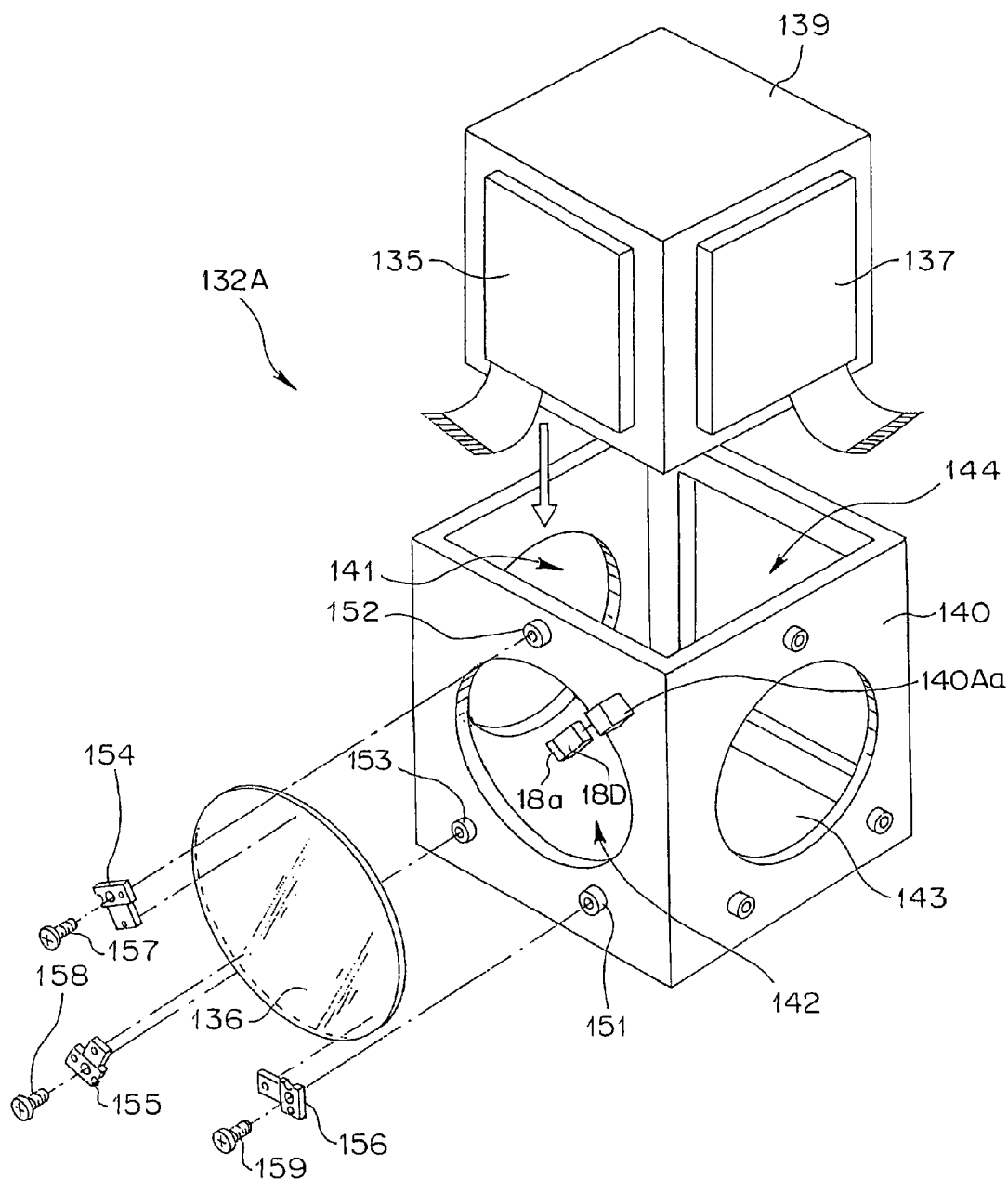
FIG. 65 is an exploded perspective view of a prism unit of the projection image display apparatus (projector apparatus) as an optical apparatus according to a fifth embodiment of the present invention.
Figure 66:
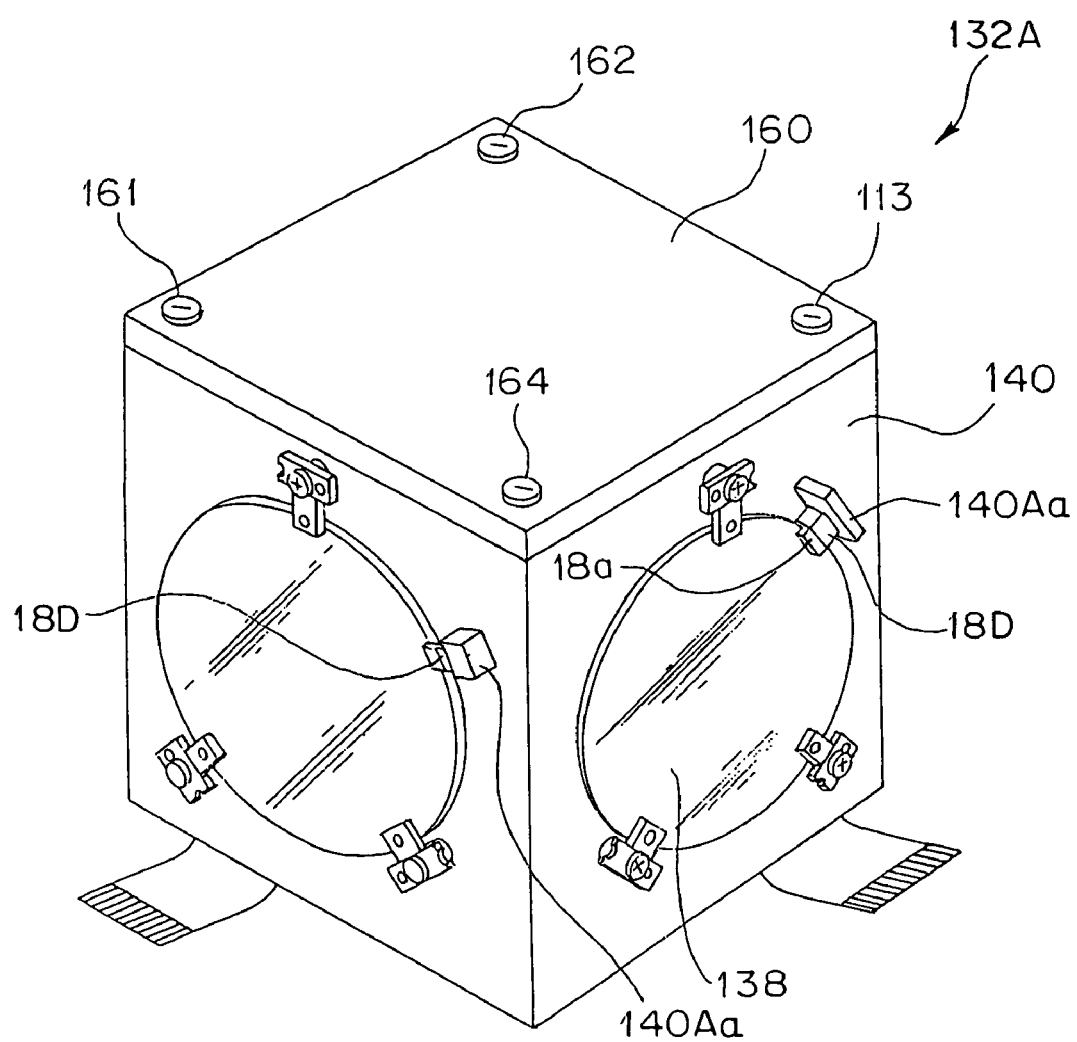
FIG. 66 is an outside perspective view to show the prism unit of FIG. 65 in an assembled state.

FIG. 65 is an exploded perspective view of a prism unit of the projection image display apparatus (projector apparatus) as an optical apparatus according to the fifth embodiment of the present invention. FIG. 66 is an outside perspective view to show the prism unit of the projection image display apparatus (projector apparatus) according to the present embodiment in an assembled state.

The fifth embodiment is basically made up of substantially same configurations as those of the above described second embodiment, and only slightly differs in the configuration of the prism unit. Therefore, the configurations similar to those of the above described second embodiment will be omitted from description, and only different configurations will be described in detail. It is noted that as to the drawings, reference will also be made to FIGS. 39 and 40 which were used in the above described second embodiment.

The projector apparatus of the present embodiment is primarily made up of a extra-high pressure mercury lamp 111, a reflector 112, a relay lens 113, a first lens array 114, a second lens array 115, a polarization conversion element 116, a superposed lens 117, total reflection mirrors (118, 120, 123, and 128), dichroic mirrors (119 and 121), relay lenses (122, 125, 129, 130, and 131), transmission liquid crystal display panels (133, 135, and 137), dust-proof filters (134, 136, and 138), a dichroic prism 139, a projection lens 101, and the like.

The dichroic prism 139, the three liquid crystal display panels (133, 135, and 137), the dust-proof filters (134, 136, and 138), and the like are integrally formed into one body as a single prism unit 132A. Thus, basic configurations are similar to those of the above described second embodiment (see FIG. 40).

Next, the configuration of the prism unit 132A in the projector apparatus of the present embodiment will be described in detail below on the portions different from those of the above described second embodiment, with reference to FIGS. 65 and 66.

Each face of the dichroic prism 139 is fixedly attached with three liquid crystal display panels (133, 135, and 137) as shown in FIG. 65 (the liquid crystal display panel 133 is not shown in FIG. 65).

The dichroic prism 139 with the liquid crystal display panels (133, 135, and 137) being fixedly attached thereto is arranged to be installed into a prism frame 140, which is a frame member, from an upper opening thereof.

The prism frame 140 is formed with circular openings (141, 142, and 143) at positions so as to be respectively faced with the three liquid crystal display panels (133, 135, and 137) fixedly attached to the dichroic prism 139. Moreover, the prism frame 140 is formed with a rectangular opening 144 at a position so as to be faced with the emitting face of the dichroic prism 139.

Further, the prism frame 140 is attached on the outer surface thereof with the dust-proof filters (134, 136, and 138) so as to cover the circular openings (141, 142, and 143). That is, the arrangement is such that the dust-proof filters (134, 136, and 138) are disposed respectively in the vicinity of each liquid crystal display panel (133, 135, 137) with a predetermined spacing with respect to the display surface thereof.

It is noted that in FIG. 65, for purposes of simplifying the drawing, only the structure for attaching the dust-proof filter 136 to the circular opening 142 will be illustrated, and description will be made only on the configuration of this portion. Therefore, other portions, that is, the structures for attaching the dust-proof filter 134 to the circular opening 141 and for attaching the dust-proof filter 138 to the circular opening 143 will be omitted from illustration and description thereof since they are identical.

Receiving parts (151, 152, and 153) protruding to the outer face side are formed in the peripheral edge part of the circular opening 142 of the prism frame 140. The receiving parts (151, 152, and 153) are portions which are formed to fixedly dispose pressing members (154, 155, and 156) for holding the dust-proof filter 136. Each pressing member (154, 155, 156) is fixedly disposed by fastening means such as screws (157, 158, and 159).

The dust-proof filter 136 is directly abutted and is held by the pressing members (154, 155, and 156) so as to be airtightly and vibratably joined with the prism frame 140.

An inertial body 140Aa which is an inertial mass member protruding to the outer face side is formed at a predetermined portion of the peripheral edge part of the circular opening 142 of the prism frame 140. There is fixedly disposed onto the inertial body 140Aa, a piezoelectric element 18D, which is the excitation member that comes into contact with the outer peripheral end face of the dust-proof filter 136 and extends/contracts the dust-proof filter 136 in a predetermined direction, that is, a direction along the face of the transmission portion of the dust-proof filter 136 thereby providing a vibration in the direction along the face of the transmission portion to the dust-proof filter 136.

It is noted that the structures of the excitation member (piezoelectric element 18D) and the dust-proof member (dust-proof filter 136) are identical to those of the excitation member (piezoelectric element 18D) and the dust-proof member (dust-proof filter 21) in the camera 1A shown in the above described third embodiment. Therefore, detailed description thereof will be omitted. Moreover, other configurations are substantially same as those of the above described second embodiment.

The action of the thus-configured projector apparatus of the present embodiment is also substantially same as that of the above described second embodiment, and for the excitation control of the dust-proof filters (134, 136, and 138) in the present embodiment, the means described in the camera 1A in the above described third embodiment can be applied without any changes. Therefore, detailed description on the action will be omitted. However, the timings for performing the excitation operation are different from those in the camera 1A of the above described third embodiment.

That is, in the case of a typical projector apparatus, a cooling fan is generally provided thereinside to cool the light source lamp. Therefore, dusts etc. are always suspended in the air inside the projector apparatus.

Therefore, the timing of the excitation control operation when applying the present invention to a projector apparatus may be arranged such that the dust-proof filter is caused to vibrate periodically during image display or at a predetermined timing such as the time point of switching image display.

This will allow to effectively shake off dusts etc. adhering to the dust-proof filter as with the above described second embodiment, thereby making it possible to always perform satisfactory image display without the risk that dusts etc. are enlarged and displayed in the image on the screen projected and displayed by the projector apparatus concerned.

As so far described, according to the first and the fifth embodiments, it is possible to provide an optical apparatus such as an image pickup apparatus equipped with an image pickup unit including an image pickup device, and a projection image display apparatus which enlarges and projects an optical image formed by an image forming element, in which the optical apparatus allows to securely remove even minute dusts etc. by means of a simple configuration so that image data for consistently representing a high quality image can be obtained or a high quality image can be projected.

Next, a sixth embodiment of the present invention will be described below. In the present embodiment, as an optical apparatus to which the present invention is applied, an image pickup apparatus, specifically a single lens reflex digital camera with interchangeable lenses will be illustrated.

Figure 67:
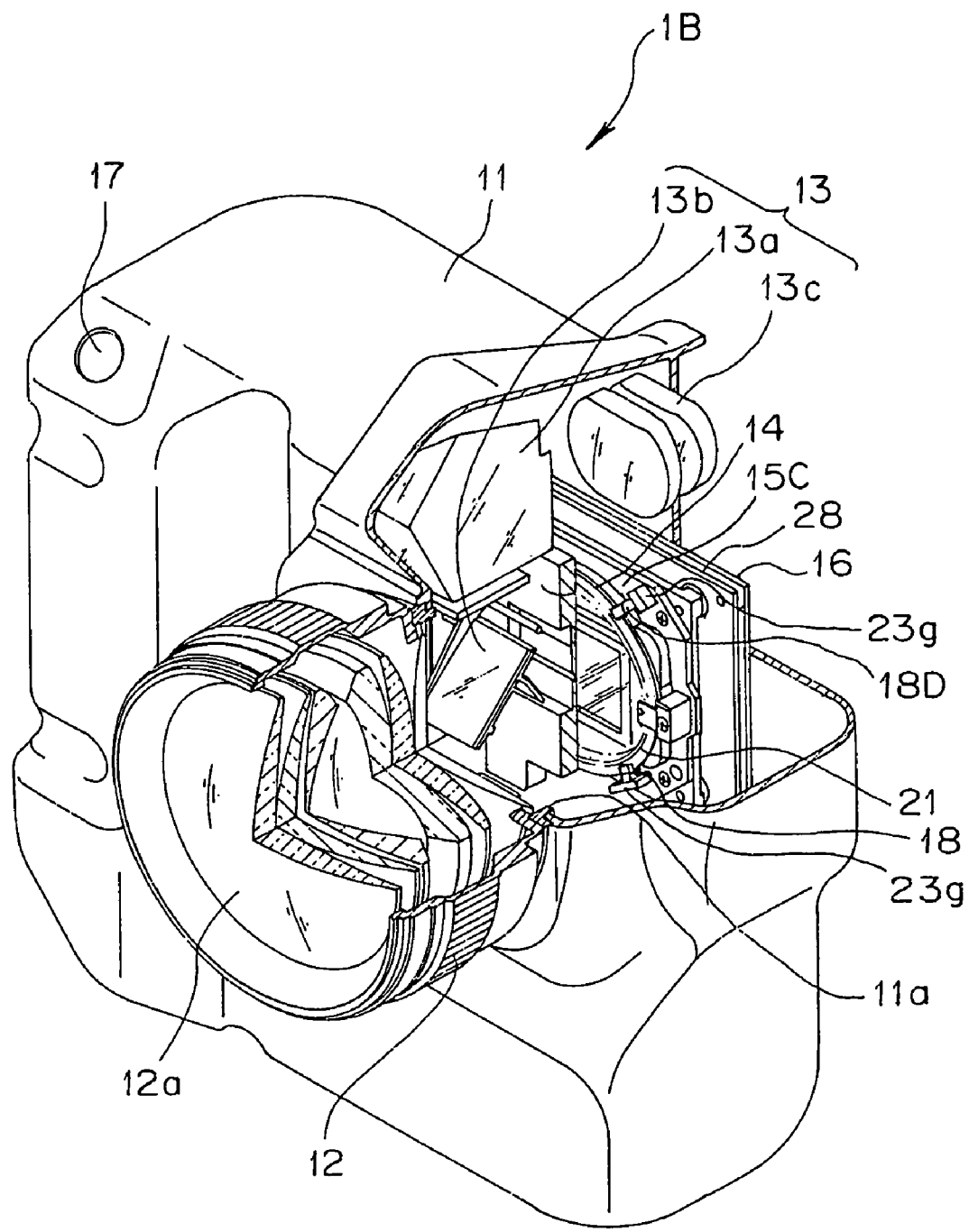
FIG. 67 is a partially cutaway perspective view to schematically show the internal configuration of an image pickup apparatus (a camera) of a sixth embodiment of the present invention.
Figure 68:
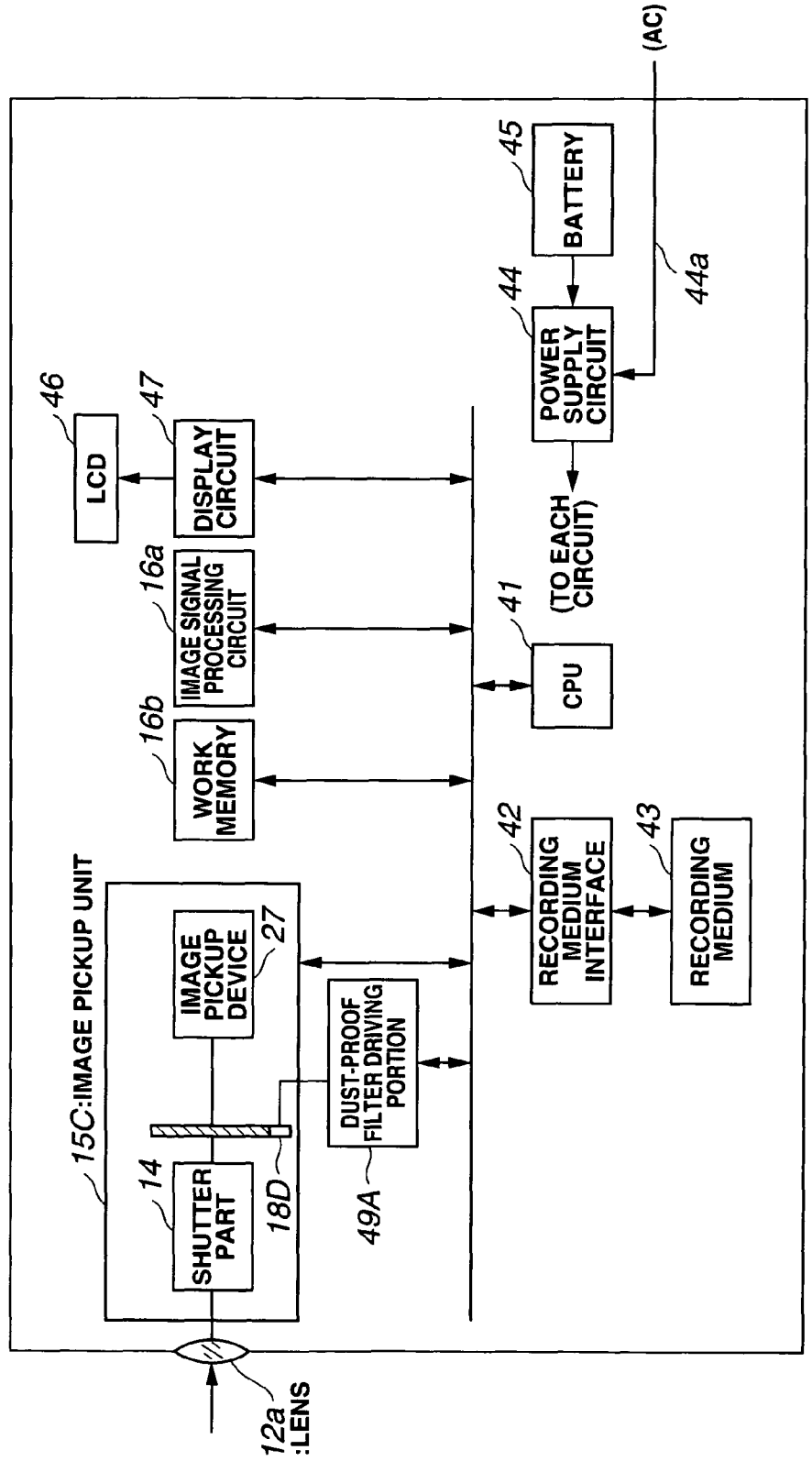
FIG. 68 is a schematic block diagram to primarily show the electric configuration of the image pickup apparatus of FIG. 67.

FIGS. 67 and 68 schematically show the configuration of the image pickup apparatus (camera) of the sixth embodiment of the present invention, in which FIG. 67 is a partially cutaway perspective view to schematically show the internal configuration of the image pickup apparatus (camera); and FIG. 68 is a schematic block diagram to primarily show the electric configuration of the image pickup apparatus (camera) of FIG. 67.

Figure 69:
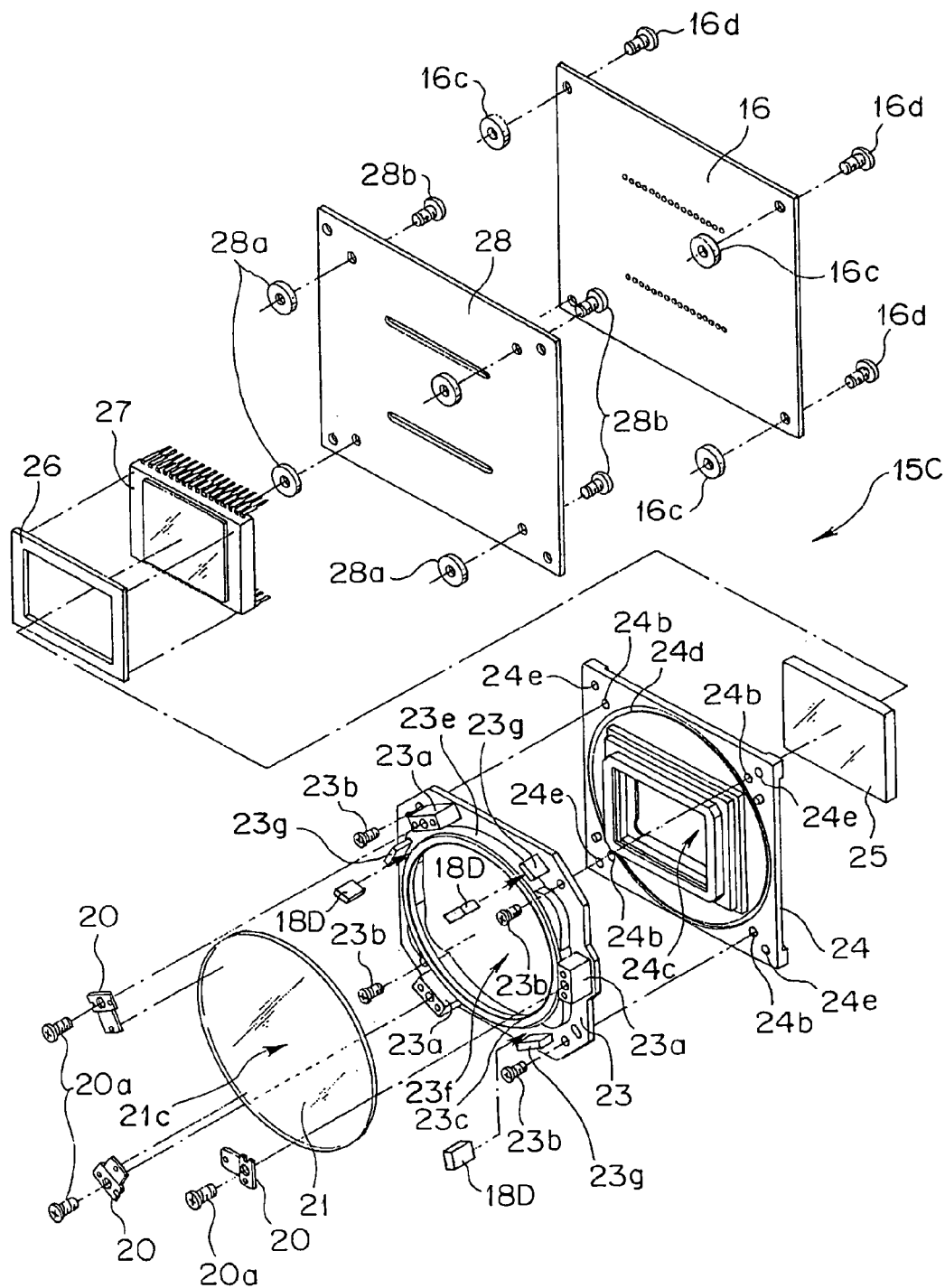
FIG. 69 is a principal part exploded perspective view to exclusively show part of the image pickup unit in the image pickup apparatus of FIG. 67.
Figure 70:
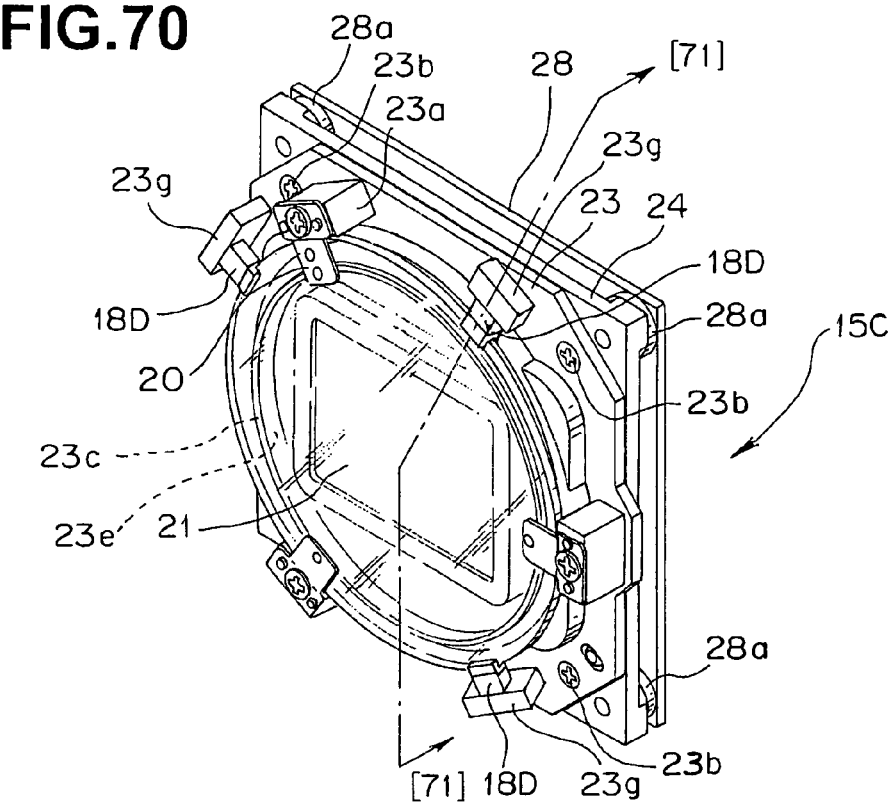
FIG. 70 is perspective view to show the image pickup unit of the image pickup apparatus of FIG. 67 in an assembled state.
Figure 71:
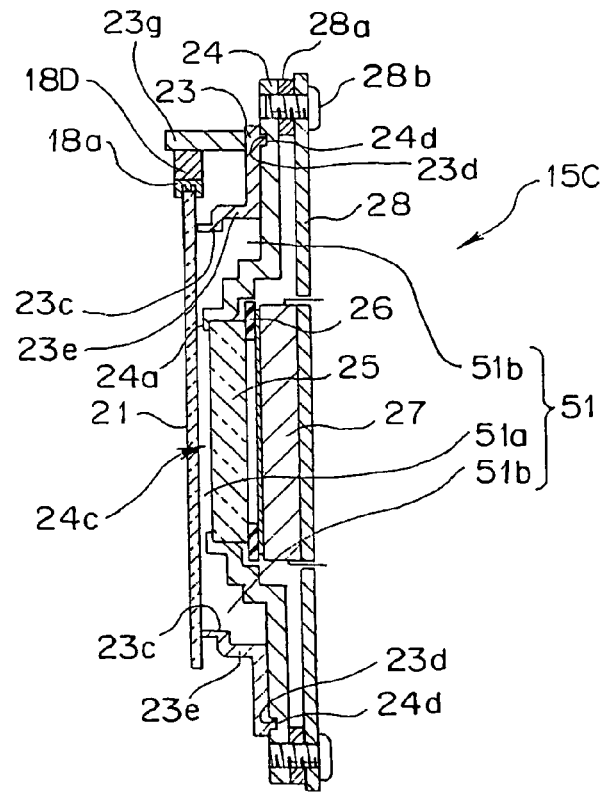
FIG. 71 a sectional view taken along the line [71]-[71] of FIG. 70.

FIGS. 69, 70, and 71 are partially cutaway views of the image pickup unit of the image pickup apparatus according to the present embodiment; in which FIG. 69 is a principal part exploded perspective view to exclusively show part of the image pickup unit; FIG. 70 is a perspective view to show the image pickup unit in an assembled state; and FIG. 71 is a sectional view taken along the line [71]-[71] in FIG. 70.

It is noted that the configuration of the present embodiment is basically similar to those of the above described first and third embodiments, and only slightly differs in the configuration of the image pickup unit. Therefore, description on the similar configuration to that of the above described first and third embodiments will be omitted and only different configuration will be described in detail below.

The electric configuration of the camera 1B of the present embodiment is, as shown in FIG. 68, principally configured to include, as with the excitation means (see FIG. 44) in the above described third embodiment, a stacked piezoelectric element 18D which is disposed in the vicinity of the dust-proof filter 21 and which is an electric circuit for generating a vibration in a predetermined direction of the dust-proof filter included in the image pickup unit 15C, a dust-proof filter driving portion 49A for performing the driving control of the piezoelectric element 18D, and the like, in addition to components similar to those of the camera 1 of the above described first embodiment, such as a CPU 41, an image signal processing circuit 16a, a work memory 16b, a recording medium 43, a recording medium interface 42, a display part 46, a display circuit 47, a battery 45, a connection cable 44a, a power supply circuit 44 etc.

Next, detailed configuration of the image pickup unit 15C in the camera 1B of the present embodiment will be described below.

The image pickup unit 15C in the camera 1B of the present embodiment is principally configured, as shown in FIGS. 67 to 71, to include similar components to those of the image pickup unit 15A of the camera 1A of the above described third embodiment, such as an image pickup device 27, an image pickup device fixing plate 28, an optical low pass filter (optical LPF) 25, a low pas filter receiving member 26, an image pickup device container case member 24 (CCD case 24), a dust-proof filter receiving member 23, a dust-proof filter 21, a pressing member 20, a stacked piezoelectric element 18D which is an excitation member, and the like.

Further, as with the above described third embodiment, in the present embodiment as well, the excitation means is made up of a piezoelectric element 18D which is an excitation member, a dust-proof filter driving portion 49A (see FIG. 68) which is an electric circuit for performing the driving control of the piezoelectric element 18D through a control by the CPU 41 to cause the dust-proof filter 21 to vibrate in a predetermined direction, and the like.

Further, in the present embodiment, the dust-proof filter driving portion 49A is configured to perform the driving control of the piezoelectric element 18D through the control by the CPU 41 to cause the piezoelectric element 18D to perform an extension/contraction operation in a predetermined direction, so that the dust-proof filter 21 can generate a vibration in a first direction which is a direction along the face of the transmission portion 21c of the dust-proof filter 21 (a direction substantially perpendicular to the direction of the optical axis of the photographing optical system 12a), and a vibration in a second direction which is substantially perpendicular to the first direction.

Meanwhile, on the front face side of the dust-proof filter receiving member 23, a plurality of (three in the present embodiment) protruding parts 23a and 23g are formed so as to protrude to the front face side at predetermined positions in the vicinity of the outer peripheral edge part of the wall part 23e. The three protruding parts 23a are respectively disposed at an angular spacing of about 120 degrees with respect to the circumference of the dust-proof filter 21. Further, the three protruding parts 23g are also disposed at an angular spacing of about 120 degrees respectively at positions different from those of the above described protruding parts 23a. In this point, configuration is similar to that of the above described first embodiment.

The protruding part 23a is a portion which is formed to fixedly mount the pressing member 20 for holding the dust-proof filter 21. The pressing member 20 is fixedly mounted to the distal end of the protruding part 23a with a screw 20a, which is fastening means.

The pressing member 20 is, as described above, a member formed of an elastic body such as a leaf spring, and the proximal end portion thereof is fixedly mounted to the distal end portion of the protruding part 23a and a free end part thereof comes into abutment with the outer peripheral edge part of the dust-proof filter 21, thereby pressing the dust-proof filter 21 in the direction to the dust-proof filter receiving member 23 side, that is, the direction of the optical axis of the photographing optical system 12a to hold the dust-proof filter 21.

At this moment, it is arranged such that a predetermined portion on the rear face side of the dust-proof filter 21 abuts against the receiving part 23c. This will result in that the position of the dust-proof filter 21 in the optical axis direction of the photographing optical system 12a is restricted. This will also result in that the dust-proof filter 21 is held so as to be airtightly joined to the dust-proof filter receiving member 23.

In other words, it is configured such that the dust-proof filter receiving member 23 airtightly joins the dust-proof filter 21 with the elastic force caused by the pressing member 20.

It is noted that, in this case, the pressing force by the pressing member 20 is set to be a level of force that allows to secure a satisfactory airtightness between the dust-proof filter 21 and the receiving part 23c of the dust-proof filter receiving member 23, and will not inhibit the vibration of the dust-proof filter 21 in a first direction (a direction along the face of the transmission portion 21C of the dust-proof filter 21) caused by the piezoelectric element 18D.

Further, the protruding part 23g is a portion to be formed to fixedly hold the piezoelectric element 18D which is an excitation member for providing a vibration in a predetermined direction to the dust-proof filter 21.

Figure 72:
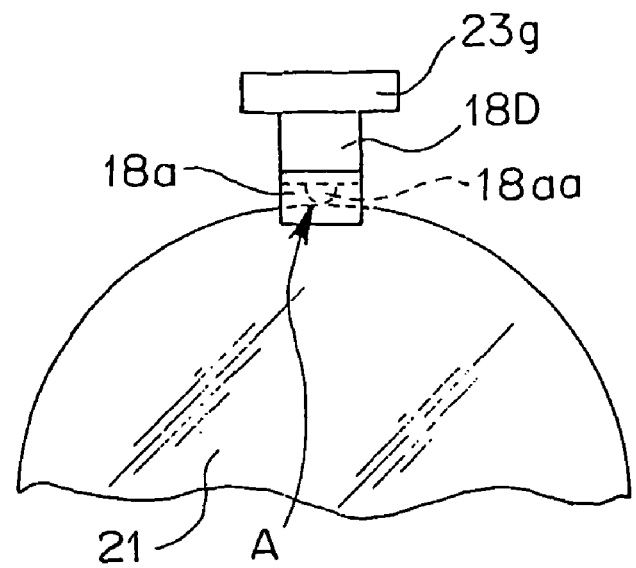
FIG. 72 is a principal part enlarged view to conceptually show part of the image pickup unit (the vicinity of the contacting portion of an excitation member with a dust-proof member) of the image pickup apparatus in FIG. 67.

FIG. 72 is a principal part enlarged view to conceptually show an enlarged part of the image pickup unit 15C of the camera 1B of the present embodiment; and is specifically a principal part enlarged view to conceptually show, in an enlarged scale, the contacting portion of the dust-proof member (the dust-proof filter 21) to the excitation member (stacked piezoelectric element) in the image pickup unit 15C. Further, FIG. 73 is a principal part enlarged view to show, in an enlarged scale, a holding member which is provided on the distal end of the excitation member (stacked piezoelectric element).

Figure 73:
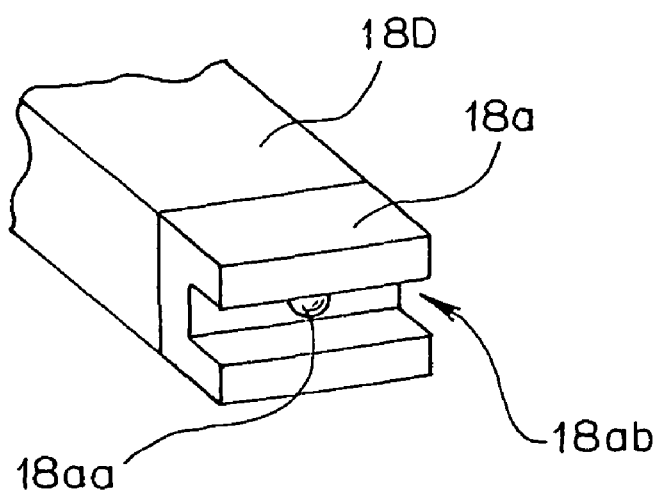
FIG. 73 is a principal part enlarged view to show a holding member in an enlarged state, the holding member being provided on distal end of the excitation member (stacked piezoelectric element) in the image pickup apparatus of FIG. 67.

As shown in FIGS. 72 and 73, the piezoelectric element 18D has its proximal end adhesively attached to a predetermined position on the inner face of the protruding part 23g, for example, by means of an adhesive.

A holding member 18a, which serves to maintain a contacting state between the piezoelectric element 18D and the outer peripheral edge part of the dust-proof filter 21 when the piezoelectric element 18D vibrates, is integrally disposed at the distal end portion of the piezoelectric element 18D, for example, adhesive means.

A groove part 18ab, which fits with the outer peripheral edge part of the dust-proof filter 21, is formed at the distal end side of the holding member 18a as shown in FIG. 73. There is formed in the groove bottom portion of the groove part 18ab, for example, a spherical protruding part 18aa having a hemisphere shape.

Further the configuration in the contacting portion between the piezoelectric element 18D and the dust-proof filter 21 is as follows. That is, the holding member 18a is integrally disposed at the distal end portion of the piezoelectric element 18D of which proximal end part is integrally disposed with the protruding part 23g. The outer peripheral edge part of the dust-proof filter 21 fits into the groove part 18ab of the holding member 18a. In this configuration, the dust-proof filter 21 is held so as to be slidable in horizontal direction, that is, the direction along the groove part 18ab and to be immobile in the optical axis direction of the photographing optical system 12a.

Further, the outer peripheral end face of the dust-proof filter 21 is in constant abutment against the spherical protruding part 18aa in the groove part 18ab of the holding member 18a. In the configuration, the contact between the spherical protruding part 18aa and the outer peripheral end face of the dust-proof filter 21 forms a point contact at point A as shown in FIG. 72.

The reason why the contacting portion of the piezoelectric element 18D against the outer peripheral end face of the dust-proof filter 21 configured to be a point contact is as follows.

That is, as described later, the dust-proof filter 21 is arranged to be subjected to a vibration in a first direction (direction along the face of the transmission portion 21C of the dust-proof filter 21) and a vibration in a second direction (optical axis direction of the photographing optical system 12a) by the piezoelectric element 18D. In the present embodiment, both of the vibration in the first direction and the vibration in the second direction are realized by applying a pressing force caused by the extension/contraction of the piezoelectric element 18D, to the direction along the face of the transmission portion of the dust-proof filter 21.

Thus, this will result in that in order to effectively transfer the pressing force caused by the piezoelectric element 18D to the dust-proof filter 21, it is desirable that the dust-proof filter 21 is movable in the horizontal direction (first direction) of the dust-proof filter 21, but not slidable in the optical axis direction of the photographing optical system 12a (second direction) in the contacting portion between the outer peripheral end face of the dust-proof filter 21 and the piezoelectric element 18D (actually the spherical protruding part 18aa of the holding member 18a).

Thus, it is configured such that the movement in the optical axis direction of the photographing optical system 12a (second direction) is restricted by the arrangement that the holding member 18a of the above described form is fixedly disposed at the distal end portion of the piezoelectric element 18D, and the outer peripheral edge part of the dust-proof filter 21 fits into the groove part 18ab of the holding member 18a, while the movement in the horizontal direction of the dust-proof filter 21 (first direction) is permitted by the arrangement that a point contact is formed by the spherical protruding part 18aa in the contacting portion between the outer peripheral end face of the dust-proof filter 21 and the holding member 18a.

It is noted that it will be more effective if the spherical protruding part 18aa itself is made of a material having little damping effect on the vibration.

The configuration of the contacting portion between the dust-proof filter 21 and the piezoelectric element 18D will not be limited to the form of the above described example, but different forms may be adopted provided a similar effect can be achieved.

For example, a variant for the above described contacting portion will be described below.

Figure 74:
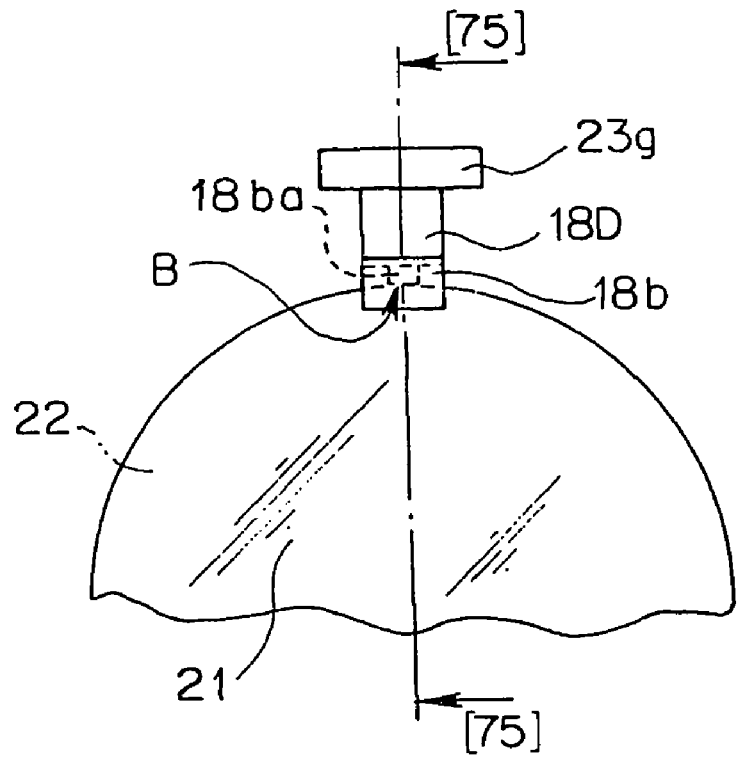
FIG. 74 is a principal part enlarged view in the vicinity of the contacting portion to conceptually show a variation of the contacting state of the excitation member with respect to the dust-proof member in the image pickup unit of the image pickup apparatus in FIG. 67.
Figure 75:
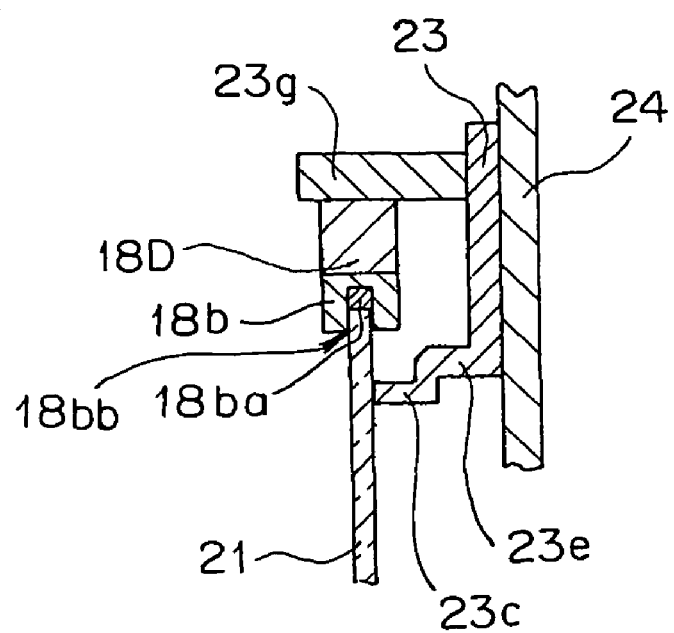
FIG. 75 is a sectional view taken along the line [75]-[75] of FIG. 74.

FIGS. 74 and 75 show a variant of the contacting form of the excitation member (stacked piezoelectric element) to the dust-proof member (the dust-proof filter) in the image pickup unit of the image pickup apparatus according to the present embodiment, in which FIG. 74 is a principal part enlarged view of the vicinity of the contacting portion; and FIG. 75 is a sectional view taken along the line [75]-[75] of FIG. 74.

In this variant, the holding member 18b is integrally disposed at the distal end part of the piezoelectric element 18D by means of, for example, adhesive bonding etc. The holding member 18b is a member which is provided to maintain a contacting state between the piezoelectric element 18D and the outer peripheral edge part of the dust-proof filter 21 when the piezoelectric element 18D vibrates.

The holding member 18b is formed in a substantially same manner with the above described holding member 18a, in which a lubricating member 18ba which has substantially the same shape as a groove part 18bb and is made of a material having little damping effect on vibration is disposed in the groove bottom portion of the groove part 18bb in place of the above described spherical protruding part 18aa of a hemispherical shape. Other configurations are identical to those of the above described embodiment.

Such configuration results in that in this variant, the contacting portion B (see FIG. 74) between the lubricating member 18ba and the outer peripheral end face of the dust-proof filter 21 forms a plane contact, thus extending across the whole thickness of the dust-proof filter 21 in the outer peripheral end face.

In other words, the contact between the outer peripheral end face of the dust-proof filter 21 and the contacting face B of the lubricating member 18ba is formed in a larger area compared with case of the above described point contact (see FIG. 72), which results in a configuration to allow secure transfer of the pressing force of the piezoelectric element 18D to the dust-proof filter 21.

It is noted that a material which has little damping effect on vibration may be used for the lubricating member 18ba, and for example, configuration may be such that a lubricating sheet of a sheet shape etc. is stuck to the groove bottom portion of the groove part 18bb.

The concept of the action when the pressing force of the piezoelectric element 18D is applied to the dust-proof filter 21 in the case in which a spherical protruding part 18aa is formed or a lubricating member 18ba is disposed in the contacting portion between the holding members 18a, 18b and the dust-proof filter 21, will be described as follows.

FIG. 76 conceptually illustrates the manner in which the plurality of excitation members (stacked piezoelectric element) act to the dust-proof member (dust-proof filter) in the camera of the present embodiment. In FIG. 76, for convenience of explanation, two stacked piezoelectric elements are illustrated and described.

Here, as shown in FIG. 76, suppose that two piezoelectric elements 18DA and 18DB are disposed on the peripheral edge part of the dust-proof filter 21. Specifically, the first piezoelectric element 18DA and the second piezoelectric element 18DB of the two stacked piezoelectric elements are disposed in the vicinity of the outer peripheral edge part of the dust-proof filter 21 at a position respectively rotated by an angle of about 90 degrees with respect to the dust-proof filter 21.

Suppose that in this case, the first piezoelectric element 18DA, which is one of the two piezoelectric elements 18DA and 18DB, is driven and thereby the first piezoelectric element 18DA has extended in the direction of arrow D by the amount of symbol D1 shown in FIG. 76. Then, the dust-proof filter 21 vibrates between the position indicated by the solid line and the position indicated by the two-dot chain line shown in FIG. 76. The amount of vibration of the dust-proof filter 21 at this moment is symbol D1, the same as the extension amount of the piezoelectric element 18DA.

Meanwhile, suppose that while the first piezoelectric element 18A is driven and extended in the direction of arrow D as described above, the second piezoelectric element 18DB is not driven and its position is maintained. Then, the contact (see symbol E) between the second piezoelectric element 18DB and the outer peripheral end face of the dust-proof filter 21 is constantly maintained. Therefore, the contact between the second piezoelectric element 18DB and the outer peripheral end face of the dust-proof filter 21 may hinder the extension of the first piezoelectric element 18DA, that is, the vibration of the dust-proof filter 21.

Therefore, it is configured such that vibration of the dust-proof filter 21 in the horizontal direction caused by the piezoelectric element 18D smoothly takes place by the arrangement that the above described spherical protruding part 18aa or the lubricating member 18ba is disposed at the portion where the holding member 18a comes into contact with the outer peripheral end face of the dust-proof filter 21.

Thus, in the present embodiment and its variant, the spherical protruding part 18aa or the lubricating member 18ba is disposed as described above in the contacting portion of the holding members 18a, 18b, which provided in the distal end portion of the piezoelectric element 18D, to the dust-proof filter 21, which results in a configuration that the vibration by one out of the plurality of piezoelectric elements 18D is securely transferred to the dust-proof filter 21 without inhibiting the vibration by other second piezoelectric elements 18D other than the one itself.

Other configurations of the thus-configured camera 1B of the present embodiment are substantially same as those of the above described first and third embodiments.

Next, the actions of the dust-proof filter 21 and the piezoelectric element 18D out of the image pickup unit 15C in the camera 1B of the present embodiment will be described below.

FIGS. 77A, 77B, and 77C and FIGS. 78 to 100 illustrate the action of the image pickup apparatus of the present embodiment, in which FIGS. 77A, 77B, and 77C are conceptual diagrams as viewed from the side of a dust-proof member (dust-proof filter) and an excitation member (stacked piezoelectric element) to show the manner in which the dust-proof member (dust-proof filter) vibrates as the excitation member (stacked piezoelectric element) extends/contracts.

Figure 78:
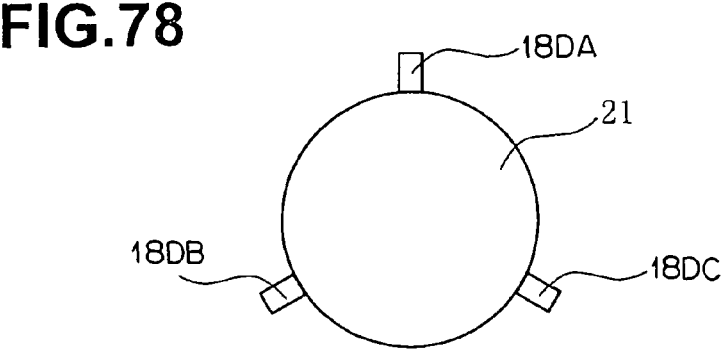
FIG. 78 is a conceptual diagram to show the positional relationship between the dust-proof member and the excitation members as viewed from the front while the dust-proof member and the excitation members are in a normal (no load) condition, the figure illustrating the action when driving the excitation member in the image pickup apparatus of FIG. 67 to generate a vibration in a first direction.
Figure 79:
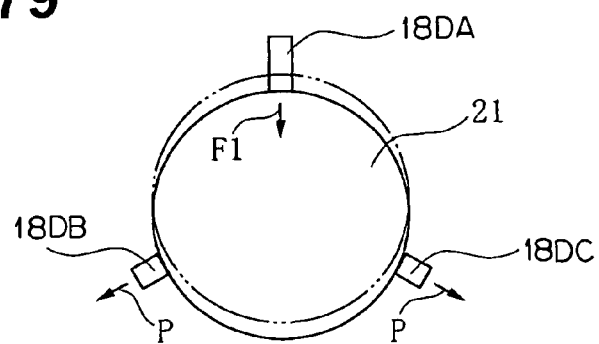
FIG. 79 is a conceptual diagram to illustrate a state in which a first stacked piezoelectric element out of the plurality of excitation members has become extended and simultaneously a second and third stacked piezoelectric elements have become contracted from the state of FIG. 78.
Figure 80:
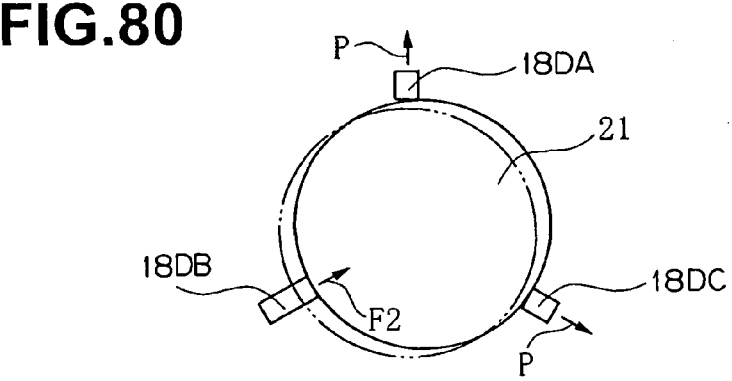
FIG. 80 is a conceptual diagram to illustrate a state in which a second stacked piezoelectric element out of the plurality of excitation members has become extended and simultaneously a first and third stacked piezoelectric elements have become contracted from the state of FIG. 79.
Figure 81:
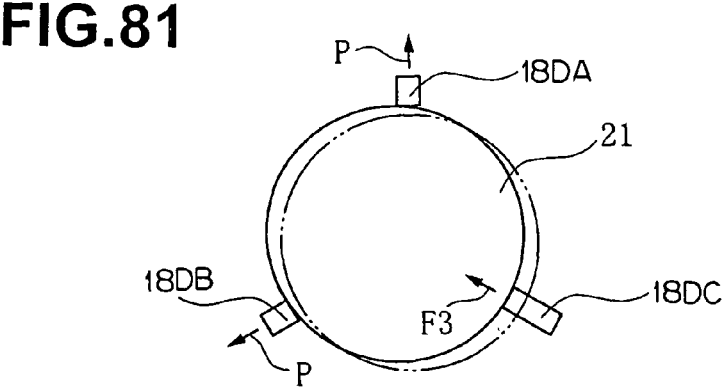
FIG. 81 is a conceptual diagram to illustrate a state in which a third stacked piezoelectric element out of the plurality of excitation members has become extended and simultaneously a first and second stacked piezoelectric elements have become contracted from the state of FIG. 80.

Further, FIGS. 78 to 90 illustrates the action when the excitation member (stacked piezoelectric element) is driven to generate a vibration in a first direction, in which FIGS. 78 to 81 are conceptual diagram as viewed from the front of the dust-proof member (dust-proof filter) and an excitation member (stacked piezoelectric element); FIG. 78 shows the positional relationship between the dust-proof member (dust-proof filter) and the excitation member (stacked piezoelectric element) in a normal (no load) condition; FIG. 79 shows a state in which a first stacked piezoelectric element of a plurality of excitation members (stacked piezoelectric elements) has become extended and simultaneously a second and third stacked piezoelectric elements have become contracted; FIG. 80 shows a state in which a second stacked piezoelectric element out of a plurality of excitation members (stacked piezoelectric elements) has become extended and simultaneously a first and third stacked piezoelectric elements have become contracted; and FIG. 81 shows a state in which a third stacked piezoelectric element out of a plurality of excitation members (stacked piezoelectric elements) has become extended and simultaneously a first and second stacked piezoelectric elements have become contracted.

Figure 82:
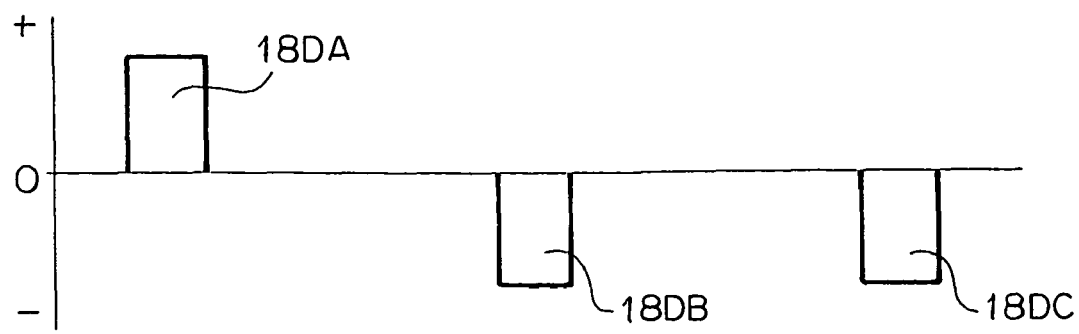
FIG. 82 shows the state of the applied voltage to be applied to drive the plurality of excitation members to be extended/contracted in the state of FIG. 79.
Figure 83:
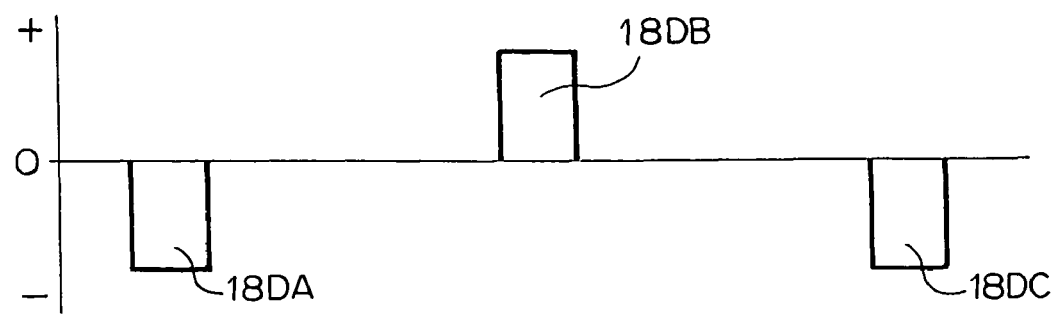
FIG. 83 shows the state of the applied voltage to be applied to drive the plurality of excitation members to be extended/contracted in the state of FIG. 80.
Figure 84:
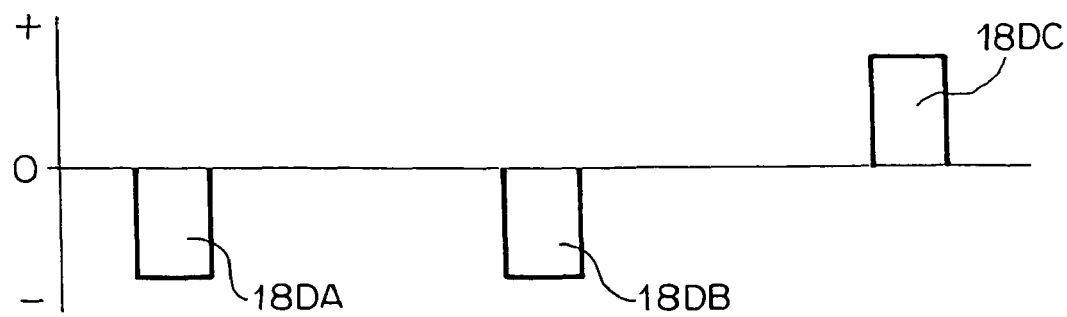
FIG. 84 shows the state of the applied voltage to be applied to drive the plurality of excitation members to be extended/contracted in the state of FIG. 81.
Figure 85:
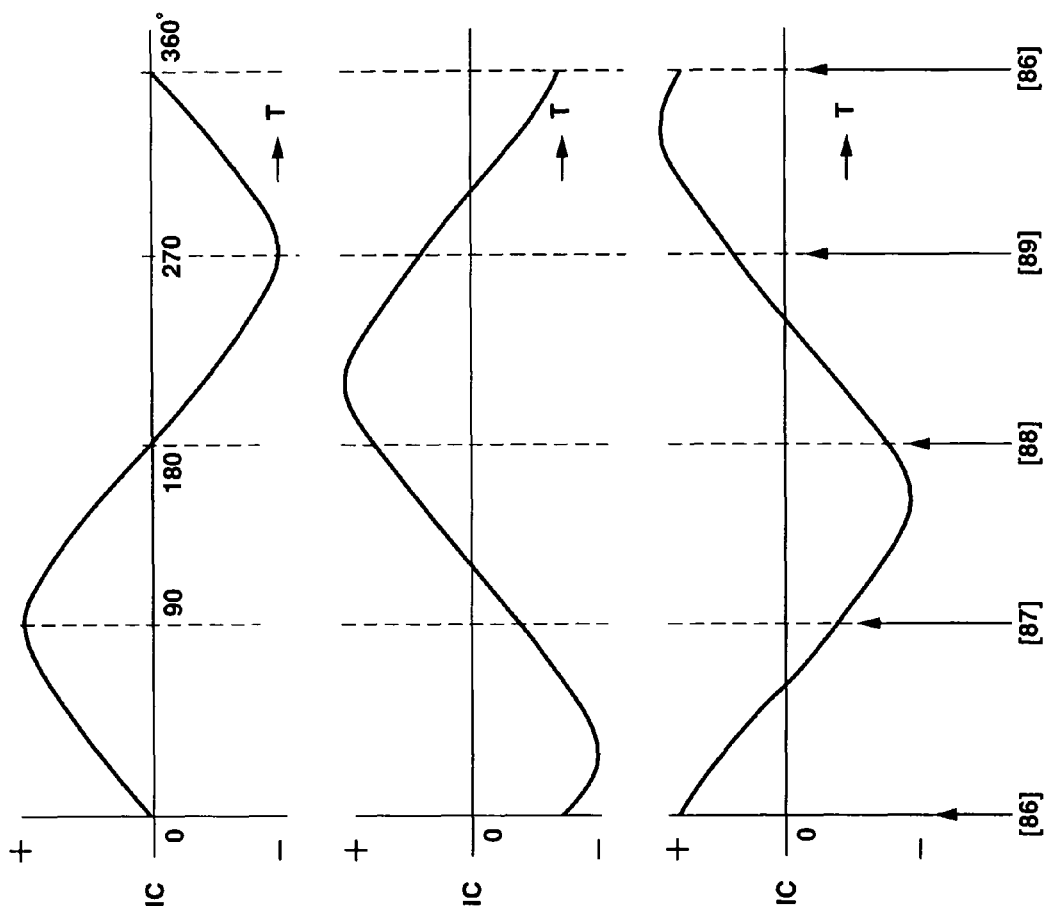
FIG. 85A shows a control waveform when a sine wave voltage is applied to the first piezoelectric element, illustrating a variation of the applied voltage to be applied to drive the plurality of excitation members to be extended/contracted in the image pickup apparatus of FIG. 67.
FIG. 85B shows a control waveform when a sine wave voltage is applied to the second piezoelectric element, illustrating a variation of the applied voltage to be applied to drive the plurality of excitation members to be extended/contracted in the image pickup apparatus of FIG. 67.
FIG. 85C shows a control waveform when a sine wave voltage is applied to the third piezoelectric element, illustrating a variation of the applied voltage to be applied to drive the plurality of excitation members to be extended/contracted in the image pickup apparatus of FIG. 67.

FIGS. 82 to 84 show the state of the applied voltages to be applied to drive the plurality of excitation members (stacked piezoelectric elements) to be extended/contracted in each state of FIGS. 79 to 81 described above; in which FIG. 82 shows each applied voltage corresponding to the state of FIG. 79; FIG. 83 each applied voltage corresponding to the state of FIG. 80; and FIG. 84 each applied voltage corresponding to the state of FIG. 81, respectively.

Further, FIGS. 85A, 85B, and 85C respectively show variants of each applied voltage to be applied to drive each of the plurality of excitation members (stacked piezoelectric elements) to be extended/contracted in the image pickup apparatus of the present embodiment.

Figure 86:
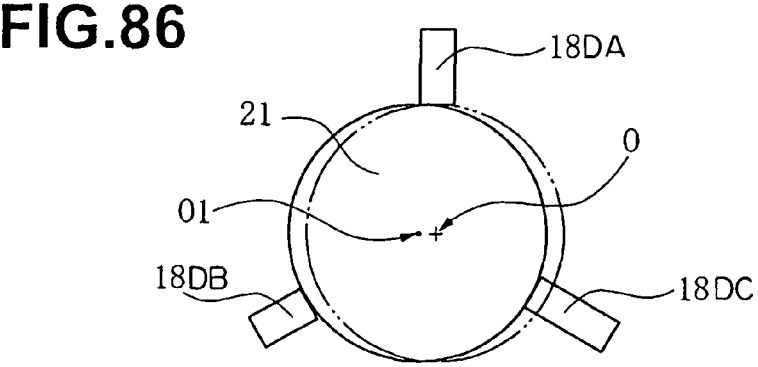
FIG. 86 conceptually shows the state shifts of the plurality of the excitation members and the dust-proof member caused by the application of the voltage at the timing of symbol [86] in FIG. 85C.
Figure 87:
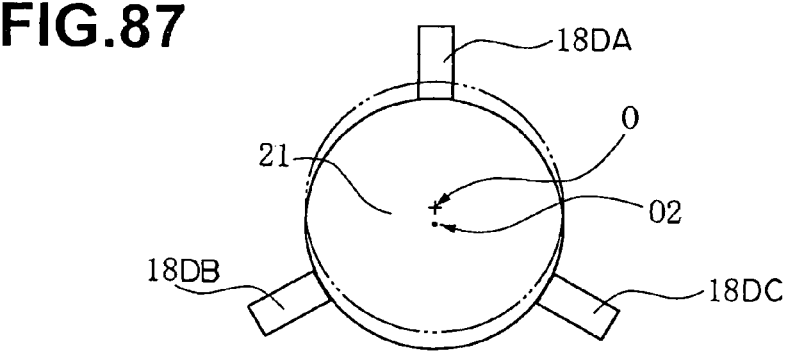
FIG. 87 conceptually shows the state shifts of the plurality of the excitation members and the dust-proof member caused by the application of the voltage at the timing of symbol [87] in FIG. 85C.
Figure 88:
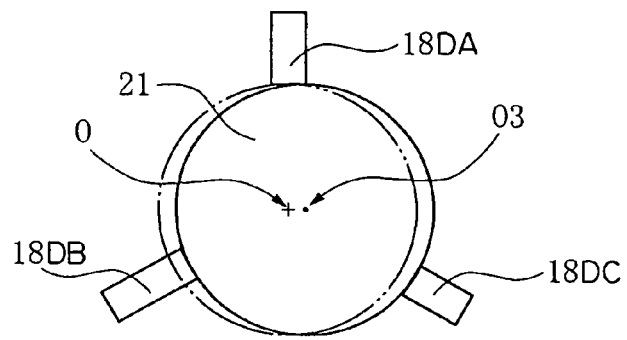
FIG. 88 conceptually shows the state shifts of the plurality of the excitation members and the dust-proof member caused by the application of the voltage at the timing of symbol [88] in FIG. 85C.
Figure 89:
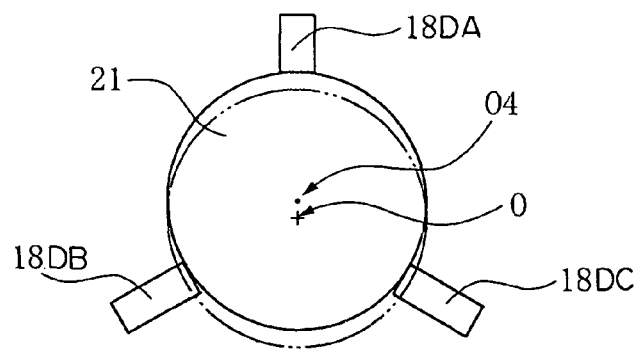
FIG. 89 conceptually shows the state shifts of the plurality of the excitation members and the dust-proof member caused by the application of the voltage at the timing of symbol [89] in FIG. 85C.

Further, FIGS. 86 to 90 show the state shifts of the plurality of excitation members (stacked piezoelectric elements) and the dust-proof member (dust-proof filter) caused by the application of the voltages corresponding to each time point of symbols [86], [87], [88], [89], and [86] shown in FIG. 85C, in which FIG. 86 shows the state when the voltage at the time point of symbols [86] and [86] in FIG. 85C is applied; FIG. 87 the state when the voltage at the time point of symbol [87] in FIG. 85C is applied; FIG. 88 the state when the voltage at the time point of symbol [88] in FIG. 85C is applied; and FIG. 89 shows the state when the voltage at the time point of symbol [89] in FIG. 85C is applied.

Figure 90:
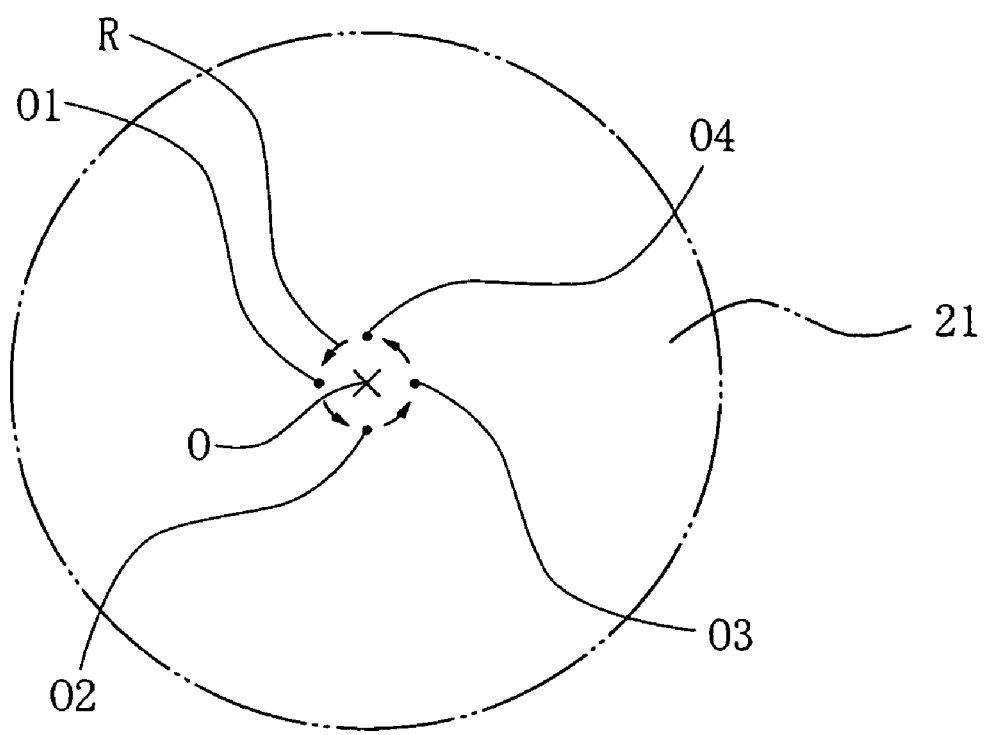
FIG. 90 conceptually shows the locus of the center point of the dust-proof member when the voltages shown in FIG. 85A, FIG. 85B, and FIG. 85C are consecutively applied to the plurality of excitation members.

FIG. 90 conceptually shows the locus of the center point of the dust-proof member (dust-proof filter) when the voltages shown in the above described FIG. 85A, FIG. 85B, and FIG. 85C are consecutively applied to the plurality of excitation members (stacked piezoelectric elements).

On the other hand, FIGS. 91 to 96 illustrate the action when the excitation members (stacked piezoelectric elements) are driven to generate a vibration in a second direction in the image pickup unit of the image pickup apparatus according to the present embodiment.

Figure 91:
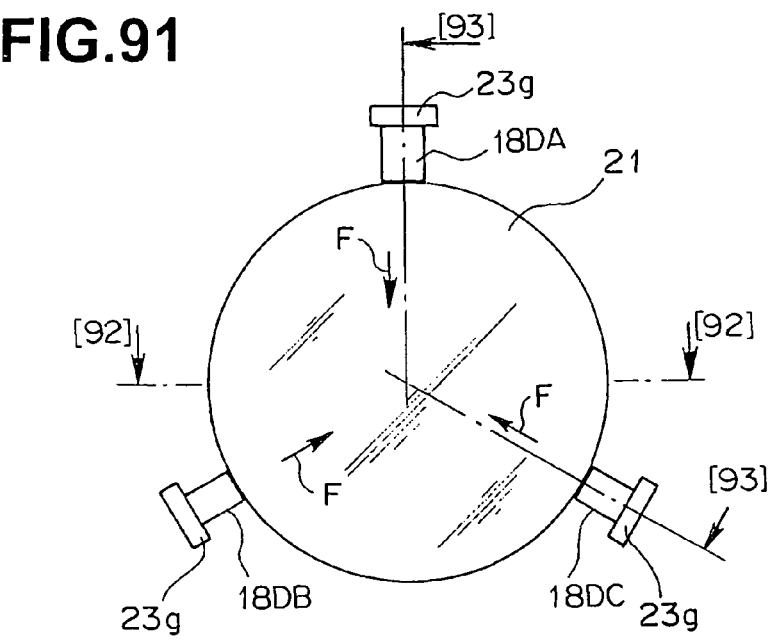
FIG. 91 conceptually shows the dust-proof member and the excitation members as viewed from the front to illustrate the action when driving the excitation member in the image pickup unit of the image pickup apparatus of FIG. 67 to generate vibrations in a second direction.
Figure 92:
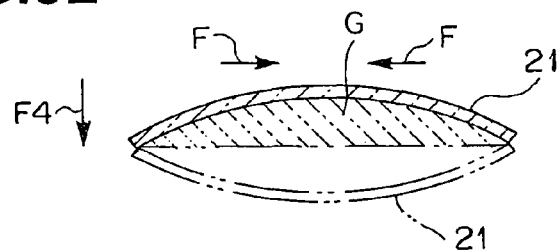
FIG. 92 is a sectional view taken along the line [92]-[92] in FIG. 91 to show the state change of the dust-proof member and the excitation member when a drive voltage is applied to the excitation member of FIG. 91.
Figure 93:
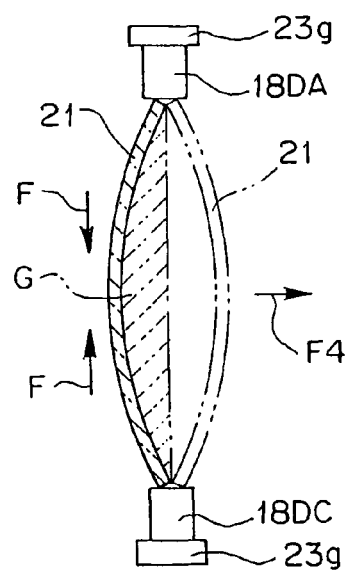
FIG. 93 is a sectional view taken along the line [93]-[93] in FIG. 91 to show the state change of the dust-proof member and the excitation member when a drive voltage is applied to the excitation member of FIG. 91.
Figure 94:
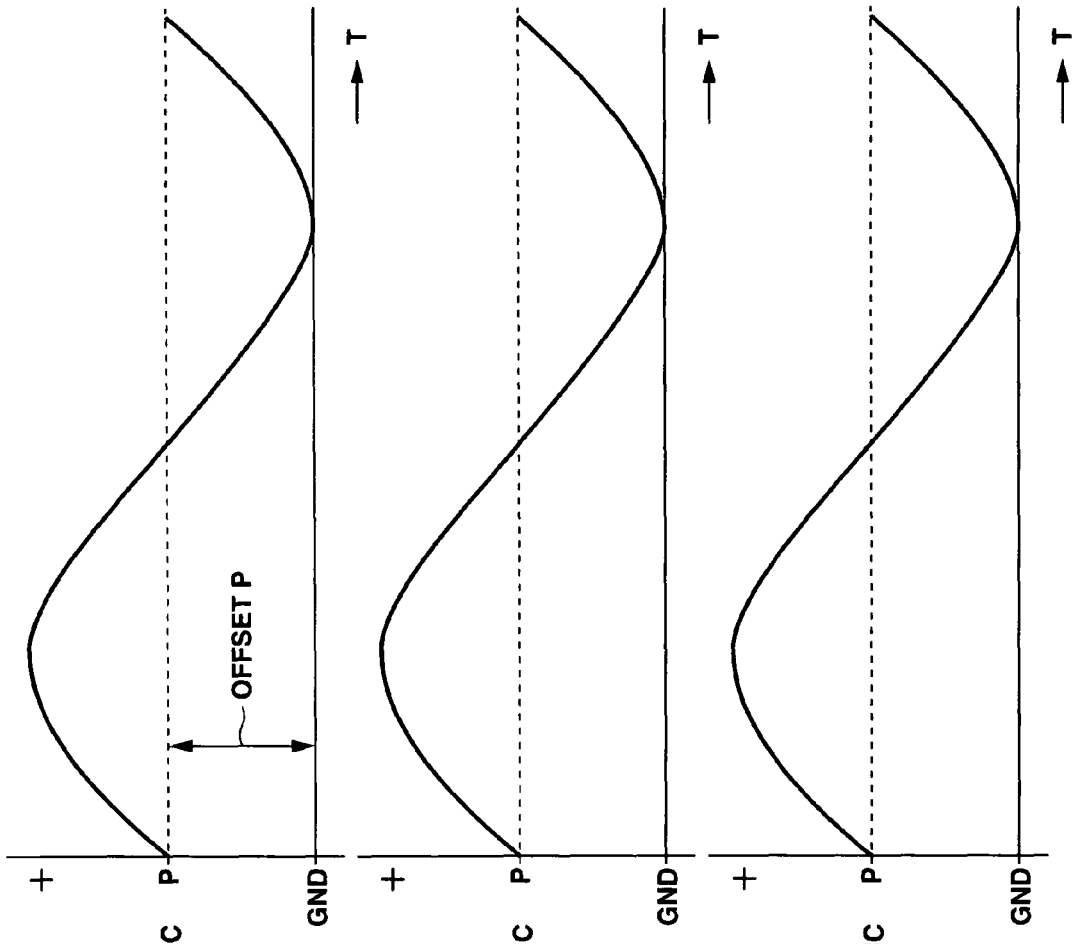
FIG. 94A shows the applied voltage to the first piezoelectric element when generating vibrations in a second direction with respect to the dust-proof member in the image pickup apparatus of FIG. 67.
FIG. 94B shows the applied voltage to the second piezoelectric element when generating vibrations in a second direction with respect to the dust-proof member in the image pickup apparatus of FIG. 67.
FIG. 94C shows the applied voltage to the third piezoelectric element when generating vibrations in a second direction with respect to the dust-proof member in the image pickup apparatus of FIG. 67.

FIGS. 91 to 93 show an example of the vibration in a second direction of the excitation members (piezoelectric elements) in the present embodiment.

That is, FIG. 91 is a front view to exclusively show the dust-proof member (dust-proof filter) and the excitation members (stacked piezoelectric elements) of the image pickup unit. FIGS. 92 and 93 show the state change of the dust-proof member (dust-proof filter) and the excitation members (stacked piezoelectric elements) when a drive voltage is applied to the excitation member of FIG. 91, in which FIG. 92 is a sectional view taken along the line [92]-[92] in FIG. 91; and FIG. 93 is a sectional view taken along the line [93]-[93] in FIG. 91.

FIGS. 94A, 94B, and 94C respectively shows the applied voltage to be applied to each excitation member (stacked piezoelectric element) when generating a vibration of the dust-proof member (dust-proof filter) in a second direction in the image pickup apparatus of the present embodiment.

Figure 95:
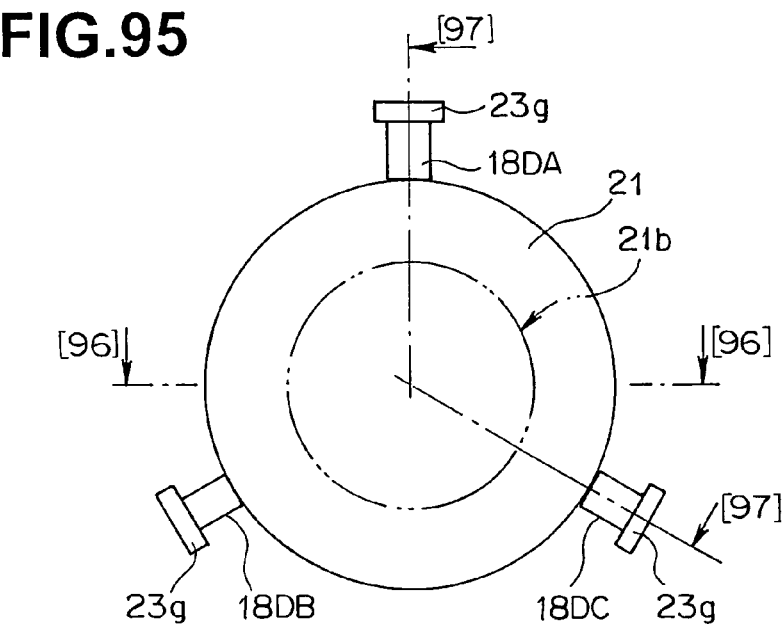
FIG. 95 conceptually shows the dust-proof member and the excitation member as viewed from the front to illustrate the action of another example (in the case of generating secondary vibration) when driving the excitation member in the image pickup unit of the image pickup apparatus of FIG. 67 to generate vibrations in a second direction.
Figure 96:
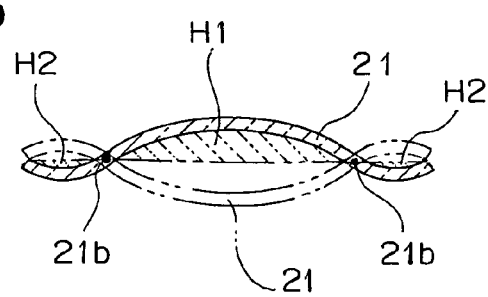
FIG. 96 is a sectional view taken along the line [96]-[96] in FIG. 95 to show the state change of the dust-proof member and the excitation member when a drive voltage is applied to the excitation member of FIG. 95.
Figure 97:
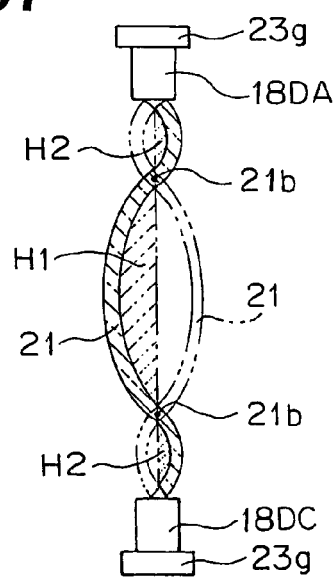
FIG. 97 is a sectional view taken along the line [97]-[97] in FIG. 95 to show the state change of the dust-proof member and the excitation member when a drive voltage is applied to the excitation member of FIG. 95.

FIGS. 95 to 97 show another example of the vibration action in a second direction of the excitation member (piezoelectric element) in the present embodiment.

That is, FIGS. 95 to 97 show the case in which a secondary mode vibration is provided to the dust-proof member (dust-proof filter) in an image pickup unit having the identical configuration to that of shown in the above described FIGS. 91 to 93, in which FIG. 95 is a front view to exclusively show the dust-proof member (dust-proof filter) and the excitation members (stacked piezoelectric elements) of the image pickup unit as with FIG. 91. Further, FIGS. 96 and 97 show the state change of the dust-proof member (dust-proof filter) and the excitation members (stacked piezoelectric elements) when a drive voltage is applied to the excitation member (stacked piezoelectric element) of FIG. 95, in which FIG. 96 is a sectional view taken along the line [96]-[96] in FIG. 95; and FIG. 97 is a sectional view along the line [97]-[97] in FIG. 95.

Figure 98:
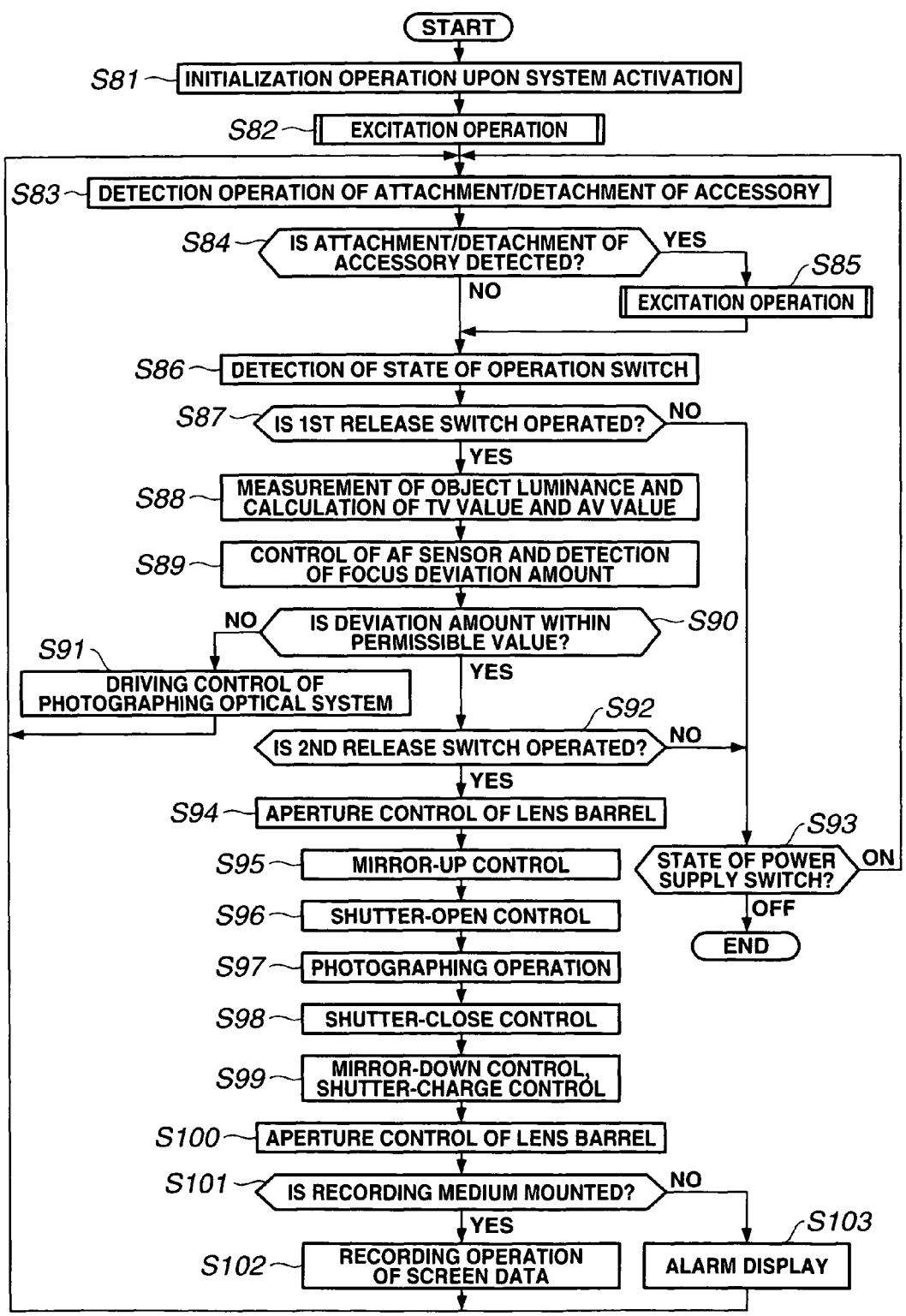
FIG. 98 is a flowchart to show the outline of the photographing operation processing in the image pickup apparatus of FIG. 67.
Figure 99:
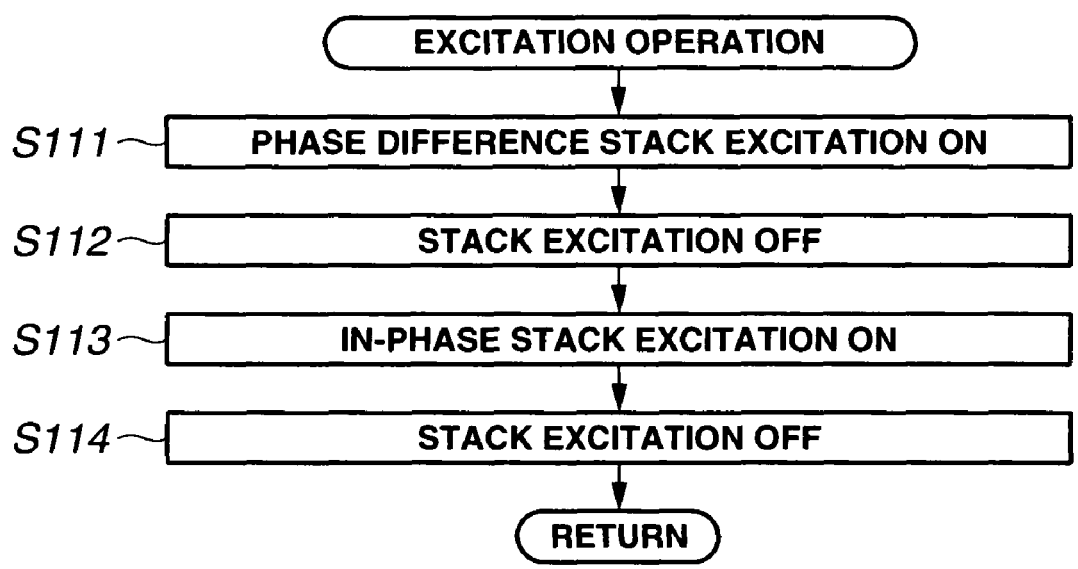
FIG. 99 is a flowchart to show an "excitation operation" processing out of the photographing operation processing of FIG. 98.

FIGS. 98 and 99 show the flow of action (control processing) in the image pickup apparatus of the present embodiment, in which FIG. 98 is a flowchart to show the outline of the photographing operation processing in the image pickup apparatus concerned; and FIG. 99 is a flowchart to show a "excitation operation" processing out of the photographing operation processing shown in FIG. 98.

Figure 100:
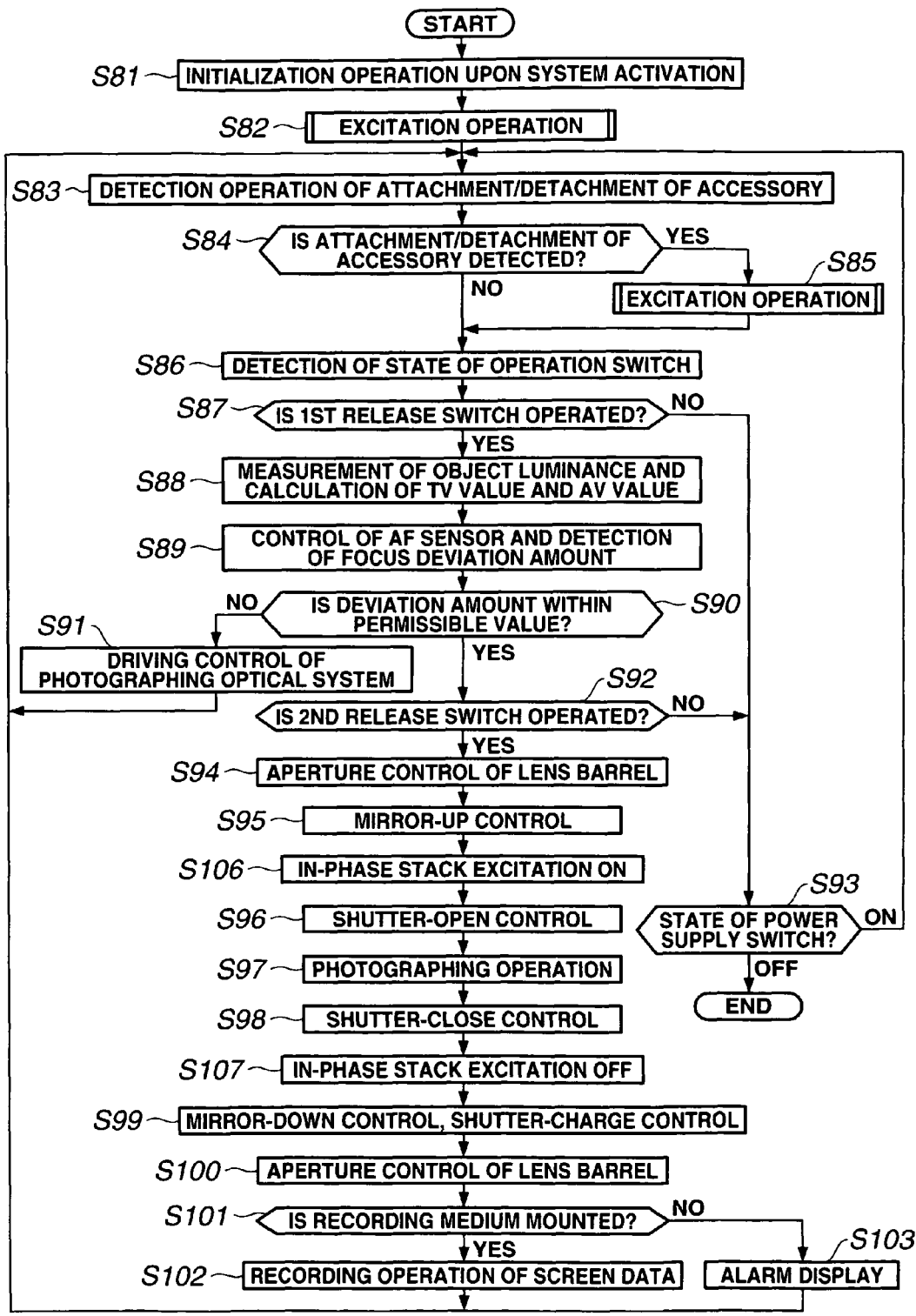
FIG. 100 is a flowchart to show another variant of the photographing operation processing of the image pickup apparatus of FIG. 67.

FIG. 100 is a flowchart to show another variant of the photographing operation processing of the image pickup apparatus of the present embodiment.

It is noted that the operation of each member illustrated in each figure after FIG. 11 is exaggerated for the convenience of illustrating the actions.

First, the actions when the dust-proof filter 21, which is the dust-proof member, is caused to vibrate in the first direction by the extension/contraction of the piezoelectric element 18D, which is the excitation member, will be described with reference to FIGS. 77A, 77B, and 77C.

The piezoelectric element 18D is, as well known, an element which extends/contracts by a minute amount upon being applied a voltage. First, when in a no-load state shown in FIG. 77A, a plus (+) voltage is applied to the piezoelectric element 18D through the control by CPU 41 via a dust-proof filter driving portion 49A (see FIG. 68). Then the piezoelectric element 18D extends in the direction of arrow T1 shown in FIG. 77B. The extension amount of the piezoelectric element 18D at the moment is indicated by symbol D2 in the same figure.

The (spherical protruding part 18aa of the holding member 18a of the) distal end of the piezoelectric element 18D is contacted with the outer peripheral end face of the dust-proof filter 21. Therefore, when the piezoelectric element 18D extends by the amount indicated by symbol D2 as described above, the dust-proof filter 21 will move by the amount indicated by symbol S2 in FIG. 77B in the direction of arrow T1.

Next, when in a state shown in FIG. 77B, a minus (−) voltage is applied to the piezoelectric element 18D through the control by CPU 41 via the dust-proof filter driving portion 49A (see FIG. 68). Then, the piezoelectric element 18D contracts in the direction of arrow T2 shown in FIG. 77C. The contraction amount of the piezoelectric element 18D at the moment is indicated by symbol D3 in the same figure. It is noted that the contraction amount D3 is a contraction amount corresponding to the no-load state shown in FIG. 77A. Therefore, when a shift from the state of FIG. 77B to the state of FIG. 77C occurs, the piezoelectric element 18D will contract by the amount indicated by D2+D3. This will cause the dust-proof filter 21 to move in the direction of arrow T2 by the amount indicated by S2+S3.

Thus, the configuration is such that an alternate application of a plus (+) and minus (−) voltages to the piezoelectric element 18D will cause the dust-proof filter 21 to vibrate in the direction indicated by arrows T1 and T2, that is, the direction substantially perpendicular to the optical axis of the light flux that passes through the dust-proof filter 21 (the horizontal direction of the dust-proof filter 21; the first direction).

It is noted that an application of a voltage to the piezoelectric element 18D can achieve for example a response rate of no more than about 10 micro seconds (μsec). Therefore, this can cause minute dusts etc. to float up from the surface of the dust-proof filter 21, to which the minute dusts etc. adhere and which is to be subjected to a vibration.

The actions when the dust-proof filter 21 vibrates due to the extension/contraction of the piezoelectric element 18D will be described in more detail with reference to FIGS. 79 to 84.

In the present embodiment, as described above, three piezoelectric elements 18D are disposed to be substantially evenly spaced apart to each other, that is, at an angular spacing of about 120 degrees, in the vicinity of the peripheral edge part of the dust-proof filter 21.

Now, let the three piezoelectric elements 18D be a first piezoelectric element 18DA, a second piezoelectric element 18DB, and a third piezoelectric element 18DC as shown in FIGS. 78 to 81.

First, when in a no-load state shown in FIG. 78, voltages shown in FIG. 82 are applied rapidly for a predetermined time to each of the piezoelectric elements 18DA, 18DB, and 18DC, respectively. That is, a plus (+) voltage is applied to the first piezoelectric element 18DA, and a minus (−) voltage is applied to the second piezoelectric element 18DB and the third piezoelectric element 18DC.

This will cause a rapid shift in the state of the piezoelectric elements 18DA, 18DB, and 18DC and the dust-proof filter 21 from the state shown in FIG. 78 to the state shown in FIG. 79. At this moment, the first piezoelectric element 18DA extends by a predetermined amount in the direction of arrow F1 in FIG. 79, and the second piezoelectric element 18DB and the third piezoelectric element 18DC contract by a predetermined amount in the direction of arrow P in FIG. 79. This will cause the dust-proof filter 21 to move from the position indicated by the two-dot chain line in FIG. 79 (an equal position to the state of FIG. 78) to the position indicated by the solid line in FIG. 79.

Next, when in a state of FIG. 79, voltages shown in FIG. 83 are applied rapidly for a predetermined time to each of the piezoelectric elements 18DA, 18DB, and 18DC, respectively. That is, a plus (+) voltage is applied to the second piezoelectric element 18DB, and a minus (−) voltage is applied to the first piezoelectric element 18DA and the third piezoelectric element 18DC.

This will cause the states of the piezoelectric elements 18DA, 18DB, and 18DC, and the dust-proof filter 21 to be shifted from the state shown in FIG. 79 to the state shown in FIG. 80. At this moment, the second piezoelectric element 18DB extends by a predetermined amount in the direction of arrow F2 in FIG. 80, and the first piezoelectric element 18DA and the third piezoelectric element 18DC contract by a predetermined amount in the direction of arrow P in FIG. 80. This will cause the dust-proof filter 21 to move from the position indicated by the two-dot chain line in FIG. 80 (an equal position to the state indicated by the solid line of FIG. 79) to the position indicated by the solid line in FIG. 80.

Further following that, when in a state of FIG. 80, voltages shown in FIG. 84 are applied rapidly for a predetermined time to each of the piezoelectric elements 18DA, 18DB, and 18DC, respectively. That is, a plus (+) voltage is applied to the third piezoelectric element 18DC, and a minus (−) voltage is applied to the first piezoelectric element 18DA and the second piezoelectric element 18DB.

This will cause the states of the piezoelectric elements 18DA, 18DB, and 18DC to be shifted from the state shown in FIG. 80 to the state shown in FIG. 81. At this moment, the third piezoelectric element 18DC extends by a predetermined amount in the direction of arrow F3 in FIG. 81, and the first piezoelectric element 18DA and the second piezoelectric element 18DB contract by a predetermined amount in the direction of arrow P in FIG. 81. This will cause the dust-proof filter 21 to move from the position indicated by the two-dot chain line in FIG. 81 (an equal position to the state indicated by the solid line of FIG. 80) to the position indicated by the solid line in FIG. 81.

Thus, the configuration is such that repeated execution of the control to apply voltages in the forms as shown in FIGS. 82 to 84 rapidly for a predetermined time to each of the piezoelectric elements 18DA, 18DB, and 18DC can cause the dust-proof filter 21 to intermittently vibrate in the direction to rotate it around the optical axis thereof, that is, in the direction (first direction) substantially perpendicular to the light flux that passes through the dust-proof filter 21.

In this case, as described above, an application of a voltage to the piezoelectric element 18D can achieve for example a response rate of no more than about 10 micro seconds (μsec). Therefore, the execution of the vibration control as described above will cause minute dusts etc. to float up from the surface of the dust-proof filter 21 to which the minute dusts etc. adhere. Thus, execution of the control to successively change the vibration direction of the dust-proof filter 21 in the order of arrows F1, F2, and F3 will vibrate the dust-proof filter 21 to rotate around the optical axis. This will cause the minute dusts etc. adhering to the surface of the dust-proof filter 21 to gradually move toward the outer periphery side on the dust-proof filter 21 due to centrifugal force.

It is noted that the control to apply voltage to respective piezoelectric elements 18DA, 18DB, and 18DC is not limited to the above described example, and for example, the control shown in FIGS. 85A, 85B, and 85C may be performed.

That is, in a variant shown in FIGS. 85A, 85B, and 85C, the voltage to be applied to respective piezoelectric elements 18DA, 18DB, and 18DC is controlled so as to have a sinusoidal waveform.

FIG. 85A shows the control of the voltage application to the first piezoelectric element 18DA, FIG. 85B the control of the voltage application to the second piezoelectric element 18DB, and FIG. 85C the control of the voltage application to the third piezoelectric element 18DC.

In this case, the states of respective piezoelectric elements 18DA, 18DB, 18DC and the dust-proof filter 21 caused by, for example, the applied voltages to respective piezoelectric elements 18DA, 18DB, and 18DC at the time point of symbol [86] and symbol [86] shown in FIG. 85C are the state shown in FIG. 86.

That is, at this moment, the first piezoelectric element 18DA is in a no-load state, and therefore it has no extension/contraction. The second piezoelectric element 18DB is applied with a voltage of a minus (−) predetermined amount. This will result in that the second piezoelectric element 18DB is contracted by a predetermined amount. And the third piezoelectric element 18DC is applied with a voltage of a plus (+) predetermined amount. This will result in that the third piezoelectric element 18DC is extended by a predetermined amount. Therefore, in the state shown in FIG. 86, the dust-proof filter 21 is located at the position indicated by the solid line with respect to the position of a no-load state indicated by the two-dot chain line in the same figure.

It is noted that the circle indicated by the two-dot chain line of FIG. 86 indicates the position of the dust-proof filter 21 when all the three piezoelectric elements 18DA, 18DB, and 18DC are in a no-load state (called as a reference position, and as the same hereinafter in FIGS. 87 to 89).

When a shift takes place from the time point of symbol [86] in FIG. 85C to the time point of symbol [87] in the same figure, the state of respective piezoelectric elements 18DA, 18DB, and 18DC and the dust-proof filter 21 caused by the applied voltages to respective piezoelectric elements 18DA, 18DB, and 18DC at this time point of symbol [87] becomes the state shown in FIG. 87.

Thus, at this moment, a voltage of a plus (+) predetermined amount is applied to the first piezoelectric element 18DA. This will result in that the first piezoelectric element 18DA is extended by a predetermined amount. The second piezoelectric element 18DB and the third piezoelectric element 18DC are applied with a voltage of a minus (−) predetermined amount. This will result in that the second piezoelectric element 18DB and the third piezoelectric element 18DC are contracted by a predetermine amount, respectively. Thus, in the state shown in FIG. 87, the dust-proof filter 21 is located at the position indicated by the solid line in the same figure.

Further, when a shift takes place from the time point of symbol [87] in FIG. 85C to the time point of symbol [88] in the same figure, the state of respective piezoelectric elements 18DA, 18DB, and 18DC and the dust-proof filter 21 caused by the applied voltages to respective piezoelectric elements 18DA, 18DB, and 18DC at this time point of symbol [88] become the state shown in FIG. 88.

That is, at this moment, the first piezoelectric element 18DA is in a no-load state, and therefore it has no extension/contraction. The second piezoelectric element 18DB is applied with a voltage of a plus (+) predetermined amount. This will result in that the second piezoelectric element 18DB is extended by a predetermined amount. And the third piezoelectric element 18DC is applied with a voltage of a minus (−) predetermined amount. This will result in that the third piezoelectric element 18DC is contracted by a predetermined amount. Thus, in the state shown in FIG. 88, the dust-proof filter 21 is located at the position indicated by the solid line in the same figure.

Further, when a shift takes place from the time point of symbol [88] in FIG. 85C to the time point of symbol [89] in the same figure, the state of respective piezoelectric elements 18DA, 18DB, and 18DC and the dust-proof filter 21 caused by the applied voltages to respective piezoelectric elements 18DA, 18DB, and 18DC at this time point of symbol [89] becomes the state shown in FIG. 89.

Thus, at this moment, the first piezoelectric element 18DA is applied with a voltage of a minus (−) predetermined amount. This will result in that the first piezoelectric element 18DA is contracted by a predetermined amount. The second piezoelectric element 18DB and the third piezoelectric element 18DC are applied with a voltage of a plus (+) predetermined amount, respectively. This will result in that the second piezoelectric element 18DB and the third piezoelectric element 18DC are extended by a predetermined amount. Therefore, in the state shown in FIG. 89, the dust-proof filter 21 is located at the position indicated by the solid line in the same figure.

Then, when a shift takes place from the time point of symbol [89] in FIG. 85C to the time point of symbol [86] in the same figure, the state of respective piezoelectric elements 18DA, 18DB, and 18DC and the dust-proof filter 21 caused by the applied voltages to respective piezoelectric elements 18DA, 18DB, and 18DC at this time point of symbol [86] returns to the state shown in FIG. 86.

When the control (sinusoidal waveform control) of applied voltage to respective piezoelectric elements 18DA, 18DB, and 18DC is performed as described above, the dust-proof filter 21 will vibrate in the direction to rotate around the center point "O" thereof with respect to the reference position of the dust-proof filter 21. Thus, the center points O1, O2, O3 and O4 of the dust-proof filter 21 at respective time points will vibrate so as to move along a predetermined locus R around the center point "O" at the reference position as shown in FIG. 90. This enables to remove minute dusts etc. adhering to the surface of the dust-proof filter 21.

And as the application frequency of applied voltage is raised, the vibration speed of the dust-proof filter 21 in the rotational direction increases. Therefore, the control of voltage application frequency will allow to more effectively remove minute dusts etc. on the surface of the dust-proof filter 21.

On the other hand, the actions when the dust-proof filter 21, which is a dust-proof member, is caused to vibrate in a second direction by the extension/contraction of the piezoelectric element 18D, which is the excitation member, will be described with reference to FIGS. 91 to 93.

First, setting is made such that an offset voltage P is applied to each of the three piezoelectric elements 18D (A, B, C) shown in FIG. 91 in a state in which the dust-proof filter 21 is in a horizontal state.

In this state, when applied voltages as shown in FIGS. 94A, 94B, and 94C are gradually applied to the three piezoelectric elements 18D (A, B, C) simultaneously, each piezoelectric element 18D (A, B, C) gradually extends in the direction of arrow F shown in FIGS. 91 to 93, respectively. This will cause the dust-proof filter 21 to start deflecting toward the state shown by the solid line in FIGS. 92 and 93. Then, at the time point when the applied voltage reaches a predetermined peak value, the deflection of dust-proof filter 21 becomes a maximum. The state at this moment is the state shown by the solid line in the FIGS. 92 and 93.

In this state, a control to gradually reduce the applied voltage is performed. Then, the dust-proof filter 21 is displaced from the solid line state in FIGS. 92 and 93 to the direction to return to a horizontal state (direction of arrow F4 in FIGS. 92 and 93). Then, at the time point of the offset voltage P, the dust-proof filter 21 returns to a horizontal state.

Further from this state, a reduction control of the applied voltage to the three piezoelectric elements 18D (A, B, C) is performed. Then, each piezoelectric element 18D starts deflecting toward the state indicated by the two-dot chain line in FIGS. 92 and 93. Then, at the time point when the applied voltage reaches a peak value (GND value), the deflection of the dust-proof filter 21 becomes a maximum. The state at this moment is the state indicated by the two-dot chain line in FIGS. 92 and 93.

Next, in this state, a control to gradually apply an applied voltage is performed. Then, the dust-proof filter 21 is displaced from the two-dot chain line state in FIGS. 92 and 93 to the direction to become a horizontal state. Then, at the time point of the offset voltage P, the dust-proof filter 21 returns to a horizontal state.

Consecutively, if the application of voltage to each piezoelectric element 18D is continued, the dust-proof filter 21 starts deflecting again toward the state indicated by the solid line FIGS. 92 and 93.

Thus, performing a control to repeatedly boost/reduce the applied voltage to each piezoelectric element 18D will result in that the dust-proof filter 21 vibrates in a second direction (direction along the optical axis of the photographing optical system 12a). Therefore, dusts etc. adhering to the surface of the dust-proof filter 21 will be removed.

It is noted that the resonance frequency at this moment depends on the shape, thickness, material etc. of the dust-proof filter 21. In the example shown in the above described FIGS. 91 to 93, the case in which a primary mode vibration is generated is shown. However, not being limited thereto, and it may be arranged such that a higher order mode vibration is generated.

For example, another example shown in FIGS. 95 to 97 shows a situation when a secondary mode vibration is generated in a dust-proof filter 21 having the same configuration as that of the embodiment shown in FIGS. 91 to 93.

In this case, when for example a plus (+) voltage is applied to piezoelectric element 18D, the dust-proof filter 21 will deflect as indicated by the solid line in FIGS. 96 and 97. Further, when a minus (−) voltage is applied to piezoelectric element 18D, the dust-proof filter 21 will deflect as indicated by the two-dot chain line in the same figure.

Therefore, applying a periodic voltage to the piezoelectric element 18D at a predetermined time by controlling the dust-proof filter driving portion I48 through the control by CPU 41 will cause the dust-proof filter 21 to vibrate. Therefore, dusts etc. adhering to the surface of the dust-proof filter 21 will be removed.

When the primary mode vibration is generated as shown in the above described FIGS. 91 to 93, a sealed space 51 will undergo a volume change by the amount indicated by symbol G (FIGS. 92 and 93) caused by the amplitude of the dust-proof filter 21. On the other hand, when a secondary mode vibration is generated as shown in FIGS. 95 to 97, the volume change of the sealed space 51 caused by the amplitude of the dust-proof filter 21 will be equal to the amount obtained by subtracting two times the area indicated by symbol H2 from the area indicated by symbol H1 i.e., (H1−(H2×2)).

It is well known that as the volume change to the sealed space 51 decreases, the change of the internal pressure inside the sealed space 51 decreases. This will result in that a smaller volume change of the sealed space 51 will allow to provide a vibration more efficiently. Therefore, in view of the efficiency of electromechanical conversion, it will be more desirable to arrange that vibration is generated in a high order mode.

In an image pickup apparatus (camera 1) thus configured according to the present embodiment, the flow of control processing while a photographing operation is performed will be described below with reference to the flowcharts of FIGS. 98 and 99.

First, user's operation of a predetermined operation member (a power supply switch etc., not expressly shown) in the camera 1 of the present embodiment will cause the present camera 1 to be activated. This causes the CPU 41 to start the execution of the photographing operation processing shown in FIG. 98 (START).

In the step S81 of FIG. 98, the CPU 41 executes the processing of the initialization operation during system activation. Thereafter, the process advances to the processing of the step S82.

In the step S82, the CPU 41 executes an excitation operation processing (see FIG. 99). The excitation operation processing to be executed here is a series of sequence processing shown in FIG. 99. That is, the excitation operation processing is a processing to provide a vibration in a first direction and a vibration in a second direction to the dust-proof filter 21 for each predetermined time period by controlling the driving of the excitation means (the piezoelectric element 18D, and the dust-proof filter driving portion 49A).

That is, in the step S111 of FIG. 99, the CPU 41 turns the excitation operation in the first direction, which is the direction perpendicular to the optical axis into On state. That is, the CPU 41 applies periodic voltages with a phase difference to a plurality of piezoelectric elements 18D respectively via the dust-proof filter driving portion 49A. This will result in that the piezoelectric element 18D will cause the dust-proof filter 21 to vibrate in a first direction, that is, a direction substantially perpendicular to the optical axis of a light flux that passes through the dust-proof filter 21. Thereafter, the process advances to the next step S112.

In the step S112, after a predetermined time period has passed from the start of the processing of the above described step S111, the CPU 41 turns the excitation operation in a direction perpendicular to the optical axis (first direction) into Off state. That is, the CPU 41 stops applying voltage to the piezoelectric element 18D via the dust-proof filter driving portion 49A. This will result in that the vibration of the dust-proof filter 21 in the first direction caused by the piezoelectric element 18D is stopped. Thereafter, the process advances to the next step S113.

Next, in the step S113, the CPU 41 turns the excitation operation in the direction along the optical axis of the photographing optical system 12a (second direction) into On state. That is, the CPU 41 applies voltages having the same phase to the plurality of piezoelectric elements 18D respectively via the dust-proof filter driving portion 49A. This will result in that the piezoelectric element 18D causes the dust-proof filter 21 to vibrate in a second direction, that is, the traveling direction of a light flux that passes through the dust-proof filter 21, which is the direction along the optical axis of the photographing optical system 12a. Thereafter, the process advances to the processing of next step S114.

In the step S114, after a predetermined time period has passed from the start of the processing of the above described step S113, the CPU 41 turns the excitation operation in the optical axis direction of the photographing optical system 12a into Off state. That is, the CPU 41 stops applying voltage to the piezoelectric element 18D via the dust-proof filter driving portion 49A. This will result in that the vibration of the dust-proof filter 21 in the second direction caused by the piezoelectric element 18D is stopped. Thereafter, the process returns to the sequence of FIG. 98 and advances to the processing of the step S83 in the same figure (RETURN).

Returning back to FIG. 98, in the step S83, the CPU 41 executes the detection operation of the attachment/detachment of accessory. The detection operation of the attachment/detachment of accessory is an operation to detect if an accessory such as the lens barrel 12 etc. is attached/detached to or from the camera body 11.

First, in the step S84, if the attachment/detachment of an accessory is not detected, the process advances to the processing of the step S86. On the other hand, if the attachment/detachment of an accessory is detected in the step S84, the process advances to the processing of the step S85.

In the step S85, the CPU 41 executes an excitation operation processing. The excitation operation processing to be executed here is a similar operation to the above described operation of the step S82, which is a series of sequence processing shown in FIG. 99. Thereafter, the process advances to the operation of the step S86.

In the step S86, the CPU 41 executes the detection operation of the state of various operation switches (SW, not expressly shown). The operation switches of which state is detected here include, for example, a release switch which is interlocked with the operation of a release button 17, a power supply switch, and the like. This release switch is made up of a two-step switch which is used in ordinary cameras etc. That is an ordinary release switch which is configured such that a half-press operation of the first release button 17 turns the first (1st) release switch into On state and the following full-press state of the release button 17 will turn the second (2nd) switch into On state.

In the step S87, the CPU 41 confirms whether or not the first release switch has been operated. Here, if it is confirmed that the aforementioned switch has not been operated, the process advances to the step S93. Then, in the step S93, the CPU 41 confirms the state of the power supply switch. Here, if it is confirmed that the state of the power supply switch is Off state, a series of processing is terminated (END). Further, if it is confirmed that the state of the power supply switch is On state, the process returns to the processing of the above described step S83, and repeats the processing that follows.

On the other hand, in the above described step S87, if it is confirmed by the CPU 41 that the first release switch has been operated, the process advances to the processing of the next step S88.

In the step S88, the CPU 41 executes a so-called photometric processing which performs the measurement of object luminance and the calculation of TV values and AV values.

Next, in the step S89, the CPU 41 executes a so-called autofocus (AF) processing which controls an AF sensor to detect a focus deviation amount.

Next, in the step S90, the CPU 41 makes judgment whether or not the focus deviation amount detected as the result of the AF processing by the above described step S89 is within a permissible value. Here, if it is judged that the deviation amount is not within the permissible value, the process advances to the processing of the step S91. Then, in the step S91, after executing the driving control of the photographing optical system 12a, the CPU 41 returns to the processing of the above described step S83, and repeats the processing that follows.

On the other hand, in the above described step S90, if it is judged that the deviation amount is within the permissible value, the process advances to the processing of the next step S92.

In the step S92, the CPU confirms whether or not the second release switch has been operated. Here, if it is confirmed that the aforementioned switch has not been operated, the process advances to the processing of the step S93. Then, in the step S93, the CPU 41 confirms the state of the power supply switch. Here, if it is confirmed that the state of the power supply switch is Off state, a series of processings are terminated (END). Further, if it is confirmed that the state of the power supply switch is On state, the process returns to the processing of the above described step S83 and repeats the processing that follows.

On the other hand, in the above described step S92, if the CPU 41 confirms that the second release switch has been operated, the process advances to the processing of the next step S94.

In the step S94, the CPU 41 executes an aperture control processing of the lens barrel 12. The aperture control processing is a processing to perform the open-close operation of the aperture blade provided inside the lens barrel 12 based on the calculation result in the above described step S88 thereby controlling the setting of a predetermined aperture value.

Next, in the step S95, the CPU 41 executes a mirror-up control processing. The mirror-up control processing is a control of the operation to move the reflex mirror 13b, which is located in the position at which the reflex mirror 13b can bend the optical axis of the object light flux that has passed the photographing optical system 12a and direct the object light flux toward the observation optical system, to a position at which the reflex mirror 13b retreats from the optical axis of the photographing optical system 12a. This mirror-up operation allows the object light flux that has passed the photographing optical system 12a to travel toward the photoelectric conversion surface of the image pickup device 27.

Next, in the step S96, the CPU 41 executes a shutter-open control processing. The shutter-open control processing is a processing to control the opening operation of the shutter mechanism provided inside the camera body 11 based on the calculation result in the above described step S88.

Then, in the step S97, the CPU 41 executes an image pickup operation processing by controlling the driving of the image pickup device 27, the image signal processing circuit 16a, the work memory 16b, the display circuit 47, the LCD 46, and the like. The image pickup operation processing includes: a processing to drive the image pickup device 27 to perform photoelectric conversion processing and to acquire image signal; a processing to perform a predetermined signal processing on the acquired image signal, at the image signal processing circuit 16a etc. and convert it into a predetermined form of image data; and a series of control processing such as transferring the generated image data to the work memory 16*b* to temporally record it, transferring the image data to the display circuit 47 to generate an image signal in a predetermined display format in the display circuit 47, and performing an image display processing by the LCD 46.

In parallel with that, in the step S98, the CPU 41 executes a shutter-close control processing. The shutter-close control processing is a processing to control the closing operation of the shutter mechanism provided inside the camera body 11 based on the calculation result in the above described step S88.

Next, in the step S99, the CPU 41 executes a mirror-down control processing and a shutter-charge control operation. Out of these, the mirror-down control processing is a control to perform the operation to move the reflex mirror 13*b*, which is located in the position at which the reflex mirror 13*b* can retreat from the optical axis of the photographing optical system 12*a*, to a position at which the reflex mirror 13*b* can bend the optical axis of the object light flux that has passed the photographing optical system 12*a* and direct the object light flux toward the observation optical system. This mirror-down operation allows the optical axis of the object light flux, which has passed the photographing optical system 12*a*, to be bent by the reflex mirror 13*b* and reflected toward the pentaprism 13*a* which is disposed above the reflex mirror 13*b*.

Further, the shutter-charge control operation is a preparation operation for the next photographing operation, and is a control to turn the shutter mechanism into a charge state.

Then, in the step S100, the CPU 41 executes an aperture control processing of the lens barrel 12. The aperture control processing to be executed here is a processing to operate the aperture blade, which is set to be a specific aperture value based on the calculation result in the above described step S88, to be set in a full-open state, that is, an open state.

Next, in the step S101, the CPU 41 confirms whether or not a recording medium 43 is installed at a predetermined portion of the camera body 11 of the present camera 1 via a recording medium interface 42. In this case, if the CPU 41 confirms that the recording medium 43 is installed in the camera body 11, the process advances to the processing of the next step S102.

In the step S102, the CPU 41 executes a recording operation processing of image data. The recording operation processing of image data is a control operation to record the image data, which is acquired and generated by the image pickup operation processing in the above described step S97, and is temporally recorded inside the work memory 16*b* etc., in the recording medium 43 through the recording medium interface 42.

On the other hand, in the step S101, if the CPU 41 confirms that the recording medium 43 is not installed in the camera body 11, the process advances to the processing of the step S103. Then, in the step S103, an alarm display processing indicating that the recording medium 43 is not installed is executed on the display screen of the LCD 46 connected, for example, via the display circuit 47. Thereafter, the process returns to the above described step S83 and repeats the processing that follows.

In the above described embodiment, as shown by the flowchart of FIG. 98, the timing to operate the excitation means (the timing to execute the excitation operation processing (see FIG. 99)) is represented by the time point immediately after the system activation of the present camera 1 (step S82 of FIG. 98) and the time point when an accessory such as the lens barrel 12 etc. is attached/detached to or from the camera body 11 (step S85 of FIG. 98).

This operation timing of the excitation means is not limited to the above case, but for example it can be arranged in the same manner with another variant to be described next (see the flowchart shown in FIG. 100). In the another variant, in addition to the operation timing of the step S82 and the step S85 in the above described FIG. 98, it is arranges such that the excitation means is operated at a predetermined time before or after the photographing operation processing (step S106 and the step S107 of FIG. 100).

That is, after the mirror-up control processing of the step S95 of FIG. 100, in the step S106, the CPU 41 turns the excitation operation in the direction perpendicular to the optical axis into On state. That is, the CPU 41 applies a periodic voltage having the same phase to the plurality of piezoelectric elements 18D via the dust-proof filter driving portion 49A. This will result in that the piezoelectric elements 18D cause the dust-proof filter 21 to vibrate in the first direction, that is, the direction substantially perpendicular to the optical axis of the light flux that passes through the dust-proof filter 21. Thereafter, the process advances to the processing of the next step S96.

Further, after the shutter-close control processing of the step S98 of FIG. 100, in the step S107, the CPU 41 turns the excitation operation in the perpendicular direction to the optical axis into Off state. That is, the CPU 41 stops applying voltage having the same phase to the plurality of piezoelectric elements 18D via the dust-proof filter driving portion 49A. This will result in that the vibration of the dust-proof filter 21 in the first direction caused by the piezoelectric elements 18D is stopped. Thereafter, the process advances to the processing of the next step S99.

In the flowchart of FIG. 100, other processing steps are identical to those of the above described flowchart of FIG. 98.

Thus, in this example, it is arranged that the dust-proof filter 21 is caused to vibrate in the first direction by the excitation means during the time period from the time point before the execution of the shutter-open control processing (step S96) to the time point after the execution of the shutter-close control processing (step S98). When the present camera 1 is in such state, the shutter is turned into open state and the outer surface of the dust-proof filter 21 is most extensively exposed to the outside. Therefore, the outer surface of the dust-proof filter 21 is most likely to be adhered to by dusts etc.

Then, performing the control processing as shown in the flowchart of FIG. 100 can result in that the dust-proof filter 21 is caused to vibrate in a first direction by the excitation means at a timing when the shutter mechanism is in an open state during image pickup operation, thereby allowing to remove dusts etc.

In addition, since the dust-proof filter 21 is kept on vibrating during an image pickup operation, even when there exist dusts etc. which are adhering to the surface of the dust-proof filter 21 and which cannot be removed, since it is arranged that microvibration is provided to the dust-proof filter 21 in the vicinity of the front face side of the photoelectric conversion surface of the image pickup device 27, a shadow caused by the adhering dusts etc. will not form a clear image on the photoelectric conversion surface. Therefore, even in a state in which dusts etc. on the surface of the dust-proof filter 21 have not been completely removed, it is ensured that a high quality image will be obtained without adversely affecting the image to be obtained.

As so far described, according to the above described sixth embodiment, since it is realized that a vibration in the direction along the face of the transmission portion 21*c* of the dust-proof member (the dust-proof filter 21) (first direction) and a vibration in the direction along the optical axis of the optical element (photographing optical system 12*a*) are obtained by using excitation means (the piezoelectric element 18D, and the dust-proof filter driving portion 49A) which vibrates in one direction, and devising the driving control thereof, it is possible to more effectively remove dusts etc. adhering to the surface of the dust-proof filter 21 and to realize a reduction of the number of parts. This can contribute to the miniaturization of the image pickup unit 15 and the reduction of production cost.

Next, a seventh embodiment of the present invention will be described. In the present embodiment, as the optical apparatus to which the present invention is applied, a projection image display apparatus, specifically a three-panel projector apparatus having three transmission liquid crystal display panels (image display elements) as an image forming body including an image forming element will be illustrated. Therefore, in the seventh embodiment described below, the optical apparatus is referred to as a projection image display apparatus (projector apparatus).

Figure 101:
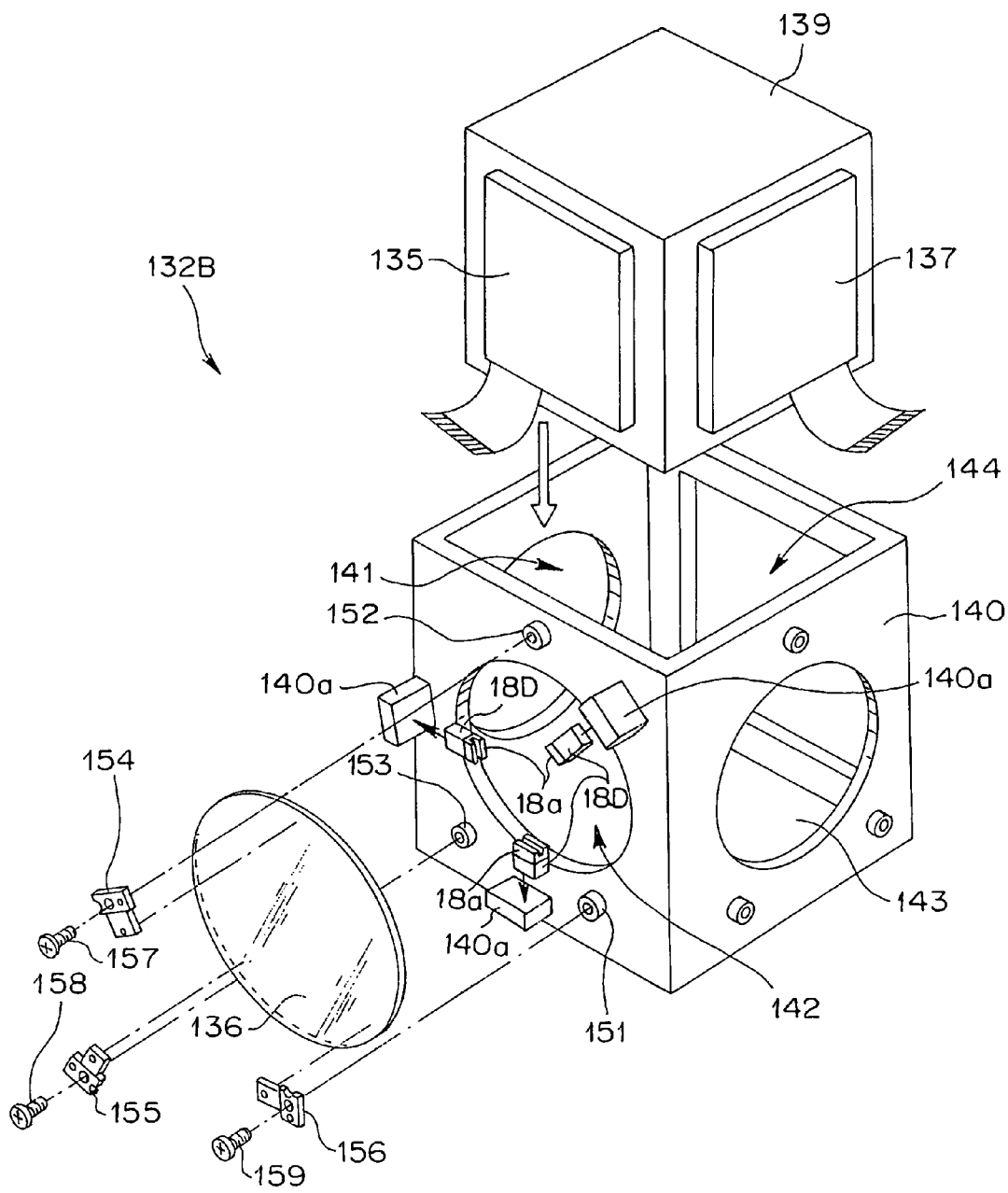
FIG. 101 is an exploded perspective view of a prism unit in the projection image display apparatus according to a seventh embodiment of the present invention.
Figure 102:
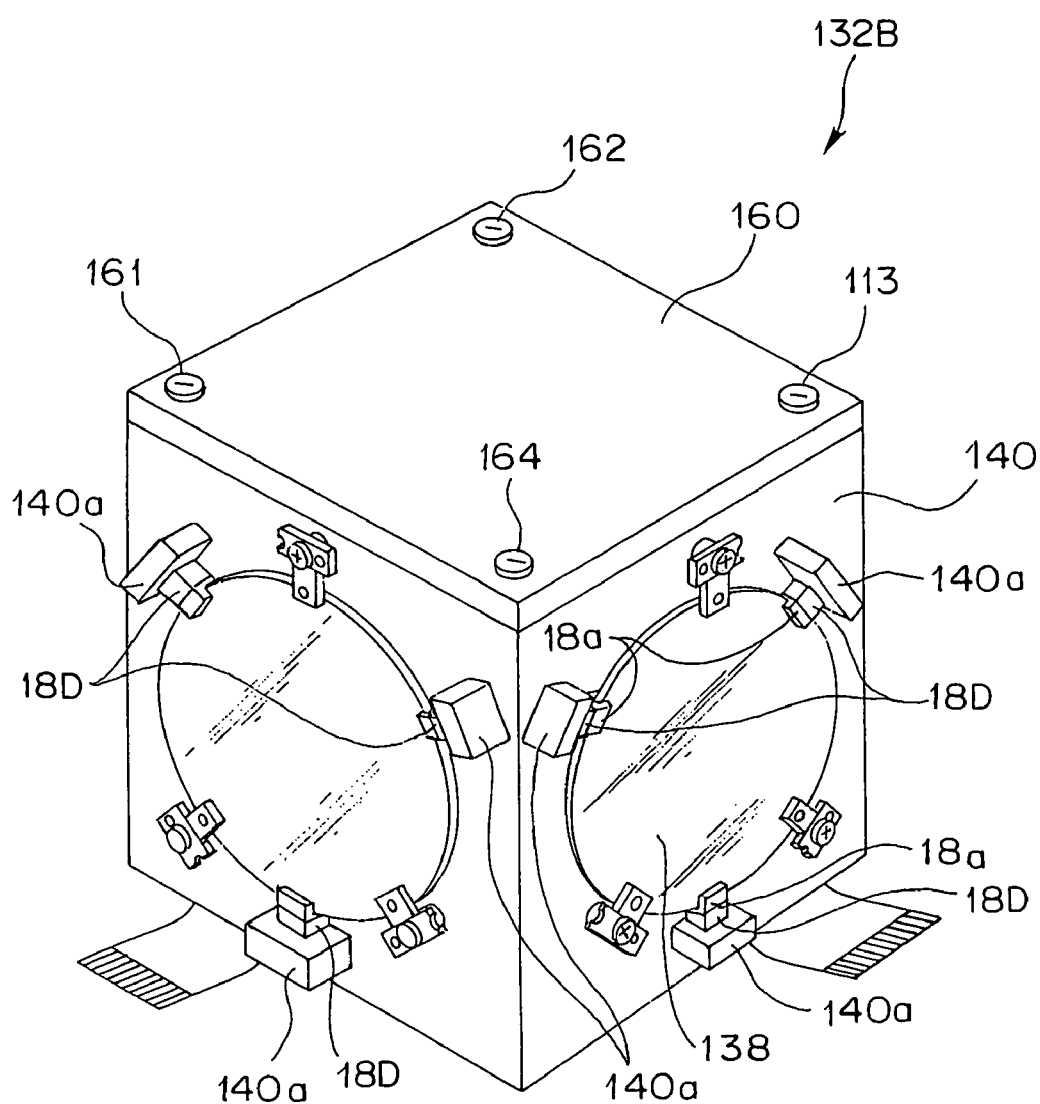
FIG. 102 is an outside perspective view to show the prism unit of FIG. 101 in an assembled state.

FIG. 101 is an exploded perspective view of a prism unit in the projection image display apparatus (projector apparatus) as an optical apparatus according to the seventh embodiment of the present invention. FIG. 102 is an outside perspective view to show the prism unit in the projection image display apparatus (projector apparatus) of the present embodiment in an assembled state.

The seventh embodiment is basically made up of substantially same configurations as those of the above described second and fifth embodiments, and only slightly differs in the configuration of the prism unit. Therefore, the configurations similar to those of the above described second and fifth embodiments will be omitted from description, and only different configurations will be described in detail. It is noted that as to the drawings, reference will also be made to FIGS. 39 and 40 which were used in the above described second embodiment.

The projector apparatus of the present embodiment is primarily made up of a extra-high pressure mercury lamp 111, a reflector 112, a relay lens 113, a first lens array 114, a second lens array 115, a polarization conversion element 116, a superposed lens 117, total reflection mirrors (118, 120, 123, and 128), dichroic mirrors (119 and 121), relay lenses (122, 125, 129, 130, and 131), transmission liquid crystal display panels (133, 135, and 137), dust-proof filters (134, 136, and 138), a dichroic prism 139, a projection lens 101, and the like.

The dichroic prism 139, the three liquid crystal display panels (133, 135, and 137), the dust-proof filters (134, 136, and 138), and the like are integrally formed into one body as a single prism unit 132B. Thus, basic configurations are similar to those of the above described second and fifth embodiments (see FIG. 40).

Here, the configuration of the prism unit 132B in the projector apparatus of the present embodiment will be described in detail below on the portions different from those of the above described second and fifth embodiments, with reference to FIGS. 101 and 102.

Each face of the dichroic prism 139 is fixedly attached with three liquid crystal display panels (133, 135, and 137) as shown in FIG. 101 (the liquid crystal display panel 133 is not shown in FIG. 101).

The dichroic prism 139 with the liquid crystal display panels (133, 135, and 137) being fixedly attached thereto is arranged to be installed into a prism frame 140, which is a frame member, from an upper opening thereof.

The prism frame 140 is formed with circular openings (141, 142, and 143) at positions so as to be respectively faced with the three liquid crystal display panels (133, 135, and 137) fixedly attached to the dichroic prism 139. Moreover, the prism frame 140 is formed with a rectangular opening 144 at a position so as to be faced with the emitting face of the dichroic prism 139.

Further, the prism frame 140 is attached on the outer surface thereof with the dust-proof filters (134, 136, and 138) so as to cover the circular openings (141, 142, and 143). That is, the arrangement is such that the dust-proof filters (134, 136, and 138) are disposed respectively in the vicinity of each liquid crystal display panel (133, 135, 137) with a predetermined spacing with respect to the display surface thereof.

It is noted that in FIG. 101, for purposes of simplifying the drawing, only the structure for attaching the dust-proof filter 136 to the circular opening 142 will be illustrated, and description will be made only on the configuration of this portion. Therefore, other portions, that is, the structures for attaching the dust-proof filter 134 to the circular opening 141 and for attaching the dust-proof filter 138 to the circular opening 143 will be omitted from illustration and description thereof since they are identical.

Receiving parts (151, 152, and 153) protruding to the outer face side are formed in the peripheral edge part of the circular opening 142 of the prism frame 140. The receiving parts (151, 152, and 153) are portions which are formed to fixedly dispose pressing members (154, 155, and 156) for holding the dust-proof filter 136. Each pressing member (154, 155, 156) is fixedly disposed by fastening means such as screws (157, 158, and 159).

The dust-proof filter 136 differs from that of the above described second embodiment and is substantially same with that of the above described fifth embodiment in that it is directly abutted and is held by the pressing members (154, 155, and 156) so as to be airtightly and vibratably joined with the prism frame 140.

Three supporting parts 140a protruding to the outer face side are formed at the peripheral edge part of the circular opening 142 of the prism frame 140. There are fixedly disposed on to the three supporting parts 140a, a piezoelectric element 18D, which is an excitation member that comes into contact with the outer peripheral end face of the dust-proof filter 136 and extends/contracts the dust-proof filter 136 in a predetermined direction, that is, the direction along the face of the transmission portion of the dust-proof filter 136 thereby providing vibrations to the dust-proof filter 136 in two directions, that is, a first direction (direction along the face of the transmission portion of the dust-proof filter 136) and a second direction (direction along the optical axis of the relay lens 130). The configuration on this point is substantially same as that of the above described second embodiment.

It is noted that the structures of the excitation member (piezoelectric element 18D) and the dust-proof member (the dust-proof filter 136) are identical to the excitation member (piezoelectric element 18D) and the dust-proof member (the dust-proof filter 21) in the camera 1B shown in the above described sixth embodiment. Therefore, detailed description thereof will be omitted. Also other configurations are substantially same as those of the above described second and fifth embodiments.

The action of the thus-configured projector apparatus of the present embodiment is also substantially same as that of the above described fifth embodiment, and for the excitation control of the dust-proof filters (134, 136, and 138) in the present embodiment, the means described in the camera 1B in the above described sixth embodiment can be applied without any changes. Therefore, detailed description on the action will be omitted. However, the timings for performing the excitation operation are different from those in the camera 1B of the above described sixth embodiment.

That is, in the case of a typical projector apparatus, a cooling fan is generally provided thereinside to cool the light source lamp. Therefore, dusts etc. are always suspended in the air inside the projector apparatus.

Therefore, the timing of the excitation control operation when applying the present invention to a projector apparatus may be arranged such that the dust-proof filter is caused to vibrate periodically during image display or at a predetermined timing such as the time point of switching image display.

This will allow to effectively shake off dusts etc. adhering to the dust-proof filter as with the above described second and fifth embodiments, thereby making it possible to always perform satisfactory image display without the risk that dusts etc. are enlarged and displayed in the image on the screen projected and displayed by the projector apparatus concerned.

As so far described, according to the sixth and the seventh embodiments, it is possible to provide an optical apparatus such as an image pickup apparatus equipped with an image pickup unit including an image pickup device, and a projection image display apparatus which enlarges and projects an optical image formed by an image forming element, in which the optical apparatus allows to improve the dust-proof capability by combining different excitation directions to the dust-proof member enabling to securely remove finer dusts etc. so that image data for consistently representing a high quality image can be obtained or a high quality image can be projected; and allows to realize a configuration for generating two-direction displacements by means of excitation means which vibrates in one direction enabling to contribute to the reduction of the number of parts.

It is obvious that a wide range of different embodiments can be configured based on the present invention without departing from the spirit and scope of the present invention. The present invention will not be restricted by its particular embodiments except as they are so limited by the appended claims.

What is claimed is:

1. A dust-proof filter unit, comprising:
a dust-proof member including a transmission portion which can transmit a light flux for image, the dust-proof member being oppositely disposed to a solid image pickup device at a predetermined spacing therebetween;
first excitation means for providing a vibration to the dust-proof member, the vibration being in a first direction in parallel with a predetermined plane;
second excitation means for providing a vibration to the dust-proof member, the vibration being in a second direction substantially perpendicular to the first direction;
a dust-proof filter driving portion for driving the first excitation means and the second excitation means; and
a control circuit for controlling the dust-proof filter driving portion,
wherein an abutment part between the first excitation means and the dust-proof member is configured to be relatively slidable.

2. The dust-proof filter unit according to claim 1, wherein the first excitation means are a plurality of excitation members which are disposed in abutment with a periphery of the dust-proof member in a direction perpendicular to an optical axis with respect to the dust-proof member.

3. The dust-proof filter unit according to claim 2, wherein the plurality of excitation members are controlled by the control circuit so that a phase difference is produced between each of the plurality of excitation members.

4. The dust-proof filter unit according to claim 1, wherein the control circuit performs control such that the first excitation means is operated, and thereafter the second excitation means is operated.

5. The dust-proof filter unit according to claim 1, wherein the control circuit performs control such that the first excitation means and the second excitation means operate simultaneously.

6. The dust-proof filter unit according to claim 1, wherein the dust-proof member is an optical low pass filter for optically removing a high frequency component of a light flux for image.

7. The dust-proof filter unit according to claim 1, further comprising
an image pickup optical system for directing a light flux incident to the solid image pickup device, wherein:
the dust-proof member is disposed in an optical path between the image pickup optical system and the solid image pickup device;
the vibration in the first direction caused by the first excitation means is substantially perpendicular to an optical axis of the image pickup optical system; and
the vibration in the second direction caused by the second excitation means is a direction substantially along the optical axis of the image pickup optical system.

8. The dust-proof filter unit according to claim 7; wherein
the first excitation means are a plurality of excitation members which are disposed in abutment with the periphery of the dust-proof member in a direction perpendicular to an optical axis with respect to the dust-proof member.

9. The dust-proof filter unit according to claim 8, wherein
the plurality of excitation members are controlled by the control circuit so that a phase difference is produced between each of the plurality of excitation members.

10. The dust-proof filter unit according to claim 7; wherein
the control circuit performs control such that the first excitation means is operated, and thereafter the second excitation means is operated.

11. The dust-proof filter unit according to claim 7; wherein
the control circuit performs control such that the first excitation means and the second excitation means operate simultaneously.

12. The dust-proof filter unit according to claim 7; wherein
the dust-proof member is an optical low pass filter for optically removing a high frequency component of a light flux for image.

13. A dust-proof filter unit, comprising:
a dust-proof member including a transmission portion which can transmit a light flux for image, the dust-proof member being oppositely disposed to a solid image pickup device at a predetermined spacing therebetween;
first excitation arrangement for providing a vibration to the dust-proof member, the vibration being in a first direction in parallel with a predetermined plane;
second excitation arrangement for providing a vibration to the dust-proof member, the vibration being in a second direction substantially perpendicular to the first direction;
a dust-proof filter driving portion for driving the first excitation arrangement and the second excitation arrangement; and
a control circuit for controlling the dust-proof filter driving portion;
wherein an abutment part between the first excitation arrangement and the dust-proof member is configured to be relatively slidable; and wherein the first excitation arrangement and the second excitation arrangement are a stacked piezoelectric element.

14. A dust-proof filter unit, comprising:

a dust-proof member including a transmission portion which can transmit a light flux for image, the dust-proof member being oppositely disposed to a solid image pickup device at a predetermined spacing therebetween;

first excitation arrangement for providing a vibration to the dust-proof member, the vibration being in a first direction in parallel with a predetermined plane;

second excitation arrangement for providing a vibration to the dust-proof member, the vibration being in a second direction substantially perpendicular to the first direction;

a dust-proof filter driving portion for driving the first excitation arrangement and the second excitation arrangement;

a control circuit for controlling the dust-proof filter driving portion; and an image pickup optical system for directing a light flux incident to the solid image pickup device;

wherein:

the dust-proof member is disposed in an optical path between the image pickup optical system and the solid image pickup device;

the vibration in the first direction caused by the first excitation arrangement is substantially perpendicular to an optical axis of the image pickup optical system;

the vibration in the second direction caused by the second excitation arrangement is a direction substantially along the optical axis of the image pickup optical system;

an abutment part between the first excitation arrangement and the dust-proof member is configured to be relatively slidable; and the first excitation arrangement and the second excitation arrangement are a stacked piezoelectric element.

* * * * *